(12) United States Patent
Rahman et al.

(10) Patent No.: US 10,536,205 B2
(45) Date of Patent: Jan. 14, 2020

(54) METHOD AND APPARATUS TO CSI REPORTING USING MULTIPLE ANTENNA PANELS IN ADVANCED WIRELESS COMMUNICATION SYSTEMS

(71) Applicant: Samsung Electronics Co., Ltd., Suwon-si (KR)

(72) Inventors: Md Saifur Rahman, Plano, TX (US); Eko Onggosanusi, Coppell, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/961,616

(22) Filed: Apr. 24, 2018

(65) Prior Publication Data

US 2018/0316407 A1    Nov. 1, 2018

Related U.S. Application Data

(60) Provisional application No. 62/490,296, filed on Apr. 26, 2017, provisional application No. 62/492,591, (Continued)

(51) Int. Cl.
*H04B 7/06* (2006.01)
*H04B 7/0456* (2017.01)

(52) U.S. Cl.
CPC ........ *H04B 7/0626* (2013.01); *H04B 7/0469* (2013.01); *H04B 7/0478* (2013.01); (Continued)

(58) Field of Classification Search
CPC .. H04B 7/0626; H04B 7/0469; H04B 7/0478; H04B 7/0482; H04B 7/0617; H04B 7/063; H04B 7/0639; H04B 7/0695
(Continued)

(56) References Cited

U.S. PATENT DOCUMENTS

2018/0091272 A1* 3/2018 Wang .................. H04B 7/0417
2018/0219603 A1    8/2018 Park et al.

FOREIGN PATENT DOCUMENTS

WO    2017014612 A1    1/2017

OTHER PUBLICATIONS

3GPP TSG RAN WG1 Meeting #88bis, R1-1705509 (Year: 2017).*
(Continued)

*Primary Examiner* — Yemane Mesfin
*Assistant Examiner* — Intekhaab A Siddiquee

(57) ABSTRACT

A user equipment (UE) for channel state information (CSI) feedback is provided. The UE comprises a transceiver configured to receive, from a base station (BS), configuration information for the CSI feedback, the configuration information indicating a number of antenna panels ($N_g$) at the BS and a codebook mode, wherein $N_g>1$ and each of the antenna panels comprises antenna ports with a first polarization ($P_1$) and antenna ports with a second polarization ($P_2$). The UE further comprises a processor operably connected to the transceiver, the processor configured to identify the number of antenna panels ($N_g$) at the BS, identify a codebook for the CSI feedback based on the codebook mode configured between a first codebook mode and a second codebook mode, and generate the CSI feedback using the identified codebook. The transceiver is further configured to transmit the generated CSI feedback to the BS.

17 Claims, 12 Drawing Sheets

Related U.S. Application Data filed on May 1, 2017, provisional application No. 62/535,584, filed on Jul. 21, 2017, provisional application No. 62/539,142, filed on Jul. 31, 2017, provisional application No. 62/547,467, filed on Aug. 18, 2017, provisional application No. 62/548,744, filed on Aug. 22, 2017.

(52) U.S. Cl.
CPC .......... *H04B 7/063* (2013.01); *H04B 7/0617* (2013.01); *H04B 7/0639* (2013.01); *H04B 7/0695* (2013.01)

(58) Field of Classification Search
USPC .......................................................... 370/252
See application file for complete search history.

(56) References Cited

OTHER PUBLICATIONS

"3rd Generation Partnership Project; Technical Specification Group Radio Access Network; Evolved Universal Terrestrial Radio Access (E-UTRA); Physical channels and modulation (Release 14)", Technical Specification 3GPP TS 36.211 V14.2.0, Mar. 2017, 194 pages.
"3rd Generation Partnership Project; Technical Specification Group Radio Access Network; Evolved Universal Terrestrial Radio Access (E-UTRA); Multiplexing and channel coding (Release 14)", Technical Specification 3GPP TS 36.212 V14.2.0, Mar. 2017, 197 pages.
"3rd Generation Partnership Project; Technical Specification Group Radio Access Network; Evolved Universal Terrestrial Radio Access (E-UTRA); Physical layer procedures (Release 14)", Technical Specification 3GPP TS 36.21 V14.2.0, Mar. 2017, 454 pages.
"3rd Generation Partnership Project; Technical Specification Group Radio Access Network; Evolved Universal Terrestrial Radio Access (E-UTRA); Medium Access Control (MAC) protocol specification (Release 14)", Technical Specification 3GPP TS 36.321 V14.2.0, Mar. 2017, 106 pages.
"3rd Generation Partnership Project; Technical Specification Group Radio Access Network; Evolved Universal Terrestrial Radio Access (E-UTRA); Radio Resource Control (RRC); Protocol specification (Release 14)", Technical Specification 3GPP TS 36.331 V14.2.0, Mar. 2017, 721pages.
"3rd Generation Partnership Project; Technical Specification Group Services and System Aspects; Feasibility Study on New Services and Markets Technology Enablers; Stage 1 (Release 14)", Technical Report 3GPP TR 22.891 V1.2.0, Nov. 2015, 96 pages.
International Search Report regarding International Application No. PCT/KR2018/004796, dated Aug. 28, 2018, 3 pages.
Interdigital Communications, "On Type I CSI feedback for Multi-panel", 3GPP TSG RAN WG1 Meeting #88bis, Apr. 2017, R1-1705509, 5 pages.
Ericsson, "Type I Multi-panel CSI codebook", 3GPP TSG-RAN WG1 #88, R1-1702684, Feb. 2017, 8 pages.
NTT DOCOMO, CSI Feedback Type I for NR MIMO, 3GPP TSG RAN WG1 Meeting #88b, R1-1705723, Apr. 2017, 12 pages.
Samsung, "Draft CR on CSR for CSI feedback for semi-OL transmission", 3GPP TSG-RAN WG1 Meeting #88bis, R1705271, Apr. 2017, 28 pages.

\* cited by examiner

METHOD AND APPARATUS TO CSI REPORTING USING MULTIPLE ANTENNA PANELS IN ADVANCED WIRELESS COMMUNICATION SYSTEMS

CROSS-REFERENCE TO RELATED APPLICATION(S) AND CLAIM OF PRIORITY

The present application claims priority to U.S. Provisional Patent Application Ser. No. 62/490,296, filed on Apr. 26, 2017; U.S. Provisional Patent Application Ser. No. 62/492,591, filed on May 1, 2017; U.S. Provisional Patent Application Ser. No. 62/535,584, filed on Jul. 21, 2017; U.S. Provisional Patent Application Ser. No. 62/539,142, filed on Jul. 31, 2017; U.S. Provisional Patent Application Ser. No. 62/548,744, filed on Aug. 22, 2017; and U.S. Provisional Patent Application Ser. No. 62/547,467, filed on Aug. 18, 2017. The content of the above-identified patent documents is incorporated herein by reference.

TECHNICAL FIELD

The present disclosure relates generally to channel state information (CSI) reporting schemes for multiple antenna panels in advanced wireless communication systems.

BACKGROUND

Understanding and correctly estimating the channel in an advance wireless communication system between a user equipment (UE) and an eNode B (eNB) is important for efficient and effective wireless communication. In order to correctly estimate the channel conditions, the UE may report (e.g., feedback) information about channel measurement, e.g., CSI, to the eNB. With this information about the channel, the eNB is able to select appropriate communication parameters to efficiently and effectively perform wireless data communication with the UE.

SUMMARY

Embodiments of the present disclosure provide methods and apparatuses for CSI reporting in an advanced wireless communication system.

In one embodiment, a user equipment (UE) for CSI feedback is provided. The UE comprises a transceiver configured to receive, from a base station (BS), configuration information for the CSI feedback, the configuration information indicating a number of antenna panels ($N_g$) at the BS and a codebook mode, wherein $N_g > 1$ and each of the antenna panels comprises antenna ports with a first polarization ($P_1$) and antenna ports with a second polarization ($P_2$). The UE further comprises a processor operably connected to the transceiver. The processor is configured to identify the number of antenna panels ($N_g$) at the BS, identify a codebook for the CSI feedback based on the codebook mode configured between a first codebook mode and a second codebook mode, and generate the CSI feedback using the identified codebook. The transceiver is further configured to transmit the generated CSI feedback to the BS. The codebook corresponding to the first codebook mode is used to generate the CSI feedback based on a wideband inter-panel co-phase that is common for a plurality of subbands configured for the CSI feedback. The codebook corresponding to the second codebook mode is used to generate the CSI feedback based on at least one of (i) a wideband inter-panel co-phase that is common for the plurality of subbands, and (ii) a subband inter-panel co-phase for each of the plurality of subbands.

In another embodiment, a BS is provided. The BS comprises a processor configured to generate configuration information for CSI feedback, the configuration information indicating a number of antenna panels ($N_g$) at the BS and a codebook mode, the codebook mode indicating a codebook for the CSI feedback and configured between a first codebook mode and a second codebook mode, wherein $N_g > 1$ and each of the antenna panels comprises antenna ports with a first polarization ($P_1$) and antenna ports with a second polarization ($P_2$). The BS further comprises a transceiver operably connected to the processor. The transceiver is configured to transmit, to a UE, the configuration information and receive the CSI feedback from the UE generated in accordance with the indicated codebook. The codebook corresponding to the first codebook mode is used to generate the CSI feedback based on a wideband inter-panel co-phase that is common for a plurality of subbands configured for the CSI feedback. The codebook corresponding to the second codebook mode is used to generate the CSI feedback based on at least one of (i) a wideband inter-panel co-phase that is common for the plurality of subbands, and (ii) a subband inter-panel co-phase for each of the plurality of subbands.

In yet another embodiment, a method for CSI feedback by a UE is provided. The method comprises receiving, from a BS, configuration information for the CSI feedback, the configuration information indicating a number of antenna panels ($N_g$) at the BS and a codebook mode, wherein $N_g > 1$ and each of the antenna panels comprises antenna ports with a first polarization ($P_1$) and antenna ports with a second polarization ($P_2$), identifying the number of antenna panels ($N_g$) at the BS, identifying a codebook for the CSI feedback based on the codebook mode configured between a first codebook mode and a second codebook mode, generating the CSI feedback using the identified codebook, and transmitting the generated CSI feedback to the BS. The codebook corresponding to the first codebook mode is used to generate the CSI feedback based on a wideband inter-panel co-phase that is common for a plurality of subbands configured for the CSI feedback. The codebook corresponding to the second codebook mode is used to generate the CSI feedback based on at least one of (i) a wideband inter-panel co-phase that is common for the plurality of subbands, and (ii) a subband inter-panel co-phase for each of the plurality of subbands.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
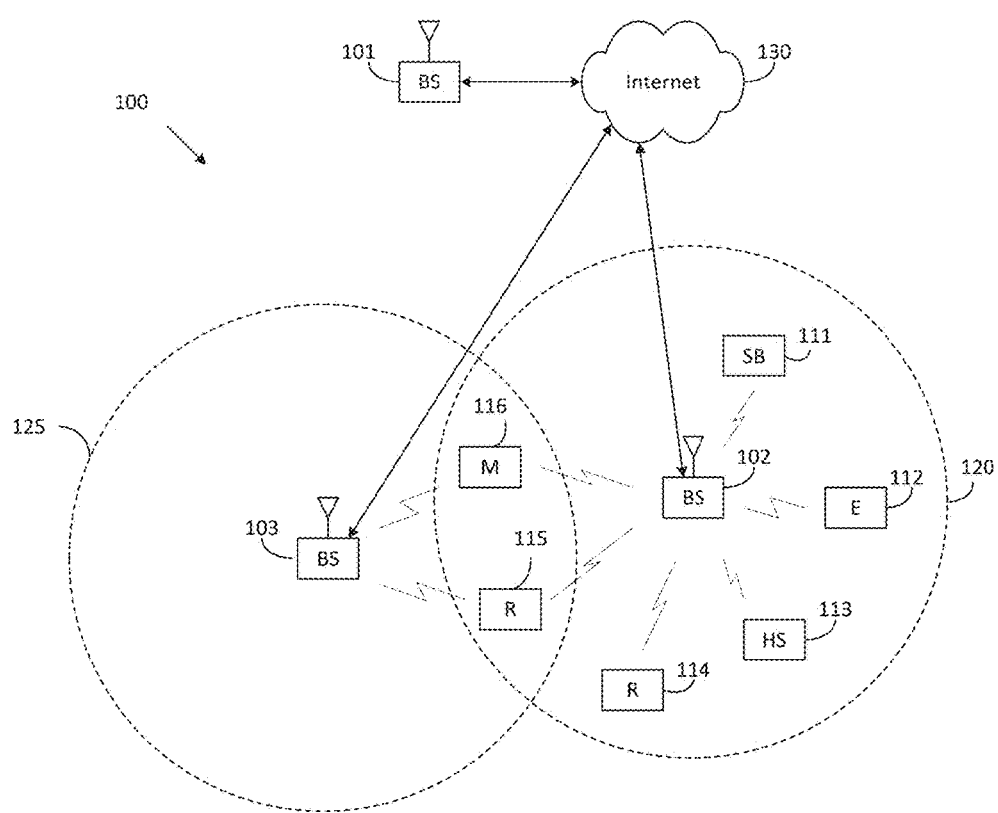
FIG. 1 illustrates an example wireless network according to embodiments of the present disclosure.

FIG. 1 through FIG. 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v14.2.0, "E-UTRA, Physical channels and modulation;" 3GPP TS 36.212 v14.2.0, "E-UTRA, Multiplexing and Channel coding;" 3GPP TS 36.213 v14.2.0, "E-UTRA, Physical Layer Procedures;" 3GPP TS 36.321 v14.2.0, "E-UTRA, Medium Access Control (MAC) protocol specification;" and 3GPP TS 36.331 v14.2.0, "E-UTRA, Radio Resource Control (RRC) protocol specification;" 3GPP TR 22.891 v1.2.0.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), this disclosure can be extended to other OFDM-based transmission waveforms or multiple access schemes such as filtered OFDM (F-OFDM).

The present disclosure covers several components which can be used in conjunction or in combination with one another, or can operate as standalone schemes.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 2:
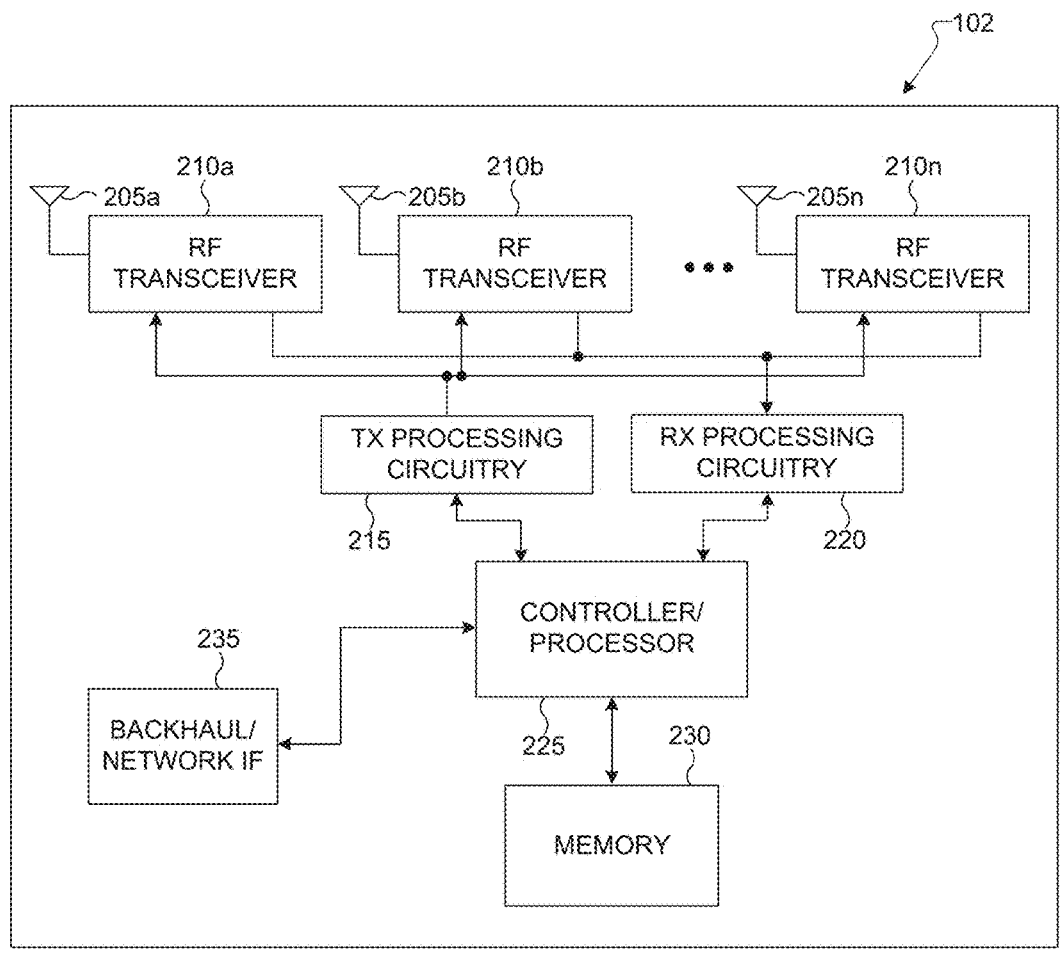
FIG. 2 illustrates an example eNB according to embodiments of the present disclosure.
Figure 3:
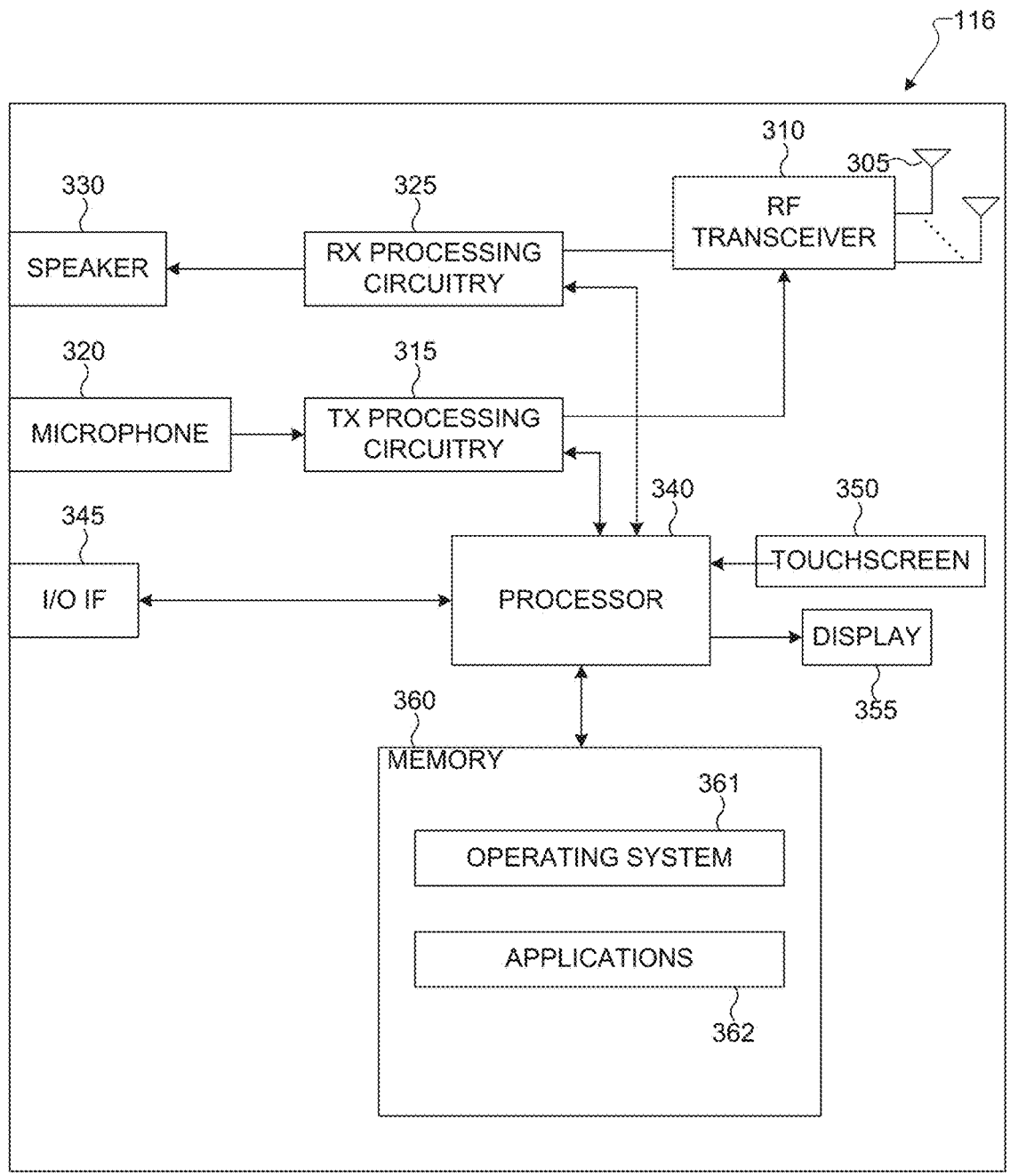
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for efficient CSI reporting in an advanced wireless communication system. In certain embodiments, and one or more of the eNBs 101-103 includes circuitry, programming, or a combination thereof, for receiving efficient CSI reporting in an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on PUCCH. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
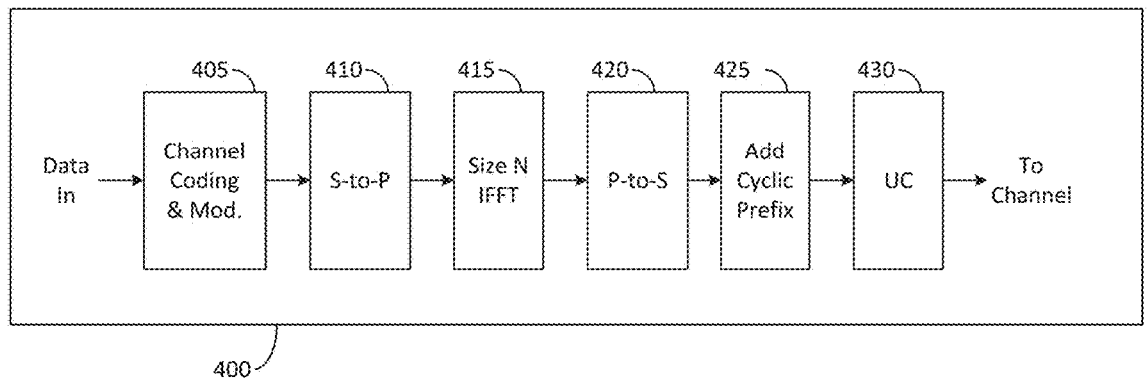
FIG. 4A illustrates a high-level diagram of an orthogonal frequency division multiple access transmit path according to embodiments of the present disclosure.
Figure 4B:
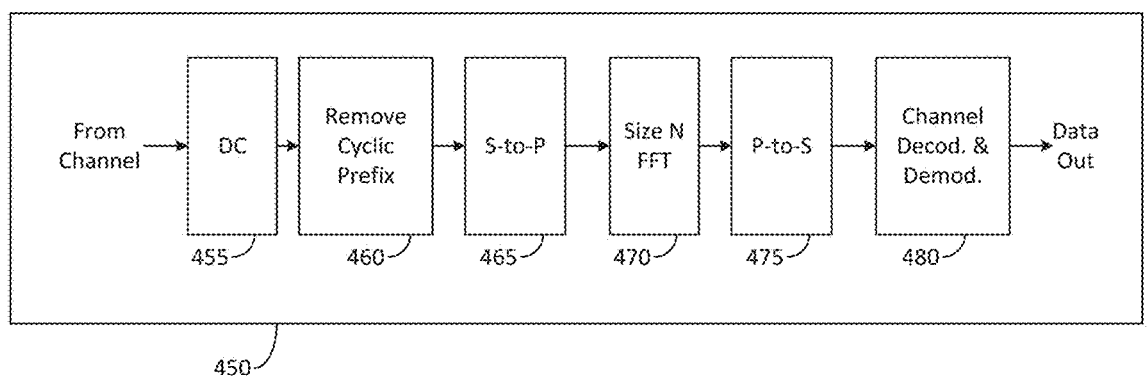
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $NR_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH}=M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 5:
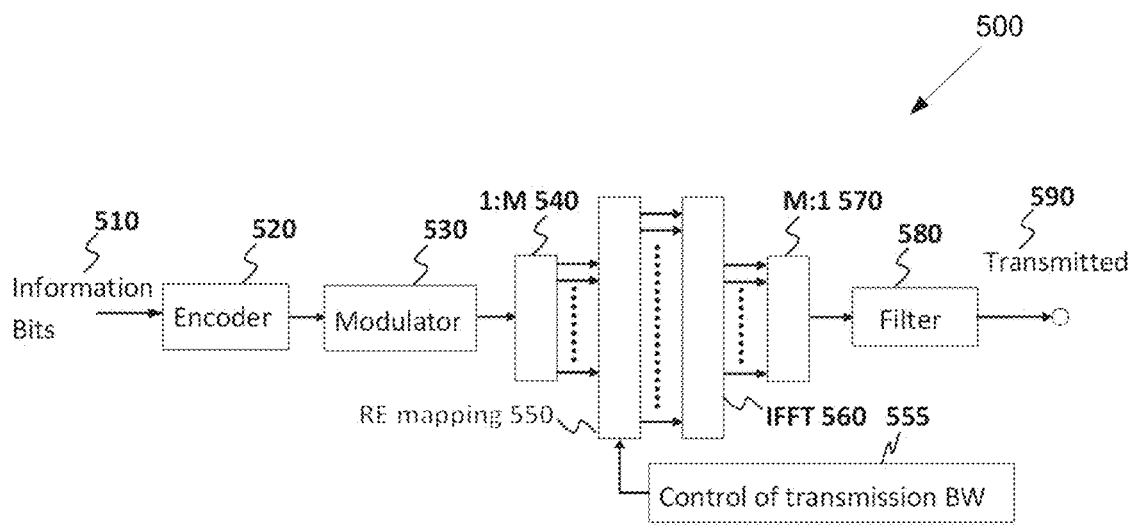
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
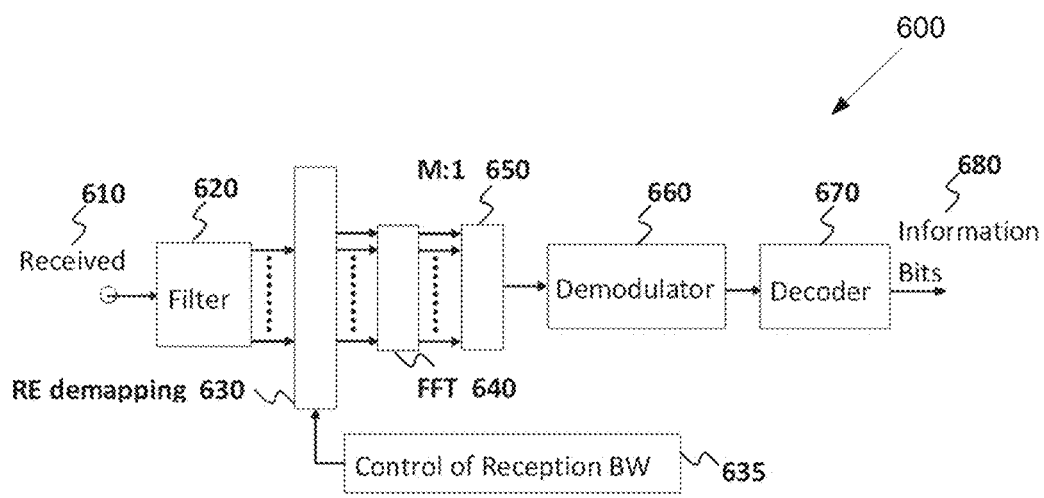
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
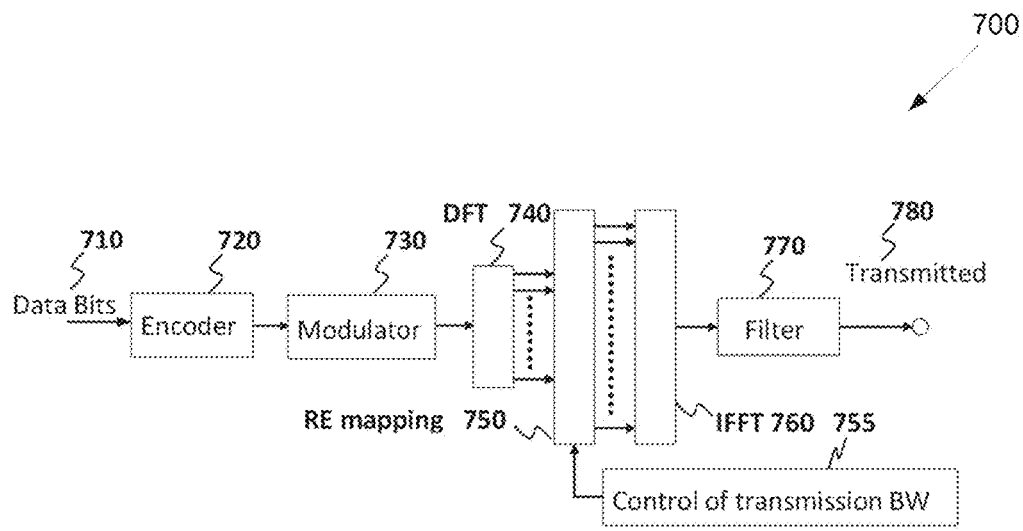
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
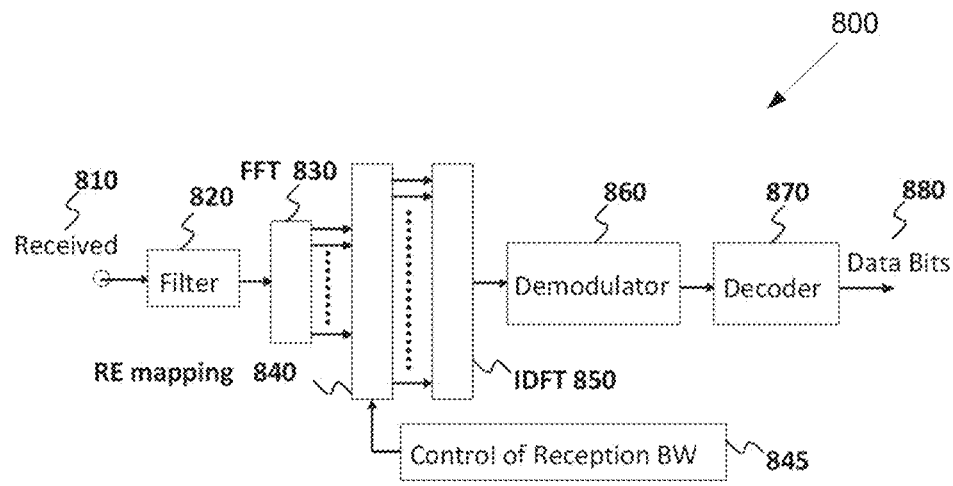
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases has been identified and described; those use cases can be roughly categorized into three different groups. A first group is termed 'enhanced mobile broadband' (eMBB), targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per km$^2$ with less stringent the reliability, data rate, and latency requirements.

In order for the 5G network to support such diverse services with different quality of services (QoS), one method has been identified in LTE specification, called network slicing. To utilize PHY resources efficiently and multiplex various slices (with different resource allocation schemes, numerologies, and scheduling strategies) in DL-SCH, a flexible and self-contained frame or subframe design is utilized.

Figure 9:
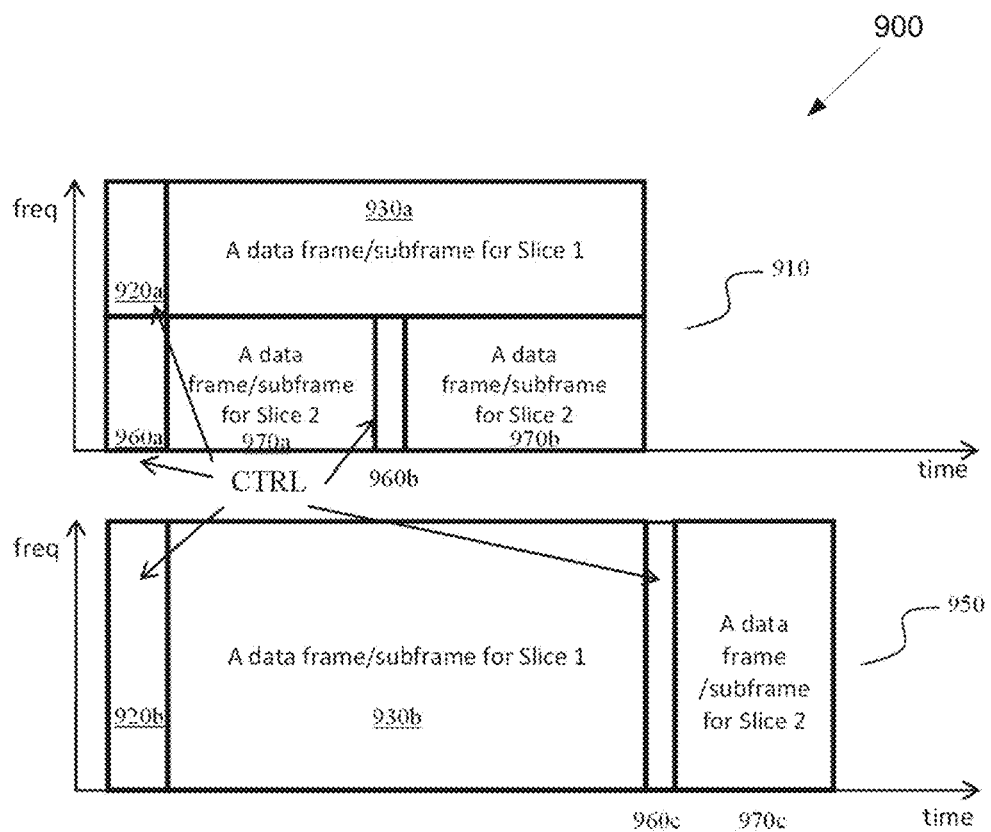
FIG. 9 illustrates an example multiplexing of two slices according to embodiments of the present disclosure.

FIG. 9 illustrates an example multiplexing of two slices 900 according to embodiments of the present disclosure. The embodiment of the multiplexing of two slices 900 illustrated in FIG. 9 is for illustration only. FIG. 9 does not limit the scope of this disclosure to any particular implementation of the multiplexing of two slices 900.

Two exemplary instances of multiplexing two slices within a common subframe or frame are depicted in FIG. 9. In these exemplary embodiments, a slice can be composed of one or two transmission instances where one transmission instance includes a control (CTRL) component (e.g., 920*a*, 960*a*, 960*b*, 920*b*, or 960*c*) and a data component (e.g., 930*a*, 970*a*, 970*b*, 930*b*, or 970*c*). In embodiment 910, the two slices are multiplexed in frequency domain whereas in embodiment 950, the two slices are multiplexed in time domain. These two slices can be transmitted with different sets of numerology.

LTE specification supports up to 32 CSI-RS antenna ports which enable an eNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
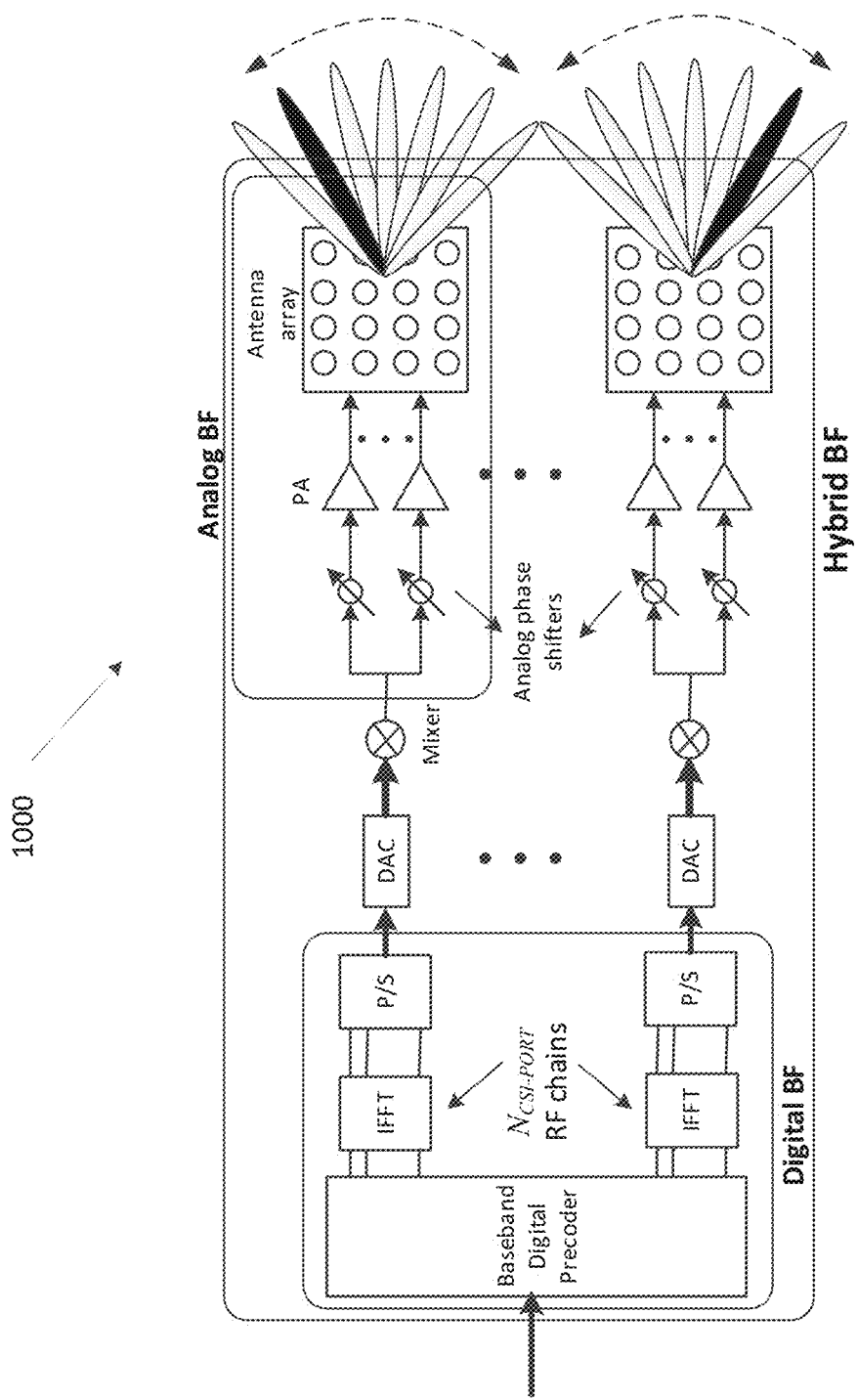
FIG. 10 illustrates an example antenna blocks according to embodiments of the present disclosure.

FIG. 10 illustrates an example antenna blocks 1000 according to embodiments of the present disclosure. The embodiment of the antenna blocks 1000 illustrated in FIG. 10 is for illustration only. FIG. 10 does not limit the scope of this disclosure to any particular implementation of the antenna blocks 1000.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols or subframes. The number of sub-arrays (equal to the number of RF chains) is the same as the number of CSI-RS ports $N_{CSI-PORT}$. A digital beamforming unit performs a linear combination across $N_{CSI-PORT}$ analog beams to further increase precoding gain. While analog beams are wideband (hence not frequency-selective), digital precoding can be varied across frequency sub-bands or resource blocks.

Figure 11:
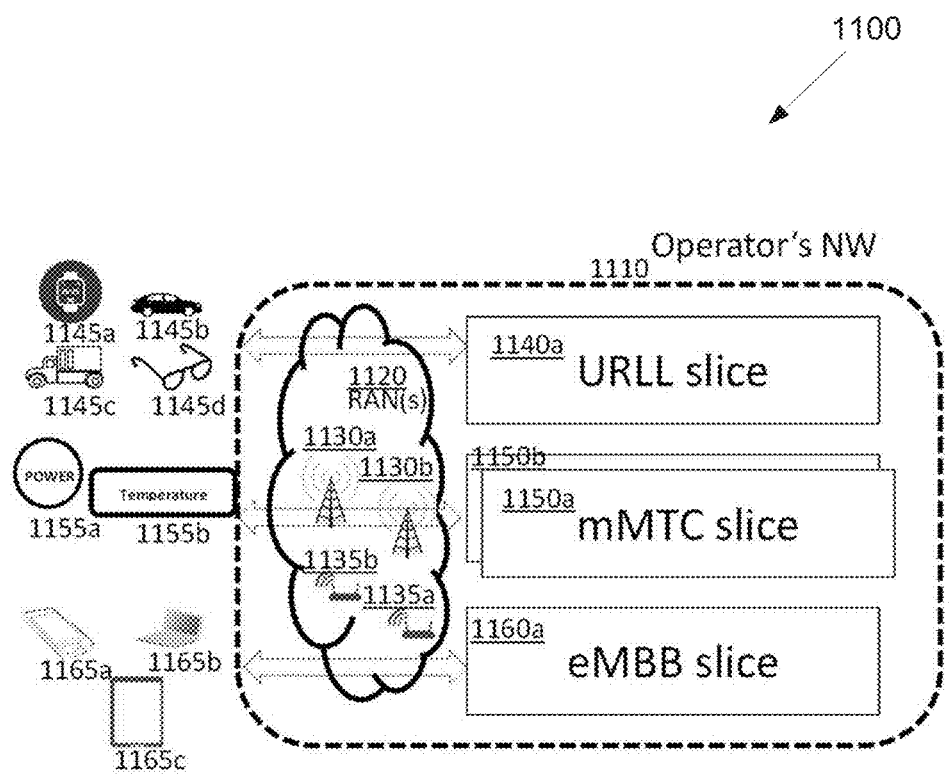
FIG. 11 illustrates an example network configuration according to embodiments of the present disclosure.

FIG. 11 illustrates an example network configuration 1100 according to embodiments of the present disclosure. The embodiment of the network configuration 1100 illustrated in FIG. 11 is for illustration only. FIG. 11 does not limit the scope of this disclosure to any particular implementation of the configuration 1100.

In order for the 5G network to support such diverse services with different quality of services (QoS), one scheme has been identified in LTE specification, called network slicing.

As shown in FIG. 11, An operator's network 1110 includes a number of radio access network(s) 1120 (RAN(s)) that are associated with network devices such as eNBs 1130*a* and 1130*b*, small cell base stations (femto/pico eNBs or Wi-Fi access points) 1135*a* and 1135*b*. The network 1110 can support various services, each represented as a slice.

In the example, an URLL slice 1140*a* serves UEs requiring URLL services such as cars 1145*b*, trucks 1145*c*, smart watches 1145*a*, and smart glasses 1145*d*. Two mMTC slices 1150*a* and 550*b* serve UEs requiring mMTC services such as power meters 555*b*, and temperature control box 1155*b*. One eMBB slice 1160*a* serves UEs requiring eMBB services such as cells phones 1165*a*, laptops 1165*b*, and tablets 1165*c*. A device configured with two slices can also be envisioned.

From LTE specification, MIMO has been identified as an essential feature in order to achieve high system throughput requirements and MIMO may continue to be the same in NR. One of the key components of a MIMO transmission scheme is the accurate CSI acquisition at the eNB (or TRP). For MU-MIMO, in particular, the availability of accurate CSI is necessary in order to guarantee high MU performance. For TDD systems, the CSI can be acquired using the SRS transmission relying on the channel reciprocity.

For FDD systems, on the other hand, it can be acquired using the CSI-RS transmission from eNB, and CSI acquisition and feedback from UE. In FDD systems, the CSI feedback framework is "implicit" in the form of CQI/PMI/RI derived from a codebook assuming SU transmission from eNB. Because of the inherent SU assumption while deriving CSI, this implicit CSI feedback is inadequate for MU transmission. Since future (e.g. NR) systems are likely to be more MU-centric, this SU-MU CSI mismatch may be a bottleneck in achieving high MU performance gains. Another issue with implicit feedback is the scalability with larger number of antenna ports at eNB.

For large number of antenna ports, the codebook design for implicit feedback is quite complicated (for example, in LTE specification, the total number of Class A codebooks=44), and the designed codebook is not guaranteed to bring justifiable performance benefits in practical deployment scenarios (for example, only a small percentage gain can be shown at the most). Realizing aforementioned issues, it has agreed to provide specification support to advanced CSI reporting in LTE specification, which, at the very least, can serve as a good starting point to design advanced CSI scheme in NR MIMO. Compared to LTE specification, the CSI acquisition for NR MIMO may consider the following additional differentiating factors.

In one example of flexibility CSI reporting framework, CSI reporting in NR may be flexible to support users with different CSI reporting capabilities. For example, some users may only be capable of reporting implicit CSI in the form of PMI/CQI/RI as in LTE and some other users may be capable of reporting both implicit as well as explicit channel reporting. In addition, UE motilities in NR can range from 0 kmph to 500 kmph. So, CSI reporting framework may be able to support such diverse use cases and UE capabilities.

In one example of increased number of antenna ports, in NR MIMO, the number of antenna elements at the eNB can be up to 256, which means that the total number of antenna ports can be more than 32, which is the maximum number of antenna ports supported in LTE eFD-MIMO. Although this can be accommodated with partial-port CSI-RS mapping where each subset consists of at most 32 ports, the total number of ports across time can be extended to a much larger number. As the number of ports increases, meaningful system gain can only be obtained in a MU-centric system.

In one example of increased throughput requirement, the system throughput requirements (e.g. for eMBB in NR) is several times more than that for LTE eFD-MIMO. Such high throughput requirements can only met with a mechanism to provide very accurate CSI to the eNB.

In one example of beamforming, following the trend established in FD-MIMO, NR MIMO system may be beamformed either cell-specifically or UE-specifically, where the beams can either be of analog (RF) or digital or hybrid type. For such a beam-formed system, a mechanism is needed to obtain accurate beam-forming information at the eNB.

In one example of unified design, since NR includes both above and below 6 GHz frequency bands, a unified MIMO framework working for both frequency regimes may be preferable.

In the following, for brevity, both FDD and TDD are considered as the duplex method for both DL and UL signaling. Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

Depending on the network type, the term "base station" or "BS" can refer to any component (or collection of components) configured to provide wireless access to a network, such as transmit point (TP), transmit-receive point (TRP), an enhanced base station (eNodeB or eNB), gNB, a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals.

Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Figure 12:
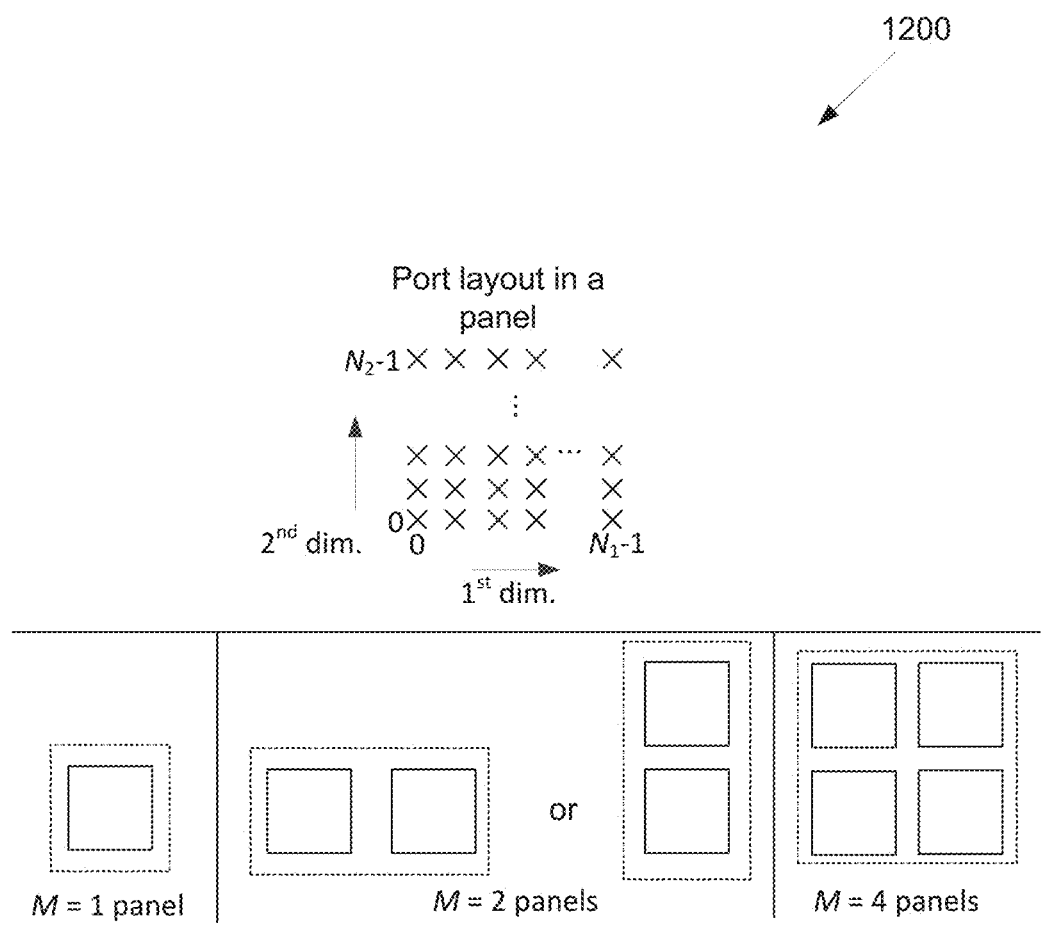
FIG. 12 illustrates an example multiple antenna panels according to embodiments of the present disclosure.

FIG. 12 illustrates an example multiple antenna panels 1200 according to embodiments of the present disclosure. The embodiment of the multiple antenna panels 1200 illustrated in FIG. 12 is for illustration only. FIG. 12 does not limit the scope of this disclosure to any particular implementation.

In the following, it is assumed that $N_1$ and $N_2$ are the number of antenna ports with the same polarization in the first and second dimensions, respectively. For 2D antenna port layouts, it may be $N_1>1$, $N_2>1$, and for 1D antenna port layouts $N_1>1$ and $N_2=1$. So, for a dual-polarized antenna port layout, the total number of antenna ports is $2N_1N_2$.

The focus of the present disclosure is on the CSI acquisition for the antenna structure to which multiple antenna panels are applied where each panel is a dual-polarized antenna ports with $N_1$ and $N_2$ ports in two dimensions. An illustration is shown in FIG. 12 in which there are M=1, 2, 4 antenna panels. Furthermore, the antenna pot layout, i.e., ($N_1$, $N_2$) value, for each antenna panel is identical.

In one embodiment, a dual-stage codebook: $W=W_1W_2$ has been proposed for the multiple antenna panels in which the first stage $W_1$ codebook is used to report a beam group comprising L beams, and the second stage $W_2$ codebook is used to report a single beam selection (per layer) from the reported beam group which is common for two polarizations, and a co-phase value selection for the two polarizations, where L beam selection is WB, the single beam selection and co-phase selection is SB.

In one embodiment 1, a UE is configured with $W_1$ codebook for multiple antenna panels as shown in FIG. 12 with M≥1 panels, which has a block diagonal structure with 2M blocks, where the first 2 consecutive blocks are associated with the two polarizations of the $1^{st}$ antenna panel, the next 2 consecutive blocks are associated with the two polarizations of the $2^{nd}$ antenna panel, and so on. The $W_1$ codebook structure is according to at least one of the following two alternatives.

In one example of Alt 1-0 (common $$W_1), W_1 = \begin{bmatrix} B_0 & 0 \\ 0 & B_0 \end{bmatrix}$$

for M=1 panel, $$W_1 = \begin{bmatrix} B_0 & 0 & 0 & 0 \\ 0 & B_0 & 0 & 0 \\ 0 & 0 & B_0 & 0 \\ 0 & 0 & 0 & B_0 \end{bmatrix}$$

for M=2 panels and $$W_1 = \begin{bmatrix} B_0 & 0 & 0 & 0 & 0 & 0 & 0 & 0 \\ 0 & B_0 & 0 & 0 & 0 & 0 & 0 & 0 \\ 0 & 0 & B_0 & 0 & 0 & 0 & 0 & 0 \\ 0 & 0 & 0 & B_0 & 0 & 0 & 0 & 0 \\ 0 & 0 & 0 & 0 & B_0 & 0 & 0 & 0 \\ 0 & 0 & 0 & 0 & 0 & B_0 & 0 & 0 \\ 0 & 0 & 0 & 0 & 0 & 0 & B_0 & 0 \\ 0 & 0 & 0 & 0 & 0 & 0 & 0 & B_0 \end{bmatrix}$$

for M=4 panels, where $B_0 = [b_0, b_1, \ldots, b_{L-1}]$ is a common beam group for all panels comprising L beams.

In one example of Alt 1-1 (per panel $W_1$), $$W_1 = \begin{bmatrix} B_0 & 0 \\ 0 & B_0 \end{bmatrix}$$

for M=1 panel, $$W_1 = \begin{bmatrix} B_0 & 0 & 0 & 0 \\ 0 & B_0 & 0 & 0 \\ 0 & 0 & B_1 & 0 \\ 0 & 0 & 0 & B_1 \end{bmatrix}$$

for M=2 panels and $$W_1 = \begin{bmatrix} B_0 & 0 & 0 & 0 & 0 & 0 & 0 & 0 \\ 0 & B_0 & 0 & 0 & 0 & 0 & 0 & 0 \\ 0 & 0 & B_1 & 0 & 0 & 0 & 0 & 0 \\ 0 & 0 & 0 & B_1 & 0 & 0 & 0 & 0 \\ 0 & 0 & 0 & 0 & B_2 & 0 & 0 & 0 \\ 0 & 0 & 0 & 0 & 0 & B_2 & 0 & 0 \\ 0 & 0 & 0 & 0 & 0 & 0 & B_3 & 0 \\ 0 & 0 & 0 & 0 & 0 & 0 & 0 & B_3 \end{bmatrix}$$

for M=4 panels $B_0 = [b_{0,0}, b_{0,1}, \ldots, b_{0,L-1}]$, $B_1 = [b_{1,0}, b_{1,1}, \ldots, b_{1,L-1}]$, $B_2 = [b_{2,0}, b_{2,1}, \ldots, b_{2,L-1}]$ and $B_3 = [b_{3,0}, b_{3,1}, \ldots, b_{3,L-1}]$ are beam groups for panels 0, 1, 2, and 3, respectively, each comprising L beams.

In one example, only one of the two $W_1$ codebook structures (Alt 1-0, Alt 1-1) is supported in the specification, for example, Alt 1-0. In another example, one of the two structures is configured to the UE via 1-bit higher layer (RRC) or MAC CE based or DCI based signaling. In yet another example, the UE reports a preferred a $W_1$ codebook structure as a 1-bit WB CSI report either jointly with other WB CSI reports or separately as a separate WB report. In yet another example, only of the two structures is supported for each antenna port layouts and/or M values.

In one embodiment 1A, a UE is configured with $W_1$ codebook (cf. Alt 1-0 or Alt 1-1), where the number of beams (L value) in the beam group for each panel is the same and is according to at least one of the two alternatives: Alt 1A-0: L=1; and Alt 1A-1: L=2.

In one example, only one of the two alternatives (Alt 1A-0, Alt 1A-1) is supported in the specification, for example, Alt 1A-0. In another example, one of the two alternatives is configured to the UE via 1-bit higher layer (RRC) or MAC CE based or DCI based signaling. In yet another example, the UE reports a preferred L value as a 1-bit WB CSI report either jointly with other WB CSI reports or separately as a separate WB report. In yet another example, only of the two alternatives is supported for each antenna port layouts and/or M values.

For L=2, at least one of the following is supported for the beam group structure or patterns comprising two beams. In one example, only one beam pattern is supported regardless of the antenna pot layout or ($N_1$, $N_2$) values. In one example, only one beam pattern is supported for 2D antenna port layouts, i.e., ($N_1$, $N_2$) with $N_1>1$ and $N_2>1$, and only one beam pattern is supported for 1D antenna port layouts, i.e., ($N_1$, $N_2$) with $N_1>1$ and $N_2=1$. In one example, two beam patterns are supported regardless of the antenna pot layout or ($N_1$, $N_2$) values. In one example, two beam patterns are supported for 2D antenna port layouts, i.e., ($N_1$, $N_2$) with $N_1>1$ and $N_2>1$, and one beam pattern is supported for 1D antenna port layouts, i.e., ($N_1$, $N_2$) with $N_1>1$ and $N_2=1$. In one example, two beam patterns are supported for 2D antenna port layouts, i.e., ($N_1$, $N_2$) with $N_1>1$ and $N_2>1$, and two beam patterns are supported for 1D antenna port layouts, i.e., ($N_1$, $N_2$) with $N_1>1$ and $N_2=1$.

In one embodiment 1B, a UE is configured with $W_1$ codebook (cf. Alt 1-0 or Alt 1-1), where the number of beams (L value) in the beam group for each panel is the same and is according to at least one of the two alternatives: Alt 1B-0: L=1; and Alt 1B-1: L=4.

In one example, only one of the two alternatives (Alt 1B-0, Alt 1B-1) is supported in the specification, for example, Alt 1B-0. In another example, one of the two alternatives is configured to the UE via 1-bit higher layer (RRC) or MAC CE based or DCI based signaling. In yet another example, the UE reports a preferred L value as a 1-bit WB CSI report either jointly with other WB CSI reports or separately as a separate WB report. In yet another example, only of the two alternatives is supported for each antenna port layouts and/or M values.

For L=4, at least one of the following is supported for the beam group structure or patterns comprising four beams. In one example, only one beam pattern is supported regardless of the antenna pot layout or ($N_1$, $N_2$) values. In one example, only one beam pattern is supported for 2D antenna port layouts, i.e., ($N_1$, $N_2$) with $N_1>1$ and $N_2>1$, and only one beam pattern is supported for 1D antenna port layouts, i.e., ($N_1$, $N_2$) with $N_1>1$ and $N_2=1$. In one example, two beam patterns are supported regardless of the antenna pot layout or ($N_1$, $N_2$) values. In one example, two beam patterns are supported for 2D antenna port layouts, i.e., ($N_1$, $N_2$) with $N_1>1$ and $N_2>1$, and one beam pattern is supported for 1D antenna port layouts, i.e., ($N_1$, $N_2$) with $N_1>1$ and $N_2=1$. In one example, two beam patterns are supported for 2D antenna port layouts, i.e., ($N_1$, $N_2$) with $N_1>1$ and $N_2>1$, and two beam patterns are supported for 1D antenna port layouts, i.e., ($N_1$, $N_2$) with $N_1>1$ and $N_2=1$.

In one embodiment 1C, the $W_1$ beam groups ($B_0$, $B_1$, …) comprises of oversampled 2D DFT beams. For a given antenna port layout (N1, N2) and oversampling factors (O1, O2) for two dimensions, the DFT beam $v_{l,m}$ can be expressed as follows:

$$v_{l,m} = \left[ u_m \quad e^{j\frac{2\pi l}{O_1 N_1}} u_m \quad \ldots \quad e^{j\frac{2\pi l(N_1-1)}{O_1 N_1}} u_m \right]^T \text{ where}$$

$$u_m = \left[ 1 \quad e^{j\frac{2\pi m}{O_2 N_2}} \quad \ldots \quad e^{j\frac{2\pi m(N_2-1)}{O_2 N_2}} \right].$$

In one embodiment 2, a UE is configured with $W_2$ codebook for M≥1 antenna panels according to at least one of the following alternatives. In one example of Alt 2-0 (common intra-panel $W_2$), $W_2=c\otimes d$ or $d\otimes c$ where c is an intra-panel $W_2$ vector (size 2L×1), common for all panels, and d is an inter-panel phase vector (size M×1), where $c\otimes d$ denotes the Kronecker product of c and d which is defined as $c\otimes d=[c_0 d \ c_1 d \ \ldots \ c_{2L-1} d]^T$ where $d=[d_0 \ d_1 \ \ldots \ d_{M-1}]$.

If $W_2=c\otimes d$, then for M=2: $W_2=[c_0 d_0 \ c_0 d_1 \ c_1 d_0 \ c_1 d_1]^T$. If one of $c_0$ and $d_0$ is fixed to 1, one of the two alternate forms for $W_2$ is considered: $W_2=[d_0 \ d_1 \ c_1 d_0 \ c_1 d_1]^T$; and $W_2=[c_0 \ c_0 d_1 \ c_1 \ c_1 d_1]^T$. If both $c_0$ and $d_0$ are fixed to 1, then $W_2=[1 \ d_1 \ c_1 \ c_1 d_1]^T$.

If $W_2=c\otimes d$, then for M=4: $W_2=[c_0 d_0 \ c_0 d_1 \ c_0 d_2 \ c_0 d_3 \ c_1 d_0 \ c_1 d_1 \ c_1 d_2 \ c_1 d_3]^T$; since one of $c_0$ and $d_0$ can be fixed to 1, one of the two alternate forms for $W_2$ is considered: $W_2=[d_0 \ d_1 \ d_2 \ d_3 \ c_1 d_0 \ c_1 d_1 \ c_1 d_2 \ c_1 d_3]^T$; and $W_2=[c_0 \ c_0 d_1 \ c_0 d_2 \ c_0 d_3 \ c_1 \ c_1 d_1 \ c_1 d_2 \ c_1 d_3]^T$. If both $c_0$ and $d_0$ are fixed to 1, then $W_2=[1 \ d_1 \ d_2 \ d_3 \ c_1 \ c_1 d_1 \ c_1 d_2 \ c_1 d_3]^T$.

If $W_2=d\otimes c$, then for M=2: $W_2=[c_0 d_0 \ c_1 d_0 \ c_0 d_1 \ c_1 d_1]^T$; since one of $c_0$ and $d_0$ can be fixed to 1, one of the two alternate forms for $W_2$ is considered: $W_2=[d_0 \ c_1 d_0 \ d_1 \ c_1 d_1]^T$; and $W_2=[c_0 \ c_1 \ c_0 d_1 \ c_1 d_1]^T$. For M=4: $W_2=[c_0 d_0 \ c_1 d_0 \ c_0 d_1 \ c_1 d_1 \ c_0 d_2 \ c_1 d_2 \ c_0 d_3 \ c_1 d_3]^T$; since one of $c_0$ and $d_0$ can be fixed to 1, one of the two alternate forms for $W_2$ is considered: $W_2=[d_0 \ c_1 d_0 \ d_1 \ c_1 d_1 \ d_2 \ c_1 d_2 \ d_3 \ c_1 d_3]^T$; and $W_2=[c_0 \ c_1 \ c_0 d_1 \ c_1 d_1 \ c_0 d_2 \ c_1 d_2 \ c_0 d_3 \ c_1 d_3]^T$.

In one example of Alt 2-1 (per panel $W_2$), $W_2=[1 \ c_1 \ c_2 \ c_3 \ \ldots \ c_{2LM-1}]^T$, where $\{c_i\}$ are independent phase for M panels and 2 polarizations. For M=2: $W_2=[1 \ c_1 \ c_2 \ c_3]^T$. For M=4: $W_2=[1 \ c_1 \ c_2 \ c_3 \ c_4 \ c_5 \ c_6 \ c_7]^T$.

The codebook to report the $W_2$ phase is at least one of BPSK {1,−1} or QPSK {1,j,−1,−j} or two stage $a_{WB} b_{WB}$ where $a_{WB}$ and $a_{SB}$ codebooks are according to at least one of the following: $a_{WB}=\{1,j,-1,-j\}$ (2 bit WB phase) and $a_{SB}=\{1,j\}$ (1-bit SB phase); $a_{WB}=\{1,j,-1,-j\}$ (2 bit WB phase) and $a_{SB}=\{1,-j\}$ (1-bit SB phase); $a_{WB}=\{1,j,-1,-j\}$ (2 bit WB phase) and $$a_{SB} = \{e^{-j\frac{\pi}{4}}, e^{j\frac{\pi}{4}}\}$$

(1-bit SB phase);

$$a_{WB} = \{e^{j\frac{\pi}{4}}, e^{j\frac{3\pi}{4}}, e^{j\frac{5\pi}{4}}, e^{j\frac{7\pi}{4}}\}$$

(2 bit WB phase) and $$a_{SB} = \{e^{-j\frac{\pi}{4}}, e^{j\frac{\pi}{4}}\}$$

(1-bit SB phase);

$$a_{WB} = \{e^{j\frac{\pi}{4}}, e^{j\frac{3\pi}{4}}, e^{j\frac{5\pi}{4}}, e^{j\frac{7\pi}{4}}\}$$

(2 bit WB phase and $a_{SB}=\{1, -j\}$ (1-bit SB phase); and $$a_{WB} = \{e^{j\frac{\pi}{4}}, e^{j\frac{3\pi}{4}}, e^{j\frac{5\pi}{4}}, e^{j\frac{7\pi}{4}}\}$$

(2 bit WB phase) and $a_{SB}=\{1, j\}$ (1-bit SB phase).

The codebook alternatives for inter-panel phase reporting is according to at least one of the following. In one example of Alt 2-0A, a separate codebook (e.g. $W_3$) is used to report the inter-panel phase regardless of whether the inter-panel phase is reported in a WB or SB manner. This alternative is applicable to the case in which the inter-panel phase can be decoupled from the intra-panel phase. An example of which is Alt 2-0.

In one example of Alt 2-1A, if the inter-panel phase is reported in a WB manner, then the inter-panel phase is reported jointly with the first PMI ($i_1$) indicating beam group using the $W_1$ codebook.

In one example of Alt 2-2A, if the inter-panel phase is reported in a SB manner, then the inter-panel phase is reported jointly with the second PMI ($i_2$) indicating co-phasing for two polarizations (and beam selection of L>1) using the $W_2$ codebook.

In one example of Alt 2-3A, if the inter-panel phase is reported differentially with both WB and SB components, then the WB component of the inter-panel phase is reported jointly with the first PMI ($i_1$) indicating beam group using the $W_1$ codebook, and the SB component of the inter-panel phase is reported jointly with the second PMI ($i_2$) indicating co-phasing for two polarizations (and beam selection of L>1) using the $W_2$ codebook.

One of these alternatives is either fixed in the specification or configured via higher layer RRC or dynamic DCI signaling.

In one embodiment 2A, the amplitude is also reported in addition to inter-panel phase according to at least one of the following alternatives. In one example of Alt 2A-0, the amplitude is reported independently for each panel and common for the two polarizations in each panel. For M panels, M-1 amplitude needs to be reported since the amplitude for the first panel can be assumed to be 1 without loss of generality. In one example of Alt 2A-1, the amplitude is reported independently for each panel and for each polarization. For M panels, 2M-1 amplitude needs to be reported since the amplitude for the first polarization of the first panel can be assumed to be 1 without loss of generality.

The amplitude reporting can either be in a WB manner or in a SB manner or in a differential manner with both WB and SB components. One of these three reporting can either be fixed (e.g. WB reporting) or configurable via higher layer RRC or dynamic DCI signaling. For example, the amplitude reporting can be turned ON or OFF using RRC or dynamic DCI signaling whereas the phase reporting is always ON.

For N-bit amplitude reporting, the amplitude quantization codebook (WB and/or SB) is according to at least one of the following alternatives. In one example, if N=1, then the amplitude codebook is one of the following: $C_0=\{1, \sqrt{0.5}\}$; $C_1=\{1.0\}$; and $C_2=\{\sqrt{1.4125}, \sqrt{0.7079}\}$. In one example, if N=2, then the amplitude codebook is one of the following: $C_0=\{1, \sqrt{0.5}, \sqrt{0.25}, \sqrt{0.125}\}$; and $C_1=\{1, \sqrt{0.5}, \sqrt{0.25}, 0\}$. In one example, if N=3, then the amplitude codebook is one of the following: $C_0=\{1, \sqrt{0.5}, \sqrt{0.25}, \sqrt{0.125}, \sqrt{0.0625}, \sqrt{0.0313}, \sqrt{0.0156}, \sqrt{0.0078}\}$; $C_1=\{1, \sqrt{0.5}, \sqrt{0.25}, \sqrt{0.125}, \sqrt{0.0625}, \sqrt{0.0313}, \sqrt{0.0156},\}$; and $C_2=\{1, \sqrt{0.6683}, \sqrt{0.4467}, \sqrt{0.2985}, \sqrt{0.1995}, \sqrt{0.1334}, \sqrt{0.0891}, 0\}$.

In one embodiment 3, the multi-panel codebook using a modular approach where the multi-panel pre-coder vector/matrix $W_{MP}$ is built from the single-panel pre-coder vector/matrix $W_{SP}$ as follows. In one example of M=2, for rank 1:

$$W_{MP} = \begin{bmatrix} W_{SP} \\ e^{j\alpha_1} W_{SP} \end{bmatrix} = \begin{bmatrix} W_1 W_2 \\ e^{j\alpha_1} W_1 W_2 \end{bmatrix} = \begin{bmatrix} v_1 \\ e^{j\beta} v_1 \\ e^{j\alpha_1} v_1 \\ e^{j(\alpha_1+\beta)} v_1 \end{bmatrix}$$

and for rank 2:

$$W_{MP} = \begin{bmatrix} W_{SP} \\ e^{j\alpha_1} W_{SP} \end{bmatrix} = \begin{bmatrix} W_1 W_2 \\ e^{j\alpha_1} W_1 W_2 \end{bmatrix} = \begin{bmatrix} v_1 & v_1 \\ e^{j\beta} v_1 & -e^{j\beta} v_1 \\ e^{j\alpha_1} v_1 & e^{j\alpha_1} v_1 \\ e^{j(\alpha_1+\beta)} v_1 & -e^{j(\alpha_1+\beta)} v_1 \end{bmatrix}.$$

In one example of M=4, for rank 1:

$$W_{MP} = \begin{bmatrix} W_{SP} \\ e^{j\alpha_1} W_{SP} \\ e^{j\alpha_2} W_{SP} \\ e^{j\alpha_3} W_{SP} \end{bmatrix} = \begin{bmatrix} W_1 W_2 \\ e^{j\alpha_1} W_1 W_2 \\ e^{j\alpha_2} W_1 W_2 \\ e^{j\alpha_3} W_1 W_2 \end{bmatrix} = \begin{bmatrix} v_1 \\ e^{j(\alpha_1+\beta)} v_1 \\ e^{j(\alpha_2+\beta)} v_1 \\ e^{j(\alpha_3+\beta)} v_1 \end{bmatrix}$$

and for rank 2:

$$W_{MP} = \begin{bmatrix} W_{SP} \\ e^{j\alpha_1} W_{SP} \\ e^{j\alpha_2} W_{SP} \\ e^{j\alpha_3} W_{SP} \end{bmatrix} = \begin{bmatrix} W_1 W_2 \\ e^{j\alpha_1} W_1 W_2 \\ e^{j\alpha_2} W_1 W_2 \\ e^{j\alpha_3} W_1 W_2 \end{bmatrix} = \begin{bmatrix} v_1 & v_1 \\ e^{j\beta} v_1 & -e^{j\beta} v_1 \\ e^{j\alpha_1} v_1 & e^{j\alpha_1} v_1 \\ e^{j(\alpha_1+\beta)} v_1 & -e^{j(\alpha_1+\beta)} v_1 \\ e^{j\alpha_2} v_1 & e^{j\alpha_2} v_1 \\ e^{j(\alpha_2+\beta)} v_1 & -e^{j(\alpha_2+\beta)} v_1 \\ e^{j\alpha_3} v_1 & e^{j\alpha_3} v_1 \\ e^{j(\alpha_3+\beta)} v_1 & -e^{j(\alpha_3+\beta)} v_1 \end{bmatrix},$$

where: $v_1$ is an oversampled 2D DFT beam; the selection of $W_{SP}$ is limited to be the same for all panels; and the inter-panel phase $e^{j\alpha_i}$ (i=1 or 1-3) can be reported either WB or SB or both WB and SB; and the co-phase $e^{j\beta}$ is reported SB.

In one embodiment 4, the UE is configured with a PMI codebook (via higher layer RRC signaling) for CSI reporting for $P=2N_1N_2 \geq$CSI-RS antenna ports in M=2 panels as follows: the PMI codebook assumes $W=W_1 W_2$ pre-coder structure for rank 1 to 8 (1 layer to 8 layers), where for each layer $$W_1 = \begin{bmatrix} b_1 & 0 & 0 & 0 \\ 0 & b_1 & 0 & 0 \\ 0 & 0 & b_1 & 0 \\ 0 & 0 & 0 & b_1 \end{bmatrix},$$

$b_1$ is an oversampled 2D DFT beam; and
$W_2$ performs QPSK co-phasing between panels and polarizations.

The supported combinations of $(M, N_1, N_2, O_1, O_2)$ are tabulated in TABLE 1. The UE is configured with higher-layer parameters (e.g., RRC) multipanel-Config-M, codebook-Config-N1, and codebook-Config-N2, to configure the codebook parameters M, $N_1$ and $N_2$, respectively. Note that there is no need to signal (configure) $(O_1, O_2)$ since only one $(O_1, O_2)$ is supported for each $(N_1, N_2)$. Other alternate tables are shown in TABLES 2-5. Note that in TABLE 5, $(M, N_1, N_2)=(2, 1, 1)$ and $(4, 1, 1)$ are also considered. Since for these two port configurations $N_1=N_2=1$, the W1 codebook structure reduces to an M×M identity matrix, there is no $W_1$ feedback needed, i.e., the WB reporting of $b_1$ is needed ($b_1=1$). Only one of these $(M, N_1, N_2, O_1, O_2)$ combination tables (or their any combinations) is supported in the specification.

TABLE 1

Supported configurations of $(O_1, O_2)$ and $(N_1, N_2)$

| Number of CSI-RS ports | $(M, N_1, N_2)$ | $(O_1, O_2)$ |
|---|---|---|
| 8 | (2, 2, 1) | (4, —) |
| 12 | (2, 3, 1) | (4, —) |
| 16 | (2, 2, 2) | (4, 4) |
|  | (2, 4, 1) | (4, —) |
| 24 | (2, 3, 2), (2, 2, 3) | (4, 4) |
|  | (2, 6, 1) | (4, —) |
| 32 | (2, 4, 2), (2, 2, 4) | (4, 4) |
|  | (2, 8, 1) | (4, —) |

TABLE 2

Supported configurations of $(O_1, O_2)$ and $(N_1, N_2)$

| Number of CSI-RS ports | $(M, N_1, N_2)$ | $(O_1, O_2)$ |
|---|---|---|
| 8 | (2, 2, 1) | (4, —) |
| 12 | (2, 3, 1) | (4, —) |
| 16 | (2, 2, 2) | (4, 4) |
|  | (2, 4, 1) | (4, —) |
| 24 | (2, 3, 2) | (4, 4) |
|  | (2, 6, 1) | (4, —) |
| 32 | (2, 4, 2) | (4, 4) |
|  | (2, 8, 1) | (4, —) |

TABLE 3

Supported configurations of $(O_1, O_2)$ and $(N_1, N_2)$

| Number of CSI-RS ports | $(M, N_1, N_2)$ | $(O_1, O_2)$ |
|---|---|---|
| 8 | (2, 2, 1) | (4, —) |
| 16 | (2, 2, 2) | (4, 4) |
|  | (2, 4, 1), (4, 2, 1) | (4, —) |
| 24 | (2, 3, 2) | (4, 4) |
|  | (2, 6, 1) | (4, —) |

TABLE 3-continued

Supported configurations of $(O_1, O_2)$ and $(N_1, N_2)$

| Number of CSI-RS ports | $(M, N_1, N_2)$ | $(O_1, O_2)$ |
|---|---|---|
| 32 | (2, 4, 2), (4, 2, 2) | (4, 4) |
|  | (2, 8, 1), (4, 4, 1) | (4, —) |

TABLE 4

Supported configurations of $(O_1, O_2)$ and $(N_1, N_2)$

| Number of CSI-RS ports | $(M, N_1, N_2)$ | $(O_1, O_2)$ |
|---|---|---|
| 8 | (2, 2, 1) | (4, —) |
| 16 | (2, 2, 2) | (4, 4) |
|  | (2, 4, 1), (4, 2, 1) | (4, —) |
| 32 | (2, 4, 2), (4, 2, 2) | (4, 4) |
|  | (2, 8, 1), (4, 4, 1) | (4, —) |

TABLE 5

Supported configurations of $(O_1, O_2)$ and $(N_1, N_2)$

| Number of CSI-RS ports | $(M, N_1, N_2)$ | $(O_1, O_2)$ |
|---|---|---|
| 4 | (2, 1, 1) | (—, —) |
| 8 | (4, 1, 1) | (—, —) |
|  | (2, 2, 1) | (4, —) |
| 16 | (2, 2, 2) | (4, 4) |
|  | (2, 4, 1), (4, 2, 1) | (4, —) |
| 32 | (2, 4, 2), (4, 2, 2) | (4, 4) |
|  | (2, 8, 1), (4, 4, 1) | (4, —) |

If multiple $(O_1, O_2)$ pairs are supported for any $(N_1, N_2)$ pair, then the UE is further configured with higher-layer parameters codebook-Over-Sampling-RateConfig-O1 and codebook-Over-Sampling-RateConfig-O2, to configure $O_1$ and $O_2$, respectively.

The codebook details for rank 1 and rank 2 CSI reporting are as follows. 2D DFT beam index $(k_1, k_2)$ may be defined, where $k_1 = i_{1,1}$, $k_2 = i_{1,2}$. The leading beam index $(i_{1,1}, i_{1,2})$ is reported wideband, where $i_{1,1} = 0, 1, \ldots N_1O_1-1$ and $i_{1,2} = 0, 1, \ldots N_2O_2-1$, hence it requires $\lceil \log_2(N_1O_1N_2O_2) \rceil$ bits.

For 1 layer CSI reporting (rank 1), the pre-coding vector is given by $$W = \frac{1}{\sqrt{MP}} \begin{bmatrix} w_{0,0,0} \\ w_{0,1,0} \\ w_{1,0,0} \\ w_{1,1,0} \end{bmatrix},$$

and for 2 layer CSI reporting (rank 2), the pre-coding matrix is given by $$W = \frac{1}{\sqrt{2MP}} \begin{bmatrix} w_{0,0,0} & w_{0,0,1} \\ w_{0,1,0} & w_{0,1,1} \\ w_{1,0,0} & w_{1,0,1} \\ w_{1,1,0} & w_{1,1,1} \end{bmatrix},$$

where: $w_{p,r,l} = b_{k_1,k_2} \cdot c_{p,r,l}$, $p=0,1$ (for two panels), $r=0,1$ (for two polarizations), $l=0,1$ (for two layers); $b_{k_1,k_2}$ is an over-sampled 2D DFT beam; and $c_{p,r,l}$ is the co-phase value for panel p, polarization r and layer l.

For rank 1, the reporting of $c_{0,1,0}$, $c_{1,0,0}$, and $c_{1,0,0}$ are according to at least one of the following alternatives. In one example of Alt 4-0A, $c_{0,0,0}=1$, $c_{0,1,0} \in \{1,j,-1,-j\}$, $c_{1,0,0} \in \{1, j,-1, -j,\}$ and $c_{1,1,0} \in \{1,-1,-j\}$, where the calculation and reporting of $c_{0,1,0}$, $c_{1,0,0}$ and $c_{1,1,0}$ can be SB (which requires 6 bits/SB).

In one example of Alt 4-1A, $c_{0,0,0}=1$, $c_{0,1,0} \in \{1, j, -1, -j\}$, $c_{1,0,0} \in \{1, j, -1, -j\}$ and $c_{1,1,0} = c_{1,0,0} \times c_{1,0,0}$, where the calculation and reporting of $c_{0,1,0}$, $c_{1,0,0}$ and $c_{1,1,0}$ can be SB (which requires 4 bits/SB).

In one example of Alt 4-2A, $c_{0,0,0}=1$, $c_{0,1,0} \in \{1,j,-1,-j\}$, $c_{1,0,0} = a_{1,0,0} b_{1,0,0}$ and $c_{1,1,0} = a_{1,1,0} b_{1,1,0}$ where $$a_{1,r,0} \in \left\{ e^{\frac{j\pi}{4}}, e^{\frac{j3\pi}{4}}, e^{\frac{j5\pi}{4}}, e^{\frac{j7\pi}{4}} \right\} \text{ and } b_{1,r,0} = \left\{ e^{-\frac{j\pi}{4}}, e^{\frac{j\pi}{4}} \right\},$$

where the calculation and reporting of $c_{0,1,0}$, $b_{1,0,0}$ and $b_{1,1,0}$ can be SB (which requires 4 bits/SB), and the calculation and report of $a_{1,0,0}$ and $a_{1,1,0}$ are WB (which requires 4 bits).

In one example of Alt 4-3A, $c_{0,0,0}=1$, $c_{1,0,0} \in \{1, j, -1, -j\}$, $c_{0,1,0} = a_{0,1,0} b_{0,1,0}$ and $c_{1,1,0} = a_{1,1,0} b_{1,1,0}$ where $$a_{p,1,0} \in \left\{ e^{\frac{j\pi}{4}}, e^{\frac{j3\pi}{4}}, e^{\frac{j5\pi}{4}}, e^{\frac{j7\pi}{4}} \right\} \text{ and } b_{p,1,0} \in \left\{ e^{-\frac{j\pi}{4}}, e^{\frac{j\pi}{4}} \right\},$$

where the calculation and reporting of $c_{1,0,0}$, $b_{0,1,0}$ and $b_{1,1,0}$ can be SB (which requires 4 bits/SB), and the calculation and report of $a_{0,1,0}$ and $a_{1,1,0}$ are WB (which requires 4 bits).

In one example of Alt 4-4A, $c_{0,0,0}=1$, $c_{1,1,0} \in \{1, j, -1, -j\}$, $c_{1,0,0} = a_{1,0,0} b_{1,0,0}$ and $c_{0,1,0} = a_{0,1,0} b_{0,1,0}$ where $a_{1,1,0}$, $a_{0,1,0}$ $$\in \left\{ e^{\frac{j\pi}{4}}, e^{\frac{j3\pi}{4}}, e^{\frac{j5\pi}{4}}, e^{\frac{j7\pi}{4}} \right\} \text{ and } b_{1,0,0}, b_{0,1,0} \in \left\{ e^{-\frac{j\pi}{4}}, e^{\frac{j\pi}{4}} \right\},$$

where the calculation and reporting of $c_{1,1,0}$, $b_{1,0,0}$ and $b_{0,1,0}$ can be SB (which requires 4 bits/SB), and the calculation and report of $a_{1,0,0}$ and $a_{0,1,0}$ are WB (which requires 4 bits).

In one example of Alt 4-5A, the codebook are $$\left\{ e^{\frac{j\pi}{4}}, e^{\frac{j3\pi}{4}}, e^{\frac{j5\pi}{4}}, e^{\frac{j7\pi}{4}} \right\} \text{ and } \left\{ e^{-\frac{j\pi}{4}}, e^{\frac{j\pi}{4}} \right\}$$

are respectively replaced with any one of the following: $a_{WB} = \{1, j, -1, -j\}$ (2 bit WB phase) and $a_{SB} = \{1, j\}$ (1-bit SB phase); $a_{WB} = \{1, j, -1, -j\}$ (2 bit WB phase) and $a_{SB} = \{1, -j\}$ (1-bit SB phase); $a_{WB} = \{1, j, -1, -j\}$ (2 bit WB phase) and $$a_{SB} = \left\{ e^{-\frac{j\pi}{4}}, e^{\frac{j\pi}{4}} \right\}$$

(1-bit SB phase);

$$a_{WB} = \left\{ e^{\frac{j\pi}{4}}, e^{\frac{j3\pi}{4}}, e^{\frac{j5\pi}{4}}, e^{\frac{j7\pi}{4}} \right\}$$

(2 bit WB phase) and $$a_{SB} = \left\{ e^{-\frac{j\pi}{4}}, e^{\frac{j\pi}{4}} \right\}$$

(1-bit SB phase);

$$a_{WB} = \left\{ e^{\frac{j\pi}{4}}, e^{\frac{j3\pi}{4}}, e^{\frac{j5\pi}{4}}, e^{\frac{j7\pi}{4}} \right\}$$

(2 bit WB phase) and $a_{SB}=\{1, -j\}$ (1-bit SB phase); and $$a_{WB} = \left\{ e^{\frac{j\pi}{4}}, e^{\frac{j3\pi}{4}}, e^{\frac{j5\pi}{4}}, e^{\frac{j7\pi}{4}} \right\}$$

(2 bit WB phase) and $a_{SB}=\{1, j\}$ (1-bit SB phase).

In one example of Alt 4-6A, $c_{0,0,0}=1$, $c_{0,1,0} \in \{1, j, -1, -j\}$, $c_{1,0,0} \in \{1, j, -1, -j\}$ and $c_{1,1,0}=c_{0,1,0} \times c_{1,0,0}$, where the calculation and reporting of $c_{1,0,0}$ is WB (which requires 2 bits), and that of $c_{0,1,0}$ can be WB or SB (which requires 2 bits/SB).

At least one of the following embodiments may be used to support at least one of the above alternatives. In one embodiment, only one of the alternatives is fixed in the specification (e.g. Alt 4-2A). In another embodiment, two of these alternatives are supported in the specification (e.g. Alt 4-6A, Alt 4-2A) and one of the two is configured to the UE (RRC). In another embodiment, one of the alternatives is either configured (via higher layer RRC signaling or dynamic DCI signaling) or UE reports a preferred alternative. In yet another embodiment, Alt 4-6A is supported for both M=2 and 4, and Alt 4-2A is supported for M=2 only. Only one of these embodiments is specified in the specification.

For rank 2, the reporting of $c_{0,1,l}$, $c_{1,0,l}$, and $c_{1,0,l}$ are according to at least one of the following alternatives. In one example of Alt 4-0B, $c_{p,0,0}=c_{p,0,1}$, $c_{p,1,0}=c_{p,1,1}$, $c_{0,0,0}=1$, $c_{0,1,0} \in \{1,j\}$, $c_{1,0,0} \in \{1, j, -1, -j\}$, $c_{1,1,0} \in \{1, j, -1, -j\}$, where the calculation and reporting of $c_{0,1,0}$, $c_{1,0,0}$ and $c_{1,1,0}$ can be SB (which requires 5 bits/SB).

In one example of Alt 4-1B, $c_{p,0,0}=c_{p,0,1}$, $c_{p,1,0}=-c_{p,1,1}$, $c_{0,0,0}=1$, $c_{0,1,0} \in \{1, j\}$, $c_{1,0,0} \in \{1, j, -1, -j\}$, $c_{1,1,0}=c_{0,1,0} \cdot c_{1,0,0}$, where the calculation and reporting of $c_{0,1,0}$ and $c_{1,0,0}$ can be SB (which requires 3 bits/SB).

In one example of Alt 4-2B, $c_{p,0,0}=c_{p,0,1}$, $c_{p,1,0}=c_{p,1,1}$, $c_{0,0,0}=1$, $c_{0,1,0} \in \{1, j\}$, $c_{1,0,0}=a_{1,0,0}b_{1,0,0}$, and $c_{1,1,0}=a_{1,1,0}b_{1,1,0}$ where $$a_{1,r,0} \in \left\{ e^{\frac{j\pi}{4}}, e^{\frac{j3\pi}{4}}, e^{\frac{j5\pi}{4}}, e^{\frac{j7\pi}{4}} \right\} \text{ and } b_{1,r,0} = \left\{ e^{-\frac{j\pi}{4}}, e^{\frac{j\pi}{4}} \right\},$$

where the calculation and reporting of $c_{0,1,0}$, $b_{1,0,0}$ and $b_{1,1,0}$ can be SB (which requires 3 bits/SB) and the calculation and report of $a_{1,0,0}$ and $a_{1,1,0}$ are wideband (which requires 4 bits).

In one example of Alt 4-3B, $c_{p,0,0}=c_{p,0,1}$, $c_{p,1,0}=-c_{p,1,1}$, $c_{0,0,0}=1$, $c_{1,0,0} \in \{1,j\}$, $c_{0,1,0}=a_{0,1,0}b_{0,1,0}$ and $c_{1,1,0}=a_{1,1,0}b_{1,1,0}$ where $$a_{p,1,0} \in \left\{ e^{\frac{j\pi}{4}}, e^{\frac{j3\pi}{4}}, e^{\frac{j5\pi}{4}}, e^{\frac{j7\pi}{4}} \right\} \text{ and } b_{p,1,0} \in \left\{ e^{-\frac{j\pi}{4}}, e^{\frac{j\pi}{4}} \right\},$$

where the calculation and reporting of $c_{1,0,0}$, $b_{0,1,0}$ and $b_{1,1,0}$ can be SB (which requires 3 bits/SB), and the calculation and report of $a_{0,1,0}$ and $a_{1,1,0}$ are WB (which requires 4 bits).

In one example of Alt 4-4B, $c_{p,0,0}=c_{p,0,1}$, $c_{p,1,0}=-c_{p,1,1}$, $c_{0,0,0}=1$, $c_{1,1,0} \in \{1,j\}$, $c_{1,0,0}=a_{1,0,0}b_{1,0,0}$ and $c_{0,1,0}=a_{0,1,0}b_{0,1,0}$ where $a_{1,0,0}$, $$a_{0,1,0} \in \left\{ e^{\frac{j\pi}{4}}, e^{\frac{j3\pi}{4}}, e^{\frac{j5\pi}{4}}, e^{\frac{j7\pi}{4}} \right\} \text{ and } b_{1,0,0}, b_{0,1,0} \in \left\{ e^{-\frac{j\pi}{4}}, e^{\frac{j\pi}{4}} \right\},$$

where the calculation and reporting of $c_{1,1,0}$, $b_{1,0,0}$ and $b_{0,1,0}$ can be SB (which requires 3 bits/SB), and the calculation and report of $a_{1,0,0}$ and $a_{0,1,0}$ are WB (which requires 4 bits).

In one example of Alt 4-5B, the codebook are $$\left\{ e^{\frac{j\pi}{4}}, e^{\frac{j3\pi}{4}}, e^{\frac{j5\pi}{4}}, e^{\frac{j7\pi}{4}} \right\} \text{ and } \left\{ e^{-\frac{j\pi}{4}}, e^{\frac{j\pi}{4}} \right\}$$

are respectively replaced with any one of the following: $a_{WB}=\{1, j, -1, -j\}$ (2 bit WB phase) and $a_{SB}=\{1, j\}$ (1-bit SB phase); $a_{WB}=\{1, j, -1, -j\}$ (2 bit WB phase) and $a_{SB}=\{1, -j\}$ (1-bit SB phase); $a_{WB}=\{1, j, -1, -j\}$ (2 bit WB phase) and $$a_{SB} = \left\{ e^{-\frac{j\pi}{4}}, e^{\frac{j\pi}{4}} \right\}$$

(1-bit SB phase);

$$a_{WB} = \left\{ e^{\frac{j\pi}{4}}, e^{\frac{j3\pi}{4}}, e^{\frac{j5\pi}{4}}, e^{\frac{j7\pi}{4}} \right\}$$

(2 bit WB phase) and $$a_{SB} = \left\{ e^{-\frac{j\pi}{4}}, e^{\frac{j\pi}{4}} \right\}$$

(1-bit SB phase);

$$a_{WB} = \left\{ e^{\frac{j\pi}{4}}, e^{\frac{j3\pi}{4}}, e^{\frac{j5\pi}{4}}, e^{\frac{j7\pi}{4}} \right\}$$

(2 bit WB phase) and $a_{SB}=\{1, -j\}$ (1-bit SB phase); and $$a_{WB} = \left\{ e^{\frac{j\pi}{4}}, e^{\frac{j3\pi}{4}}, e^{\frac{j5\pi}{4}}, e^{\frac{j7\pi}{4}} \right\}$$

(2 bit WB phase) and $a_{SB}=\{1, j\}$ (1-bit SB phase).

In one example of Alt 4-6B, $c_{p,0,0}=c_{p,0,1}$, $c_{p,1,0}=-c_{p,1,1}$, $c_{0,0,0}=1$, $c_{0,1,0} \in \{1, j\}$, $c_{1,0,0} \in \{1, j, -1, -j\}$, $c_{1,1,0}=c_{0,1,0} \cdot c_{1,0,0}$, where +the calculation and reporting of $c_{1,0,0}$ is WB (which requires 2 bits), and that of $c_{0,1,0}$ can be WB or SB (which requires 1 bits/SB).

At least one of the following embodiments may be used to support at least one of the above alternatives. In one embodiment, only one of the alternatives is fixed in the specification (e.g. Alt 4-2B). In another embodiment, two of these alternatives are supported in the specification (e.g. Alt 4-6B, Alt 4-2B) and one of the two is configured to the UE (RRC). In another embodiment, one of the alternatives is either configured (via higher layer RRC signaling or dynamic DCI signaling) or UE reports a preferred alternative. In yet another embodiment, Alt 4-6B is supported for both M=2 and 4, and Alt 4-2B is supported for M=2 only. Only one of these methods is specified in the specification.

An alternative expression for $$a_{WB} = \left\{e^{\frac{j\pi}{4}}, e^{\frac{j3\pi}{4}}, e^{\frac{j5\pi}{4}}, e^{\frac{j7\pi}{4}}\right\} \text{ and } a_{SB} = \left\{e^{-\frac{j\pi}{4}}, e^{\frac{j\pi}{4}}\right\}$$

are as follows:

$$a_{WB} = \left\{e^{j\pi\left(\frac{k}{2}+\frac{1}{4}\right)}: k=0,1,2,3\right\} \text{ or } \left\{e^{j\pi\left(\frac{2k+1}{4}\right)}: k=0,1,2,3\right\} \text{ or}$$
$$\left\{e^{\frac{j\pi}{4}}e^{\frac{j\pi k}{2}}: k=0,1,2,3\right\}; \text{ and } a_{SB} = \left\{e^{j\pi\left(\frac{k}{2}-\frac{1}{4}\right)}: k=0,1\right\} \text{ or}$$
$$\left\{e^{j\pi\left(\frac{2k-1}{4}\right)}: k=0,1\right\} \text{ or } a_{SB} = \left\{e^{-\frac{j\pi}{4}}e^{\frac{j\pi k}{2}}: k=0,1\right\}.$$

In one embodiment 4A, the PMI codebook for rank 3 and 4 CSI reporting comprises of the following pre-coding matrices $$W = \frac{1}{\sqrt{3MP}} \begin{bmatrix} w_{0,0,0} & w_{0,0,1} & w_{0,0,2} \\ w_{0,1,0} & w_{0,1,1} & w_{0,1,2} \\ w_{1,0,0} & w_{1,0,1} & w_{1,0,2} \\ w_{1,1,0} & w_{1,1,1} & w_{1,1,2} \end{bmatrix} \text{ and}$$

$$W = \frac{1}{\sqrt{4MP}} \begin{bmatrix} w_{0,0,0} & w_{0,0,1} & w_{0,0,2} & w_{0,0,3} \\ w_{0,1,0} & w_{0,1,1} & w_{0,1,2} & w_{0,1,3} \\ w_{1,0,0} & w_{1,0,1} & w_{1,0,2} & w_{1,0,3} \\ w_{1,1,0} & w_{1,1,1} & w_{1,1,2} & w_{1,1,3} \end{bmatrix},$$

respectively, where: $w_{p,r,l} = b_{k_1+k'_{1,l},k_2+k'_{2,l}} \cdot c_{p,r,l}$, p=0,1 (for two panels), r=0,1 (for two polarizations), l=0,1,2,3 (for four layers); $b_{k_1+k'_{1,l},k_2+k'_{2,l}}$ is an oversampled 2D DFT beam; $k_1=i_{1,1}$, $k_2=i_{1,2}$ and the leading beam index $(i_{1,1},i_{1,2})$ is reported wideband, where $i_{1,1}=0, 1, \ldots N_1O_1-1$ and $i_{1,2}=0,1, \ldots N_2O_2-1$, hence it requires $\lceil \log_2(N_1O_1N_2O_2) \rceil$ bits; for layer 0 and 1 (l=0, 1), the index pair $(k'_{1,l}, k'_{2,l})=(0,0)$; for layer 2 and 3 (l=2, 3), the index pair $(k'_{1,l}, k'_{2,l})$ is calculated and reported in a wideband manner according to at least one of the following alternatives.

One of the alternatives is supported in the specification. In one example of Alt 4A-0, the same as in LTE Release 13/14 Class A rank 3-4 codebook for Codebook-Config=1, i.e., $(k'_{1,1}, k'_{2,1}) \in \{(1,0), (0,1)\}$ for 2D antenna port layouts ($N_1>1, N_2>1$), and $(k'_{1,1}, k'_{2,1}) \in \{(1,0), (2,0), (3,0)\}$ for 1D antenna port layouts ($N_1>1, N_2=1$).

In one example of Alt 4A-1, $(k'_{1,1}, k'_{2,1}) \in \{(1,0), (0,1)\}$ for 2D antenna port layouts ($N_1>1, N_2>1$), and $(k'_{1,1},k'_{2,1}) \in \{(1,0), (2,0)\}$ for 1D antenna port layouts ($N_1>1, N_2=1$).

In one example of Alt 4A-2, for $N_1>1$ and $N_2>2$ and $N_2>N_1$: $(k'_{1,1},k'_{2,1})=\{(0,0), (O_1, 0), (0, O_2), (0, 2O_2)\}$; for $N_2>1$ and $N_1>2$ and $N_2>N_1$: $(k'_{1,1},k'_{2,1})=\{(0,0), (O_1, 0), (0, O_2), (2O_1, 0)\}$; for $N_2>1$ and $N_1>1$ and $N_1=N_2$: $(k'_{1,1}, k'_{2,1})=\{(0,0), (O_1, 0), (0, O_2), (O_1, O_2)\}$; and for $N_2=1$: $(k'_{1,1}, k'_{2,1})=\{(0,0), (O_1, 0), (2O_1, 0), (3O_1, 0)\}$ The last two values are not applicable for 4 ports (i.e., $N_1=2$).

In one example of Alt 4A-3, for $N_1>1$ and $N_2>2$ and $N_2>N_1$: $(k'_{1,1},k'_{2,1})=\{(0,0), (O_1,0), (0,O_2), (0,(N_2-1)O_2)\}$;

for $N_2>1$ and $N_1>2$ and $N_1>N_2$: $(k'_{1,1},k'_{2,1})=\{(0,0), (O_1,0), (0,O_2), ((N_1-1)O_1,0)\}$; for $N_2>1$ and $N_1>1$ and $N_1=N_2$: $(k'_{1,1},k'_{2,1})=\{(0,0), (O_1,0), (0,O_2), (O_1,O_2)\}$; and for $N_2=1$: $(k'_{1,1},k'_{2,1})=\{(0,0), (O_1,0), (2O_1,0), ((N_1-1)O_1,0)\}$. The last two values are not applicable for 4 ports (i.e., $N_1=2$).

In one example of Alt 4A-4, for $N_2>1$ and $N_1>1$: $(k'_{1,1}, k'_{2,1})=\{(0,0), (O_1,0), (0,O_2), (O_1,O_2)\}$; and for $N_2=1$: $(k'_{1,1}, k'_{2,1})=\{(0,0), (O_1,0), (2O_1,0), (3O_1,0)\}$. The last two values are not applicable for 4 ports (i.e., $N_1=2$).

In one example of Alt 4A-5, for $N_2>1$ and $N_1>1$: $(k'_{1,1}, k'_{2,1})=\{(0,0), (O_1,0), (0,O_2), (O_1,O_2)\}$; and for $N_2=1$: $(k'_{1,1}, k'_{2,1})=\{(0,0), (O_1,0), (2O_1,0), ((N_1-1)O_1,0)\}$. The last two values are not applicable for 4 ports (i.e., $N_1=2$).

$c_{p,r,l}$ is the co-phase value for panel p, polarization r and layer l. The reporting of $c_{p,r,l}$ is according to the codebook in at least one of Alt 4-0A through Alt 4-5A or/and Alt 4-0B through Alt 4-5B.

In one embodiment 4B, the PMI codebook for rank 5, rank 6, rank 7, and 8 CSI reporting comprises of the following pre-coding matrices $$W = \frac{1}{\sqrt{5MP}} \begin{bmatrix} w_{0,0,0} & w_{0,0,1} & w_{0,0,2} & w_{0,0,3} & w_{0,0,4} \\ w_{0,1,0} & w_{0,1,1} & w_{0,1,2} & w_{0,1,3} & w_{0,1,4} \\ w_{1,0,0} & w_{1,0,1} & w_{1,0,2} & w_{1,0,3} & w_{1,0,4} \\ w_{1,1,0} & w_{1,1,1} & w_{1,1,2} & w_{1,1,3} & w_{1,1,4} \end{bmatrix},$$

$$W = \frac{1}{\sqrt{6MP}} \begin{bmatrix} w_{0,0,0} & w_{0,0,1} & w_{0,0,2} & w_{0,0,3} & w_{0,0,4} & w_{0,0,5} \\ w_{0,1,0} & w_{0,1,1} & w_{0,1,2} & w_{0,1,3} & w_{0,1,4} & w_{0,1,5} \\ w_{1,0,0} & w_{1,0,1} & w_{1,0,2} & w_{1,0,3} & w_{1,0,4} & w_{1,0,5} \\ w_{1,1,0} & w_{1,1,1} & w_{1,1,2} & w_{1,1,3} & w_{1,1,4} & w_{1,1,5} \end{bmatrix},$$

$$W = \frac{1}{\sqrt{7MP}} \begin{bmatrix} w_{0,0,0} & w_{0,0,1} & w_{0,0,2} & w_{0,0,3} & w_{0,0,4} & w_{0,0,5} & w_{0,0,6} \\ w_{0,1,0} & w_{0,1,1} & w_{0,1,2} & w_{0,1,3} & w_{0,1,4} & w_{0,1,5} & w_{0,1,6} \\ w_{1,0,0} & w_{1,0,1} & w_{1,0,2} & w_{1,0,3} & w_{1,0,4} & w_{1,0,5} & w_{1,0,6} \\ w_{1,1,0} & w_{1,1,1} & w_{1,1,2} & w_{1,1,3} & w_{1,1,4} & w_{1,1,5} & w_{1,1,6} \end{bmatrix},$$

$$W = \frac{1}{\sqrt{8MP}} \begin{bmatrix} w_{0,0,0} & w_{0,0,1} & w_{0,0,2} & w_{0,0,3} & w_{0,0,4} & w_{0,0,5} & w_{0,0,6} & w_{0,0,7} \\ w_{0,1,0} & w_{0,1,1} & w_{0,1,2} & w_{0,1,3} & w_{0,1,4} & w_{0,1,5} & w_{0,1,6} & w_{0,1,7} \\ w_{1,0,0} & w_{1,0,1} & w_{1,0,2} & w_{1,0,3} & w_{1,0,4} & w_{1,0,5} & w_{1,0,6} & w_{1,0,7} \\ w_{1,1,0} & w_{1,1,1} & w_{1,1,2} & w_{1,1,3} & w_{1,1,4} & w_{1,1,5} & w_{1,1,6} & w_{1,1,7} \end{bmatrix}$$

respectively.

In such embodiment, $w_{p,r,l} = b_{k_1+k'_{1,l},k_2+k'_{2,l}} \cdot c_{p,r,l}$, p=0,1 (for two panels), r=0,1 (for two polarizations), l=0,1,2,3,5,6,7,8 (for up to eight layers), $b_{k_1+k'_{1,l},k_2+k'_{2,l}}$ is an oversampled 2D DFT beam, $k_1=i_{1,1}, k_2=i_{1,2}$ and the leading beam index $(i_{1,1},i_{1,2})$ is reported wideband, where $i_{1,1}=0, 1, \ldots N_1O_1-1$ and $i_{1,2}=0,1, \ldots N_2O_2-1$, hence it requires $\lceil \log_2(N_1O_1N_2O_2) \rceil$ bits.

For layer 0 and 1 (l=0, 1), the index pair $(k'_{1,l},k'_{2,l})=(b_{1,0},b_{2,0})$, for layer 2 and 3 (l=2, 3), the index pair $(k'_{1,l},k'_{2,l})=(b_{1,1}, b_{2,1})$, for layer 4 and 5 (l=4, 5), the index pair $(k'_{1,l},k'_{2,l})=(b_{1,2}, b_{2,2})$, and for layer 6 and 7 (l=6, 7), the index pair $(k'_{1,l},k'_{2,l})=(b_{1,3},b_{2,3})$, where $(b_{1,0},b_{2,0})$, $(b_{1,1},b_{2,1})$, $(b_{1,2},b_{2,2})$, and $(b_{1,3},b_{2,3})$ for different layers are determined according to at least one of the following alternatives.

In one example of Alt 4B-0, $(b_{1,0}, b_{2,0})$, $(b_{1,1}, b_{2,1})$, $(b_{1,2}, b_{2,2})$, and $(b_{1,3}, b_{2,3})$ are determined based on fixed orthogonal beam patterns (similar to Rel. 13/14 LTE Class A rank 5-8) using higher layer RRC parameter Codebook-Config, where Codebook-Config=1,2,3,4 which correspond to the orthogonal beam groups in LTE specification Class A rank 5-8.

In one example of Alt 4B-1, Alt 4B-0 in which UE reports a preferred orthogonal beam group using a 2-bit CSI reporting which is reported in a WB manner. This reporting can be separate or joint with other WB CSI reports such as (PMI $i_1$). Alternatively, the reporting can be restricted to 1 bit.

In one example of Alt 4B-2, $(b_{1,0}, b_{2,0})$, $(b_{1,1}, b_{2,1})$, $(b_{1,2}, b_{2,2})$, and $(b_{1,3}, b_{2,3})$ are determined based on independent or free selection from full orthogonal DFT basis comprising of $N_1 N_2$ orthogonal beams.

The extension of embodiment 4 to M>2 antenna panels, for example M=4, is straightforward to those the skilled in the art.

In one embodiment 5, the UE is configured with the CQI reporting, in addition to RI/PMI, according to at least one of the following alternatives. In one example of Alt 5-0, a joint CQI common for all panels is reported. An example use case of this alternative is when all layers are transmitted from all panels. In one example of Alt 5-1, per panel CQI is reported, i.e. M CQIs are reported in total. An example use case of this alternative is when different layers are transmitted from different panels. For example, layer 0 is transmitted from panel 0, layer 1 is transmitted from panel 1, and so on.

In one embodiment 6, the UE is configured with the RI reporting, in addition to CQI/PMI, according to at least one of the following alternatives. In one example of Alt 6-0, RI=M is fixed, and hence no RI is reported. In one example of Alt 6-1, a joint RI common for all panels is reported. An example use case of this alternative is when all layers are transmitted from all panels. In one example of Alt 5-2, per panel RI is reported, i.e. M RIs are reported in total. An example use case of this alternative is when different layers are transmitted from different panels. For example, at least one of layer 0 and 1 is transmitted from panel 0, at least one of layer 2 and 3 is transmitted from panel 1, and so on. In this case, each reported RI can be 1 bit.

In one embodiment 7, the UE is configured with the CRI reporting either alone or together with CSI reports CQI/PMI/RI.

In one embodiment 8, the UE is configured the CSI reporting for hybrid beamforming architecture comprising of both radio frequency (RF) or analog beams (precoding) in addition to the digital or baseband precoding. In addition, the beams in the W1 codebook is used to report analog beam and W2 is used to report inter-panel or/and intra-panel phase where the $W_2$ codebook is according to some embodiment of the present disclosure.

In one embodiment 9, the UE is configured with the SB sizes $K_1$ and $K_2$ respectively for inter-panel co-phasing and intra-panel (inter-polarization) co-phasing. A few alternatives for $(K_1, K_2)$ are as follows. In one example of Alt 9-0, $K_1 = K_2$. In one example of Alt 9-1, $K_1 = r \times K_2$, where r is an integer, for example belonging to $\{1, 2, 3, 4\}$. In one example of Alt 9-2, $K_2 = r \times K_1$, where r is an integer, for example belonging to $\{1, 2, 3, 4\}$. In one example of Alt 9-3, $K_1 = r \times K_2$, where r is an integer or 1 or a fraction, for example belonging to $\{¼, ⅓, ½, 1, 2, 3, 4\}$. In one example of Alt 9-4, Alt-3 where the r value depends on the system bandwidth (BW). For example, for smaller BWs, r=1, and for larger BWs, r=2 or 4. In one example of Alt 9-5, a single $(K_1, K_2)$ according to one of Alt 9-0 to Alt 9-3 is configured either higher layer RRC or dynamic MAC CE based or DCI signaling. In one example of Alt 9-6, the $K_1$ value is configured via higher layer RRC or dynamic MAC CE based or DCI signaling and the $K_2$ value is fixed, either BW-dependent or BW-independent. In one example of Alt 9-7, the $K_2$ value is configured via higher layer RRC or dynamic MAC CE based or DCI signaling and the $K_1$ value is fixed, either BW-dependent or BW-independent. In one example of Alt 9-8, a combination of at least one of Alt 9-0 through Alt 9-7.

In one embodiment, only one of the alternatives is fixed in the specification. In another embodiment, one of the alternatives is either configured (via higher layer RRC signaling or dynamic DCI signaling) or UE reports a preferred alternative In one embodiment 10, for M=4, a UE is configured with a PMI codebook for CSI feedback according to at least one of the following alternatives. In one example of Alt 10-0 (panel selection), 2 out of 4 panels are selected, and then the PMI codebook for 2 panels is used to report PMI for the selected two panels. This panel selection can be reported either in a WB manner or per SB, where this reporting requires $$\left\lceil \log_2 \binom{4}{2} \right\rceil = 3$$

bits which can be reported either jointly with other WB/SB CSI components such as PMI1/PMI2 or separately as a separate WB/SB CSI report. In an example, panel selection is reported using CRI (CSI-RS resource indicator).

In one example of Alt 10-1 (panel/polarization combination selection), 4 out of 8 panel and polarization combinations (2 polarizations and 4 panels, hence 8 combinations) are selected, and then the PMI codebook for 2 panels (which is equivalent to 4 panel and polarization combinations) is used to report PMI for the selected four panel and polarization combinations. This panel/polarization combination selection can be reported either in a WB manner or per SB, where this reporting requires $$\left\lceil \log_2 \binom{8}{4} \right\rceil = 7$$

bits which can be reported either jointly with other WB/SB CSI components such as PMI1/PMI2 or separately as a separate WB/SB CSI report. In an example, panel/polarization combination selection is reported using CRI (CSI-RS resource indicator)

In one example of Alt 10-2, for rank 1 $W_2 = [c_{0,0,0} \ c_{0,1,0} \ c_{1,0,0} \ c_{1,1,0} \ c_{2,0,0} \ c_{2,1,0} \ c_{3,0,0} \ c_{3,1,0}]^T$. In such example, p=0: $c_{0,0,0}=1$, $c_{1,1,0} \in \{1, j, -1, -j\}$ is reported SB (requires 2 bits for reporting), and p>0, r=0,1: $c_{p,r,0} = a_{p,r,0} b_{p,r,0}$ where $$a_{p,r,0} \in \left\{ e^{\frac{j\pi}{4}}, e^{\frac{j3\pi}{4}}, e^{\frac{j5\pi}{4}}, e^{\frac{j7\pi}{4}} \right\}$$

is reported WB and $$b_{p,r,0} \in \left\{ e^{-\frac{j\pi}{4}}, e^{\frac{j\pi}{4}} \right\}$$

is reported SB (hence, requires 12 WB bits and 6 SB bit). In total, this alternative requires, 12 WB bits to report WB part of the phase and 8 SB bits to report SB part of the phase. For rank 2, $c_{p,0,1} = c_{p,0,0}$ and $c_{p,1,1} = -c_{p,1,0}$.

In one example of Alt 10-3, for rank 1 $W_2=[c_{0,0,0}\ c_{0,1,0}\ c1,0,0\ c1,1,0\ c_{2,0,0}\ c2,1,0\ c_{3,0,0}\ c_{3,1,0}]^T$, p=0,1,2,3, and r=0, 1: $c_{p,r,0}=a_{p,r,0}b_{p,r,0}$ where $$a_{p,r,0} \in \left\{ e^{\frac{j\pi}{4}}, e^{\frac{j3\pi}{4}}, e^{\frac{j5\pi}{4}}, e^{\frac{j7\pi}{4}} \right\}$$

is reported WB and $$b_{p,r,0} \in \left\{ e^{-\frac{j\pi}{4}}, e^{\frac{j\pi}{4}} \right\}$$

is reported SB. In total, this alternative requires, 14 WB bits to report WB part of the phase and 7 SB bits to report SB part of the phase. For rank 2, $c_{p,0,1}=c_{p,0,0}$ and $c_{p,1,1}=-c_{p,1,0}$.

In one example of Alt 10-4, for rank 1 $W_2=[c_{0,0,0}\ c_{0,1,0}\ c_{1,0,0}\ c_{1,1,0}\ c_{2,0,0}\ c_{2,1,0}\ c_{3,0,0}\ c_{3,1,0}]^T$, p=0: $c_{0,0,0}=1$, $c_{1,1,0}\in\{1, j, -1, -j\}$ is reported SB (requires 2 bits for reporting), and p>0, r=0,1: $c_{p,0,0}=c_{p,1,0}=a_{p,r,0}b_{p,r,0}$ where $$a_{p,r,0} \in \left\{ e^{\frac{j\pi}{4}}, e^{\frac{j3\pi}{4}}, e^{\frac{j5\pi}{4}}, e^{\frac{j7\pi}{4}} \right\}$$

is reported WB and $$b_{p,r,0} \in \left\{ e^{-\frac{j\pi}{4}}, e^{\frac{j\pi}{4}} \right\}$$

is reported SB (hence, requires 6 WB bits and 3 SB bit). In total, this alternative requires, 6 WB bits to report WB part of the phase and 5 SB bits to report SB part of the phase. For rank 2, $c_{p,0,1}=c_{p,0,0}$ and $c_{p,1,1}=-c_{p,1,0}$.

In one example of Alt 10-5, for rank 1 $W_2=[c_{0,0,0}\ c_{0,1,0}\ c_{1,0,0}\ c_{1,1,0}\ c_{2,0,0}\ c_{2,1,0}\ c_{3,0,0}\ c_{3,1,0}]^T$, p=0, 1, 2, 3, and r=0, 1: $c_{p,0,0}=c_{p,1,0}=a_{p,r,0}b_{p,r,0}$ where $$a_{p,r,0} \in \left\{ e^{\frac{j\pi}{4}}, e^{\frac{j3\pi}{4}}, e^{\frac{j5\pi}{4}}, e^{\frac{j7\pi}{4}} \right\}$$

is reported WB and $$b_{p,r,0} \in \left\{ e^{-\frac{j\pi}{4}}, e^{\frac{j\pi}{4}} \right\}$$

is reported SB. In total, this alternative requires, 8 WB bits to report WB part of the phase and 4 SB bits to report SB part of the phase. For rank 2, $c_{p,0,1}=c_{p,0,0}$ and $c_{p,1,1}=-c_{p,1,0}$.

In one embodiment 11, a UE is configured with a PMI codebook for multi panels ($N_g=M>1$) for all ranks (e.g. 1-8), which can be constructed from the single panel PMI codebook ($N_g=M=1$) by the following pre-coder relation: $w_{p,r,l}=b_{k_1+k'_{1,l},k_2+k'_{2,l}} \cdot c_{p,r,l}$, where p=0,1, ..., $N_g-1$ (panel, where $N_g$ denotes the number of panels), r=0,1 (two polarizations), l=0,1, ..., R−1 (layers, where R denotes rank), $b_{k_1+k'_{1,l},k_2+k'_{2,l}}$ corresponds to a single 2D DFT beam (L=1) in the $W_1$ codebook; where $(k'_{1,l},k'_{2,l})=(0,0)$ for rank 1 and 2, is according to Embodiment 4A and 4B for rank 3-8, and $c_{p,r,l}$ is co-phasing coefficient between panels and polarizations. The inter-panel co-phasing payload is configurable via RRC. In one example of Mode 1, this mode corresponds to lower payload, and is supported for both $N_g=2$ or 4. In one example of Mode 2, his mode corresponds to higher payload, and at least supported for $N_g=2$. For $N_g=4$, this mode can be supported with maximum 4 bits/subband according to at least one alternative in the aforementioned embodiment 10.

For rank 1, $c_{p,r,0}$ is given as follows. In one example of Mode 1, $c_{0,0,0}=1$, $c_{0,1,0}\in\{1, j, -1, -j\}$, $c_{p,0,0}\in\{1, j, -1, -j\}$ and $c_{p,1,0}=c_{0,1,0}\times c_{p,0,0}$. In such mode, the calculation and reporting of $c_{0,1,0}$ can be subband (requires 2 bits/subband). In such mode, the calculation and reporting of $c_{p,0,0}$ is wideband (requires $2\times(N_g-1)$ bits).

In one example of Mode 2, $c_{0,0,0}=1$, $c_{0,1,0}\in\{1,j,-1,-j\}$ and $c_{p,r,0}=a_{p,r,0}\times b_{p,r,0}$ where p>0, $$a_{p,r,0} \in \left\{ e^{\frac{j\pi}{4}}, e^{\frac{j3\pi}{4}}, e^{\frac{j5\pi}{4}}, e^{\frac{j7\pi}{4}} \right\} \text{ and } b_{p,r,0} \in \left\{ e^{-\frac{j\pi}{4}}, e^{\frac{j\pi}{4}} \right\}.$$

In such mode, the calculation and reporting of $c_{0,1,0}$ and $b_{p,r,0}$ can be subband ($2+2\times(N_g-1)$ bits/subband). In such mode, the calculation and reporting of $a_{p,r,0}$ is wideband ($4\times(N_g-1)$ bits).

For rank 2, $$c_{p,r,l} = \frac{c_{r,l}}{c_{r,0}} \times c_{p,r,0}$$

for l=1, $c_{0,1,0}\in\{1, j\}$, $c_{p,0,1}=c_{p,0,0}$ and $c_{p,1,1}=-c_{p,1,0}$. $c_{0,0}=c_{0,1}=1$, $c_{1,0}=-c_{1,1}$, and $c_{1,0}\in\{1, j\}$ and $c_{p,r,0}$ is given in the above rank 1 MP codebook for each mode. For ranks 3-8, the codebook in (or their extension) the aforementioned embodiments 4A and 4B can be used.

In one embodiment 12, a UE is configured with a PMI codebook for multi panels ($N_g=M>1$) as follows. For 8 antenna ports (e.g. {15, 16, ..., 22}), 16 antenna ports (e.g. {15, 16, ..., 30}), 32 antenna ports (e.g. {15, 16, ..., 46}), when the number of layers v=1, each PMI value corresponds to four codebook indices $i_{1,1}$, $i_{1,2}$, $i_{1,4}$, $i_2$ and when the number of layers $v\in\{2,3,4\}$, each PMI value corresponds to five codebook indices $i_{1,1}$, $i_{1,2}$, $i_{1,3}$, $i_{1,4}$, $i_2$. The codebooks for 1-4 layers are given respectively in TABLES 8-11. The mapping from $i_{1,3}$ to $k_1$ and $k_2$ for 2-layer reporting is given in TABLE 6. The mapping from $i_{1,3}$ to $k_1$ and $k_2$ for 3-layer and 4-layer reporting is given in TABLE 7. The quantities $\varphi_n$, $a_p$, $b_p$, $u_m$, and $v_{l,m}$ are given by:

$$\varphi_n = e^{j\pi n/2}$$
$$a_p = e^{j\pi(p/2+1/4)} = e^{j\pi/4} e^{j\pi p/2}$$
$$b_p = e^{j\pi(p/2-1/4)} = e^{-j\pi/4} e^{j\pi p/2}$$
$$u_m = \begin{cases} \left[ 1 \quad e^{j\frac{2\pi m}{O_2 N_2}} \quad \ldots \quad e^{j\frac{2\pi m(N_2-1)}{O_2 N_2}} \right] & N_2 > 1 \\ 1 & N_2 = 1 \end{cases}$$
$$v_{l,m} = \left[ u_m \quad e^{j\frac{2\pi l}{O_1 N_1}} u_m \quad \ldots \quad e^{j\frac{2\pi l(N_1-1)}{O_1 N_1}} u_m \right]^T.$$

The values of $N_g$, $N_1$, and $N_2$ are configured with the higher-layer parameters CodebookConfig-Ng, CodebookConfig-N1 and CodebookConfig-N2, respectively. The supported configurations of $(N_g, N_1, N_2)$ for a given number of CSI-RS ports and the corresponding values of $(O_1, O_2)$ are given in TABLE 4. The number of CSI-RS ports, $P_{CSI-RS}$, is $2N_g N_1 N_2$.

A UE may only use $i_{1,2}=0$ and may not report $i_{1,2}$ if the value of CodebookConfig-N2 is set to 1.

TABLE 6

Mapping of $i_{1,3}$ to $k_1$ and $k_2$ for 2-layer CSI reporting for $N_g \in \{2, 4\}$

| | $N_1 = 4, N_2 = 2$ | | $N_1 = 2, N_2 = 2$ | | $N_1 = 2, N_2 = 1$ | | $N_1 > 2, N_2 = 1$ | |
|---|---|---|---|---|---|---|---|---|
| $i_{1,3}$ | $k_1$ | $k_2$ | $k_1$ | $k_2$ | $k_1$ | $k_2$ | $k_1$ | $k_2$ |
| 0 | 0 | 0 | 0 | 0 | 0 | 0 | 0 | 0 |
| 1 | $O_1$ | 0 | $O_1$ | 0 | $O_1$ | 0 | $O_1$ | 0 |

TABLE 6-continued

Mapping of $i_{1,3}$ to $k_1$ and $k_2$ for 2-layer CSI reporting for $N_g \in \{2, 4\}$

| | $N_1 = 4, N_2 = 2$ | | $N_1 = 2, N_2 = 2$ | | $N_1 = 2, N_2 = 1$ | | $N_1 > 2, N_2 = 1$ | |
|---|---|---|---|---|---|---|---|---|
| $i_{1,3}$ | $k_1$ | $k_2$ | $k_1$ | $k_2$ | $k_1$ | $k_2$ | $k_1$ | $k_2$ |
| 2 | 0 | $O_2$ | 0 | $O_2$ | | | $2O_1$ | 0 |
| 3 | $2O_1$ | 0 | $O_1$ | $O_2$ | | | $3O_1$ | 0 |

TABLE 7

Mapping of $i_{1,3}$ to $k_1$ and $k_2$ for 3-layer and 4-layer CSI reporting for $N_g \in \{2, 4\}$

| | $N_1 = 2, N_2 = 1$ | | $N_1 = 4, N_2 = 1$ | | $N_1 = 8, N_2 = 1$ | | $N_1 = 2, N_2 = 2$ | | $N_1 = 4, N_2 = 2$ | |
|---|---|---|---|---|---|---|---|---|---|---|
| $i_{1,3}$ | $k_1$ | $k_2$ | $k_1$ | $k_2$ | $k_1$ | $k_2$ | $k_1$ | $k_2$ | $k_1$ | $k_2$ |
| 0 | $O_1$ | 0 | $O_1$ | 0 | $O_1$ | 0 | $O_1$ | 0 | $O_1$ | 0 |
| 1 | | | $2O_1$ | 0 | $2O_1$ | 0 | 0 | $O_2$ | 0 | $O_2$ |
| 2 | | | $3O_1$ | 0 | $3O_1$ | 0 | $O_1$ | $O_2$ | $O_1$ | $O_2$ |
| 3 | | | | | $4O_1$ | 0 | | | $2O_1$ | 0 |

TABLE 8

Codebook for 1-layer CSI reporting using antenna ports [15 to 14 + $P_{CSI-RS}$]

| Codebook-Config = 1, $N_g \in \{2, 4\}$ | | | | |
|---|---|---|---|---|
| $i_{1,1}$ | $i_{1,2}$ | $i_{1,4}$ | $i_2$ | |
| $0, 1, \ldots, N_1 O_1 - 1$ | $0, 1, \ldots, N_2 O_2 - 1$ | $0, \ldots, 4^{N_g-1} - 1$ | $0, 1, 2, 3$ | $W^{(1)}_{i_{1,1}, i_{1,2}, i_{1,4}, i_2}$ | for $N_g = 2$, $W^{(1)}_{l,m,p,n} = \dfrac{1}{\sqrt{P_{CSI-RS}}} \begin{bmatrix} v_{l,m} \\ \varphi_n v_{l,m} \\ \varphi_p v_{l,m} \\ \varphi_p \varphi_n x_{l,m} \end{bmatrix}$; and for $N_g = 4$, $W^{(1)}_{l,m,p,n} = \dfrac{1}{\sqrt{P_{CSI-RS}}} \begin{bmatrix} v_{l,m} \\ \varphi_n v_{l,m} \\ \varphi_{p_1} v_{l,m} \\ \varphi_{p_1} \varphi_n v_{l,m} \\ \varphi_{p_2} v_{l,m} \\ \varphi_{p_2} \varphi_n v_{l,m} \\ \varphi_{p_3} v_{l,m} \\ \varphi_{p_3} \varphi_n v_{l,m} \end{bmatrix}$;

$p_1 = \left\lfloor \dfrac{p}{16} \right\rfloor$; $p_2 = \left\lfloor \dfrac{p}{4} \right\rfloor$; $p_3 = p$.

| Codebook-Config = 2, $N_g = 2$ | | | | |
|---|---|---|---|---|
| $i_{1,1}$ | $i_{1,2}$ | $i_{1,4}$ | $i_2$ | |
| $0, 1, \ldots, N_1 O_1 - 1$ | $0, 1, \ldots, N_2 O_2 - 1$ | $0, \ldots, 15$ | $0, \ldots, 15$ | $W^{(1)}_{i_{1,1}, i_{1,2}, i_{1,4}, i_2}$ | where $W^{(1)}_{l,m,p,n} = \dfrac{1}{\sqrt{P_{CSI-RS}}} \begin{bmatrix} v_{l,m} \\ \varphi_{n_1} v_{l,m} \\ a_{p_2} b_{n_2} v_{l,m} \\ a_{p_3} b_{n_3} v_{l,m} \end{bmatrix}$; $p_2 = \left\lfloor \dfrac{p}{4} \right\rfloor$; $p_3 = p$;

TABLE 8-continued

Codebook for 1-layer CSI reporting using antenna ports [15 to 14 + $P_{CSI-RS}$]

$n_1 = \lfloor \frac{n}{4} \rfloor; n_2 = \lfloor \frac{n}{2} \rfloor \bmod 2; n_3 = n \bmod 2;$

TABLE 9

Codebook for 2-layer CSI reporting using antenna ports [15 to 14 + $P_{CSI-RS}$]

Codebook-Config = 1, $N_g \in \{2, 4\}$

| $i_{1,1}$ | $i_{1,2}$ | $i_{1,4}$ | $i_2$ | |
|---|---|---|---|---|
| $0, 1, \ldots, N_1O_1 - 1$ | $0, 1, \ldots, N_2O_2 - 1$ | $0, \ldots, 4^{N_g-1} - 1$ | $0, 1$ | $W^{(2)}_{i_{1,1},i_{1,1}+k_1,i_{1,2},i_{1,2}+k_2,i_{1,4},i_2}$ | for $N_g = 2$, $W^{(2)}_{l,l',m,m',p,n} = \frac{1}{\sqrt{2P_{CSI-RS}}} \begin{bmatrix} v_{l,m} & v_{l',m'} \\ \varphi_n v_{l,m} & -\varphi_n v_{l',m'} \\ \varphi_p v_{l,m} & \varphi_p v_{l',m'} \\ \varphi_p \varphi_n v_{l,m} & -\varphi_p \varphi_n v_{l',m'} \end{bmatrix}$; and for $N_g = 4$, $W^{(2)}_{l,l',m,m',p,n} = \frac{1}{\sqrt{2P_{CSI-RS}}} \begin{bmatrix} v_{l,m} & v_{l',m'} \\ \varphi_n v_{l,m} & -\varphi_n v_{l',m'} \\ \varphi_{p_1} v_{l,m} & \varphi_{p_1} v_{l',m'} \\ \varphi_{p_1} \varphi_n v_{l,m} & -\varphi_{p_1} \varphi_n v_{l',m'} \\ \varphi_{p_2} v_{l,m} & \varphi_{p_2} v_{l',m'} \\ \varphi_{p_2} \varphi_n v_{l,m} & -\varphi_{p_2} \varphi_n v_{l',m'} \\ \varphi_{p_3} v_{l,m} & \varphi_{p_3} v_{l',m'} \\ \varphi_{p_3} \varphi_n v_{l,m} & -\varphi_{p_3} \varphi_n v_{l',m'} \end{bmatrix}$;

$p_1 = \lfloor \frac{p}{16} \rfloor; p_2 = \lfloor \frac{p}{4} \rfloor; p_3 = p.$ Codebook-Config = 2, $N_g = 2$

| $i_{1,1}$ | $i_{1,2}$ | $i_{1,4}$ | $i_2$ | |
|---|---|---|---|---|
| $0, 1, \ldots, N_1O_1 - 1$ | $0, 1, \ldots, N_2O_2 - 1$ | $0, \ldots, 15$ | $0, \ldots, 7$ | $W^{(2)}_{i_{1,1},i_{1,1}+k_1,i_{1,2},i_{1,2}+k_2,i_{1,4},i_2}$ | where $W^{(2)}_{l,l',m,m',p,n} = \frac{1}{\sqrt{2P_{CSI-RS}}} \begin{bmatrix} v_{l,m} & v_{l',m'} \\ \varphi_{n_1} v_{l,m} & -\varphi_{n_1} v_{l',m'} \\ a_{p_2} b_{n_2} v_{l,m} & a_{p_2} b_{n_2} v_{l',m'} \\ a_{p_3} b_{n_3} v_{l,m} & -a_{p_3} b_{n_3} v_{l',m'} \end{bmatrix}$;

$p_2 = \lfloor \frac{p}{4} \rfloor; p_3 = p;$ $n_1 = \lfloor \frac{n}{4} \rfloor; n_2 = \lfloor \frac{n}{2} \rfloor \bmod 2; n_3 = n \bmod 2;$

TABLE 10

Codebook for 3-layer CSI reporting using antenna ports [15 to 14 + $P_{CSI-RS}$]

Codebook-Config = 1, $N_g \in \{2, 4\}$

| $i_{1,1}$ | $i_{1,2}$ | $i_{1,4}$ | $i_2$ | |
|---|---|---|---|---|
| $0, 1, \ldots, N_1O_1 - 1$ | $0, 1, \ldots, N_2O_2 - 1$ | $0, \ldots, 4^{N_g-1} - 1$ | $0, 1$ | $W^{(3)}_{i_{1,1},i_{1,1}+k_1,i_{1,2},i_{1,2}+k_2,i_{1,4},i_2}$ |

TABLE 10-continued

Codebook for 3-layer CSI reporting using antenna ports [15 to 14 + $P_{CSI-RS}$]

for $N_g = 2$, $W^{(3)}_{l,l',m,m',p,n} = \frac{1}{\sqrt{3P_{CSI-RS}}} \begin{bmatrix} v_{l,m} & v_{l',m'} & v_{l,m} \\ \varphi_n v_{l,m} & \varphi_n v_{l',m'} & -\varphi_n v_{l,m} \\ \varphi_p v_{l,m} & \varphi_p v_{l',m'} & \varphi_p v_{l,m} \\ \varphi_p \varphi_n v_{l,m} & \varphi_p \varphi_n v_{l',m'} & -\varphi_p \varphi_n v_{l,m} \end{bmatrix}$; and for $N_g = 4$, $W^{(3)}_{l,l',m,m',p,n} = \frac{1}{\sqrt{3P_{CSI-RS}}} \begin{bmatrix} v_{l,m} & v_{l',m'} & v_{l,m} \\ \varphi_n v_{l,m} & \varphi_n v_{l',m'} & -\varphi_n v_{l,m} \\ \varphi_{p_1} v_{l,m} & \varphi_{p_1} v_{l',m'} & \varphi_{p_1} v_{l,m} \\ \varphi_{p_1} \varphi_n v_{l,m} & \varphi_{p_1} \varphi_n v_{l',m'} & -\varphi_{p_1} \varphi_n v_{l,m} \\ \varphi_{p_2} v_{l,m} & \varphi_{p_2} v_{l',m'} & \varphi_{p_2} v_{l,m} \\ \varphi_{p_2} \varphi_n v_{l,m} & \varphi_{p_2} \varphi_n v_{l',m'} & -\varphi_{p_2} \varphi_n v_{l,m} \\ \varphi_{p_3} v_{l,m} & \varphi_{p_3} v_{l',m'} & \varphi_{p_3} v_{l,m} \\ \varphi_{p_3} \varphi_n v_{l,m} & \varphi_{p_3} \varphi_n v_{l',m'} & -\varphi_{p_3} \varphi_n v_{l,m} \end{bmatrix}$;

$p_1 = \lfloor \frac{p}{16} \rfloor$; $p_2 = \lfloor \frac{p}{4} \rfloor$; $p_3 = p$.

Codebook-Config = 2, $N_g$ = 2

| $i_{1,1}$ | $i_{1,2}$ | $i_{1,4}$ | $i_2$ | |
|---|---|---|---|---|
| $0, 1, \ldots, N_1 O_1 - 1$ | $0, 1, \ldots, N_2 O_2 - 1$ | $0, \ldots, 15$ | $0, \ldots, 7$ | $W^{(3)}_{i_{1,1},i_{1,1}+k_1,i_{1,2},i_{1,2}+k_2,i_{1,4},i_2}$ | where $W^{(3)}_{l,l',m,m',p,n} = \frac{1}{\sqrt{3P_{CSI-RS}}} \begin{bmatrix} v_{l,m} & v_{l',m'} & v_{l,m} \\ \varphi_{n_1} v_{l,m} & \varphi_{n_1} v_{l',m'} & -\varphi_{n_1} v_{l,m} \\ a_{p_2} b_{n_2} v_{l,m} & a_{p_2} b_{n_2} v_{l',m'} & a_{p_2} b_{n_2} v_{l,m} \\ a_{p_3} b_{n_3} v_{l,m} & a_{p_3} b_{n_3} v_{l',m'} & -a_{p_3} b_{n_3} v_{l,m} \end{bmatrix}$;

$p_2 = \lfloor \frac{p}{4} \rfloor$; $p_3 = p$;

$n_1 = \lfloor \frac{n}{4} \rfloor$; $n_2 = \lfloor \frac{n}{2} \rfloor \bmod 2$; $n_3 = n \bmod 2$;

TABLE 11

Codebook for 4-layer CSI reporting using antenna ports [15 to 14 + $P_{CSI-RS}$]

Codebook-Config = 1, $N_g \in \{2, 4\}$

| $i_{1,1}$ | $i_{1,2}$ | $i_{1,4}$ | $i_2$ | |
|---|---|---|---|---|
| $0, 1, \ldots, N_1 O_1 - 1$ | $0, 1, \ldots, N_2 O_2 - 1$ | $0, \ldots, 4^{N_g-1} - 1$ | $0, 1$ | $W^{(4)}_{i_{1,1},i_{1,1}+k_1,i_{1,2},i_{1,2}+k_2,i_{1,4},i_2}$ | for $N_g = 2$, $W^{(4)}_{l,l',m,m',p,n} = \frac{1}{\sqrt{4P_{CSI-RS}}} \begin{bmatrix} v_{l,m} & v_{l',m'} & v_{l,m} & v_{l',m'} \\ \varphi_n v_{l,m} & \varphi_n v_{l',m'} & -\varphi_n v_{l,m} & -\varphi_n v_{l',m'} \\ \varphi_p v_{l,m} & \varphi_p v_{l',m'} & \varphi_p v_{l,m} & \varphi_p v_{l',m'} \\ \varphi_p \varphi_n v_{l,m} & \varphi_p \varphi_n v_{l',m'} & -\varphi_p \varphi_n v_{l,m} & -\varphi_p \varphi_n v_{l',m'} \end{bmatrix}$; and for $N_g = 4$, $W^{(4)}_{l,l',m,m',p,n} = \frac{1}{\sqrt{4P_{CSI-RS}}} \begin{bmatrix} v_{l,m} & v_{l',m'} & v_{l,m} & v_{l',m'} \\ \varphi_n v_{l,m} & \varphi_n v_{l',m'} & -\varphi_n v_{l,m} & -\varphi_n v_{l',m'} \\ \varphi_{p_1} v_{l,m} & \varphi_{p_1} v_{l',m'} & \varphi_{p_1} v_{l,m} & \varphi_{p_1} v_{l',m'} \\ \varphi_{p_1} \varphi_n v_{l,m} & \varphi_{p_1} \varphi_n v_{l',m'} & -\varphi_{p_1} \varphi_n v_{l,m} & -\varphi_{p_1} \varphi_n v_{l',m'} \\ \varphi_{p_2} v_{l,m} & \varphi_{p_2} v_{l',m'} & \varphi_{p_2} v_{l,m} & \varphi_{p_2} v_{l',m'} \\ \varphi_{p_2} \varphi_n v_{l,m} & \varphi_{p_2} \varphi_n v_{l',m'} & -\varphi_{p_2} \varphi_n v_{l,m} & -\varphi_{p_2} \varphi_n v_{l',m'} \\ \varphi_{p_3} v_{l,m} & \varphi_{p_3} v_{l',m'} & \varphi_{p_3} v_{l,m} & \varphi_{p_3} v_{l',m'} \\ \varphi_{p_3} \varphi_n v_{l,m} & \varphi_{p_3} \varphi_n v_{l',m'} & -\varphi_{p_3} \varphi_n v_{l,m} & -\varphi_{p_3} \varphi_n v_{l',m'} \end{bmatrix}$;

TABLE 11-continued

Codebook for 4-layer CSI reporting using antenna ports [15 to 14 + $P_{CSI-RS}$]

$p_1 = \left\lfloor \dfrac{p}{16} \right\rfloor; p_2 = \left\lfloor \dfrac{p}{4} \right\rfloor; p_3 = p.$ Codebook-Config = 2, $N_g$ = 2

| $i_{1,1}$ | $i_{1,2}$ | $i_{1,4}$ | $i_2$ | |
|---|---|---|---|---|
| $0, 1, \ldots, N_1O_1 - 1$ | $0, 1, \ldots, N_2O_2 - 1$ | $0, \ldots, 4^{N_g-1} - 1$ | 0, 1 | $W_{i_{1,1},i_{1,1}+k_1,i_{1,2},i_{1,2}+k_2,i_{1,4},i_2}^{(4)}$ | where $W_{l,l',m,m',p,n}^{(4)} = \dfrac{1}{\sqrt{4P_{CSI-RS}}} \begin{bmatrix} v_{l,m} & v_{l',m'} & v_{l,m} & v_{l',m'} \\ \varphi_{n_1}v_{l,m} & \varphi_{n_1}v_{l',m'} & -\varphi_{n_1}v_{l,m} & -\varphi_{n_1}v_{l',m'} \\ a_{p_2}b_{n_2}v_{l,m} & a_{p_2}b_{n_2}v_{l',m'} & a_{p_2}b_{n_2}v_{l,m} & a_{p_2}b_{n_2}v_{l',m'} \\ a_{p_3}b_{n_3}v_{l,m} & a_{p_3}b_{n_3}v_{l',m'} & -a_{p_3}b_{n_3}v_{l,m} & -a_{p_3}b_{n_3}v_{l',m'} \end{bmatrix}$ ; $p_2 = \left\lfloor \dfrac{p}{4} \right\rfloor; p_3 = p;$ $n_1 = \left\lfloor \dfrac{n}{4} \right\rfloor; n_2 = \left\lfloor \dfrac{n}{2} \right\rfloor \bmod 2; n_3 = n \bmod 2;$ In one embodiment 12A, for Codebook-Config=1, two separate codebook tables are used for $N_g$=2 and $N_g$=4, as shown in TABLES 12-15 for 1-layer, 2-layer, 3-layer, and 4-layer, respectively.

TABLE 12

Codebook for 1-layer CSI reporting using antenna ports [15 to 14 + $P_{CSI-RS}$]

Codebook-Config = 1, $N_g$ = 2

| $i_{1,1}$ | $i_{1,2}$ | $i_{1,4}$ | $i_2$ | |
|---|---|---|---|---|
| $0, 1, \ldots, N_1O_1 - 1$ | $0, 1, \ldots, N_2O_2 - 1$ | 0, 1, 2, 3 | 0, 1, 2, 3 | $W_{i_{1,1},i_{1,2},i_{1,4},i_2}^{(1)}$ | where $W_{l,m,p,n}^{(1)} = \dfrac{1}{\sqrt{P_{CSI-RS}}} \begin{bmatrix} v_{l,m} \\ \varphi_n v_{l,m} \\ \varphi_p v_{l,m} \\ \varphi_p \varphi_n x_{l,m} \end{bmatrix}$ Codebook-Config = 1, $N_g$ = 4

| $i_{1,1}$ | $i_{1,2}$ | $i_{1,4}$ | $i_2$ | |
|---|---|---|---|---|
| $0, 1, \ldots, N_1O_1 - 1$ | $0, 1, \ldots, N_2O_2 - 1$ | $0, \ldots, 63$ | 0, 1, 2, 3 | $W_{i_{1,1},i_{1,2},i_{1,4},i_2}^{(1)}$ | where $W_{l,m,p,n}^{(1)} = \dfrac{1}{\sqrt{P_{CSI-RS}}} \begin{bmatrix} v_{l,m} \\ \varphi_n v_{l,m} \\ \varphi_{p_1} v_{l,m} \\ \varphi_{p_1} \varphi_n x_{l,m} \\ \varphi_{p_2} v_{l,m} \\ \varphi_{p_2} \varphi_n v_{l,m} \\ \varphi_{p_3} v_{l,m} \\ \varphi_{p_3} \varphi_n x_{l,m} \end{bmatrix}$ ; $p_1 = \left\lfloor \dfrac{p}{16} \right\rfloor; p_2 = \left\lfloor \dfrac{p}{4} \right\rfloor; p_3 = p$

TABLE 13

Codebook for 2-layer CSI reporting using antenna ports [15 to 14 + $P_{CSI-RS}$]

Codebook-Config = 1, $N_g$ = 2

| $i_{1,1}$ | $i_{1,2}$ | $i_{1,4}$ | $i_2$ | |
|---|---|---|---|---|
| $0, 1, \ldots, N_1O_1 - 1$ | $0, 1, \ldots, N_2O_2 - 1$ | 0, 1, 2, 3 | 0, 1 | $W_{i_{1,1},i_{1,1}+k_1,i_{1,2},i_{1,2}+k_2,i_{1,4},i_2}^{(2)}$ |

TABLE 13-continued

Codebook for 2-layer CSI reporting using antenna ports [15 to 14 + $P_{CSI-RS}$]

$$\text{where } W^{(2)}_{l,l',m,m',p,n} = \frac{1}{\sqrt{2P_{CSI-RS}}} \begin{bmatrix} v_{l,m} & v_{l',m'} \\ \varphi_n v_{l,m} & -\varphi_n v_{l',m'} \\ \varphi_p v_{l,m} & \varphi_p v_{l',m'} \\ \varphi_p \varphi_n v_{l,m} & -\varphi_p \varphi_n v_{l',m'} \end{bmatrix}$$

Codebook-Config = 1, $N_g = 4$

| $i_{1,1}$ | $i_{1,2}$ | $i_{1,4}$ | $i_2$ | |
|---|---|---|---|---|
| $0, 1, \ldots, N_1 O_1 - 1$ | $0, 1, \ldots, N_2 O_2 - 1$ | $0, \ldots, 63$ | $0, 1$ | $W^{(2)}_{i_{1,1}, i_{1,1}+k_1, i_{1,2}, i_{1,2}+k_2, i_{1,4}, i_2}$ |

$$\text{where } W^{(2)}_{l,l',m,m',p,n} = \frac{1}{\sqrt{2P_{CSI-RS}}} \begin{bmatrix} v_{l,m} & v_{l',m'} \\ \varphi_n v_{l,m} & -\varphi_n v_{l',m'} \\ \varphi_{p_1} v_{l,m} & \varphi_{p_1} v_{l',m'} \\ \varphi_{p_1} \varphi_n v_{l,m} & -\varphi_{p_1} \varphi_n v_{l',m'} \\ \varphi_{p_2} v_{l,m} & \varphi_{p_2} v_{l',m'} \\ \varphi_{p_2} \varphi_n v_{l,m} & -\varphi_{p_2} \varphi_n v_{l',m'} \\ \varphi_{p_3} v_{l,m} & \varphi_{p_3} v_{l',m'} \\ \varphi_{p_3} \varphi_n v_{l,m} & -\varphi_{p_3} \varphi_n v_{l',m'} \end{bmatrix}; p_1 = \left\lfloor \frac{p}{16} \right\rfloor; p_2 = \left\lfloor \frac{p}{4} \right\rfloor; p_3 = p$$

TABLE 14

Codebook for 3-layer CSI reporting using antenna ports [15 to 14 + $P_{CSI-RS}$]

Codebook-Config = 1, $N_g = 2$

| $i_{1,1}$ | $i_{1,2}$ | $i_{1,4}$ | $i_2$ | |
|---|---|---|---|---|
| $0, 1, \ldots, N_1 O_1 - 1$ | $0, 1, \ldots, N_2 O_2 - 1$ | $0, 1, 2, 3$ | $0, 1$ | $W^{(3)}_{i_{1,1}, i_{1,1}+k_1, i_{1,2}, i_{1,2}+k_2, i_{1,4}, i_2}$ |

$$\text{where } W^{(3)}_{l,l',m,m',p,n} = \frac{1}{\sqrt{3P_{CSI-RS}}} \begin{bmatrix} v_{l,m} & v_{l',m'} & v_{l,m} \\ \varphi_n v_{l,m} & \varphi_n v_{l',m'} & -\varphi_n v_{l,m} \\ \varphi_p v_{l,m} & \varphi_p v_{l',m'} & \varphi_n v_{l,m} \\ \varphi_p \varphi_n v_{l,m} & \varphi_p \varphi_n v_{l',m'} & -\varphi_p \varphi_n v_{l,m} \end{bmatrix}$$

Codebook-Config = 1, $N_g = 4$

| $i_{1,1}$ | $i_{1,2}$ | $i_{1,4}$ | $i_2$ | |
|---|---|---|---|---|
| $0, 1, \ldots, N_1 O_1 - 1$ | $0, 1, \ldots, N_2 O_2 - 1$ | $0, \ldots, 63$ | $0, 1$ | $W^{(3)}_{i_{1,1}, i_{1,1}+k_1, i_{1,2}, i_{1,2}+k_2, i_{1,4}, i_2}$ |

$$\text{where } W^{(3)}_{l,l',m,m',p,n} = \frac{1}{\sqrt{3P_{CSI-RS}}} \begin{bmatrix} v_{l,m} & v_{l',m'} & v_{l,m} \\ \varphi_n v_{l,m} & \varphi_n v_{l',m'} & -\varphi_n v_{l,m} \\ \varphi_{p_1} v_{l,m} & \varphi_{p_1} v_{l',m'} & \varphi_{p_1} v_{l,m} \\ \varphi_{p_1} \varphi_n v_{l,m} & \varphi_{p_1} \varphi_n v_{l',m'} & -\varphi_{p_1} \varphi_n v_{l,m} \\ \varphi_{p_2} v_{l,m} & \varphi_{p_2} v_{l',m'} & \varphi_{p_2} v_{l,m} \\ \varphi_{p_2} \varphi_n v_{l,m} & \varphi_{p_2} \varphi_n v_{l',m'} & -\varphi_{p_2} \varphi_n v_{l,m} \\ \varphi_{p_3} v_{l,m} & \varphi_{p_3} v_{l',m'} & \varphi_{p_3} v_{l,m} \\ \varphi_{p_3} \varphi_n v_{l,m} & \varphi_{p_3} \varphi_n v_{l',m'} & -\varphi_{p_3} \varphi_n v_{l,m} \end{bmatrix}; p_1 = \left\lfloor \frac{p}{16} \right\rfloor; p_2 = \left\lfloor \frac{p}{4} \right\rfloor; p_3 = p$$

TABLE 15

Codebook for 4-layer CSI reporting using antenna ports [15 to 14 + $P_{CSI-RS}$]

Codebook-Config = 1, $N_g = 2$

| $i_{1,1}$ | $i_{1,2}$ | $i_{1,4}$ | $i_2$ | |
|---|---|---|---|---|
| $0, 1, \ldots, N_1 O_1 - 1$ | $0, 1, \ldots, N_2 O_2 - 1$ | $0, 1, 2, 3$ | $0, 1$ | $W^{(4)}_{i_{1,1}, i_{1,1}+k_1, i_{1,2}, i_{1,2}+k_2, i_{1,4}, i_2}$ |

TABLE 15-continued

Codebook for 4-layer CSI reporting using antenna ports [15 to 14 + $P_{CSI-RS}$]

$$\text{where } W^{(4)}_{l,l',m,m',p,n} = \frac{1}{\sqrt{4P_{CSI-RS}}} \begin{bmatrix} v_{l,m} & v_{l',m'} & v_{l,m} & v_{l',m'} \\ \varphi_n v_{l,m} & \varphi_n v_{l',m'} & -\varphi_n v_{l,m} & -\varphi_n v_{l',m'} \\ \varphi_p v_{l,m} & \varphi_p v_{l',m'} & \varphi_p v_{l,m} & \varphi_p v_{l',m'} \\ \varphi_p \varphi_n v_{l,m} & \varphi_p \varphi_n v_{l',m'} & -\varphi_p \varphi_n v_{l,m} & -\varphi_p \varphi_n v_{l',m'} \end{bmatrix}$$

Codebook-Config = 1, $N_g$ = 4

| $i_{1,1}$ | $i_{1,2}$ | $i_{1,4}$ | $i_2$ | |
|---|---|---|---|---|
| $0, 1, \ldots, N_1 O_1 - 1$ | $0, 1, \ldots, N_2 O_2 - 1$ | $0, \ldots, 63$ | $0, 1$ | $W^{(4)}_{i_{1,1},i_{1,1}+k_1,i_{1,2},i_{1,2}+k_2,i_{1,4},i_2}$ |

$$\text{where } W^{(4)}_{l,l',m,m',p,n} = \frac{1}{\sqrt{4P_{CSI-RS}}} \begin{bmatrix} v_{l,m} & v_{l',m'} & v_{l,m} & v_{l',m'} \\ \varphi_n v_{l,m} & \varphi_n v_{l',m'} & -\varphi_n v_{l,m} & -\varphi_n v_{l',m'} \\ \varphi_{p_1} v_{l,m} & \varphi_{p_1} v_{l',m'} & \varphi_{p_1} v_{l,m} & \varphi_{p_1} v_{l',m'} \\ \varphi_{p_1} \varphi_n v_{l,m} & \varphi_{p_1} \varphi_n v_{l',m'} & -\varphi_{p_1} \varphi_n v_{l,m} & -\varphi_{p_1} \varphi_n v_{l',m'} \\ \varphi_{p_2} v_{l,m} & \varphi_{p_2} v_{l',m'} & \varphi_{p_2} v_{l,m} & \varphi_{p_2} v_{l',m'} \\ \varphi_{p_2} \varphi_n v_{l,m} & \varphi_{p_2} \varphi_n v_{l',m'} & -\varphi_{p_2} \varphi_n v_{l,m} & -\varphi_{p_2} \varphi_n v_{l',m'} \\ \varphi_{p_3} v_{l,m} & \varphi_{p_3} v_{l',m'} & \varphi_{p_3} v_{l,m} & \varphi_{p_3} v_{l',m'} \\ \varphi_{p_3} \varphi_n v_{l,m} & \varphi_{p_3} \varphi_n v_{l',m'} & -\varphi_{p_3} \varphi_n v_{l,m} & -\varphi_{p_3} \varphi_n v_{l',m'} \end{bmatrix} ; p_1 = \left\lfloor \frac{p}{16} \right\rfloor ; p_2 = \left\lfloor \frac{p}{4} \right\rfloor ; p_3 = p$$

In one embodiment 12B, for Codebook-Config=1, and $N_g$=4, instead of joint reporting of $p_1$, $p_2$, and $p_3$ using $i_{1,4}$, CSI is reported separately using indices ($i_{1,4,1}$, $i_{1,4,2}$, $i_{1,4,3}$) or ($i_{1,4}$, $i_{1,5}$, $i_{1,6}$) for ($p_1$, $p_2$, $p_3$). The codebook tables for 1-4 layers are shown in TABLES 16-19.

TABLE 16

Codebook for 1-layer CSI reporting using antenna ports [15 to 14 + $P_{CSI-RS}$]
Codebook-Config = 1, $N_g$ = 4

| $i_{1,1}$ | $i_{1,2}$ | $i_{1,4,1}$ | $i_{1,4,2}$ | $i_{1,4,3}$ | $i_2$ | |
|---|---|---|---|---|---|---|
| $0, 1, \ldots, N_1 O_1 - 1$ | $0, 1, \ldots, N_2 O_2 - 1$ | $0, 1, 2, 3$ | $0, 1, 2, 3$ | $0, 1, 2, 3$ | $0, 1, 2, 3$ | $W^{(1)}_{i_{1,1},i_{1,2},i_{1,4,1},i_{1,4,2},i_{1,4,3},i_2}$ |

$$\text{where } W^{(1)}_{l,m,p_1,p_2,p_3,n} = \frac{1}{\sqrt{P_{CSI-RS}}} \begin{bmatrix} v_{l,m} \\ \varphi_n v_{l,m} \\ \varphi_{p_1} v_{l,m} \\ \varphi_{p_1} \varphi_n v_{l,m} \\ \varphi_{p_2} v_{l,m} \\ \varphi_{p_2} \varphi_n v_{l,m} \\ \varphi_{p_3} v_{l,m} \\ \varphi_{p_3} \varphi_n v_{l,m} \end{bmatrix}$$

TABLE 17

Codebook for 2-layer CSI reporting using antenna ports [15 to 14 + $P_{CSI-RS}$]
Codebook-Config = 1, $N_g$ = 4

| $i_{1,1}$ | $i_{1,2}$ | $i_{1,4,1}$ | $i_{1,4,2}$ | $i_{1,4,3}$ | $i_2$ | |
|---|---|---|---|---|---|---|
| $0, 1, \ldots, N_1 O_1 - 1$ | $0, 1, \ldots, N_2 O_2 - 1$ | $0, 1, 2, 3$ | $0, 1, 2, 3$ | $0, 1, 2, 3$ | $0, 1$ | $W^{(2)}_{i_{1,1},i_{1,1}+k_1,i_{1,2},i_{1,2}+k_2,i_{1,4,1},i_{1,4,2},i_{1,4,3},i_2}$ |

TABLE 17-continued

Codebook for 2-layer CSI reporting using antenna ports [15 to 14 + $P_{CSI-RS}$]
Codebook-Config = 1, $N_g$ = 4

| $i_{1,1}$ | $i_{1,2}$ | $i_{1,4,1}$ | $i_{1,4,2}$ | $i_{1,4,3}$ | $i_2$ |
|---|---|---|---|---|---|

$$\text{where } W^{(2)}_{l,l',m,m',p_1,p_2,p_3,n} = \frac{1}{\sqrt{2P_{CSI-RS}}} \begin{bmatrix} v_{l,m} & v_{l',m'} \\ \varphi_n v_{l,m} & -\varphi_n v_{l',m'} \\ \varphi_{p_1} v_{l,m} & \varphi_{p_1} v_{l',m'} \\ \varphi_{p_1}\varphi_n v_{l,m} & -\varphi_{p_1}\varphi_n v_{l',m'} \\ \varphi_{p_2} v_{l,m} & \varphi_{p_2} v_{l',m'} \\ \varphi_{p_2}\varphi_n v_{l,m} & -\varphi_{p_2}\varphi_n v_{l',m'} \\ \varphi_{p_3} v_{l,m} & \varphi_{p_3} v_{l',m'} \\ \varphi_{p_3}\varphi_n v_{l,m} & -\varphi_{p_3}\varphi_n v_{l',m'} \end{bmatrix}$$

TABLE 18

Codebook for 3-layer CSI reporting using antenna ports [15 to 14 + $P_{CSI-RS}$]
Codebook-Config = 1, $N_g$ = 4

| $i_{1,1}$ | $i_{1,2}$ | $i_{1,4,1}$ | $i_{1,4,2}$ | $i_{1,4,3}$ | $i_2$ | |
|---|---|---|---|---|---|---|
| $0, 1, \ldots, N_1O_1 - 1$ | $0, 1, \ldots, N_2O_2 - 1$ | $0, 1, 2, 3$ | $0, 1, 2, 3$ | $0, 1, 2, 3$ | $0, 1$ | $W^{(3)}_{i_{1,1},i_{1,1}+k_1,i_{1,2},i_{1,2}+k_2,i_{1,4,1},i_{1,4,2},i_{1,4,3},i_2}$ |

$$\text{where } W^{(3)}_{l,l',m,m',p_1,p_2,p_3,n} = \frac{1}{\sqrt{3P_{CSI-RS}}} \begin{bmatrix} v_{l,m} & v_{l',m'} & v_{l,m} \\ \varphi_n v_{l,m} & \varphi_n v_{l',m'} & -\varphi_n v_{l,m} \\ \varphi_{p_1} v_{l,m} & \varphi_{p_1} v_{l',m'} & \varphi_{p_1} v_{l,m} \\ \varphi_{p_1}\varphi_n v_{l,m} & \varphi_{p_1}\varphi_n v_{l',m'} & -\varphi_{p_1}\varphi_n v_{l,m} \\ \varphi_{p_2} v_{l,m} & \varphi_{p_2} v_{l',m'} & \varphi_{p_2} v_{l,m} \\ \varphi_{p_2}\varphi_n v_{l,m} & \varphi_{p_2}\varphi_n v_{l',m'} & -\varphi_{p_2}\varphi_n v_{l,m} \\ \varphi_{p_3} v_{l,m} & \varphi_{p_3} v_{l',m'} & \varphi_{p_3} v_{l,m} \\ \varphi_{p_3}\varphi_n v_{l,m} & \varphi_{p_3}\varphi_n v_{l',m'} & -\varphi_{p_3}\varphi_n v_{l,m} \end{bmatrix}$$

TABLE 19

Codebook for 4-layer CSI reporting using antenna ports [15 to 14 + $P_{CSI-RS}$]
Codebook-Config = 1, $N_g$ = 4

| $i_{1,1}$ | $i_{1,2}$ | $i_{1,4,1}$ | $i_{1,4,2}$ | $i_{1,4,3}$ | $i_2$ | |
|---|---|---|---|---|---|---|
| $0, 1, \ldots, N_1O_1 - 1$ | $0, 1, \ldots, N_2O_2 - 1$ | $0, 1, 2, 3$ | $0, 1, 2, 3$ | $0, 1, 2, 3$ | $0, 1$ | $W^{(4)}_{i_{1,1},i_{1,1}+k_1,i_{1,2},i_{1,2}+k_2,i_{1,4,1},i_{1,4,2},i_{1,4,3},i_2}$ |

$$\text{where } W^{(4)}_{l,l',m,m',p_1,p_2,p_3,n} = \frac{1}{\sqrt{4P_{CSI-RS}}} \begin{bmatrix} v_{l,m} & v_{l',m'} & v_{l,m} & v_{l',m'} \\ \varphi_n v_{l,m} & \varphi_n v_{l',m'} & -\varphi_n v_{l,m} & -\varphi_n v_{l',m'} \\ \varphi_{p_1} v_{l,m} & \varphi_{p_1} v_{l',m'} & \varphi_{p_1} v_{l,m} & \varphi_{p_1} v_{l',m'} \\ \varphi_{p_1}\varphi_n v_{l,m} & \varphi_{p_1}\varphi_n v_{l',m'} & -\varphi_{p_1}\varphi_n v_{l,m} & -\varphi_{p_1}\varphi_n v_{l',m'} \\ \varphi_{p_2} v_{l,m} & \varphi_{p_2} v_{l',m'} & \varphi_{p_2} v_{l,m} & \varphi_{p_2} v_{l',m'} \\ \varphi_{p_2}\varphi_n v_{l,m} & \varphi_{p_2}\varphi_n v_{l',m'} & -\varphi_{p_2}\varphi_n v_{l,m} & -\varphi_{p_2}\varphi_n v_{l',m'} \\ \varphi_{p_3} v_{l,m} & \varphi_{p_3} v_{l',m'} & \varphi_{p_3} v_{l,m} & \varphi_{p_3} v_{l',m'} \\ \varphi_{p_3}\varphi_n v_{l,m} & \varphi_{p_3}\varphi_n v_{l',m'} & -\varphi_{p_3}\varphi_n v_{l,m} & -\varphi_{p_3}\varphi_n v_{l',m'} \end{bmatrix}$$

Similarly, for Codebook-Config=2, and $N_g$=2, instead of joint reporting of $p_2$ and $p_3$ using $i_{1,4}$, CSI is reported separately using indices ($i_{1,4,1}$, $i_{1,4,2}$) or ($i_{1,4}$, $i_{1,5}$) for ($p_2$, $p_3$), and instead of joint reporting of $n_1$, $n_2$, and $n_3$ using $i_2$, CSI is reported separately using indices ($i_{2,1}$, $i_{2,2}$, $i_{2,3}$) or ($i_2$, $i_3$, $i_4$) for ($n_1$, $n_2$, $n_3$). The codebook tables for 1-4 layers are shown in TABLES 20-23.

TABLE 20

Codebook for 1-layer CSI reporting using antenna ports [15 to 14 + $P_{CSI-RS}$]
Codebook-Config = 2, $N_g$ = 2

| $i_{1,1}$ | $i_{1,2}$ | $i_{1,4,1}$ | $i_{1,4,2}$ | $i_{2,1}$ | $i_{2,2}$ | $i_{2,3}$ |
|---|---|---|---|---|---|---|
| $0,1,\ldots,N_1O_1-1$ | $0,1,\ldots,N_2O_2-1$ | 0,1,2,3 | 0,1,2,3 | 0,1 | 0,1 | $W^{(1)}_{i_{1,1},i_{1,2},i_{1,4,1},i_{1,4,2},i_{2,1},i_{2,2},i_{2,3}}$ | where $W^{(1)}_{l,m,p_2,p_3,n_1,n_2,n_3} = \dfrac{1}{\sqrt{P_{CSI-RS}}} \begin{bmatrix} v_{l,m} \\ \varphi_{n_1} v_{l,m} \\ a_{p_2} b_{n_2} v_{l,m} \\ a_{p_3} b_{n_3} v_{l,m} \end{bmatrix}$

TABLE 21

Codebook for 2-layer CSI reporting using antenna ports [15 to 14 + $P_{CSI-RS}$]
Codebook-Config = 2, $N_g$ = 2

| $i_{1,1}$ | $i_{1,2}$ | $i_{1,4,1}$ | $i_{1,4,2}$ | $i_{2,1}$ | $i_{2,2}$ | $i_{2,3}$ |
|---|---|---|---|---|---|---|
| $0,1,\ldots,N_1O_1-1$ | $0,1,\ldots,N_2O_2-1$ | 0,1,2,3 | 0,1,2,3 | 0,1 | 0,1 | $W^{(2)}_{i_{1,1},i_{1,1}+k_1,i_{1,2},i_{1,2}+k_2,i_{1,4,1},i_{1,4,2},i_{2,1},i_{2,2},i_{2,3}}$ | where $W^{(2)}_{l,l',m,m',p_2,p_3,n_1,n_2,n_3} = \dfrac{1}{\sqrt{2P_{CSI-RS}}} \begin{bmatrix} v_{l,m} & v_{l',m'} \\ \varphi_{n_1} v_{l,m} & -\varphi_{n_1} v_{l',m'} \\ a_{p_2} b_{n_2} v_{l,m} & a_{p_2} b_{n_2} v_{l',m'} \\ a_{p_3} b_{n_3} v_{l,m} & -a_{p_3} b_{n_3} v_{l',m'} \end{bmatrix}$

TABLE 22

Codebook for 3-layer CSI reporting using antenna ports [15 to 14 + $P_{CSI-RS}$]
Codebook-Config = 2, $N_g$ = 2

| $i_{1,1}$ | $i_{1,2}$ | $i_{1,4,1}$ | $i_{1,4,2}$ | $i_{2,1}$ | $i_{2,2}$ | $i_{2,3}$ |
|---|---|---|---|---|---|---|
| $0,1,\ldots,N_1O_1-1$ | $0,1,\ldots,N_2O_2-1$ | 0,1,2,3 | 0,1,2,3 | 0,1 | 0,1 | 0,1 | $W^{(3)}_{i_{1,1},i_{1,1}+k_1,i_{1,2},i_{1,2}+k_2,i_{1,4,1},i_{1,4,2},i_{2,1},i_{2,2},i_{2,3}}$ | where $W^{(3)}_{l,l',m,m',p_2,p_3,n_1,n_2,n_3} = \dfrac{1}{\sqrt{3P_{CSI-RS}}} \begin{bmatrix} v_{l,m} & v_{l',m'} & v_{l,m} \\ \varphi_{n_1} v_{l,m} & \varphi_{n_1} v_{l',m'} & -\varphi_{n_1} v_{l,m} \\ a_{p_2} b_{n_2} v_{l,m} & a_{p_2} b_{n_2} v_{l',m'} & a_{p_2} b_{n_2} v_{l,m} \\ a_{p_3} b_{n_3} v_{l,m} & a_{p_3} b_{n_3} v_{l',m'} & -a_{p_3} b_{n_3} v_{l,m} \end{bmatrix}$

TABLE 23

Codebook for 4-layer CSI reporting using antenna ports [15 to 14 + $P_{CSI-RS}$]
Codebook-Config = 2, $N_g$ = 2

| $i_{1,1}$ | $i_{1,2}$ | $i_{1,4,1}$ | $i_{1,4,2}$ | $i_{2,1}$ | $i_{2,2}$ | $i_{2,3}$ |
|---|---|---|---|---|---|---|
| $0,1,\ldots,N_1O_1-1$ | $0,1,\ldots,N_2O_2-1$ | 0,1,2,3 | 0,1,2,3 | 0,1 | 0,1 | 0,1 | $W^{(4)}_{i_{1,1},i_{1,1}+k_1,i_{1,2},i_{1,2}+k_2,i_{1,4,1},i_{1,4,2},i_{2,1},i_{2,2},i_{2,3}}$ | where $W^{(4)}_{l,l',m,m',p_2,p_3,n_1,n_2,n_3} = \dfrac{1}{\sqrt{4P_{CSI-RS}}} \begin{bmatrix} v_{l,m} & v_{l',m'} & v_{l,m} & v_{l',m'} \\ \varphi_{n_1} v_{l,m} & \varphi_{n_1} v_{l',m'} & -\varphi_{n_1} v_{l,m} & -\varphi_{n_1} v_{l',m'} \\ a_{p_2} b_{n_2} v_{l,m} & a_{p_2} b_{n_2} v_{l',m'} & a_{p_2} b_{n_2} v_{l,m} & a_{p_2} b_{n_2} v_{l',m'} \\ a_{p_3} b_{n_3} v_{l,m} & a_{p_3} b_{n_3} v_{l',m'} & -a_{p_3} b_{n_3} v_{l,m} & -a_{p_3} b_{n_3} v_{l',m'} \end{bmatrix}$ In another alternative, for Codebook-Config=2, and $N_g$=2, instead of joint reporting of $p_2$ and $p_3$ using $i_{1,4}$, CSI is reported separately using indices ($i_{1,4,1}$, $i_{1,4,2}$) or ($i_{1,4}$, $i_{1,5}$) for ($p_2$, $p_3$), and $n_1$, $n_2$, and $n_3$ are reported jointly using $i_2$. The codebook tables for 1-4 layers are shown in TABLES 24-27.

TABLE 24

Codebook for 1-layer CSI reporting using antenna ports [15 to 14 + $P_{CSI-RS}$]
Codebook-Config = 2, $N_g$ = 2

| $i_{1,1}$ | $i_{1,2}$ | $i_{1,4,1}$ | $i_{1,4,2}$ | $i_2$ | |
|---|---|---|---|---|---|
| $0,1,\ldots,N_1O_1 - 1$ | $0,1,\ldots,N_2O_2 - 1$ | $0,1,2,3$ | $0,1,2,3$ | $0,\ldots,15$ | $W_{i_{1,1},i_{1,2},i_{1,4,1},i_{1,4,2},i_2}^{(1)}$ | where $W_{l,m,p_2,p_3,n}^{(1)} = \frac{1}{\sqrt{P_{CSI-RS}}} \begin{bmatrix} v_{l,m} \\ \varphi_{n_1} v_{l,m} \\ a_{p_2} b_{n_2} v_{l,m} \\ a_{p_3} b_{n_3} v_{l,m} \end{bmatrix}$; $n_1 = \lfloor \frac{n}{4} \rfloor$; $n_2 = \lfloor \frac{n}{2} \rfloor$ mod 2; $n_3 = n$ mod 2;

TABLE 25

Codebook for 2-layer CSI reporting using antenna ports [15 to 14 + $P_{CSI-RS}$]
Codebook-Config = 2, $N_g$ = 2

| $i_{1,1}$ | $i_{1,2}$ | $i_{1,4,1}$ | $i_{1,4,2}$ | $i_2$ | |
|---|---|---|---|---|---|
| $0,1,\ldots,N_1O_1 - 1$ | $0,1,\ldots,N_2O_2 - 1$ | $0,1,2,3$ | $0,1,2,3$ | $0,\ldots,7$ | $W_{i_{1,1},i_{1,1}+k_1,i_{1,2},i_{1,2}+k_2,i_{1,4,1},i_{1,4,2},i_2}^{(2)}$ | where $W_{l,l',m,m',p_2,p_3,n}^{(2)} = \frac{1}{\sqrt{2P_{CSI-RS}}} \begin{bmatrix} v_{l,m} & v_{l',m'} \\ \varphi_{n_1} v_{l,m} & \varphi_{n_1} v_{l',m'} \\ a_{p_2} b_{n_2} v_{l,m} & a_{p_2} b_{n_2} v_{l',m'} \\ a_{p_3} b_{n_3} v_{l,m} & -a_{p_3} b_{n_3} v_{l',m'} \end{bmatrix}$; $n_1 = \lfloor \frac{n}{4} \rfloor$; $n_2 = \lfloor \frac{n}{2} \rfloor$ mod 2; $n_3 = n$ mod 2;

TABLE 26

Codebook for 3-layer CSI reporting using antenna ports [15 to 14 + $P_{CSI-RS}$]
Codebook-Config = 2, $N_g$ = 2

| $i_{1,1}$ | $i_{1,2}$ | $i_{1,4,1}$ | $i_{1,4,2}$ | $i_2$ | |
|---|---|---|---|---|---|
| $0,1,\ldots,N_1O_1 - 1$ | $0,1,\ldots,N_2O_2 - 1$ | $0,1,2,3$ | $0,1,2,3$ | $0,\ldots,7$ | $W_{i_{1,1},i_{1,1}+k_1,i_{1,2},i_{1,2}+k_2,i_{1,4,1},i_{1,4,2},i_2}^{(3)}$ | where $W_{l,l',m,m',p_2,p_3,n}^{(3)} = \frac{1}{\sqrt{3P_{CSI-RS}}} \begin{bmatrix} v_{l,m} & v_{l',m'} & v_{l,m} \\ \varphi_{n_1} v_{l,m} & \varphi_{n_1} v_{l',m'} & -\varphi_{n_1} v_{l,m} \\ a_{p_2} b_{n_2} v_{l,m} & a_{p_2} b_{n_2} v_{l',m'} & a_{p_2} b_{n_2} v_{l,m} \\ a_{p_3} b_{n_3} v_{l,m} & a_{p_3} b_{n_3} v_{l',m'} & -a_{p_3} b_{n_3} v_{l,m} \end{bmatrix}$; $n_1 = \lfloor \frac{n}{4} \rfloor$; $n_2 = \lfloor \frac{n}{2} \rfloor$ mod 2; $n_3 = n$ mod 2;

TABLE 27

Codebook for 4-layer CSI reporting using antenna ports [15 to 14 + $P_{CSI-RS}$]
Codebook-Config = 2, $N_g$ = 2

| $i_{1,1}$ | $i_{1,2}$ | $i_{1,4,1}$ | $i_{1,4,2}$ | $i_2$ | |
|---|---|---|---|---|---|
| $0,1,\ldots,N_1O_1 - 1$ | $0,1,\ldots,N_2O_2 - 1$ | $0,1,2,3$ | $0,1,2,3$ | $0,\ldots,7$ | $W_{i_{1,1},i_{1,1}+k_1,i_{1,2},i_{1,2}+k_2,i_{1,4,1},i_{1,4,2},i_2}^{(4)}$ | where $W_{l,l',m,m',p_2,p_3,n}^{(4)} = \frac{1}{\sqrt{4P_{CSI-RS}}} \begin{bmatrix} v_{l,m} & v_{l',m'} & v_{l,m} & v_{l',m'} \\ \varphi_{n_1} v_{l,m} & \varphi_{n_1} v_{l',m'} & -\varphi_{n_1} v_{l,m} & -\varphi_{n_1} v_{l',m'} \\ a_{p_2} b_{n_2} v_{l,m} & a_{p_2} b_{n_2} v_{l',m'} & a_{p_2} b_{n_2} v_{l,m} & a_{p_2} b_{n_2} v_{l',m'} \\ a_{p_3} b_{n_3} v_{l,m} & a_{p_3} b_{n_3} v_{l',m'} & -a_{p_3} b_{n_3} v_{l,m} & -a_{p_3} b_{n_3} v_{l',m'} \end{bmatrix}$; $n_1 = \lfloor \frac{n}{4} \rfloor$; $n_2 = \lfloor \frac{n}{2} \rfloor$ mod 2; $n_3 = n$ mod 2;

In another alternative, for Codebook-Config=2, and $N_g$=2, $p_2$ and $p_3$ are reported jointly using $i_{1,4}$, and instead of joint reporting of $n_1$, $n_2$, and $n_3$ using $i_2$, CSI is reported separately using indices ($i_{2,1}$, $i_{2,2}$, $i_{2,3}$) or ($i_2$, $i_3$, $i_4$) for ($n_1$, $n_2$, $n_3$). The codebook tables for 1-4 layers are shown in TABLE 28-31.

TABLE 28

Codebook for 1-layer CSI reporting using antenna ports [15 to 14 + $P_{CSI-RS}$]
Codebook-Config = 2, $N_g$ = 2

| $i_{1,1}$ | $i_{1,2}$ | $i_{1,4}$ | $i_{2,1}$ | $i_{2,2}$ | $i_{2,3}$ | |
|---|---|---|---|---|---|---|
| $0,1,\ldots,N_1O_1-1$ | $0,1,\ldots,N_2O_2-1$ | $0,\ldots,15$ | $0,1,2,3$ | $0,1$ | $0,1$ | $W^{(1)}_{i_{1,1},i_{1,2},i_{1,4},i_{2,1},i_{2,2},i_{2,3}}$ |

$$\text{where } W^{(1)}_{l,m,p,n_1,n_2,n_3} = \frac{1}{\sqrt{P_{CSI-RS}}} \begin{bmatrix} v_{l,m} \\ \varphi_{n_1} v_{l,m} \\ a_{p_2} b_{n_2} v_{l,m} \\ a_{p_3} b_{n_3} v_{l,m} \end{bmatrix}; p_2 = \left\lfloor \frac{p}{4} \right\rfloor; p_3 = p$$

TABLE 29

Codebook for 2-layer CSI reporting using antenna ports [15 to 14 + $P_{CSI-RS}$]
Codebook-Config = 2, $N_g$ = 2

| $i_{1,1}$ | $i_{1,2}$ | $i_{1,4}$ | $i_{2,1}$ | $i_{2,2}$ | $i_{2,3}$ | |
|---|---|---|---|---|---|---|
| $0,1,\ldots,N_1O_1-1$ | $0,1,\ldots,N_2O_2-1$ | $0,\ldots,15$ | $0,1$ | $0,1$ | $0,1$ | $W^{(2)}_{i_{1,1},i_{1,1}+k_1,i_{1,2},i_{1,2}+k_2,i_{1,4},i_{2,1},i_{2,2},i_{2,3}}$ |

$$\text{where } W^{(2)}_{l,l',m,m',p,n_1,n_2,n_3} = \frac{1}{\sqrt{2P_{CSI-RS}}} \begin{bmatrix} v_{l,m} & v_{l',m'} \\ \varphi_{n_1} v_{l,m} & -\varphi_{n_1} v_{l',m'} \\ a_{p_2} b_{n_2} v_{l,m} & a_{p_2} b_{n_2} v_{l',m'} \\ a_{p_3} b_{n_3} v_{l,m} & -a_{p_3} b_{n_3} v_{l',m'} \end{bmatrix}; p_2 = \left\lfloor \frac{p}{4} \right\rfloor; p_3 = p$$

TABLE 30

Codebook for 3-layer CSI reporting using antenna ports [15 to 14 + $P_{CSI-RS}$]
Codebook-Config = 2, $N_g$ = 2

| $i_{1,1}$ | $i_{1,2}$ | $i_{1,4}$ | $i_{2,1}$ | $i_{2,2}$ | $i_{2,3}$ | |
|---|---|---|---|---|---|---|
| $0,1,\ldots,N_1O_1-1$ | $0,1,\ldots,N_2O_2-1$ | $0,\ldots,15$ | $0,1$ | $0,1$ | $0,1$ | $W^{(3)}_{i_{1,1},i_{1,1}+k_1,i_{1,2},i_{1,2}+k_2,i_{1,4},i_{2,1},i_{2,2},i_{2,3}}$ |

$$\text{where } W^{(3)}_{l,l',m,m',p,n_1,n_2,n_3} = \frac{1}{\sqrt{3P_{CSI-RS}}} \begin{bmatrix} v_{l,m} & v_{l',m'} & v_{l,m} \\ \varphi_{n_1} v_{l,m} & \varphi_{n_1} v_{l',m'} & -\varphi_{n_1} v_{l,m} \\ a_{p_2} b_{n_2} v_{l,m} & a_{p_2} b_{n_2} v_{l',m'} & a_{p_2} b_{n_2} v_{l,m} \\ a_{p_3} b_{n_3} v_{l,m} & a_{p_3} b_{n_3} v_{l',m'} & -a_{p_3} b_{n_3} v_{l,m} \end{bmatrix}; p_2 = \left\lfloor \frac{p}{4} \right\rfloor; p_3 = p$$

TABLE 31

Codebook for 4-layer CSI reporting using antenna ports [15 to 14 + $P_{CSI-RS}$]
Codebook-Config = 2, $N_g$ = 2

| $i_{1,1}$ | $i_{1,2}$ | $i_{1,4}$ | $i_{2,1}$ | $i_{2,2}$ | $i_{2,3}$ | |
|---|---|---|---|---|---|---|
| $0,1,\ldots,N_1O_1-1$ | $0,\ldots,N_2O_2-1$ | $0,\ldots,15$ | $0,1$ | $0,1$ | $0,1$ | $W^{(4)}_{i_{1,1},i_{1,1}+k_1,i_{1,2},i_{1,2}+k_2,i_{1,4},i_{2,1},i_{2,2},i_{2,3}}$ |

$$\text{where } W^{(4)}_{l,l',m,m',p_2,p_3} = \frac{1}{\sqrt{4P_{CSI-RS}}} \begin{bmatrix} v_{l,m} & v_{l',m'} & v_{l,m} & v_{l',m'} \\ \varphi_{n_1} v_{l,m} & \varphi_{n_1} v_{l',m'} & -\varphi_{n_1} v_{l,m} & -\varphi_{n_1} v_{l',m'} \\ a_{p_2} b_{n_2} v_{l,m} & a_{p_2} b_{n_2} v_{l',m'} & a_{p_2} b_{n_2} v_{l,m} & a_{p_2} b_{n_2} v_{l',m'} \\ a_{p_3} b_{n_3} v_{l,m} & a_{p_3} b_{n_3} v_{l',m'} & -a_{p_3} b_{n_3} v_{l,m} & -a_{p_3} b_{n_3} v_{l',m'} \end{bmatrix}; p_2 = \left\lfloor \frac{p}{4} \right\rfloor; p_3 = p$$

In another alternative, for Codebook-Config=2, and $N_g$=2, codebook tables for 1-4 layers are shown in TABLES 32-35.

TABLE 32

Codebook for 1-layer CSI reporting using antenna ports [15 to 14 + $P_{CSI-RS}$]
Codebook-Config = 2, $N_g$ = 2

| $i_{1,1}$ | $i_{1,2}$ | $i_{1,4}$ | $i_2$ | |
|---|---|---|---|---|
| | | | 0 | 1 |
| $0,1,\ldots,N_1O_1-1$ | $0,1,\ldots,N_2O_2-1$ | $0,\ldots,15$ | $W^{(1)}_{i_{1,1},i_{1,2},i_{1,4},0,0,0}$ | $W^{(1)}_{i_{1,1},i_{1,2},i_{1,4},0,0,1}$ |

| $i_{1,1}$ | $i_{1,2}$ | $i_{1,4}$ | $i_2$ | |
|---|---|---|---|---|
| | | | 2 | 3 |
| $0,1,\ldots,N_1O_1-1$ | $0,1,\ldots,N_2O_2-1$ | $0,\ldots,15$ | $W^{(1)}_{i_{1,1},i_{1,2},i_{1,4},0,1,0}$ | $W^{(1)}_{i_{1,1},i_{1,2},i_{1,4},0,1,1}$ |

| $i_{1,1}$ | $i_{1,2}$ | $i_{1,4}$ | $i_2$ | |
|---|---|---|---|---|
| | | | 4 | 5 |
| $0,1,\ldots,N_1O_1-1$ | $0,1,\ldots,N_2O_2-1$ | $0,\ldots,15$ | $W^{(1)}_{i_{1,1},i_{1,2},i_{1,4},1,0,0}$ | $W^{(1)}_{i_{1,1},i_{1,2},i_{1,4},1,0,1}$ |

| $i_{1,1}$ | $i_{1,2}$ | $i_{1,4}$ | $i_2$ | |
|---|---|---|---|---|
| | | | 6 | 7 |
| $0,1,\ldots,N_1O_1-1$ | $0,1,\ldots,N_2O_2-1$ | $0,\ldots,15$ | $W^{(1)}_{i_{1,1},i_{1,2},i_{1,4},1,1,0}$ | $W^{(1)}_{i_{1,1},i_{1,2},i_{1,4},1,1,1}$ |

| $i_{1,1}$ | $i_{1,2}$ | $i_{1,4}$ | $i_2$ | |
|---|---|---|---|---|
| | | | 8 | 9 |
| $0,1,\ldots,N_1O_1-1$ | $0,1,\ldots,N_2O_2-1$ | $0,\ldots,15$ | $W^{(1)}_{i_{1,1},i_{1,2},i_{1,4},2,0,0}$ | $W^{(1)}_{i_{1,1},i_{1,2},i_{1,4},2,0,1}$ |

| $i_{1,1}$ | $i_{1,2}$ | $i_{1,4}$ | $i_2$ | |
|---|---|---|---|---|
| | | | 10 | 11 |
| $0,1,\ldots,N_1O_1-1$ | $0,1,\ldots,N_2O_2-1$ | $0,\ldots,15$ | $W^{(1)}_{i_{1,1},i_{1,2},i_{1,4},2,1,0}$ | $W^{(1)}_{i_{1,1},i_{1,2},i_{1,4},2,1,1}$ |

| $i_{1,1}$ | $i_{1,2}$ | $i_{1,4}$ | $i_2$ | |
|---|---|---|---|---|
| | | | 12 | 13 |
| $0,1,\ldots,N_1O_1-1$ | $0,1,\ldots,N_2O_2-1$ | $0,\ldots,15$ | $W^{(1)}_{i_{1,1},i_{1,2},i_{1,4},3,0,0}$ | $W^{(1)}_{i_{1,1},i_{1,2},i_{1,4},3,0,1}$ |

| $i_{1,1}$ | $i_{1,2}$ | $i_{1,4}$ | $i_2$ | |
|---|---|---|---|---|
| | | | 14 | 15 |
| $0,1,\ldots,N_1O_1-1$ | $0,1,\ldots,N_2O_2-1$ | $0,\ldots,15$ | $W^{(1)}_{i_{1,1},i_{1,2},i_{1,4},3,1,0}$ | $W^{(1)}_{i_{1,1},i_{1,2},i_{1,4},3,1,1}$ | where $W^{(1)}_{l,m,p,n_1,n_2,n_3} = \frac{1}{\sqrt{P_{CSI-RS}}} \begin{bmatrix} v_{l,m} \\ \varphi_{n_1} v_{l,m} \\ a_{p_2} b_{n_2} v_{l,m} \\ a_{p_3} b_{n_3} v_{l,m} \end{bmatrix}; p_2 = \lfloor \frac{p}{4} \rfloor; p_3 = p$

TABLE 33

Codebook for 2-layer CSI reporting using antenna ports [15 to 14 + $P_{CSI-RS}$]
Codebook-Config = 2, $N_g$ = 2

| $i_{1,1}$ | $i_{1,2}$ | $i_{1,4}$ | $i_2$ | |
|---|---|---|---|---|
| | | | 0 | 1 |
| $0,1,\ldots,N_1O_1-1$ | $0,1,\ldots,N_2O_2-1$ | $0,\ldots,15$ | $W^{(2)}_{i_{1,1},i_{1,1}+k_1,i_{1,2},i_{1,2}+k_2,i_{1,4},0,0,0}$ | $W^{(2)}_{i_{1,1},i_{1,1}+k_1,i_{1,2},i_{1,2}+k_2,i_{1,4},0,0,1}$ |

| $i_{1,1}$ | $i_{1,2}$ | $i_{1,4}$ | $i_2$ | |
|---|---|---|---|---|
| | | | 2 | 3 |
| $0,1,\ldots,N_1O_1-1$ | $0,1,\ldots,N_2O_2-1$ | $0,\ldots,15$ | $W^{(2)}_{i_{1,1},i_{1,1}+k_1,i_{1,2},i_{1,2}+k_2,i_{1,4},0,1,0}$ | $W^{(2)}_{i_{1,1},i_{1,1}+k_1,i_{1,2},i_{1,2}+k_2,i_{1,4},0,1,1}$ |

| $i_{1,1}$ | $i_{1,2}$ | $i_{1,4}$ | $i_2$ | |
|---|---|---|---|---|
| | | | 4 | 5 |
| $0,1,\ldots,N_1O_1-1$ | $0,1,\ldots,N_2O_2-1$ | $0,\ldots,15$ | $W^{(2)}_{i_{1,1},i_{1,1}+k_1,i_{1,2},i_{1,2}+k_2,i_{1,4},1,0,0}$ | $W^{(2)}_{i_{1,1},i_{1,1}+k_1,i_{1,2},i_{1,2}+k_2,i_{1,4},1,0,1}$ |

| $i_{1,1}$ | $i_{1,2}$ | $i_{1,4}$ | $i_2$ | |
|---|---|---|---|---|
| | | | 6 | 7 |
| $0,1,\ldots,N_1O_1-1$ | $0,1,\ldots,N_2O_2-1$ | $0,\ldots,15$ | $W^{(2)}_{i_{1,1},i_{1,1}+k_1,i_{1,2},i_{1,2}+k_2,i_{1,4},1,1,0}$ | $W^{(2)}_{i_{1,1},i_{1,1}+k_1,i_{1,2},i_{1,2}+k_2,i_{1,4},1,1,1}$ |

TABLE 33-continued

Codebook for 2-layer CSI reporting using antenna ports [15 to 14 + $P_{CSI-RS}$]
Codebook-Config = 2, $N_g$ = 2 where $W^{(2)}_{l,l',m,m',p,n_1,n_2,n_3} = \frac{1}{\sqrt{2P_{CSI-RS}}} \begin{bmatrix} v_{l,m} & v_{l',m'} \\ \varphi_{n_1} v_{l,m} & -\varphi_{n_1} v_{l',m'} \\ a_{p_2} b_{n_2} v_{l,m} & a_{p_2} b_{n_2} v_{l',m'} \\ a_{p_3} b_{n_3} v_{l,m} & -a_{p_3} b_{n_3} v_{l',m'} \end{bmatrix}$; $p_2 = \lfloor \frac{p}{4} \rfloor$; $p_3 = p$

TABLE 34

Codebook for 3-layer CSI reporting using antenna ports [15 to 14 + $P_{CSI-RS}$]
Codebook-Config = 2, $N_g$ = 2

| $i_{1,1}$ | $i_{1,2}$ | $i_{1,4}$ | $i_2$ | |
|---|---|---|---|---|
| | | | 0 | 1 |
| $0,1,\ldots,N_1O_1-1$ | $0,1,\ldots,N_2O_2-1$ | $0,\ldots,15$ | $W^{(3)}_{i_{1,1},i_{1,1}+k_1,i_{1,2},i_{1,2}+k_2,i_{1,4},0,0,0}$ | $W^{(3)}_{i_{1,1},i_{1,1}+k_1,i_{1,2},i_{1,2}+k_2,i_{1,4},0,0,1}$ |

| $i_{1,1}$ | $i_{1,2}$ | $i_{1,4}$ | $i_2$ | |
|---|---|---|---|---|
| | | | 2 | 3 |
| $0,1,\ldots,N_1O_1-1$ | $0,1,\ldots,N_2O_2-1$ | $0,\ldots,15$ | $W^{(3)}_{i_{1,1},i_{1,1}+k_1,i_{1,2},i_{1,2}+k_2,i_{1,4},0,1,0}$ | $W^{(3)}_{i_{1,1},i_{1,1}+k_1,i_{1,2},i_{1,2}+k_2,i_{1,4},0,1,1}$ |

| $i_{1,1}$ | $i_{1,2}$ | $i_{1,4}$ | $i_2$ | |
|---|---|---|---|---|
| | | | 4 | 5 |
| $0,1,\ldots,N_1O_1-1$ | $0,1,\ldots,N_2O_2-1$ | $0,\ldots,15$ | $W^{(3)}_{i_{1,1},i_{1,1}+k_1,i_{1,2},i_{1,2}+k_2,i_{1,4},1,0,0}$ | $W^{(3)}_{i_{1,1},i_{1,1}+k_1,i_{1,2},i_{1,2}+k_2,i_{1,4},1,0,1}$ |

| $i_{1,1}$ | $i_{1,2}$ | $i_{1,4}$ | $i_2$ | |
|---|---|---|---|---|
| | | | 6 | 7 |
| $0,1,\ldots,N_1O_1-1$ | $0,1,\ldots,N_2O_2-1$ | $0,\ldots,15$ | $W^{(3)}_{i_{1,1},i_{1,1}+k_1,i_{1,2},i_{1,2}+k_2,i_{1,4},1,1,0}$ | $W^{(3)}_{i_{1,1},i_{1,1}+k_1,i_{1,2},i_{1,2}+k_2,i_{1,4},1,1,1}$ | where $W^{(3)}_{l,l',m,m',p,n_1,n_2,n_3} = \frac{1}{\sqrt{3P_{CSI-RS}}} \begin{bmatrix} v_{l,m} & v_{l',m'} & v_{l,m} \\ \varphi_{n_1} v_{l,m} & \varphi_{n_1} v_{l',m'} & -\varphi_{n_1} v_{l,m} \\ a_{p_2} b_{n_2} v_{l,m} & a_{p_2} b_{n_2} v_{l',m'} & a_{p_2} b_{n_2} v_{l,m} \\ a_{p_3} b_{n_3} v_{l,m} & a_{p_3} b_{n_3} v_{l',m'} & -a_{p_3} b_{n_3} v_{l,m} \end{bmatrix}$; $p_2 = \lfloor \frac{p}{4} \rfloor$; $p_3 = p$

40

TABLE 35

Codebook for 4-layer CSI reporting using antenna ports [15 to 14 + $P_{CSI-RS}$]
Codebook-Config = 2, $N_g$ = 2

| $i_{1,1}$ | $i_{1,2}$ | $i_{1,4}$ | $i_2$ | |
|---|---|---|---|---|
| | | | 0 | 1 |
| $0,1,\ldots,N_1O_1-1$ | $0,1,\ldots,N_2O_2-1$ | $0,\ldots,15$ | $W^{(4)}_{i_{1,1},i_{1,1}+k_1,i_{1,2},i_{1,2}+k_2,i_{1,4},0,0,0}$ | $W^{(4)}_{i_{1,1},i_{1,1}+k_1,i_{1,2},i_{1,2}+k_2,i_{1,4},0,0,1}$ |

| $i_{1,1}$ | $i_{1,2}$ | $i_{1,4}$ | $i_2$ | |
|---|---|---|---|---|
| | | | 2 | 3 |
| $0,1,\ldots,N_1O_1-1$ | $0,1,\ldots,N_2O_2-1$ | $0,\ldots,15$ | $W^{(4)}_{i_{1,1},i_{1,1}+k_1,i_{1,2},i_{1,2}+k_2,i_{1,4},0,1,0}$ | $W^{(4)}_{i_{1,1},i_{1,1}+k_1,i_{1,2},i_{1,2}+k_2,i_{1,4},0,1,1}$ |

| $i_{1,1}$ | $i_{1,2}$ | $i_{1,4}$ | $i_2$ | |
|---|---|---|---|---|
| | | | 4 | 5 |
| $0,1,\ldots,N_1O_1-1$ | $0,1,\ldots,N_2O_2-1$ | $0,\ldots,15$ | $W^{(4)}_{i_{1,1},i_{1,1}+k_1,i_{1,2},i_{1,2}+k_2,i_{1,4},1,0,0}$ | $W^{(4)}_{i_{1,1},i_{1,1}+k_1,i_{1,2},i_{1,2}+k_2,i_{1,4},1,0,1}$ |

| $i_{1,1}$ | $i_{1,2}$ | $i_{1,6}$ | $i_2$ | |
|---|---|---|---|---|
| | | | 6 | 7 |
| $0,1,\ldots,N_1O_1-1$ | $0,1,\ldots,N_2O_2-1$ | $0,\ldots,15$ | $W^{(4)}_{i_{1,1},i_{1,1}+k_1,i_{1,2},i_{1,2}+k_2,i_{1,4},1,1,0}$ | $W^{(4)}_{i_{1,1},i_{1,1}+k_1,i_{1,2},i_{1,2}+k_2,i_{1,4},1,1,1}$ |

TABLE 35-continued

Codebook for 4-layer CSI reporting using antenna ports [15 to 14 + $P_{CSI-RS}$]
Codebook-Config = 2, $N_g$ = 2

$$\text{where } W^{(4)}_{l,l',m,m',p,n_1,n_2,n_3} = \frac{1}{\sqrt{4P_{CSI-RS}}}\begin{bmatrix} v_{l,m} & v_{l',m'} & v_{l,m} & v_{l',m'} \\ \varphi_{n_1} v_{l,m} & \varphi_{n_1} v_{l',m'} & -\varphi_{n_1} v_{l,m} & -\varphi_{n_1} v_{l',m'} \\ a_{p_2} b_{n_2} v_{l,m} & a_{p_2} b_{n_2} v_{l',m'} & a_{p_2} b_{n_2} v_{l,m} & a_{p_2} b_{n_2} v_{l',m'} \\ a_{p_3} b_{n_3} v_{l,m} & a_{p_3} b_{n_3} v_{l',m'} & -a_{p_3} b_{n_3} v_{l,m} & -a_{p_3} b_{n_3} v_{l',m'} \end{bmatrix};$$

$$p_2 = \left\lfloor \frac{p}{4} \right\rfloor; \; p_3 = p$$

In one embodiment 12C, for Codebook-Config=1 and $N_g$=2, the pre-coding vector/matrix for 1-4 layer CSI reporting is given by one of the following alternative equations. In one example of 1-layer, $$W^{(1)}_{l,m,p,n} = \frac{1}{\sqrt{P_{CSI-RS}}} \begin{bmatrix} v_{l,m} \\ \varphi_p v_{l,m} \\ \varphi_n v_{l,m} \\ \varphi_p \varphi_n x_{l,m} \end{bmatrix} \text{ and} \quad \text{equation 1}$$

$$W^{(1)}_{l,m,p,n} = \frac{1}{\sqrt{P_{CSI-RS}}} \begin{bmatrix} x_{l,m,n} \\ \varphi_p x_{l,m,n} \end{bmatrix} \quad \text{equation 2}$$

where $x_{l,m,n} = \begin{bmatrix} v_{l,m} \\ \varphi_n v_{l,m} \end{bmatrix}$.

In one example of 2-layer, $$W^{(2)}_{l,l',m,m',p,n} = \frac{1}{\sqrt{2P_{CSI-RS}}} \begin{bmatrix} v_{l,m} & v_{l',m'} \\ \varphi_p v_{l,m} & \varphi_p v_{l',m'} \\ \varphi_n v_{l,m} & -\varphi_n v_{l',m'} \\ \varphi_p \varphi_n v_{l,m} & -\varphi_p \varphi_n v_{l',m'} \end{bmatrix} \quad \text{equation 1}$$

and $$W^{(2)}_{l,l',m,m',p,n} = \frac{1}{\sqrt{2P_{CSI-RS}}} \begin{bmatrix} x_{l,l',m,m',n} \\ \varphi_p x_{l,l',m,m',n} \end{bmatrix} \quad \text{equation 2}$$

where $x_{l,l',m,m',n} = \begin{bmatrix} v_{l,m} & v_{l',m'} \\ \varphi_n v_{l,m} & -\varphi_n v_{l',m'} \end{bmatrix}$.

In one example of 3-layer, $$W^{(3)}_{l,l',m,m',p,n} = \quad \text{equation 1}$$

$$\frac{1}{\sqrt{3P_{CSI-RS}}} \begin{bmatrix} v_{l,m} & v_{l',m'} & v_{l,m} \\ \varphi_p v_{l,m} & \varphi_p v_{l',m'} & \varphi_p v_{l,m} \\ \varphi_n v_{l,m} & \varphi_n v_{l',m'} & -\varphi_n v_{l,m} \\ \varphi_p \varphi_n v_{l,m} & \varphi_p \varphi_n v_{l',m'} & -\varphi_p \varphi_n v_{l,m} \end{bmatrix}$$

and $$W^{(3)}_{l,l',m,m',p,n} = \frac{1}{\sqrt{3P_{CSI-RS}}} \begin{bmatrix} x_{l,l',m,m',n} \\ \varphi_p x_{l,l',m,m',n} \end{bmatrix} \quad \text{equation 2}$$

where $x_{l,l',m,m',n} = \begin{bmatrix} v_{l,m} & v_{l',m'} & v_{l,m} \\ \varphi_n v_{l,m} & \varphi_n v_{l',m'} & -\varphi_n v_{l,m} \end{bmatrix}$.

In one example of 4-layer, $$W^{(4)}_{l,l',m,m',p,n} = \frac{1}{\sqrt{4P_{CSI-RS}}} \quad \text{equation 1}$$

$$\begin{bmatrix} v_{l,m} & v_{l',m'} & v_{l,m} & v_{l',m'} \\ \varphi_p v_{l,m} & \varphi_p v_{l',m'} & \varphi_p v_{l,m} & \varphi_p v_{l',m'} \\ \varphi_n v_{l,m} & \varphi_n v_{l',m'} & -\varphi_n v_{l,m} & -\varphi_n v_{l',m'} \\ \varphi_p \varphi_n v_{l,m} & \varphi_p \varphi_n v_{l',m'} & -\varphi_p \varphi_n v_{l,m} & -\varphi_p \varphi_n v_{l',m'} \end{bmatrix}$$

and $$W^{(4)}_{l,l',m,m',p,n} = \frac{1}{\sqrt{4P_{CSI-RS}}} \begin{bmatrix} x_{l,l',m,m',n} \\ \varphi_p x_{l,l',m,m',n} \end{bmatrix} \quad \text{equation 2}$$

where $x_{l,l',m,m',n} = \begin{bmatrix} v_{l,m} & v_{l',m'} & v_{l,m} & v_{l',m'} \\ \varphi_n v_{l,m} & \varphi_n v_{l',m'} & -\varphi_n v_{l,m} & -\varphi_n v_{l',m'} \end{bmatrix}$.

In one embodiment 12D, for Codebook-Config=1 and $N_g$=4, the pre-coding vector/matrix for 1-4 layer CSI reporting is given by one of the following alternative equations. In one example of 1-layer, $$W^{(1)}_{l,m,p,n} = \frac{1}{\sqrt{P_{CSI-RS}}} \begin{bmatrix} v_{l,m} \\ \varphi_{p_1} v_{l,m} \\ \varphi_{p_2} v_{l,m} \\ \varphi_{p_3} x_{l,m} \\ \varphi_n v_{l,m} \\ \varphi_{p_1} \varphi_n v_{l,m} \\ \varphi_{p_2} \varphi_n v_{l,m} \\ \varphi_{p_3} \varphi_n v_{l,m} \end{bmatrix} \text{ and} \quad \text{equation 1}$$

$$W^{(1)}_{l,m,p,n} = \frac{1}{\sqrt{P_{CSI-RS}}} \begin{bmatrix} x_{l,m,n} \\ \varphi_{p_1} x_{l,m,n} \\ \varphi_{p_2} x_{l,m,n} \\ \varphi_{p_3} x_{l,m,n} \end{bmatrix}; \quad \text{equation 2}$$

$$p_1 = \left\lfloor \frac{p}{16} \right\rfloor; \; p_2 = \left\lfloor \frac{p}{4} \right\rfloor; \; p_3 = p$$

where $x_{l,m,n} = \begin{bmatrix} v_{l,m} \\ \varphi_n v_{l,m} \end{bmatrix}$.

In one example of 2-layer, $$W^{(2)}_{l,l',m,m',p,n} = \frac{1}{\sqrt{2P_{CSI-RS}}} \begin{bmatrix} v_{l,m} & v_{l',m'} \\ \varphi_{p_1} v_{l,m} & \varphi_{p_1} v_{l',m'} \\ \varphi_{p_2} v_{l,m} & \varphi_{p_2} v_{l',m'} \\ \varphi_{p_3} x_{l,m} & \varphi_{p_3} v_{l',m'} \\ \varphi_n v_{l,m} & -\varphi_n v_{l',m'} \\ \varphi_{p_1} \varphi_n v_{l,m} & -\varphi_{p_1} \varphi_n v_{l',m'} \\ \varphi_{p_2} \varphi_n v_{l,m} & -\varphi_{p_2} \varphi_n v_{l',m'} \\ \varphi_{p_3} \varphi_n x_{l,m} & -\varphi_{p_3} \varphi_n v_{l',m'} \end{bmatrix}; \quad \text{equation 1}$$

$p_1 = \lfloor \frac{p}{16} \rfloor; p_2 = \lfloor \frac{p}{4} \rfloor; p_3 = p$ and $$W^{(2)}_{l,l',m,m',p,n} = \frac{1}{\sqrt{2P_{CSI-RS}}} \begin{bmatrix} x_{l,l',m,m',n} \\ \varphi_{p_1} x_{l,l',m,m',n} \\ \varphi_{p_2} x_{l,l',m,m',n} \\ \varphi_{p_3} x_{l,l',m,m',n} \end{bmatrix}; \quad \text{equation 2}$$

$p_1 = \lfloor \frac{p}{16} \rfloor; p_2 = \lfloor \frac{p}{4} \rfloor; p_3 = p$ where $x_{l,l',m,m',n} = \begin{bmatrix} v_{l,m} & v_{l',m'} \\ \varphi_n v_{l,m} & -\varphi_n v_{l',m'} \end{bmatrix}$.

In one example of 3-layer, $W^{(3)}_{l,l',m,m',p,n} =$ $$\frac{1}{\sqrt{3P_{CSI-RS}}} \begin{bmatrix} v_{l,m} & v_{l',m'} & v_{l,m} \\ \varphi_{p_1} v_{l,m} & \varphi_{p_1} v_{l',m'} & \varphi_{p_1} v_{l,m} \\ \varphi_{p_2} v_{l,m} & \varphi_{p_2} v_{l',m'} & \varphi_{p_2} v_{l,m} \\ \varphi_{p_3} x_{l,m} & \varphi_{p_3} v_{l',m'} & \varphi_{p_3} x_{l,m} \\ \varphi_n v_{l,m} & \varphi_n v_{l',m'} & -\varphi_n v_{l,m} \\ \varphi_{p_1} \varphi_n v_{l,m} & \varphi_{p_1} \varphi_n v_{l',m'} & -\varphi_{p_1} \varphi_n v_{l,m} \\ \varphi_{p_2} \varphi_n v_{l,m} & \varphi_{p_2} \varphi_n v_{l',m'} & -\varphi_{p_2} \varphi_n v_{l,m} \\ \varphi_{p_3} \varphi_n x_{l,m} & \varphi_{p_3} \varphi_n v_{l',m'} & -\varphi_{p_3} \varphi_n x_{l,m} \end{bmatrix}; \quad \text{equation 1}$$

$p_1 = \lfloor \frac{p}{16} \rfloor; p_2 = \lfloor \frac{p}{4} \rfloor; p_3 = p$ and $$W^{(3)}_{l,l',m,m',p,n} = \frac{1}{\sqrt{3P_{CSI-RS}}} \begin{bmatrix} x_{l,l',m,m',n} \\ \varphi_{p_1} x_{l,l',m,m',n} \\ \varphi_{p_2} x_{l,l',m,m',n} \\ \varphi_{p_3} x_{l,l',m,m',n} \end{bmatrix}; \quad \text{equation 2}$$

$p_1 = \lfloor \frac{p}{16} \rfloor; p_2 = \lfloor \frac{p}{4} \rfloor; p_3 = p$ where $x_{l,l',m,m',n} = \begin{bmatrix} v_{l,m} & v_{l',m'} & v_{l,m} \\ \varphi_n v_{l,m} & \varphi_n v_{l',m'} & -\varphi_n v_{l,m} \end{bmatrix}$.

In one example of 4-layer, $$W^{(4)}_{l,l',m,m',p,n} = \frac{1}{\sqrt{4P_{CSI-RS}}} \quad \text{equation 1}$$

$$\begin{bmatrix} v_{l,m} & v_{l',m'} & v_{l,m} & v_{l',m'} \\ \varphi_{p_1} v_{l,m} & \varphi_{p_1} v_{l',m'} & \varphi_{p_1} v_{l,m} & \varphi_{p_1} v_{l',m'} \\ \varphi_{p_2} v_{l,m} & \varphi_{p_2} v_{l',m'} & \varphi_{p_2} v_{l,m} & \varphi_{p_2} v_{l',m'} \\ \varphi_{p_3} x_{l,m} & \varphi_{p_3} v_{l',m'} & \varphi_{p_3} x_{l,m} & \varphi_{p_3} v_{l',m'} \\ \varphi_n v_{l,m} & \varphi_n v_{l',m'} & -\varphi_n v_{l,m} & -\varphi_n v_{l',m'} \\ \varphi_{p_1} \varphi_n v_{l,m} & \varphi_{p_1} \varphi_n v_{l',m'} & -\varphi_{p_1} \varphi_n v_{l,m} & -\varphi_{p_1} \varphi_n v_{l',m'} \\ \varphi_{p_2} \varphi_n v_{l,m} & \varphi_{p_2} \varphi_n v_{l',m'} & -\varphi_{p_2} \varphi_n v_{l,m} & -\varphi_{p_2} \varphi_n v_{l',m'} \\ \varphi_{p_3} \varphi_n x_{l,m} & \varphi_{p_3} \varphi_n v_{l',m'} & -\varphi_{p_3} \varphi_n x_{l,m} & -\varphi_{p_3} \varphi_n v_{l',m'} \end{bmatrix};$$

$p_1 = \lfloor \frac{p}{16} \rfloor; p_2 = \lfloor \frac{p}{4} \rfloor; p_3 = p$ and $$W^{(4)}_{l,l',m,m',p,n} = \frac{1}{\sqrt{4P_{CSI-RS}}} \begin{bmatrix} x_{l,l',m,m',n} \\ \varphi_{p_1} x_{l,l',m,m',n} \\ \varphi_{p_2} x_{l,l',m,m',n} \\ \varphi_{p_3} x_{l,l',m,m',n} \end{bmatrix}; \quad \text{equation 2}$$

$p_1 = \lfloor \frac{p}{16} \rfloor; p_2 = \lfloor \frac{p}{4} \rfloor; p_3 = p$ where $x_{l,l',m,m',n} = \begin{bmatrix} v_{l,m} & v_{l',m'} & v_{l,m} & v_{l',m'} \\ \varphi_n v_{l,m} & \varphi_n v_{l',m'} & -\varphi_n v_{l,m} & -\varphi_n v_{l',m'} \end{bmatrix}$.

In one embodiment 12E, for Codebook-Config=2 and $N_g=2$, the pre-coding vector/matrix for 1-4 layer CSI reporting is given by one of the following alternative equations:

1-layer: $W^{(1)}_{l,m,p,n} = \frac{1}{\sqrt{P_{CSI-RS}}} \begin{bmatrix} x_{l,m,n} \\ a_{p_2} b_{n_2} x_{l,m,n} \\ \varphi_{n_1} x_{l,m,n} \\ a_{p_3} b_{n_3} x_{l,m,n} \end{bmatrix};$ equation 1

$p_2 = \lfloor \frac{p}{4} \rfloor; p_3 = p; n_1 = \lfloor \frac{n}{4} \rfloor; n_2 = \lfloor \frac{n}{2} \rfloor$ mod 2; $n_3$=n mod 2;

2-layer: $W^{(2)}_{l,l',m,m',p,n} = \frac{1}{\sqrt{2P_{CSI-RS}}} \begin{bmatrix} v_{l,m} & v_{l',m'} \\ a_{p_2} b_{n_2} v_{l,m} & a_{p_2} b_{n_2} v_{l',m'} \\ \varphi_{n_1} v_{l,m} & -\varphi_{n_1} v_{l',m'} \\ a_{p_3} b_{n_3} v_{l,m} & -a_{p_3} b_{n_3} v_{l',m'} \end{bmatrix};$ $p_2 = \lfloor \frac{p}{4} \rfloor; p_3 = p;$ 3-layer: $W^{(3)}_{l,l',m,m',p,n} =$ $$\frac{1}{\sqrt{3P_{CSI-RS}}} \begin{bmatrix} v_{l,m} & v_{l',m'} & v_{l,m} \\ a_{p_2} b_{n_2} v_{l,m} & a_{p_2} b_{n_2} v_{l',m'} & a_{p_2} b_{n_2} v_{l,m} \\ \varphi_{n_1} v_{l,m} & \varphi_{n_1} v_{l',m'} & -\varphi_{n_1} v_{l,m} \\ a_{p_3} b_{n_3} v_{l,m} & a_{p_3} b_{n_3} v_{l',m'} & -a_{p_3} b_{n_3} v_{l,m} \end{bmatrix};$$

-continued $$p_2 = \left\lfloor \frac{p}{4} \right\rfloor; p_3 = p; n_1 = \left\lfloor \frac{n}{4} \right\rfloor; n_2 = \left\lfloor \frac{n}{2} \right\rfloor$$

mod 2; $n_3 = n$ mod 2; and 4-layer: $W^{(4)}_{l,l',m,m',p,n} =$ $$\frac{1}{\sqrt{4P_{CSI-RS}}} \begin{bmatrix} v_{l,m} & v_{l',m'} & v_{l,m} & v_{l',m'} \\ a_{p_2}b_{n_2}v_{l,m} & a_{p_2}b_{n_2}v_{l',m'} & a_{p_2}b_{n_2}v_{l,m} & a_{p_2}b_{n_2}v_{l',m'} \\ \varphi_{n_1}v_{l,m} & \varphi_{n_1}v_{l',m'} & -\varphi_{n_1}v_{l,m} & -\varphi_{n_1}v_{l',m'} \\ a_{p_3}b_{n_3}v_{l,m} & a_{p_3}b_{n_3}v_{l',m'} & -a_{p_3}b_{n_3}v_{l,m} & -a_{p_3}b_{n_3}v_{l',m'} \end{bmatrix};$$

$$p_2 = \left\lfloor \frac{p}{4} \right\rfloor; p_3 = p; n_1 = \left\lfloor \frac{n}{4} \right\rfloor; n_2 = \left\lfloor \frac{n}{2} \right\rfloor$$

mod 2; $n_3 = n$ mod 2.

In one embodiment 12F, the four codebook indices $i_{1,1}$, $i_{1,2}, i_{1,3}$, and $i_2$ for 1-layer CSI reporting are reported as two PMIs: the first PMI $i_1$ comprising three components, i.e., $i_1 = (i_{1,1}, i_{1,2}, i_{1,4})$; and the second PMI $i_2$.

Similarly, the five codebook indices $i_{1,1}, i_{1,2}, i_{1,3}, i_{1,4}$, and $i_2$ for 2, 3, or 4-layer CSI reporting are reported as two PMIs: the first PMI $i_1$ comprising four components, i.e., $i_1 = (i_{1,1}, i_{1,2}, i_{1,3}, i_{1,4})$; and the second PMI $i_2$.

In one embodiment 12G, the codebook index $i_{1,4}$ is reported as a separate (third) PMI $i_3$ for inter-panel co-phase. The 1-layer CSI is reported as three PMIs: the first PMI $i_1$ comprising two components, i.e., $i_1 = (i_{1,1}, i_{1,2})$; the second PMI $i_2$; and the third PMI $i_3 = i_{1,4}$.

Similarly, the 2, 3, or 4-layer CSI is reported as three PMIs: the first PMI $i_1$ comprising three components, i.e., $i_1 = (i_{1,1}, i_{1,2}, i_{1,3})$; the second PMI $i_2$; and the third PMI $i_3 = i_{1,4}$.

For Codebook-Config=1, the inter-panel co-phase $\varphi_p$ for $N_g = 2$ and $(\varphi_{p_1}, \varphi_{p_2}, \varphi_{p_3})$ for $N_g = 4$ is reported using the third PMI $i_3$ in a WB manner. For Codebook-Config=2, the inter-panel co-phase has two components: $(\varphi_{p_2}, \varphi_{p_3})$ reported in WB manner and $(\varphi_{n_2}, \varphi_{n_3})$ reported in a SB manner. The WB and SB components are reported according to at least one of the following alternatives. In one example of Alt 12G-0, the third PMI has two components, i.e., $i_3 = (i_{3,1}, i_{3,2})$, where the component $i_{3,1}$ is reported in a WB manner to indicate $(\varphi_{p_2}, \varphi_{p_3})$ and the component $i_{3,2}$ is reported in a SB manner to indicate $(\varphi_{n_2}, \varphi_{n_3})$.

In one example of Alt 12G-1, the third PMI $i_3$ indicates the WB component $(\varphi_{p_2}, \varphi_{p_3})$, and the SB component $(\varphi_{n_2}, \varphi_{n_3})$ is reported using the second PMI $i_2$. In one example of Alt 2, the third PMI $i_3$ indicates the WB component $(\varphi_{p_2}, \varphi_{p_3})$, and the SB component $(\varphi_{n_2}, \varphi_{n_3})$ is reported using a separate fourth PMI $i_4$. In one example of Alt 12G-3, the third PMI $i_3$ indicates the WB component $(\varphi_{p_2}, \varphi_{p_3})$, and the SB component $(\varphi_{n_2}, \varphi_{n_3})$ is reported using the second component $i_{2,2}$ of the second PMI $i_2 = (i_{2,1}, i_{2,2})$, where the first component $i_{2,1}$ indicates the SB co-phase $\varphi_{n_1}$.

In one embodiment 12H, the codebook indices $i_{1,3}$ and $i_{1,4}$ in the codebook tables in the present disclosure are swapped. That is, $i_{1,4}$ indicates the mapping to $k_1$ and $k_2$ in TABLE 6 and TABLE 7, and $i_{1,3}$ indicates the WB inter-panel co-phase: $\varphi_p$ for Codebook-Config=1, $N_g=2$; $(\varphi_{p_1}, \varphi_{p_2}, \varphi_{p_3})$ for Codebook-Config=1, $N_g=4$; and $(\varphi_{p_2}, \varphi_{p_3})$ for Codebook-Config=2, $N_g=2$.

In one embodiment 12I, the codebook table for Codebook-Config=2, $N_g=4$ is given by TABLES 36-39.

TABLE 36

Codebook for 1-layer CSI reporting using antenna ports [15 to 14 + $P_{CSI-RS}$]

Codebook-Config = 2, $N_g$ = 4

| $i_{1,1}$ | $i_{1,2}$ | $i_{1,4}$ | $i_2$ | |
|---|---|---|---|---|
| 0, 1, ..., $N_1O_1 - 1$ | 0, 1, ..., $N_2O_2 - 1$ | 0, ..., 4095 | 0, ..., 255 | $W^{(1)}_{i_{1,1},i_{1,2},i_{1,4},i_2}$ | where $W^{(1)}_{l,m,p,n} = \dfrac{1}{\sqrt{P_{CSI-RS}}} \begin{bmatrix} v_{l,m} \\ \varphi_{n_1} v_{l,m} \\ a_{p_2} b_{n_2} v_{l,m} \\ a_{p_3} b_{n_3} v_{l,m} \\ a_{p_4} b_{n_4} v_{l,m} \\ a_{p_5} b_{n_5} v_{l,m} \\ a_{p_6} b_{n_6} v_{l,m} \\ a_{p_7} b_{n_7} v_{l,m} \end{bmatrix};$ $$p_2 = \left\lfloor \frac{p}{1024} \right\rfloor; p_3 = \left\lfloor \frac{p}{256} \right\rfloor; p_4 = \left\lfloor \frac{p}{64} \right\rfloor; p_5 = \left\lfloor \frac{p}{16} \right\rfloor; p_6 = \left\lfloor \frac{p}{4} \right\rfloor; p_7 = p;$$

$$n_1 = \left\lfloor \frac{n}{64} \right\rfloor; n_2 = \left\lfloor \frac{n}{32} \right\rfloor \text{mod } 2; n_3 = \left\lfloor \frac{n}{16} \right\rfloor \text{mod } 2; n_4 = \left\lfloor \frac{n}{8} \right\rfloor \text{mod } 2;$$

$$n_5 = \left\lfloor \frac{n}{4} \right\rfloor \text{mod } 2; n_6 = \left\lfloor \frac{n}{2} \right\rfloor \text{mod } 2; n_7 = n \text{ mod } 2;$$

TABLE 37

Codebook for 2-layer CSI reporting using antenna ports [15 to 14 + $P_{CSI-RS}$]
Codebook-Config = 2, $N_g$ = 4

| $i_{1,1}$ | $i_{1,2}$ | $i_{1,4}$ | $i_2$ | |
|---|---|---|---|---|
| 0, 1, ..., $N_1O_1 - 1$ | 0, 1, ..., $N_2O_2 - 1$ | 0, ..., 4095 | 0, ..., 127 | $W_{i_{1,1},i_{1,1}+k_1,i_{1,2},i_{1,2}+k_2,i_{1,4},i_2}^{(2)}$ | where $W_{l,l',m,m',p,n}^{(2)} = \frac{1}{\sqrt{2P_{CSI-RS}}} \begin{bmatrix} v_{l,m} & v_{l',m'} \\ \varphi_{n_1} v_{l,m} & -\varphi_{n_1} v_{l',m'} \\ a_{p_2} b_{n_2} v_{l,m} & a_{p_2} b_{n_2} v_{l',m'} \\ a_{p_3} b_{n_3} v_{l,m} & -a_{p_3} b_{n_3} v_{l',m'} \\ a_{p_4} b_{n_4} v_{l,m} & a_{p_4} b_{n_4} v_{l',m'} \\ a_{p_5} b_{n_5} v_{l,m} & -a_{p_5} b_{n_5} v_{l',m'} \\ a_{p_6} b_{n_6} v_{l,m} & a_{p_6} b_{n_6} v_{l',m'} \\ a_{p_7} b_{n_7} v_{l,m} & -a_{p_7} b_{n_7} v_{l',m'} \end{bmatrix}$;

$p_2 = \lfloor \frac{p}{1024} \rfloor$; $p_3 = \lfloor \frac{p}{256} \rfloor$; $p_4 = \lfloor \frac{p}{64} \rfloor$; $p_5 = \lfloor \frac{p}{16} \rfloor$; $p_6 = \lfloor \frac{p}{4} \rfloor$; $p_7 = p$;

$n_1 = \lfloor \frac{n}{64} \rfloor$; $n_2 = \lfloor \frac{n}{32} \rfloor \bmod 2$; $n_3 = \lfloor \frac{n}{16} \rfloor \bmod 2$; $n_4 = \lfloor \frac{n}{8} \rfloor \bmod 2$;

$n_5 = \lfloor \frac{n}{4} \rfloor \bmod 2$; $n_6 = \lfloor \frac{n}{2} \rfloor \bmod 2$; $n_7 = n \bmod 2$;

TABLE 38

Codebook for 3-layer CSI reporting using antenna ports [15 to 14 + $P_{CSI-RS}$]
Codebook-Config = 2, $N_g$ = 4

| $i_{1,1}$ | $i_{1,2}$ | $i_{1,4}$ | $i_2$ | |
|---|---|---|---|---|
| 0, 1, ..., $N_1O_1 - 1$ | 0, 1, ..., $N_2O_2 - 1$ | 0, ..., 4095 | 0, ..., 127 | $W_{i_{1,1},i_{1,1}+k_1,i_{1,2},i_{1,2}+k_2,i_{1,4},i_2}^{(3)}$ | where $W_{l,l',m,m',p,n}^{(2)} = \frac{1}{\sqrt{2P_{CSI-RS}}} \begin{bmatrix} v_{l,m} & v_{l',m'} & v_{l,m} \\ \varphi_{n_1} v_{l,m} & \varphi_{n_1} v_{l',m'} & -\varphi_{n_1} v_{l,m} \\ a_{p_2} b_{n_2} v_{l,m} & a_{p_2} b_{n_2} v_{l',m'} & a_{p_2} b_{n_2} v_{l,m} \\ a_{p_3} b_{n_3} v_{l,m} & a_{p_3} b_{n_3} v_{l',m'} & -a_{p_3} b_{n_3} v_{l,m} \\ a_{p_4} b_{n_4} v_{l,m} & a_{p_4} b_{n_4} v_{l',m'} & a_{p_4} b_{n_4} v_{l,m} \\ a_{p_5} b_{n_5} v_{l,m} & a_{p_5} b_{n_5} v_{l',m'} & -a_{p_5} b_{n_5} v_{l,m} \\ a_{p_6} b_{n_6} v_{l,m} & a_{p_6} b_{n_6} v_{l',m'} & a_{p_6} b_{n_6} v_{l,m} \\ a_{p_7} b_{n_7} v_{l,m} & a_{p_7} b_{n_7} v_{l',m'} & -a_{p_7} b_{n_7} v_{l,m} \end{bmatrix}$;

$p_2 = \lfloor \frac{p}{1024} \rfloor$; $p_3 = \lfloor \frac{p}{256} \rfloor$; $p_4 = \lfloor \frac{p}{64} \rfloor$; $p_5 = \lfloor \frac{p}{16} \rfloor$; $p_6 = \lfloor \frac{p}{4} \rfloor$; $p_7 = p$;

$n_1 = \lfloor \frac{n}{64} \rfloor$; $n_2 = \lfloor \frac{n}{32} \rfloor \bmod 2$; $n_3 = \lfloor \frac{n}{16} \rfloor \bmod 2$; $n_4 = \lfloor \frac{n}{8} \rfloor \bmod 2$;

$n_5 = \lfloor \frac{n}{4} \rfloor \bmod 2$; $n_6 = \lfloor \frac{n}{2} \rfloor \bmod 2$; $n_7 = n \bmod 2$;

TABLE 39

Codebook for 4-layer CSI reporting using antenna ports [15 to 14 + $P_{CSI-RS}$]
Codebook-Config = 2, $N_g$ = 4

| $i_{1,1}$ | $i_{1,2}$ | $i_{1,4}$ | $i_2$ | |
|---|---|---|---|---|
| 0, 1, ..., $N_1O_1 - 1$ | 0, 1, ..., $N_2O_2 - 1$ | 0, ..., 4095 | 0, ..., 127 | $W_{i_{1,1},i_{1,1}+k_1,i_{1,2},i_{1,2}+k_2,i_{1,4},i_2}^{(4)}$ |

TABLE 39-continued

Codebook for 4-layer CSI reporting using antenna ports [15 to 14 + $P_{CSI-RS}$]
Codebook-Config = 2, $N_g$ = 4

| $i_{1,1}$ | $i_{1,2}$ | $i_{1,4}$ | $i_2$ |
|---|---|---|---|

$$\text{where } W^{(4)}_{l,l',m,m',p,n} = \frac{1}{\sqrt{4P_{CSI-RS}}} \begin{bmatrix} v_{l,m} & v_{l',m'} & v_{l,m} & v_{l',m'} \\ \varphi_{n_1} v_{l,m} & \varphi_{n_1} v_{l',m'} & -\varphi_{n_1} v_{l,m} & -\varphi_{n_1} v_{l',m'} \\ a_{p_2} b_{n_2} v_{l,m} & a_{p_2} b_{n_2} v_{l',m'} & a_{p_2} b_{n_2} v_{l,m} & a_{p_2} b_{n_2} v_{l',m'} \\ a_{p_3} b_{n_3} v_{l,m} & a_{p_3} b_{n_3} v_{l',m'} & -a_{p_3} b_{n_3} v_{l,m} & -a_{p_3} b_{n_3} v_{l',m'} \\ a_{p_4} b_{n_4} v_{l,m} & a_{p_4} b_{n_4} v_{l',m'} & a_{p_4} b_{n_4} v_{l,m} & a_{p_4} b_{n_4} v_{l',m'} \\ a_{p_5} b_{n_5} v_{l,m} & a_{p_5} b_{n_5} v_{l',m'} & -a_{p_5} b_{n_5} v_{l,m} & -a_{p_5} b_{n_5} v_{l',m'} \\ a_{p_6} b_{n_6} v_{l,m} & a_{p_6} b_{n_6} v_{l',m'} & a_{p_6} b_{n_6} v_{l,m} & a_{p_6} b_{n_6} v_{l',m'} \\ a_{p_7} b_{n_7} v_{l,m} & a_{p_7} b_{n_7} v_{l',m'} & -a_{p_7} b_{n_7} v_{l,m} & -a_{p_7} b_{n_7} v_{l',m'} \end{bmatrix};$$

$$p_2 = \left\lfloor \frac{p}{1024} \right\rfloor; \; p_3 = \left\lfloor \frac{p}{256} \right\rfloor; \; p_4 = \left\lfloor \frac{p}{64} \right\rfloor; \; p_5 = \left\lfloor \frac{p}{16} \right\rfloor; \; p_6 = \left\lfloor \frac{p}{4} \right\rfloor; \; p_7 = p;$$

$$n_1 = \left\lfloor \frac{n}{64} \right\rfloor; \; n_2 = \left\lfloor \frac{n}{32} \right\rfloor \bmod 2; \; n_3 = \left\lfloor \frac{n}{16} \right\rfloor \bmod 2; \; n_4 = \left\lfloor \frac{n}{8} \right\rfloor \bmod 2;$$

$$n_5 = \left\lfloor \frac{n}{4} \right\rfloor \bmod 2; \; n_6 = \left\lfloor \frac{n}{2} \right\rfloor \bmod 2; \; n_7 = n \bmod 2;$$

In one embodiment 12J, an alternative 2-layer (rank 2) codebook comprises of precoding matrices such that the DFT beams for the two layers are the same, i.e., l=l',m=m'. In this case, when the number of layers v=2, each PMI value corresponds to four codebook indices $i_{1,1}, i_{1,2}, i_{1,4}, i_2$, similar to the case of v=1. There is no need to have the codebook index $i_{1,3}$ to $k_1$ and $k_2$ mapping such as TABLE 6 for 2-layer reporting. The 2-layer codebook table is given by TABLE 40.

TABLE 40

Codebook for 2-layer CSI reporting using antenna ports [15 to 14 + $P_{CSI-RS}$]

Codebook-Config = 1, $N_g$ = 2

| $i_{1,1}$ | $i_{1,2}$ | $i_{1,4}$ | $i_2$ | |
|---|---|---|---|---|
| $0, 1, \ldots, N_1O_1 - 1$ | $0, 1, \ldots, N_2O_2 - 1$ | $0, \ldots, 3$ | $0, 1$ | $W^{(2)}_{i_{1,1},i_{1,2},i_{1,4},i_2}$ |

$$\text{where } W^{(2)}_{l,m,p,n} = \frac{1}{\sqrt{2P_{CSI-RS}}} \begin{bmatrix} v_{l,m} & v_{l,m} \\ \varphi_n v_{l,m} & \varphi_n v_{l,m} \\ \varphi_p v_{l,m} & \varphi_p v_{l,m} \\ \varphi_p \varphi_n v_{l,m} & \varphi_p \varphi_n v_{l,m} \end{bmatrix};$$

Codebook-Config = 1, $N_g$ = 4

| $i_{1,1}$ | $i_{1,2}$ | $i_{1,4}$ | $i_2$ | |
|---|---|---|---|---|
| $0, 1, \ldots, N_1O_1 - 1$ | $0, 1, \ldots, N_2O_2 - 1$ | $0, \ldots, 63$ | $0, 1$ | $W^{(2)}_{i_{1,1},i_{1,2},i_{1,4},i_2}$ |

$$\text{where } W^{(2)}_{l,m,p,n} = \frac{1}{\sqrt{2P_{CSI-RS}}} \begin{bmatrix} v_{l,m} & v_{l,m} \\ \varphi_n v_{l,m} & -\varphi_n v_{l,m} \\ \varphi_{p_1} v_{l,m} & \varphi_{p_1} v_{l,m} \\ \varphi_{p_1} \varphi_n v_{l,m} & -\varphi_{p_1} \varphi_n v_{l,m} \\ \varphi_{p_2} v_{l,m} & \varphi_{p_2} v_{l,m} \\ \varphi_{p_2} \varphi_n v_{l,m} & -\varphi_{p_2} \varphi_n v_{l,m} \\ \varphi_{p_3} v_{l,m} & \varphi_{p_3} v_{l,m} \\ \varphi_{p_3} \varphi_n v_{l,m} & -\varphi_{p_3} \varphi_n v_{l,m} \end{bmatrix}; \; p_1 = \left\lfloor \frac{p}{16} \right\rfloor;$$

$$p_2 = \left\lfloor \frac{p}{4} \right\rfloor; \; p_3 = p.$$

TABLE 40-continued

Codebook for 2-layer CSI reporting using antenna ports [15 to 14 + $P_{CSI-RS}$]

Codebook-Config = 2, $N_g$ = 2

| $i_{1,1}$ | $i_{1,2}$ | $i_{1,4}$ | $i_2$ | |
|---|---|---|---|---|
| $0, 1, \ldots, N_1 O_1 - 1$ | $0, 1, \ldots, N_2 O_2 - 1$ | $0, \ldots, 15$ | $0, \ldots, 7$ | $W_{i_{1,1},i_{1,2},i_{1,4},i_2}^{(2)}$ | where $W_{l,m,p,n}^{(2)} = \frac{1}{\sqrt{2P_{CSI-RS}}} \begin{bmatrix} v_{l,m} & v_{l,m} \\ \varphi_{n_1} v_{l,m} & -\varphi_{n_1} v_{l,m} \\ a_{p_2} b_{n_2} v_{l,m} & a_{p_2} b_{n_2} v_{l,m} \\ a_{p_3} b_{n_3} v_{l,m} & -a_{p_3} b_{n_3} v_{l,m} \end{bmatrix}$; $p_2 = \lfloor \frac{p}{4} \rfloor$; $p_3 = p$;

$n_1 = \lfloor \frac{n}{4} \rfloor$; $n_2 = \lfloor \frac{n}{2} \rfloor \mod 2$; $n_3 = n \mod 2$;

In one embodiment 12K, the higher layer codebook configuration parameter Codebook-Config in codebook tables in the present disclosure is referred to as Codebook-Mode or Mode. For example, Codebook-Config=1 and Codebook-Config=2 respectively are mapped to Mode1 and Mode2.

In one embodiment 13, a UE is configured with a PMI codebook for multi panels ($N_g$=M>1) as follows.

For 8 antenna ports (e.g. {15, 16, . . . , 22}), 16 antenna ports (e.g. {15, 16, . . . , 30}), 32 antenna ports (e.g. {15, 16, . . . , 46}), and the UE configured with higher layer (e.g. RRC) parameter MultiPanelCodebook set to Mode1 or Mode2, each PMI value corresponds to the codebook indices $i_1$ and $i_2$, where $i_1$ is the vector given by:

$$i_1 = \begin{cases} [i_{1,1} \; i_{1,2} \; i_{1,4}] & v = 1 \\ [i_{1,1} \; i_{1,2} \; i_{1,3} \; i_{1,4}] & v \in \{2, 3, 4\} \end{cases}$$

and v is the associated RI value.

The values of $N_g$, $N_1$, and $N_2$ are configured with the higher-layer parameters CodebookConfig-Ng, Codebook-Config-N1 and CodebookConfig-N2, respectively. The supported configurations of $(N_g, N_1, N_2)$ for a given number of CSI-RS ports and the corresponding values of $(O_1, O_2)$ are given in TABLE 41. The number of CSI-RS ports, $P_{CSI-RS}$ ports, is $2N_g N_1 N_2$. A UE may only use $i_{1,2}=0$ and may not report $i_{1,2}$ if the value of CodebookConfig-N2 is set to 1.

TABLE 41

Supported configurations of $(N_g, N_1, N_2)$ and $(O_1, O_2)$

| Number of CSI-RS antenna ports, $P_{CSI-RS}$ | $(N_g, N_1, N_2)$ | $(O_1, O_2)$ | MultiPanelCodebook |
|---|---|---|---|
| 8 | (2, 2, 1) | (4, 1) | Mode1, Mode2 |
| 16 | (2, 4, 1) | (4, 1) | Mode1, Mode2 |
|  | (4, 2, 1) | (4, 1) | Mode1 |
|  | (2, 2, 2) | (4, 4) | Mode1, Mode2 |
| 32 | (2, 8, 1) | (4, 1) | Mode1, Mode2 |
|  | (4, 4, 1) | (4, 1) | Mode1 |
|  | (2, 4, 2) | (4, 4) | Mode1, Mode2 |
|  | (4, 2, 2) | (4, 4) | Mode1 |

The mapping from $i_{1,3}$ to $k_1$ and $k_2$ for 2-layer reporting is given in TABLE 6. The mapping from $i_{1,3}$ to $k_1$ and $k_2$ for 3-layer and 4-layer reporting is given in TABLE 7. When MultiPanelCodebook is set to Mode1, $i_{1,4}$ is given by:

$$i_{1,4} = \begin{cases} i_{1,4,1} & N_g = 2 \\ [i_{1,4,1} \; i_{1,4,2} \; i_{1,4,3}] & N_g = 4 \end{cases}.$$

When MultiPanelCodebook is set to Mode2 (where $N_g$=2), $i_{1,4}$ and $i_2$ are $$i_{1,4} = [i_{1,4,1} \; i_{1,4,2}]$$
$$i_2 = [i_{2,0} \; i_{2,1,1} \; i_{2,1,2}].$$

The quantities $\varphi_n$, $a_p$, $b_n$, $u_m$, and $v_{l,m}$ are given by:

$$\varphi_n = e^{j\pi n/2}$$

$$a_p = e^{j\pi/4} e^{j\pi p/2}$$

$$b_n = e^{-j\pi/4} e^{j\pi n/2}$$

$$u_m = \begin{cases} \begin{bmatrix} 1 & e^{j\frac{2\pi m}{O_2 N_2}} & \cdots & e^{j\frac{2\pi m(N_2-1)}{O_2 N_2}} \end{bmatrix} & N_2 > 1 \\ 1 & N_2 = 1 \end{cases}$$

$$v_{l,m} = \begin{bmatrix} u_m & e^{j\frac{2\pi l}{O_1 N_1}} u_m & \cdots & e^{j\frac{2\pi l(N_1-1)}{O_1 N_1}} u_m \end{bmatrix}^T.$$

Furthermore, the quantities $W_{l,m,p,n}^{1,1,N_g}$ and $W_{l,m,p,n}^{1,2,N_g}$ ($N_g \in \{2,4\}$) are given by:

$$W_{l,m,p,n}^{1,1,2} = \frac{1}{\sqrt{P_{CSI-RS}}} \begin{bmatrix} v_{l,m} \\ \varphi_n v_{l,m} \\ \varphi_{p_1} v_{l,m} \\ \varphi_n \varphi_{p_1} v_{l,m} \end{bmatrix}$$

$$W_{l,m,p,n}^{1,2,2} = \frac{1}{\sqrt{P_{CSI-RS}}} \begin{bmatrix} v_{l,m} \\ -\varphi_n v_{l,m} \\ \varphi_{p_1} v_{l,m} \\ -\varphi_n \varphi_{p_1} v_{l,m} \end{bmatrix}$$

-continued $$W_{l,m,p,n}^{1,1,4} = \frac{1}{\sqrt{P_{CSI-RS}}} \begin{bmatrix} v_{l,m} \\ \varphi_n v_{l,m} \\ \varphi_{p_1} v_{l,m} \\ \varphi_n \varphi_{p_1} v_{l,m} \\ \varphi_{p_2} v_{l,m} \\ \varphi_n \varphi_{p_2} v_{l,m} \\ \varphi_{p_3} v_{l,m} \\ \varphi_n \varphi_{p_3} v_{l,m} \end{bmatrix}$$

$$W_{l,m,p,n}^{1,2,4} = \frac{1}{\sqrt{P_{CSI-RS}}} \begin{bmatrix} v_{l,m} \\ -\varphi_n v_{l,m} \\ \varphi_{p_1} v_{l,m} \\ -\varphi_n \varphi_{p_1} v_{l,m} \\ \varphi_{p_2} v_{l,m} \\ -\varphi_n \varphi_{p_2} v_{l,m} \\ \varphi_{p_3} v_{l,m} \\ -\varphi_n \varphi_{p_3} v_{l,m} \end{bmatrix}$$

where $p = \begin{cases} p_1 & N_g = 2 \\ [p_1 \ p_2 \ p_3] & N_g = 4 \end{cases}$, and the quantities $W_{l,m,p,n}^{2,1,N_g}$ and $W_{l,m,p,n}^{2,2,N_g}$ ($N_g=2$) are given by:

$$W_{l,m,p,n}^{2,1,2} = \frac{1}{\sqrt{P_{CSI-RS}}} \begin{bmatrix} v_{l,m} \\ \varphi_{n_0} v_{l,m} \\ a_{p_1} b_{n_1} v_{l,m} \\ a_{p_2} b_{n_2} v_{l,m} \end{bmatrix}$$

$$W_{l,m,p,n}^{2,2,2} = \frac{1}{\sqrt{P_{CSI-RS}}} \begin{bmatrix} v_{l,m} \\ -\varphi_{n_0} v_{l,m} \\ a_{p_1} b_{n_1} v_{l,m} \\ -a_{p_2} b_{n_2} v_{l,m} \end{bmatrix}$$

where $\begin{array}{l} p = [\ p_1 \ p_2] \\ n = [n_0 \ n_1 \ n_2] \end{array}$.

The codebooks for 1-4 layers are given respectively in TABLES 42-45.

TABLE 42

Codebook for 1-layer CSI reporting using antenna ports [15 to 14 + $P_{CSI-RS}$]

| Mode1, $N_g \in \{2, 4\}$ | | | |
|---|---|---|---|
| $i_{1,1}$ | $i_{1,2}$ | $i_{1,4,q}$, q = 1, ..., $N_g$ − 1 | $i_2$ |
| 0, 1, ..., $N_1O_1$ − 1 | 0, 1, ..., $N_2O_2$ − 1 | 0, 1, 2, 3 | 0, 1, 2, 3 | $W_{i_{1,1}, i_{1,2}, i_{1,4}, i_2}^{(1)}$ | where $W_{l,m,p,n}^{(1)} = W_{l,m,p,n}^{1,1,N_g}$.

| Mode2, $N_g$ = 2 | | | | |
|---|---|---|---|---|
| $i_{1,1}$ | $i_{1,2}$ | $i_{1,4,q}$, q = 1, 2 | $i_{2,0}$ | $i_{2,1,q}$, q = 1, 2 |
| 0, 1, ..., $N_1O_1$ − 1 | 0, 1, ..., $N_2O_2$ − 1 | 0, 1, 2, 3 | 0, 1, 2, 3 | 0, 1 | $W_{i_{1,1}, i_{1,2}, i_{1,4}, i_2}^{(1)}$ | where $W_{l,m,p,n}^{(1)} = W_{l,m,p,n}^{2,1,N_g}$.

TABLE 43

Codebook for 2-layer CSI reporting using antenna ports [15 to 14 + $P_{CSI-RS}$]

| Mode1, $N_g \in \{2, 4\}$ | | | |
|---|---|---|---|
| $i_{1,1}$ | $i_{1,2}$ | $i_{1,4,q}$, q = 1, ..., $N_g$ − 1 | $i_2$ |
| 0, 1, ..., $N_1O_1$ − 1 | 0, 1, ..., $N_2O_2$ − 1 | 0, 1, 2, 3 | 0, 1 | $W_{i_{1,1}, i_{1,1}+k_1, i_{1,2}, i_{1,2}+k_2, i_{1,4}, i_2}^{(2)}$ | where $W_{l,l',m,m',p,n}^{(2)} = \frac{1}{\sqrt{2}} [W_{l,m,p,n}^{1,1,N_g} \ W_{l',m',p,n}^{1,2,N_g}]$.

| Mode2, $N_g$ = 2 | | | |
|---|---|---|---|
| $i_{1,1}$ | $i_{1,2}$ | $i_{1,4,q}$, q = 1, 2 | $i_{2,0}, i_{2,1,q}$, q = 1, 2 |
| 0, 1, ..., $N_1O_1$ − 1 | 0, 1, ..., $N_2O_2$ − 1 | 0, 1, 2, 3 | 0, 1 | $W_{i_{1,1}, i_{1,1}+k_1, i_{1,2}, i_{1,2}+k_2, i_{1,4}, i_2}^{(2)}$ | where $W_{l,l',m,m',p,n}^{(2)} = \frac{1}{\sqrt{2}} [W_{l,m,p,n}^{2,1,N_g} \ W_{l',m',p,n}^{2,2,N_g}]$.

TABLE 44

Codebook for 3-layer CSI reporting using antenna ports [15 to 14 + $P_{CSI-RS}$]

| Mode1, $N_g \in \{2, 4\}$ | | | | |
|---|---|---|---|---|
| $i_{1,1}$ | $i_{1,2}$ | $i_{1,4,q}$, q = 1, ..., $N_g$ − 1 | $i_2$ | |
| 0, 1, ..., $N_1O_1$ − 1 | 0, 1, ..., $N_2O_2$ − 1 | 0, 1, 2, 3 | 0, 1 | $W^{(3)}_{i_{1,1},i_{1,1}+k_1,i_{1,2},i_{1,2}+k_2,i_{1,4},i_2}$ |
| where $W^{(3)}_{l,l',m,m',p,n} = \frac{1}{\sqrt{3}} [ W^{1,1,N_g}_{l,m,p,n} \; W^{1,1,N_g}_{l',m',p,n} \; W^{1,2,N_g}_{l,m,p,n} ]$. | | | | |
| Mode2, $N_g = 2$ | | | | |
| $i_{1,1}$ | $i_{1,2}$ | $i_{1,4,q}$, q = 1, 2 | $i_{2,0}, i_{2,1,q}$, q = 1, 2 | |
| 0, 1, ..., $N_1O_1$ − 1 | 0, 1, ..., $N_2O_2$ − 1 | 0, 1, 2, 3 | 0, 1 | $W^{(3)}_{i_{1,1},i_{1,1}+k_1,i_{1,2},i_{1,2}+k_2,i_{1,4},i_2}$ |
| where $W^{(3)}_{l,l',m,m',p,n} = \frac{1}{\sqrt{3}} [ W^{2,1,N_g}_{l,m,p,n} \; W^{2,1,N_g}_{l',m',p,n} \; W^{2,2,N_g}_{l,m,p,n} ]$. | | | | |

TABLE 45

Codebook for 4-layer CSI reporting using antenna ports [15 to 14 + $P_{CSI-RS}$]

| Mode1, $N_g \in \{2, 4\}$ | | | | |
|---|---|---|---|---|
| $i_{1,1}$ | $i_{1,2}$ | $i_{1,4,q}$, q = 1, ..., $N_g$ − 1 | $i_2$ | |
| 0, 1, ..., $N_1O_1$ − 1 | 0, 1, ..., $N_2O_2$ − 1 | 0, 1, 2, 3 | 0, 1 | $W^{(4)}_{i_{1,1},i_{1,1}+k_1,i_{1,2},i_{1,2}+k_2,i_{1,4},i_2}$ |
| where $W^{(4)}_{l,l',m,m',p,n} = \frac{1}{\sqrt{4}} [ W^{1,1,N_g}_{l,m,p,n} \; W^{1,1,N_g}_{l',m',p,n} \; W^{1,2,N_g}_{l,m,p,n} \; W^{1,2,N_g}_{l',m',p,n} ]$. | | | | |
| Mode2, $N_g = 2$ | | | | |
| $i_{1,1}$ | $i_{1,2}$ | $i_{1,4,q}$, q = 1, 2 | $i_2$ | |
| 0, 1, ..., $N_1O_1$ − 1 | 0, 1, ..., $N_2O_2$ − 1 | 0, 1, 2, 3 | 0, 1 | $W^{(4)}_{i_{1,1},i_{1,1}+k_1,i_{1,2},i_{1,2}+k_2,i_{1,4},i_2}$ |
| where $W^{(4)}_{l,l',m,m',p,n} = \frac{1}{\sqrt{4}} [ W^{2,1,N_g}_{l,m,p,n} \; W^{2,1,N_g}_{l',m',p,n} \; W^{2,2,N_g}_{l,m,p,n} \; W^{2,2,N_g}_{l',m',p,n} ]$. | | | | |

In one embodiment 13A, the 1-4 layer codebooks for Mode2 given respectively in TABLES 42-45 are also supported for $N_g=4$, where $i_{1,4}$ and $i_2$ are replaced with the following:

$$i_{1,4} = \begin{cases} [i_{1,4,1} \; i_{1,4,2}] & N_g = 2 \\ [i_{1,4,1} \; i_{1,4,2} \; i_{1,4,3} \; i_{1,4,4} \; i_{1,4,5} \; i_{1,4,6}] & N_g = 4 \end{cases}$$

$$i_{1,4,q} \in \{0, 1, 2, 3\}, q = 1, \ldots, 2(N_g - 1)$$

$$i_2 = \begin{cases} [i_{2,0} \; i_{2,1,1} \; i_{2,1,2}] & N_g = 2 \\ [i_{2,0} \; i_{2,1,1} \; i_{2,1,2} \; i_{2,1,3} \; i_{2,1,4} \; i_{2,1,5} \; i_{2,1,6}] & N_g = 4 \end{cases};$$

$$i_{2,1,q} \in \{0, 1\}, q = 1, \ldots, 2(N_g - 1)$$

$$W^{2,1,4}_{l,m,p,n} = \frac{1}{\sqrt{P_{CSI-RS}}} \begin{bmatrix} v_{l,m} \\ \varphi_{n_0} v_{l,m} \\ a_{p_1} b_{n_1} v_{l,m} \\ a_{p_2} b_{n_2} v_{l,m} \\ a_{p_3} b_{n_3} v_{l,m} \\ a_{p_4} b_{n_4} v_{l,m} \\ a_{p_5} b_{n_5} v_{l,m} \\ a_{p_6} b_{n_6} v_{l,m} \end{bmatrix}$$

and the quantities $W^{2,1,N_g}_{l,m,p,n}$ and $W^{2,2,N_g}_{l,m,p,n}$ for $N_g=4$ are given by:

$$W_{l,m,p,n}^{2,2,4} = \frac{1}{\sqrt{P_{CSI-RS}}} \begin{bmatrix} v_{l,m} \\ -\varphi_{n_0} v_{l,m} \\ a_{p_1} b_{n_1} v_{l,m} \\ -a_{p_2} b_{n_2} v_{l,m} \\ a_{p_3} b_{n_3} v_{l,m} \\ -a_{p_4} b_{n_4} v_{l,m} \\ a_{p_5} b_{n_5} v_{l,m} \\ -a_{p_6} b_{n_6} v_{l,m} \end{bmatrix}$$

where $\begin{aligned} p &= [\, p_1 \quad p_2 \quad p_3 \quad p_4 \quad p_5 \quad p_6 \,] \\ n &= [\, n_0 \quad n_1 \quad n_2 \quad n_3 \quad n_4 \quad n_5 \quad n_6 \,]\end{aligned}$.

In one embodiment 14, a UE is configured with a PMI codebook for multi panels ($N_g=M>1$) as follows. For 8 antenna ports (e.g. $\{15, 16, \ldots, 22\}$), 16 antenna ports (e.g. $\{15, 16, \ldots, 30\}$), 32 antenna ports (e.g. $\{15, 16, \ldots, 46\}$), and the UE configured with higher layer parameter Multi-PanelCodebook set to Mode1 or Mode2, where each PMI value corresponds to the codebook indices $i_1$ and $i_2$, where $i_1$ is the vector given by:

$$i_1 = \begin{cases} [i_{1,1} \quad i_{1,2} \quad i_{1,4}] & v = 1 \\ [i_{1,1} \quad i_{1,2} \quad i_{1,3} \quad i_{1,4}] & v \in \{2, 3, 4\} \end{cases}$$

and v is the associated RI value.

The mapping from $i_{1,3}$ to $k_1$ and $k_2$ for 2-layer reporting is given in TABLE 6. The mapping from $i_{1,3}$ to $k_1$ and $k_2$ for 3-layer and 4-layer reporting is given in TABLE 7. The values of $N_g$, $N_1$, and $N_2$ are configured with the higher-layer parameters CodebookConfig-Ng, CodebookConfig-N1 and CodebookConfig-N2, respectively. The supported configurations of $(N_g, N_1, N_2)$ for a given number of CSI-RS ports and the corresponding values of $(O_1, O_2)$ are given in TABLE 41. The number of CSI-RS ports, $P_{CSI-RS}$, is $2 N_g N_1 N_2$. A UE may only use $i_{1,2}=0$ and may not report $i_{1,2}$ if the value of CodebookConfig-N2 is set to 1.

When MultiPanelCodebook is set to Mode1, $i_{1,4}$ is $$i_{1,4} = \begin{cases} i_{1,4,1} & N_g = 2 \\ [i_{1,4,1} \quad i_{1,4,2} \quad i_{1,4,3}] & N_g = 4 \end{cases}.$$

$i_{1,4,q} \in \{0, 1, 2, 3\}, \; q = 1, 2, 3$

The quantities $\varphi_n$, $u_m$, and $v_{l,m}$ are given by:

$$\varphi_n = e^{-j\pi/2}$$

$$u_m = \begin{cases} \begin{bmatrix} 1 & e^{j\frac{2\pi m}{O_2 N_2}} & \cdots & e^{j\frac{2\pi m(N_2 -1)}{O_2 N_2}} \end{bmatrix} & N_2 > 1 \\ 1 & N_2 = 1 \end{cases}.$$

Furthermore, the quantities $W_{l,m,p,n}^{1,N_g}$ and $W_{l,m,p,n}^{2,N_g}$ ( $$v_{l,m} = \begin{bmatrix} u_m & e^{j\frac{2\pi l}{O_1 N_1}} u_m & \cdots & e^{j\frac{2\pi l(N_1-1)}{O_1 N_1}} u_m \end{bmatrix}^T$$

$$W_{l,m,p,n}^{1,2} = \frac{1}{\sqrt{P_{CSI-RS}}} \begin{bmatrix} v_{l,m} \\ \varphi_n v_{l,m} \\ \varphi_{p_1} v_{l,m} \\ \varphi_n \varphi_{p_1} v_{l,m} \end{bmatrix}$$

$$W_{l,m,p,n}^{2,2} = \frac{1}{\sqrt{P_{CSI-RS}}} \begin{bmatrix} v_{l,m} \\ -\varphi_n v_{l,m} \\ \varphi_{p_1} v_{l,m} \\ -\varphi_n \varphi_{p_1} v_{l,m} \end{bmatrix}$$

$N_g \in \{2,4\}$) are given by:

$$W_{l,m,p,n}^{1,4} = \frac{1}{\sqrt{P_{CSI-RS}}} \begin{bmatrix} v_{l,m} \\ \varphi_n v_{l,m} \\ \varphi_{p_1} v_{l,m} \\ \varphi_n \varphi_{p_1} v_{l,m} \\ \varphi_{p_2} v_{l,m} \\ \varphi_n \varphi_{p_2} v_{l,m} \\ \varphi_{p_3} v_{l,m} \\ \varphi_n \varphi_{p_3} v_{l,m} \end{bmatrix}$$

$$W_{l,m,p,n}^{2,4} = \frac{1}{\sqrt{P_{CSI-RS}}} \begin{bmatrix} v_{l,m} \\ -\varphi_n v_{l,m} \\ \varphi_{p_1} v_{l,m} \\ -\varphi_n \varphi_{p_1} v_{l,m} \\ \varphi_{p_2} v_{l,m} \\ -\varphi_n \varphi_{p_2} v_{l,m} \\ \varphi_{p_3} v_{l,m} \\ -\varphi_n \varphi_{p_3} v_{l,m} \end{bmatrix}$$

where $p = \begin{cases} p_1 & N_g = 2 \\ [p_1, \; p_2 \; p_3] & N_g = 4 \end{cases}.$ The Mode1 codebooks for 1-4 layers are given respectively in TABLES 46-49.

TABLE 46

Codebook for Mode1 1-layer CSI reporting using antenna ports [15 to 14 + $P_{CSI-RS}$]

| $i_{1,1}$ | $i_{1,2}$ | $i_{1,4,q}$, q = 1, ..., $N_g$ − 1 | $i_2$ | |
|---|---|---|---|---|
| 0, 1, ..., $N_1 O_1$ − 1 | 0, 1, ..., $N_2 O_2$ − 1 | 0, 1, 2, 3 | 0, 1, 2, 3 | $W_{i_{1,1}, i_{1,2}, i_{1,4}, i_2}^{(1)}$ | where $W_{l,m,p,n}^{(1)} = W_{l,m,p,n}^{1,N_g}$.

TABLE 47

Codebook for Mode1 2-layer CSI reporting using antenna ports [15 to 14 + $P_{CSI-RS}$]

| $i_{1,1}$ | $i_{1,2}$ | $i_{1,4,q}$, q = 1, ..., $N_g$ − 1 | $i_2$ | |
|---|---|---|---|---|
| 0, 1, ..., $N_1O_1$ − 1 | 0, 1, ..., $N_2O_2$ − 1 | 0, 1, 2, 3 | 0, 1 | $W^{(2)}_{i_{1,1},i_{1,1}+k_1,i_{1,2},i_{1,2}+k_2,i_{1,4},i_2}$ | where $W^{(2)}_{l,l',m,m',p,n} = \frac{1}{\sqrt{2}} [ W^{1,N_g}_{l,m,p,n} \quad W^{2,N_g}_{l',m',p,n} ]$.

TABLE 48

Codebook for Mode1 3-layer CSI reporting using antenna ports [15 to 14 + $P_{CSI-RS}$]

| $i_{1,1}$ | $i_{1,2}$ | $i_{1,4,q}$, q = 1, ..., $N_g$ − 1 | $i_2$ | |
|---|---|---|---|---|
| 0, 1, ..., $N_1O_1$ − 1 | 0, 1, ..., $N_2O_2$ − 1 | 0, 1, 2, 3 | 0, 1 | $W^{(3)}_{i_{1,1},i_{1,1}+k_1,i_{1,2},i_{1,2}+k_2,i_{1,4},i_2}$ | where $W^{(3)}_{l,l',m,m',p,n} = \frac{1}{\sqrt{3}} [ W^{1,N_g}_{l,m,p,n} \quad W^{1,N_g}_{l',m',p,n} \quad W^{2,N_g}_{l,m,p,n} ]$.

TABLE 49

Codebook for Mode1 4-layer CSI reporting using antenna ports [15 to 14 + $P_{CSI-RS}$]

| $i_{1,1}$ | $i_{1,2}$ | $i_{1,4,q}$, q = 1, ..., $N_g$ − 1 | $i_2$ | |
|---|---|---|---|---|
| 0, 1, ..., $N_1O_1$ − 1 | 0, 1, ..., $N_2O_2$ − 1 | 0, 1, 2, 3 | 0, 1 | $W^{(4)}_{i_{1,1},i_{1,1}+k_1,i_{1,2},i_{1,2}+k_2,i_{1,4},i_2}$ | where $W^{(4)}_{l,l',m,m',p,n} = \frac{1}{\sqrt{4}} [ W^{1,N_g}_{l,m,p,n} \quad W^{1,N_g}_{l',m',p,n} \quad W^{2,N_g}_{l,m,p,n} \quad W^{2,N_g}_{l',m',p,n} ]$.

When MultiPanelCodebook is set to Mode2 and $N_g=2$, $i_{1,4}$ and $i_2$ are $$i_{1,4} = [\, i_{1,4,1} \quad i_{1,4,2}\,]$$
$$i_2 = [\, i_{2,0} \quad i_{2,1,1} \quad i_{2,1,2}\,]$$

The quantities $a_p$ and $b_n$ are given by:

$$a_p = e^{j\pi/4} e^{j\pi p/2}$$
$$b_n = e^{-j\pi/4} e^{j\pi n/2}$$

Furthermore, the quantities and $W^{1,N_g}_{l,m,p,n}$ and $W^{2,N_g}_{l,m,p,n}$ ($N_g=2$) are given by:

$$W^{1,2}_{l,m,p,n} = \frac{1}{\sqrt{P_{CSI-RS}}} \begin{bmatrix} v_{l,m} \\ \varphi_{n_0} v_{l,m} \\ a_{p_1} b_{n_1} v_{l,m} \\ a_{p_2} b_{n_2} v_{l,m} \end{bmatrix}$$

$$W^{2,2}_{l,m,p,n} = \frac{1}{\sqrt{P_{CSI-RS}}} \begin{bmatrix} v_{l,m} \\ -\varphi_{n_0} v_{l,m} \\ a_{p_1} b_{n_1} v_{l,m} \\ -a_{p_2} b_{n_2} v_{l,m} \end{bmatrix}$$

where $p = [\, p_1 \quad p_2\,]$
$n = [\, n_0 \quad n_1 \quad n_2\,]$.

The Mode2 codebooks for 1-4 layers are given respectively in TABLES 50-53.

TABLE 50

Codebook for Mode2 1-layer CSI reporting using antenna ports [15 to 14 + $P_{CSI-RS}$]

$N_g = 2$

| $i_{1,1}$ | $i_{1,2}$ | $i_{1,4,q}$, q = 1, 2 | $i_{2,0}$ | $i_{2,1,q}$, q = 1, 2 | |
|---|---|---|---|---|---|
| 0, 1, ..., $N_1O_1$ − 1 | 0, 1, ..., $N_2O_2$ − 1 | 0, 1, 2, 3 | 0, 1, 2, 3 | 0, 1 | $W^{(1)}_{i_{1,1},i_{1,2},i_{1,4},i_2}$ | where $W^{(1)}_{l,m,p,n} = W^{1,N_g}_{l,m,p,n}$.

TABLE 51

Codebook for Mode2 2-layer CSI reporting using antenna ports [15 to 14 + $P_{CSI-RS}$]
$N_g = 2$

| $i_{1,1}$ | $i_{1,2}$ | $i_{1,4,q}$, q = 1, 2 | $i_{2,0}, i_{2,1,q}$, q = 1, 2 | |
|---|---|---|---|---|
| 0, 1, ..., $N_1O_1 - 1$ | 0, 1, ..., $N_2O_2 - 1$ | 0, 1, 2, 3 | 0, 1 | $W_{i_{1,1},i_{1,1}+k_1,i_{1,2},i_{1,2}+k_2,i_{1,4},i_2}^{(2)}$ | where $W_{l,l',m,m',p,n}^{(2)} = \frac{1}{\sqrt{2}} \left[ W_{l,m,p,n}^{1,N_g} \quad W_{l',m',p,n}^{2,N_g} \right]$.

TABLE 52

Codebook for Mode2 3-layer CSI reporting using antenna ports [15 to 14 + $P_{CSI-RS}$]
$N_g = 2$

| $i_{1,1}$ | $i_{1,2}$ | $i_{1,4,q}$, q = 1, 2 | $i_{2,0}, i_{2,3,q}$, q = 1, 2 | |
|---|---|---|---|---|
| 0, 1, ..., $N_1O_1 - 1$ | 0, 1, ..., $N_2O_2 - 1$ | 0, 1, 2, 3 | 0, 1 | $W_{i_{1,1},i_{1,1}+k_1,i_{1,2},i_{1,2}+k_2,i_{1,4},i_2}^{(3)}$ | where $W_{l,l',m,m',p,n}^{(3)} = \frac{1}{\sqrt{3}} \left[ W_{l,m,p,n}^{1,N_g} \quad W_{l',m',p,n}^{1,N_g} \quad W_{l,m,p,n}^{2,N_g} \right]$.

TABLE 53

Codebook for Mode2 4-layer CSI reporting using antenna ports [15 to 14 + $P_{CSI-RS}$]
$N_g = 2$

| $i_{1,1}$ | $i_{1,2}$ | $i_{1,4,q}$, q = 1, 2 | $i_{2,0}, i_{2,1,q}$, q = 1, 2 | |
|---|---|---|---|---|
| 0, 1, ..., $N_1O_1 - 1$ | 0, 1, ..., $N_2O_2 - 1$ | 0, 1, 2, 3 | 0, 1 | $W_{i_{1,1},i_{1,1}+k_1,i_{1,2},i_{1,2}+k_2,i_{1,4},i_2}^{(4)}$ | where $W_{l,l',m,m',p,n}^{(4)} = \frac{1}{\sqrt{4}} \left[ W_{l,m,p,n}^{1,N_g} \quad W_{l',m',p,n}^{1,N_g} \quad W_{l,m,p,n}^{2,N_g} \quad W_{l',m',p,n}^{2,N_g} \right]$.

In one embodiment 14A, the 1-4 layer codebooks for Mode2 given respectively in TABLES 50-53 are also supported for $N_g = 4$, where $i_{1,4}$ and $i_2$ are replaced with the following:

$$i_{1,4} = \begin{cases} [i_{1,4,1} \quad i_{1,4,2}] & N_g = 2 \\ [i_{1,4,1} \quad i_{1,4,2} \quad i_{1,4,3} \quad i_{1,4,4} \quad i_{1,4,5} \quad i_{1,4,6}] & N_g = 4 \end{cases}$$

$i_{1,4,q} \in \{0, 1, 2, 3\}$, $q = 1, \ldots, 2(N_g - 1)$;

and the quantities $W_{l,m,p,n}^{1,N_g}$ and $W_{l,m,p,n}^{2,N_g}$ for $$i_2 = \begin{cases} [i_{2,0} \quad i_{2,1,1} \quad i_{2,1,2}] & N_g = 2 \\ [i_{2,0} \quad i_{2,1,1} \quad i_{2,1,2} \quad i_{2,1,3} \quad i_{2,1,4} \quad i_{2,1,5} \quad i_{2,1,6}] & N_g = 4 \end{cases}$$

$i_{2,1,q} \in \{0, 1\}$, $q = 1, \ldots, 2(N_g - 1)$ $N_g = 4$ are given by: $W_{l,m,p,n}^{2,1,4} = \frac{1}{\sqrt{P_{CSI-RS}}} \begin{bmatrix} v_{l,m} \\ \varphi_{n_0} v_{l,m} \\ a_{p_1} b_{n_1} v_{l,m} \\ a_{p_2} b_{n_2} v_{l,m} \\ a_{p_3} b_{n_3} v_{l,m} \\ a_{p_4} b_{n_4} v_{l,m} \\ a_{p_5} b_{n_5} v_{l,m} \\ a_{p_6} b_{n_6} v_{l,m} \end{bmatrix}$ $W_{l,m,p,n}^{2,2,4} = \frac{1}{\sqrt{P_{CSI-RS}}} \begin{bmatrix} v_{l,m} \\ -\varphi_{n_0} v_{l,m} \\ a_{p_1} b_{n_1} v_{l,m} \\ -a_{p_2} b_{n_2} v_{l,m} \\ a_{p_3} b_{n_3} v_{l,m} \\ -a_{p_4} b_{n_4} v_{l,m} \\ a_{p_5} b_{n_5} v_{l,m} \\ -a_{p_6} b_{n_6} v_{l,m} \end{bmatrix}$ -continued $$p = [\, p_1 \quad p_2 \quad p_3 \quad p_4 \quad p_5 \quad p_6 \,]$$
$$\text{where } n = [\, n_0 \quad n_1 \quad n_2 \quad n_3 \quad n_4 \quad n_5 \quad n_6 \,].$$

Figure 13:
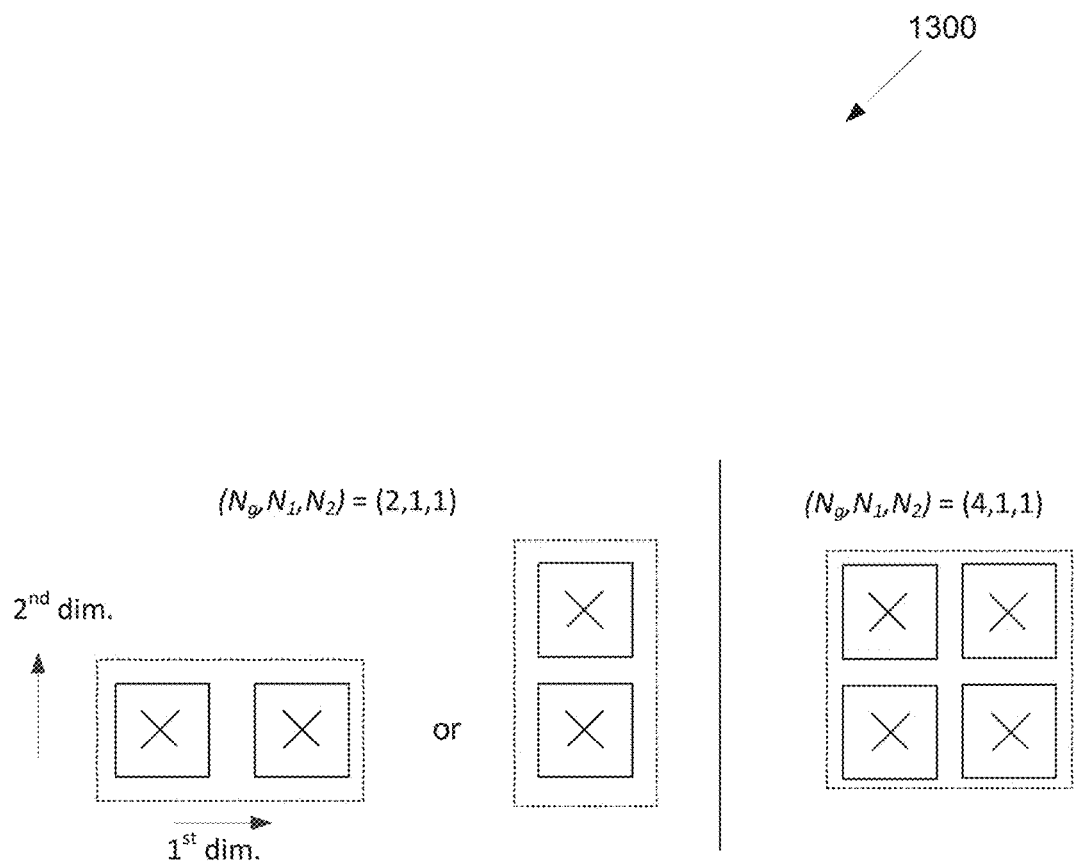
FIG. 13 illustrates an example multiple antenna panels with 2 ports per panel according to embodiments of the present disclosure.

FIG. 13 illustrates an example multiple antenna panels with 2 ports per panel 1300 according to embodiments of the present disclosure. The embodiment of the multiple antenna panels with 2 ports per panel illustrated in FIG. 13 is for illustration only. FIG. 13 does not limit the scope of this disclosure to any particular implementation.

The present disclosure provides the CSI acquisition scheme for the antenna structure to which multiple antenna panels are applied, where each panel is a dual-polarized antenna ports with $N_1=1$ and $N_2=1$ ports in two dimensions, i.e., 2 ports per panel. As shown in FIG. 13, there are $N_g=2$, 4 antenna panels with 2 ports per panel.

In one embodiment A1, a UE is configured with the PMI codebook with pre-coder W for $(N_g, N_1, N_2) \in \{(2,1,1),(4,1,1)\}$ antenna panels according to at least one of the following alternatives. In one example of Alt A1-0 (common intra-panel phase), $W = c \otimes d$ or $d \otimes c$ where c is an intra-panel phase vector (size 2×1), common for all panels, and d is an inter-panel phase vector (size $N_g \times 1$), where $c \otimes d$ denotes the Kronecker product of c and d which is defined as $c \otimes d = [c_0 d \ c_1 d]^T$ where $d = [d_0 \ d_1 \ \ldots \ d_{N_g-1}]$. If $W = c \otimes d$, for $N_g = 2$, $W = [c_0 d_0 \ c_0 d_1 \ c_1 d_0 \ c_1 d_1]^T$. If one of $c_0$ and $d_0$ is fixed to 1, there may be one of the two alternate forms for W. In one instance, $W = [d_0 \ d_1 \ c_1 d_0 \ c_1 d_1]^T$. In one instance, $W = [c_0 \ c_0 d_1 \ c_1 \ c_1 d_1]^T$. If both $c_0$ and $d_0$ are fixed to 1, then $W = [1 \ d_1 \ c_1 \ c_1 d_1]^T$.

If $W = c \otimes d$, for $N_g = 4$: $W = [c_0 d_0 \ c_0 d_1 \ c_0 d_2 \ c_0 d_3 \ c_1 d_0 \ c_1 d_1 \ c_1 d_2 \ c_1 d_3]^T$; since one of $c_0$ and $d_0$ can be fixed to 1, others may be one of the two alternate forms for W. In one instance, $W = [d_0 \ d_1 \ d_2 \ d_3 \ c_1 d_0 \ c_1 d_1 \ c_1 d_2 \ c_1 d_3]^T$. In one instance, $W = [c_0 \ c_0 d_1 \ c_0 d_2 \ c_0 d_3 \ c_1 \ c_1 d_1 \ c_1 d_2 \ c_1 d_3]^T$. If both $c_0$ and $d_0$ are fixed to 1, then $W = [1 \ d_1 \ d_2 \ d_3 \ c_1 \ c_1 d_1 \ c_1 d_2 \ c_1 d_3]^T$.

If $W = d \otimes c$, then, for $N_g = 2$: $W = [c_0 d_0 \ c_1 d_0 \ c_0 d_1 \ c_1 d_1]^T$; since one of $c_0$ and $d_0$ can be fixed to 1, there may be one of the two alternate forms for W. In one instance, $W = [d_0 \ c_1 d_0 \ d_1 \ c_1 d_1]^T$. In one instance, $W = [c_0 \ c_1 \ c_0 d_1 \ c_1 d_1]^T$. If $W = d \otimes c$, then, for $N_g = 4$: $W = [c_0 d_0 \ c_1 d_0 \ c_0 d_1 \ c_1 d_1 \ c_0 d_2 \ c_1 d_2 \ c_0 d_3 \ c_1 d_3]^T$; since one of $c_0$ and $d_0$ can be fixed to 1, there may be one of the two alternate forms for W. In one instance, $= [d_0 \ c_1 d_0 \ d_1 \ c_1 d_1 \ d_2 \ c_1 d_2 \ d_3 \ c_1 d_3]^T$. In one instance, $W = [c_0 \ c_1 \ c_0 d_1 \ c_1 d_1 \ c_0 d_2 \ c_1 d_2 \ c_0 d_3 \ c_1 d_3]^T$.

In one example of Alt A 1-1 (per panel phase): $W = [1 \ c_1 \ c_2 \ c_3 \ldots c_{2N_g-1}]^T$, where $\{c_i\}$ are independent phase for $N_g$ panels and 2 polarizations. For $N_g = 2$: $W = [1 \ c_1 \ c_2 \ c_3]^T$. For $N_g = 4$: $W = [1 \ c_1 \ c_2 \ c_3 \ c4 \ c_5 \ c_6 \ c_7]^T$.

The codebook to report the pre-coder W is at least one of BPSK $\{1,-1\}$ or QPSK $\{1,j,-1,-j\}$ or two stage $a_{WB} b_{WB}$ where $a_{WB}$ and $a_{SB}$ codebooks are according to at least one of the following: $a_{WB} = \{1, j, -1, -j\}$ (2 bit WB phase) and $a_{SB} = \{1, j\}$ (1-bit SB phase); $a_{WB} = \{1, j, -1, -j\}$ (2 bit WB phase) and $a_{SB} = \{1, -j\}$ (1-bit SB phase); $a_{WB} = \{1, j, -1, -j\}$ (2 bit WB phase) and $$a_{SB} = \left\{ e^{-\frac{j\pi}{4}}, e^{\frac{j\pi}{4}} \right\}$$

(1-bit SB phase);

$$a_{WB} = \left\{ e^{\frac{j\pi}{4}}, e^{\frac{j3\pi}{4}}, e^{\frac{j5\pi}{4}}, e^{\frac{j7\pi}{4}} \right\}$$

(2 bit WB phase) and $$a_{SB} = \left\{ e^{-\frac{j\pi}{4}}, e^{\frac{j\pi}{4}} \right\}$$

(1-bit SB phase);

$$a_{WB} = \left\{ e^{\frac{j\pi}{4}}, e^{\frac{j3\pi}{4}}, e^{\frac{j5\pi}{4}}, e^{\frac{j7\pi}{4}} \right\}$$

(2 bit WB phase) and $a_{SB} = \{1, -j\}$ (1-bit SB phase); and $$a_{WB} = \left\{ e^{\frac{j\pi}{4}}, e^{\frac{j3\pi}{4}}, e^{\frac{j5\pi}{4}}, e^{\frac{j7\pi}{4}} \right\}$$

(2 bit WB phase) and $a_{SB} = \{1, j\}$ (1-bit SB phase).

In one embodiment A2, the multi-panel codebook for $(N_g, N_1, N_2) \in \{(2,1,1),(4,1,1)\}$ is based on a modular approach where the multi-panel pre-coder vector/matrix $W_{MP}$ is built from the single-panel pre-coder vector/matrix $W_{SP}$ as follows. In one example of $N_g = 2$:

$$\text{Rank 1: } W_{MP} = \begin{bmatrix} W_{SP} \\ e^{j\alpha_1} W_{SP} \end{bmatrix} = \begin{bmatrix} W \\ e^{j\alpha_1} W \end{bmatrix} = \begin{bmatrix} 1 \\ e^{j\beta} \\ e^{j\alpha_1} \\ e^{j(\alpha_1+\beta)} \end{bmatrix}; \text{ and}$$

$$\text{Rank 2: } W_{MP} = \begin{bmatrix} W_{SP} \\ e^{j\alpha_1} W_{SP} \end{bmatrix} = \begin{bmatrix} W \\ e^{j\alpha_1} W \end{bmatrix} = \begin{bmatrix} 1 & 1 \\ e^{j\beta} & -e^{j\beta} \\ e^{j\alpha_1} & e^{j\alpha_1} \\ e^{j(\alpha_1+\beta)} & -e^{j(\alpha_1+\beta)} \end{bmatrix}.$$

In one example of $N_g = 4$:

$$\text{Rank 1: } W_{MP} = \begin{bmatrix} W_{SP} \\ e^{j\alpha} W_{SP} \end{bmatrix} = \begin{bmatrix} W \\ e^{j\alpha_1} W \\ e^{j\alpha_2} W \\ e^{j\alpha_3} W \end{bmatrix} = \begin{bmatrix} 1 \\ e^{j\beta} \\ e^{j\alpha_1} \\ e^{j(\alpha_1+\beta)} \\ e^{j\alpha_2} \\ e^{j(\alpha_2+\beta)} \\ e^{j\alpha_3} \\ e^{j(\alpha_3+\beta)} \end{bmatrix}; \text{ and}$$

$$\text{Rank 2: } W_{MP} = \begin{bmatrix} W_{SP} \\ e^{j\alpha} W_{SP} \end{bmatrix} = \begin{bmatrix} W \\ e^{j\alpha_1} W \\ e^{j\alpha_2} W \\ e^{j\alpha_3} W \end{bmatrix} = \begin{bmatrix} 1 & 1 \\ e^{j\beta} & -e^{j\beta} \\ e^{j\alpha_1} & e^{j\alpha_1} \\ e^{j(\alpha_1+\beta)} & -e^{j(\alpha_1+\beta)} \\ e^{j\alpha_2} & e^{j\alpha_2} \\ e^{j(\alpha_2+\beta)} & -e^{j(\alpha_2+\beta)} \\ e^{j\alpha_3} & e^{j\alpha_3} \\ e^{j(\alpha_3+\beta)} & -e^{j(\alpha_3+\beta)} \end{bmatrix},$$

where the selection of $W_{SP}$ is limited to be the same for all panels; and the inter-panel phase $e^{j\alpha_i}$ (i=1 or 1-3) can be reported either WB or SB or both WB and SB; and the co-phase $e^{jk\beta}$ is reported SB.

In one embodiment A3, a UE is configured with a PMI codebook for $(N_g, N_1, N_2) \in \{(2,1,1),(4,1,1)\}$ as follows. For 4 antenna ports (e.g. {3000, 3001 . . . , 3003}), 8 antenna ports (e.g. {3000, 3001 . . . , 3007}), and the UE configured with higher layer parameters CodebookType set to Type1_MultiPanel and CodebookParameters set to Type1_Parameters which includes {NumberOfPanels, CodebookConfig-N1, CodebookConfig-N2, Codebook-Mode}. The values of $N_g$, $N_1$, and $N_2$ are configured with the higher-layer parameters NumberOfPanels, CodebookConfig-N1 and CodebookConfig-N2, respectively. The number of CSI-RS ports, $P_{CSI-RS}$, is $2N_gN_1N_2$ which equals $2N_g$ if $(N_1,N_2)=(1,1)$. When $N_g=2$, CodebookMode may be set to either Config1 or Config2. When $N_g=4$, CodebookMode may be set to Config1.

Each PMI value corresponds to the codebook indices $i_1$ and $i_2$, where $i_1$ is the vector given by:

$$i_1 = \begin{cases} [i_{1,1} \ i_{1,2} \ i_{1,4}] & v=1 \\ [i_{1,1} \ i_{1,2} \ i_{1,3} \ i_{1,4}] & v \in \{2,3,4\} \end{cases}$$

and v is the associated RI value. When CodebookMode is set to Config1, $i_{1,4}$ is $$i_{1,4} = \begin{cases} i_{1,4,1} & N_g = 2 \\ [i_{1,4,1} \ i_{1,4,2} \ i_{1,4,3}] & N_g = 4 \end{cases}.$$

When CodebookMode is set to Config2, $i_{1,4}$ and $i_2$ are $$i_{1,4} = [i_{1,4,1} \ i_{1,4,2}]$$
$$i_2 = [i_{2,0} \ i_{2,1} \ i_{2,2}].$$

A UE may only use $i_{1,2}=0$ and may not report $i_{1,2}$ if the value of CodebookConfig-N1 is set to greater than 1 and CodebookConfig-N2 is set to 1. A UE may only use $i_{1,1} = i_{1,2} = i_{1,3} = 0$ and may not report $i_{1,1}$, $i_{1,2}$, and $i_{1,3}$ if the value of CodebookConfig-N1 and CodebookConfig-N2 are set to 1.

The quantities $\varphi_n$, $a_p$, $b_n$, $u_m$, and $v_{l,m}$ are given by $$\varphi_n = e^{j\pi n/2}$$
$$a_p = e^{j\pi/4} e^{j\pi p/2}$$
$$b_n = e^{-j\pi/4} e^{j\pi n/2}$$

$$u_m = \begin{cases} \left[1 \ e^{j\frac{2\pi m}{O_2 N_2}} \ \ldots \ e^{j\frac{2\pi m(N_2-1)}{O_2 N_2}}\right] & N_2 > 1 \\ 1 & N_2 = 1 \end{cases}$$

$$v_{l,m} = \begin{cases} \left[u_m \ e^{j\frac{2\pi l}{O_1 N_1}} u_m \ \ldots \ e^{j\frac{2\pi l(N_1-1)}{O_1 N_1}} u_m\right]^T & N_2 > 1 \\ 1 & N_1 = N_2 = 1 \text{ or} \\ & l = m = 0 \end{cases}.$$

Furthermore, the quantities $W_{l,m,p,n}^{1,N_g,1}$, $W_{l,m,p,n}^{2,N_g,1}$, $W_{l,m,p,n}^{3,N_g,1}$, and $W_{l,m,p,n}^{4,N_g,1}$ ($N_g \in [2,4]$) are given by:

$$W_{l,m,p,n}^{1,2,1} = \frac{1}{\sqrt{P_{CSI-RS}}} \begin{bmatrix} v_{l,m} \\ \varphi_n v_{l,m} \\ \varphi_{p_1} v_{l,m} \\ \varphi_n \varphi_{p_1} v_{l,m} \end{bmatrix}$$

$$W_{l,m,p,n}^{2,2,1} = \frac{1}{\sqrt{P_{CSI-RS}}} \begin{bmatrix} v_{l,m} \\ -\varphi_n v_{l,m} \\ \varphi_{p_1} v_{l,m} \\ -\varphi_n \varphi_{p_1} v_{l,m} \end{bmatrix}$$

$$W_{l,m,p,n}^{3,2,1} = \frac{1}{\sqrt{P_{CSI-RS}}} \begin{bmatrix} v_{l,m} \\ \varphi_n v_{l,m} \\ -\varphi_{p_1} v_{l,m} \\ -\varphi_n \varphi_{p_1} v_{l,m} \end{bmatrix}$$

$$W_{l,m,p,n}^{4,2,1} = \frac{1}{\sqrt{P_{CSI-RS}}} \begin{bmatrix} v_{l,m} \\ -\varphi_n v_{l,m} \\ -\varphi_{p_1} v_{l,m} \\ \varphi_n \varphi_{p_1} v_{l,m} \end{bmatrix}$$

$$W_{l,m,p,n}^{1,4,1} = \frac{1}{\sqrt{P_{CSI-RS}}} \begin{bmatrix} v_{l,m} \\ \varphi_n v_{l,m} \\ \varphi_{p_1} v_{l,m} \\ \varphi_n \varphi_{p_1} v_{l,m} \\ \varphi_{p_2} v_{l,m} \\ \varphi_n \varphi_{p_2} v_{l,m} \\ \varphi_{p_3} v_{l,m} \\ \varphi_n \varphi_{p_3} v_{l,m} \end{bmatrix}$$

$$W_{l,m,p,n}^{2,4,1} = \frac{1}{\sqrt{P_{CSI-RS}}} \begin{bmatrix} v_{l,m} \\ -\varphi_n v_{l,m} \\ \varphi_{p_1} v_{l,m} \\ -\varphi_n \varphi_{p_1} v_{l,m} \\ \varphi_{p_2} v_{l,m} \\ -\varphi_n \varphi_{p_2} v_{l,m} \\ \varphi_{p_3} v_{l,m} \\ -\varphi_n \varphi_{p_3} v_{l,m} \end{bmatrix}$$

$$W_{l,m,p,n}^{3,4,1} = \frac{1}{\sqrt{P_{CSI-RS}}} \begin{bmatrix} v_{l,m} \\ \varphi_n v_{l,m} \\ -\varphi_{p_1} v_{l,m} \\ -\varphi_n \varphi_{p_1} v_{l,m} \\ \varphi_{p_2} v_{l,m} \\ \varphi_n \varphi_{p_2} v_{l,m} \\ -\varphi_{p_3} v_{l,m} \\ -\varphi_n \varphi_{p_3} v_{l,m} \end{bmatrix}$$

$$W_{l,m,p,n}^{4,4,1} = \frac{1}{\sqrt{P_{CSI-RS}}} \begin{bmatrix} v_{l,m} \\ -\varphi_n v_{l,m} \\ -\varphi_{p_1} v_{l,m} \\ \varphi_n \varphi_{p_1} v_{l,m} \\ \varphi_{p_2} v_{l,m} \\ -\varphi_n \varphi_{p_2} v_{l,m} \\ -\varphi_{p_3} v_{l,m} \\ \varphi_n \varphi_{p_3} v_{l,m} \end{bmatrix}$$

where $p = \begin{cases} p_1 & N_g = 2 \\ [p_1 \ p_2 \ p_3] & N_g = 4 \end{cases}$, and the quantities $W_{l,m,p,n}^{1,N_g,2}$, $W_{l,m,p,n}^{2,N_g,2}$, $W_{l,m,p,n}^{3,N_g,2}$, and $W_{l,m,p,n}^{4,N_g,2}$ ($N_g = 2$) are given by:

$$W_{l,m,p,n}^{1,2,2} = \frac{1}{\sqrt{P_{CSI-RS}}} \begin{bmatrix} v_{l,m} \\ \varphi_{n_0} v_{l,m} \\ a_{p_1} b_{n_1} v_{l,m} \\ a_{p_2} b_{p_2} v_{l,m} \end{bmatrix}$$

$$W_{l,m,p,n}^{2,2,2} = \frac{1}{\sqrt{P_{CSI-RS}}} \begin{bmatrix} v_{l,m} \\ -\varphi_{n_0} v_{l,m} \\ a_{p_1} b_{n_1} v_{l,m} \\ -a_{p_2} b_{p_2} v_{l,m} \end{bmatrix}$$

$$W_{l,m,p,n}^{3,2,2} = \frac{1}{\sqrt{P_{CSI-RS}}} \begin{bmatrix} v_{l,m} \\ \varphi_{n_0} v_{l,m} \\ -a_{p_1} b_{n_1} v_{l,m} \\ -a_{p_2} b_{p_2} v_{l,m} \end{bmatrix}$$

$$W_{l,m,p,n}^{4,2,2} = \frac{1}{\sqrt{P_{CSI-RS}}} \begin{bmatrix} v_{l,m} \\ -\varphi_{n_0} v_{l,m} \\ -a_{p_1} b_{n_1} v_{l,m} \\ a_{p_2} b_{p_2} v_{l,m} \end{bmatrix}$$

where
$p = [p_1 \ p_2]$
$n = [n_0 \ n_1 \ n_2]$.

The codebooks for 1-4 layers are given respectively in TABLES 54-57, where $(k_1, k_2) = (0, 0)$ if $(N_1, N_2) = (1, 1)$.

TABLE 54

Codebook for 1-layer CSI reporting using antenna ports [3000 to 2999 + $P_{CSI-RS}$]

| | | Config1, $(N_g, N_1, N_2) \in \{(2, 1, 1), (4, 1, 1)\}$ | | |
|---|---|---|---|---|
| $i_{1,1}$ | $i_{1,2}$ | $i_{1,4,q}$, q = 1, ..., $N_g$ − 1 | $i_2$ | |
| 0 | 0 | 0, 1, 2, 3 | 0, 1, 2, 3 | $W_{i_{1,1}, i_{1,2}, i_{1,4}, i_2}^{(1)}$ |
| | | where $W_{l,m,p,n}^{(1)} = W_{l,m,p,n}^{1,N_g,1}$. | | |

| | | Config2, $(N_g, N_1, N_2) = (2, 1, 1)$ | | | |
|---|---|---|---|---|---|
| $i_{1,1}$ | $i_{1,2}$ | $i_{1,4,q}$, q = 1, 2 | $i_{2,0}$ | $i_{2,q}$, q = 1, 2 | |
| 0 | 0 | 0, 1, 2, 3 | 0, 1, 2, 3 | 0, 1 | $W_{i_{1,1}, i_{1,2}, i_{1,4}, i_2}^{(1)}$ |
| | | where $W_{l,m,p,n}^{(1)} = W_{l,m,p,n}^{1,N_g,2}$. | | | |

TABLE 55

Codebook for 2-layer CSI reporting using antenna ports [3000 to 2999 + $P_{CSI-RS}$]

| | | Config1, $(N_g, N_1, N_2) \in \{(2, 1, 1), (4, 1, 1)\}$ | | |
|---|---|---|---|---|
| $i_{1,1}$ | $i_{1,2}$ | $i_{1,4,q}$, q = 1, ..., $N_g$ − 1 | $i_2$ | |
| 0 | 0 | 0, 1, 2, 3 | 0, 1 | $W_{i_{1,1}, j_{1,1}+k_1, i_{1,2}, j_{1,2}+k_2, i_{1,4}, i_2}^{(2)}$ |
| | | where $W_{l,l',m,m',p,n}^{(2)} = \frac{1}{\sqrt{2}}\left[W_{l,m,p,n}^{1,N_g,1} \ W_{l',m',p,n}^{2,N_g,1}\right]$. | | |

| | | Config2, $(N_g, N_1, N_2) = (2, 1, 1)$ | | |
|---|---|---|---|---|
| $i_{1,1}$ | $i_{1,2}$ | $i_{1,4,q}$, q = 1, 2 | $i_{2,q}$, q = 0, 1, 2 | |
| 0 | 0 | 0, 1, 2, 3 | 0, 1 | $W_{i_{1,1}, j_{1,1}+k_1, i_{1,2}, j_{1,2}+k_2, i_{1,4}, i_2}^{(2)}$ |
| | | where $W_{l,l',m,m',p,n}^{(2)} = \frac{1}{\sqrt{2}}\left[W_{l,m,p,n}^{1,N_g,2} \ W_{l',m',p,n}^{2,N_g,2}\right]$. | | |

TABLE 56

Codebook for 3-layer CSI reporting using antenna ports [3000 to 2999+$_{CSI-RS}$]

| | | Config1, $(N_g, N_1, N_2) \in \{(2, 1, 1), (4, 1, 1)\}$ | | |
|---|---|---|---|---|
| $i_{1,1}$ | $i_{1,2}$ | $i_{1,4,q}$, q = 1, ..., $N_g$ − 1 | $i_2$ | |
| 0 | 0 | 0, 1, 2, 3 | 0, 1 | $W_{i_{1,1}, j_{1,1}+k_1, i_{1,2}, j_{1,2}+k_2, i_{1,4}, i_2}^{(3)}$ |
| | | where $W_{l,l',m,m',p,n}^{(3)} = \frac{1}{\sqrt{3}}\left[W_{l,m,p,n}^{1,N_g,1} \ W_{l',m',p,n}^{2,N_g,1} \ W_{l,m,p,n}^{3,N_g,1}\right]$. | | |

| | | Config2, $(N_g, N_1, N_2) = (2, 1, 1)$ | | |
|---|---|---|---|---|
| $i_{1,1}$ | $i_{1,2}$ | $i_{1,4,q}$, q = 1, 2 | $i_{2,q}$, q = 0, 1, 2 | |
| 0 | 0 | 0, 1, 2, 3 | 0, 1 | $W_{i_{1,1}, j_{1,1}+k_1, i_{1,2}, j_{1,2}+k_2, i_{1,4}, i_2}^{(3)}$ |
| | | where $W_{l,l',m,m',p,n}^{(3)} = \frac{1}{\sqrt{3}}\left[W_{l,m,p,n}^{1,N_g,2} \ W_{l',m',p,n}^{2,N_g,2} \ W_{l,m,p,n}^{3,N_g,2}\right]$. | | |

TABLE 57

Codebook for 4-layer CSI reporting using antenna ports [3000 to 2999 + $P_{CSI-RS}$]

| | | Config1, $(N_g, N_1, N_2) \in \{(2, 1, 1), (4, 1, 1)\}$ | | |
|---|---|---|---|---|
| $i_{1,1}$ | $i_{1,2}$ | $i_{1,4,q}$, q = 1, ..., $N_g$ − 1 | $i_2$ | |
| 0 | 0 | 0, 1, 2, 3 | 0, 1 | $W_{i_{1,1}, j_{1,1}+k_1, i_{1,2}, j_{1,2}+k_2, i_{1,4}, i_2}^{(4)}$ |

TABLE 57-continued

Codebook for 4-layer CSI reporting using antenna ports [3000 to 2999 + $P_{CSI-RS}$]

where $W^{(4)}_{l,l',m,m',p,n} = \frac{1}{\sqrt{4}}[W^{1,N_g,1}_{l,m,p,n} \quad W^{2,N_g,1}_{l',m',p,n} \quad W^{3,N_g,1}_{l,m,p,n} \quad W^{4,N_g,1}_{l',m',p,n}]$.

Config2, $(N_g, N_1, N_2) = (2, 1, 1)$

| $i_{1,1}$ | $i_{1,2}$ | $i_{1,4,q}$, q = 1, 2 | $i_{2,q}$, q = 0, 1, 2 | |
|---|---|---|---|---|
| 0 | 0 | 0, 1, 2, 3 | 0, 1 | $W^{(4)}_{i_{1,1},i_{1,1}+k_1,i_{1,2},i_{1,2}+k_2,i_{1,4},i_2}$ | where $W^{(4)}_{l,l',m,m',p,n} = \frac{1}{\sqrt{4}}[W^{1,N_g,2}_{l,m,p,n} \quad W^{2,N_g,2}_{l',m',p,n} \quad W^{3,N_g,2}_{l,m,p,n} \quad W^{4,N_g,2}_{l',m',p,n}]$.

In one embodiment A3A, the 1-4 layer codebooks for Config2 given respectively in TABLES 54-57 are also supported for $N_g=4$, where $i_{1,4}$ and $i_2$ are replaced with the following:

$$i_{1,4} = \begin{cases} [i_{1,4,1} \quad i_{1,4,2}] & N_g = 2 \\ [i_{1,4,1} \quad i_{1,4,2} \quad i_{1,4,3} \quad i_{1,4,4} \quad i_{1,4,5} \quad i_{1,4,6}] & N_g = 4 \end{cases}$$

$$i_{1,4,q} \in \{0, 1, 2, 3\}, q = 1, \ldots, 2(N_g - 1)$$

$$i_2 = \begin{cases} [i_{2,0} \quad i_{2,1} \quad i_{2,2}] & N_g = 2 \\ [i_{2,0} \quad i_{2,1} \quad i_{2,2} \quad i_{2,3} \quad i_{2,4} \quad i_{2,5} \quad i_{2,6}] & N_g = 4 \end{cases};$$

and the quantities $W^{1,N_g,2}_{l,m,p,n}$, $W^{2,N_g,2}_{l,m,p,n}$, $i_{2,q} \in \{0,1\}, q=1, \ldots, 2(N_g-1)$ $i_{2,0} \in \{0,1,2,3\}$ $v=1$ $i_{2,0} \in \{0,1\}$ $v=2,3,4$ $W^{3,N_g,2}_{l,m,p,n}$ and $W^{4,N_g,2}_{l,m,p,n}$ for $N_g=4$ are given by:

$$W^{1,4,2}_{l,m,p,n} = \frac{1}{\sqrt{P_{CSI-RS}}} \begin{bmatrix} v_{l,m} \\ \varphi_{n_0} v_{l,m} \\ a_{p_1} b_{n_1} v_{l,m} \\ a_{p_2} b_{n_2} v_{l,m} \\ a_{p_3} b_{n_3} v_{l,m} \\ a_{p_4} b_{n_4} v_{l,m} \\ a_{p_5} b_{n_5} v_{l,m} \\ a_{p_6} b_{n_6} v_{l,m} \end{bmatrix}$$

$$W^{2,4,2}_{l,m,p,n} = \frac{1}{\sqrt{P_{CSI-RS}}} \begin{bmatrix} v_{l,m} \\ -\varphi_{n_0} v_{l,m} \\ a_{p_1} b_{n_1} v_{l,m} \\ -a_{p_2} b_{n_2} v_{l,m} \\ a_{p_3} b_{n_3} v_{l,m} \\ -a_{p_4} b_{n_4} v_{l,m} \\ a_{p_5} b_{n_5} v_{l,m} \\ -a_{p_6} b_{n_6} v_{l,m} \end{bmatrix}$$

$$W^{3,4,2}_{l,m,p,n} = \frac{1}{\sqrt{P_{CSI-RS}}} \begin{bmatrix} v_{l,m} \\ \varphi_{n_0} v_{l,m} \\ -a_{p_1} b_{n_1} v_{l,m} \\ -a_{p_2} b_{n_2} v_{l,m} \\ a_{p_3} b_{n_3} v_{l,m} \\ a_{p_4} b_{n_4} v_{l,m} \\ -a_{p_5} b_{n_5} v_{l,m} \\ -a_{p_6} b_{n_6} v_{l,m} \end{bmatrix}$$

$$W^{4,4,2}_{l,m,p,n} = \frac{1}{\sqrt{P_{CSI-RS}}} \begin{bmatrix} v_{l,m} \\ -\varphi_{n_0} v_{l,m} \\ -a_{p_1} b_{n_1} v_{l,m} \\ a_{p_2} b_{n_2} v_{l,m} \\ a_{p_3} b_{n_3} v_{l,m} \\ -a_{p_4} b_{n_4} v_{l,m} \\ -a_{p_5} b_{n_5} v_{l,m} \\ a_{p_6} b_{n_6} v_{l,m} \end{bmatrix}$$

where $p = [p_1 \quad p_2 \quad p_3 \quad p_4 \quad p_5 \quad p_6]$ $n = [n_0 \quad n_1 \quad n_2 \quad n_3 \quad n_4 \quad n_5 \quad n_6]$.

In one embodiment A3B, the pre-coding matrix expression in the 3 layer codebook TABLE 56 is replaced with one of following:

$$W^{(3)}_{l,l',m,m',p,n} = \frac{1}{\sqrt{3}}[W^{1,N_g,1}_{l,m,p,n} \quad W^{2,N_g,1}_{l',m',p,n} \quad W^{4,N_g,1}_{l,m,p,n}]$$

for Config1 and $$W^{(3)}_{l,l',m,m',p,n} = \frac{1}{\sqrt{3}}[W^{1,N_g,2}_{l,m,p,n} \quad W^{2,N_g,2}_{l',m',p,n} \quad W^{4,N_g,2}_{l,m,p,n}]$$

for Config2;

$$W^{(3)}_{l,l',m,m',p,n} = \frac{1}{\sqrt{3}}[W^{1,N_g,1}_{l,m,p,n} \quad W^{3,N_g,1}_{l',m',p,n} \quad W^{4,N_g,1}_{l,m,p,n}]$$

for Config1 and $$W^{(3)}_{l,l',m,m',p,n} = \frac{1}{\sqrt{3}}[W^{1,N_g,2}_{l,m,p,n} \quad W^{3,N_g,2}_{l',m',p,n} \quad W^{4,N_g,2}_{l,m,p,n}]$$

for Config2; and $$W^{(3)}_{l,l',m,m',p,n} = \frac{1}{\sqrt{3}}[W^{2,N_g,1}_{l,m,p,n} \quad W^{3,N_g,1}_{l',m',p,n} \quad W^{4,N_g,1}_{l,m,p,n}]$$

for Config1 and $$W^{(3)}_{l,l',m,m',p,n} = \frac{1}{\sqrt{3}} [ W^{2,N_g,2}_{l,m,p,n} \quad W^{3,N_g,2}_{l',m',p,n} \quad W^{4,N_g,2}_{l,m,p,n} ]$$

for Config2.

In one embodiment A3C, the quantities $W_{l,m,p,n}^{1,N_g,1}$, $W_{l,m,p,n}^{2,N_g,1}$, $W_{l,m,p,n}^{3,N_g,1}$ and $W_{l,m,p,n}^{4,N_g,1}$ for $N_g=4$ in TABLES 54-57 are given by:

$$W^{1,4,1}_{l,m,p,n} = \frac{1}{\sqrt{P_{CSI-RS}}} \begin{bmatrix} v_{l,m} \\ \varphi_n v_{l,m} \\ \varphi_{p_1} v_{l,m} \\ \varphi_n \varphi_{p_1} v_{l,m} \\ \varphi_{p_2} v_{l,m} \\ \varphi_n \varphi_{p_2} v_{l,m} \\ \varphi_{p_3} v_{l,m} \\ \varphi_n \varphi_{p_3} v_{l,m} \end{bmatrix}$$

$$W^{2,4,1}_{l,m,p,n} = \frac{1}{\sqrt{P_{CSI-RS}}} \begin{bmatrix} v_{l,m} \\ \varphi_n v_{l,m} \\ -\varphi_{p_1} v_{l,m} \\ -\varphi_n \varphi_{p_1} v_{l,m} \\ \varphi_{p_2} v_{l,m} \\ \varphi_n \varphi_{p_2} v_{l,m} \\ -\varphi_{p_3} v_{l,m} \\ -\varphi_n \varphi_{p_3} v_{l,m} \end{bmatrix}$$

$$W^{3,4,1}_{l,m,p,n} = \frac{1}{\sqrt{P_{CSI-RS}}} \begin{bmatrix} v_{l,m} \\ \varphi_n v_{l,m} \\ \varphi_{p_1} v_{l,m} \\ \varphi_n \varphi_{p_1} v_{l,m} \\ -\varphi_{p_2} v_{l,m} \\ -\varphi_n \varphi_{p_2} v_{l,m} \\ -\varphi_{p_3} v_{l,m} \\ -\varphi_n \varphi_{p_3} v_{l,m} \end{bmatrix}$$

$$W^{4,4,1}_{l,m,p,n} = \frac{1}{\sqrt{P_{CSI-RS}}} \begin{bmatrix} v_{l,m} \\ \varphi_n v_{l,m} \\ -\varphi_{p_1} v_{l,m} \\ -\varphi_n \varphi_{p_1} v_{l,m} \\ -\varphi_{p_2} v_{l,m} \\ -\varphi_n \varphi_{p_2} v_{l,m} \\ \varphi_{p_3} v_{l,m} \\ \varphi_n \varphi_{p_3} v_{l,m} \end{bmatrix}$$

and the quantities $W_{l,m,p,n}^{1,N_g,2}$, $W_{l,m,p,n}^{2,N_g,2}$, $W_{l,m,p,n}^{3,N_g,2}$ and $W_{l,m,p,n}^{4,N_g,2}$ for $N_g=4$ are given by:

$$W^{1,4,2}_{l,m,p,n} = \frac{1}{\sqrt{P_{CSI-RS}}} \begin{bmatrix} v_{l,m} \\ \varphi_{n_0} v_{l,m} \\ a_{p_1} b_{n_1} v_{l,m} \\ a_{p_2} b_{n_2} v_{l,m} \\ a_{p_3} b_{n_3} v_{l,m} \\ a_{p_4} b_{n_4} v_{l,m} \\ a_{p_5} b_{n_5} v_{l,m} \\ a_{p_6} b_{n_6} v_{l,m} \end{bmatrix}$$

$$W^{2,4,2}_{l,m,p,n} = \frac{1}{\sqrt{P_{CSI-RS}}} \begin{bmatrix} v_{l,m} \\ \varphi_{n_0} v_{l,m} \\ -a_{p_1} b_{n_1} v_{l,m} \\ -a_{p_2} b_{n_2} v_{l,m} \\ a_{p_3} b_{n_3} v_{l,m} \\ a_{p_4} b_{n_4} v_{l,m} \\ -a_{p_5} b_{n_5} v_{l,m} \\ -a_{p_6} b_{n_6} v_{l,m} \end{bmatrix}$$

$$W^{3,4,2}_{l,m,p,n} = \frac{1}{\sqrt{P_{CSI-RS}}} \begin{bmatrix} v_{l,m} \\ \varphi_{n_0} v_{l,m} \\ a_{p_1} b_{n_1} v_{l,m} \\ a_{p_2} b_{n_2} v_{l,m} \\ -a_{p_3} b_{n_3} v_{l,m} \\ -a_{p_4} b_{n_4} v_{l,m} \\ -a_{p_5} b_{n_5} v_{l,m} \\ -a_{p_6} b_{n_6} v_{l,m} \end{bmatrix}$$

$$W^{4,4,2}_{l,m,p,n} = \frac{1}{\sqrt{P_{CSI-RS}}} \begin{bmatrix} v_{l,m} \\ \varphi_{n_0} v_{l,m} \\ -a_{p_1} b_{n_1} v_{l,m} \\ -a_{p_2} b_{n_2} v_{l,m} \\ -a_{p_3} b_{n_3} v_{l,m} \\ -a_{p_4} b_{n_4} v_{l,m} \\ a_{p_5} b_{n_5} v_{l,m} \\ a_{p_6} b_{n_6} v_{l,m} \end{bmatrix}.$$

In one embodiment A3D, the quantities $W_{l,m,p,n}^{1,N_g,1}$, $W_{l,m,p,n}^{2,N_g,1}$, $W_{l,m,p,n}^{3,N_g,1}$ and $W_{l,m,p,n}^{4,N_g,1}$ for $N_g=4$ in TABLES 54-57 are given by:

$$W^{1,4,1}_{l,m,p,n} = \frac{1}{\sqrt{P_{CSI-RS}}} \begin{bmatrix} v_{l,m} \\ -\varphi_n v_{l,m} \\ \varphi_{p_1} v_{l,m} \\ -\varphi_n \varphi_{p_1} v_{l,m} \\ \varphi_{p_2} v_{l,m} \\ -\varphi_n \varphi_{p_2} v_{l,m} \\ \varphi_{p_3} v_{l,m} \\ -\varphi_n \varphi_{p_3} v_{l,m} \end{bmatrix}$$

$$W_{l,m,p,n}^{2,4,1} = \frac{1}{\sqrt{P_{CSI-RS}}} \begin{bmatrix} v_{l,m} \\ -\varphi_n v_{l,m} \\ -\varphi_{p_1} v_{l,m} \\ \varphi_n \varphi_{p_1} v_{l,m} \\ \varphi_{p_2} v_{l,m} \\ -\varphi_n \varphi_{p_2} v_{l,m} \\ -\varphi_{p_3} v_{l,m} \\ \varphi_n \varphi_{p_3} v_{l,m} \end{bmatrix}$$

$$W_{l,m,p,n}^{3,4,1} = \frac{1}{\sqrt{P_{CSI-RS}}} \begin{bmatrix} v_{l,m} \\ -\varphi_n v_{l,m} \\ \varphi_{p_1} v_{l,m} \\ -\varphi_n \varphi_{p_1} v_{l,m} \\ -\varphi_{p_2} v_{l,m} \\ \varphi_n \varphi_{p_2} v_{l,m} \\ -\varphi_{p_3} v_{l,m} \\ \varphi_n \varphi_{p_3} v_{l,m} \end{bmatrix}$$

$$W_{l,m,p,n}^{4,4,1} = \frac{1}{\sqrt{P_{CSI-RS}}} \begin{bmatrix} v_{l,m} \\ -\varphi_n v_{l,m} \\ -\varphi_{p_1} v_{l,m} \\ \varphi_n \varphi_{p_1} v_{l,m} \\ -\varphi_{p_2} v_{l,m} \\ \varphi_n \varphi_{p_2} v_{l,m} \\ \varphi_{p_3} v_{l,m} \\ -\varphi_n \varphi_{p_3} v_{l,m} \end{bmatrix}$$

and the quantities $W_{l,m,p,n}^{1,N_g,2}$, $W_{l,m,p,n}^{2,N_g,2}$, $W_{l,m,p,n}^{3,N_g,2}$ and $W_{l,m,p,n}^{4,N_g,2}$ for $N_g=4$ are given by:

$$W_{l,m,p,n}^{1,4,2} = \frac{1}{\sqrt{P_{CSI-RS}}} \begin{bmatrix} v_{l,m} \\ -\varphi_{n_0} v_{l,m} \\ a_{p_1} b_{n_1} v_{l,m} \\ -a_{p_2} b_{n_2} v_{l,m} \\ a_{p_3} b_{n_3} v_{l,m} \\ -a_{p_4} b_{n_4} v_{l,m} \\ a_{p_5} b_{n_5} v_{l,m} \\ -a_{p_6} b_{n_6} v_{l,m} \end{bmatrix}$$

$$W_{l,m,p,n}^{2,4,2} = \frac{1}{\sqrt{P_{CSI-RS}}} \begin{bmatrix} v_{l,m} \\ -\varphi_{n_0} v_{l,m} \\ -a_{p_1} b_{n_1} v_{l,m} \\ a_{p_2} b_{n_2} v_{l,m} \\ a_{p_3} b_{n_3} v_{l,m} \\ -a_{p_4} b_{n_4} v_{l,m} \\ -a_{p_5} b_{n_5} v_{l,m} \\ a_{p_6} b_{n_6} v_{l,m} \end{bmatrix}$$

$$W_{l,m,p,n}^{3,4,2} = \frac{1}{\sqrt{P_{CSI-RS}}} \begin{bmatrix} v_{l,m} \\ -\varphi_{n_0} v_{l,m} \\ a_{p_1} b_{n_1} v_{l,m} \\ -a_{p_2} b_{n_2} v_{l,m} \\ -a_{p_3} b_{n_3} v_{l,m} \\ a_{p_4} b_{n_4} v_{l,m} \\ -a_{p_5} b_{n_5} v_{l,m} \\ a_{p_6} b_{n_6} v_{l,m} \end{bmatrix}$$

$$W_{l,m,p,n}^{4,4,2} = \frac{1}{\sqrt{P_{CSI-RS}}} \begin{bmatrix} v_{l,m} \\ -\varphi_{n_0} v_{l,m} \\ -a_{p_1} b_{n_1} v_{l,m} \\ a_{p_2} b_{n_2} v_{l,m} \\ -a_{p_3} b_{n_3} v_{l,m} \\ a_{p_4} b_{n_4} v_{l,m} \\ a_{p_5} b_{n_5} v_{l,m} \\ -a_{p_6} b_{n_6} v_{l,m} \end{bmatrix}.$$

In one embodiment A4, the codebook table for $(N_g, N_1, N_2) \in \{(2,1,1),(4,1,1)\}$ is as shown in TABLES 58-61, respectively, for 1-4 layer CSI reporting, where the PMI indices $i_{1,4}$ and $i_2$ are defined as in embodiment A3, and where the quantities $W_{p,n}^{1,N_g,1}$, $W_{p,n}^{2,N_g,1}$, $W_{p,n}^{3,N_g,1}$, and $W_{p,n}^{4,N_g,1}$ ($N_g \in \{2,4\}$) are given by:

$$W_{p,n}^{1,2,1} = \frac{1}{\sqrt{P_{CSI-RS}}} \begin{bmatrix} 1 \\ \varphi_n \\ \varphi_{p_1} \\ \varphi_n \varphi_{p_1} \end{bmatrix} \quad W_{p,n}^{2,2,1} = \frac{1}{\sqrt{P_{CSI-RS}}} \begin{bmatrix} 1 \\ -\varphi_n \\ \varphi_{p_1} \\ -\varphi_n \varphi_{p_1} \end{bmatrix}$$

$$W_{p,n}^{3,2,1} = \frac{1}{\sqrt{P_{CSI-RS}}} \begin{bmatrix} 1 \\ \varphi_n \\ -\varphi_{p_1} \\ -\varphi_n \varphi_{p_1} \end{bmatrix} \quad W_{p,n}^{4,2,1} = \frac{1}{\sqrt{P_{CSI-RS}}} \begin{bmatrix} 1 \\ -\varphi_n \\ -\varphi_{p_1} \\ \varphi_n \varphi_{p_1} \end{bmatrix}$$

$$W_{p,n}^{1,4,1} = \frac{1}{\sqrt{P_{CSI-RS}}} \begin{bmatrix} 1 \\ \varphi_n \\ \varphi_{p_1} \\ \varphi_n \varphi_{p_1} \\ \varphi_{p_2} \\ \varphi_n \varphi_{p_2} \\ \varphi_{p_3} \\ \varphi_n \varphi_{p_3} \end{bmatrix} \quad W_{p,n}^{2,4,1} = \frac{1}{\sqrt{P_{CSI-RS}}} \begin{bmatrix} 1 \\ -\varphi_n \\ \varphi_{p_1} \\ -\varphi_n \varphi_{p_1} \\ \varphi_{p_2} \\ -\varphi_n \varphi_{p_2} \\ \varphi_{p_3} \\ -\varphi_n \varphi_{p_3} \end{bmatrix}$$

$$W_{p,n}^{3,4,1} = \frac{1}{\sqrt{P_{CSI-RS}}} \begin{bmatrix} 1 \\ \varphi_n \\ -\varphi_{p_1} \\ -\varphi_n \varphi_{p_1} \\ \varphi_{p_2} \\ \varphi_n \varphi_{p_2} \\ -\varphi_{p_3} \\ -\varphi_n \varphi_{p_3} \end{bmatrix} \quad W_{p,n}^{4,4,1} = \frac{1}{\sqrt{P_{CSI-RS}}} \begin{bmatrix} 1 \\ -\varphi_n \\ -\varphi_{p_1} \\ \varphi_n \varphi_{p_1} \\ \varphi_{p_2} \\ -\varphi_n \varphi_{p_2} \\ -\varphi_{p_3} \\ \varphi_n \varphi_{p_3} \end{bmatrix}$$

-continued where $p = \begin{cases} p_1 & N_g = 2 \\ [p_1 \quad p_2 \quad p_3] & N_g = 4 \end{cases}$, and the quantities $W_{p,n}^{1,N_g,2}$, $W_{p,n}^{2,N_g,2}$, $W_{p,n}^{3,N_g,2}$, and $W_{p,n}^{4,N_g,2}$ ($N_g 2$) are given by:

$$W_{p,n}^{1,2,2} = \frac{1}{\sqrt{P_{CSI-RS}}} \begin{bmatrix} 1 \\ \varphi_{n_0} \\ a_{p_1} b_{n_1} \\ a_{p_2} b_{p_2} \end{bmatrix} \quad W_{p,n}^{2,2,2} = \frac{1}{\sqrt{P_{CSI-RS}}} \begin{bmatrix} 1 \\ -\varphi_{n_0} \\ a_{p_1} b_{n_1} \\ -a_{p_2} b_{p_2} \end{bmatrix}$$

$$W_{p,n}^{3,2,2} = \frac{1}{\sqrt{P_{CSI-RS}}} \begin{bmatrix} 1 \\ \varphi_{n_0} \\ -a_{p_1} b_{n_1} \\ -a_{p_2} b_{p_2} \end{bmatrix} \quad W_{p,n}^{4,2,2} = \frac{1}{\sqrt{P_{CSI-RS}}} \begin{bmatrix} 1 \\ -\varphi_{n_0} \\ -a_{p_1} b_{n_1} \\ a_{p_2} b_{p_2} \end{bmatrix}$$

where $p = [p_1 \quad p_2]$ $n = [n_0 \quad n_1 \quad n_2]$.

TABLE 58

Codebook for 1-layer CSI reporting using antenna ports [3000 to 2999 + $P_{CSI-RS}$]

| Config1, $(N_g, N_1, N_2) \in \{(2, 1, 1), (4, 1, 1)\}$ | | |
|---|---|---|
| $i_{1,4,q}$, $q = 1, \ldots, N_g - 1$ | $i_2$ | |
| 0, 1, 2, 3 | 0, 1, 2, 3 | $W_{i_{1,4},i_2}^{(1)}$ |
| where $W_{p,n}^{(1)} = W_{p,n}^{1,N_g,1}$. | | |

| Config2, $(N_g, N_1, N_2) = (2, 1, 1)$ | | | |
|---|---|---|---|
| $i_{1,4,q}$, $q = 1, 2$ | $i_{2,0}$ | $i_{2,q}$, $q = 1, 2$ | |
| 0, 1, 2, 3 | 0, 1, 2, 3 | 0, 1 | $W_{i_{1,4},i_2}^{(1)}$ |
| where $W_{p,n}^{(1)} = W_{p,n}^{1,N_g,2}$. | | | |

TABLE 59

Codebook for 2-layer CSI reporting using antenna ports [3000 to 2999 + $P_{CSI-RS}$]

| Config1, $(N_g, N_1, N_2) \in \{(2, 1, 1), (4, 1, 1)\}$ | | |
|---|---|---|
| $i_{1,4,q}$, $q = 1, \ldots, N_g - 1$ | $i_2$ | |
| 0, 1, 2, 3 | 0, 1 | $W_{i_{1,4},i_2}^{(2)}$ |
| where $W_{p,n}^{(2)} = \frac{1}{\sqrt{2}} [W_{p,n}^{1,N_g,1} \quad W_{p,n}^{2,N_g,1}]$. | | |

| Config2, $(N_g, N_1, N_2) = (2, 1, 1)$ | | |
|---|---|---|
| $i_{1,4,q}$, $q = 1, 2$ | $i_{2,q}$, $q = 0, 1, 2$ | |
| 0, 1, 2, 3 | 0, 1 | $W_{i_{1,4},i_2}^{(2)}$ |
| where $W_{p,n}^{(2)} = \frac{1}{\sqrt{2}} [W_{p,n}^{1,N_g,2} \quad W_{p,n}^{2,N_g,2}]$. | | |

TABLE 60

Codebook for 3-layer CSI reporting using antenna ports [3000 to 2999+$_{CSI-RS}$]

| Config1, $(N_g, N_1, N_2) \in \{(2, 1, 1), (4, 1, 1)\}$ | | |
|---|---|---|
| $i_{1,4,q}$, $q = 1, \ldots, N_g - 1$ | $i_2$ | |
| 0, 1, 2, 3 | 0, 1 | $W_{i_{1,4},i_2}^{(3)}$ |
| where $W_{p,n}^{(3)} = \frac{1}{\sqrt{3}} [W_{p,n}^{1,N_g,1} \quad W_{p,n}^{2,N_g,1} \quad W_{p,n}^{3,N_g,1}]$. | | |

| Config2, $(N_g, N_1, N_2) = (2, 1, 1)$ | | |
|---|---|---|
| $i_{1,4,q}$, $q = 1, 2$ | $i_{2,q}$, $q = 0, 1, 2$ | |
| 0, 1, 2, 3 | 0, 1 | $W_{i_{1,4},i_2}^{(3)}$ |
| where $W_{p,n}^{(3)} = \frac{1}{\sqrt{3}} [W_{p,n}^{1,N_g,2} \quad W_{p,n}^{2,N_g,2} \quad W_{p,n}^{3,N_g,2}]$. | | |

TABLE 61

Codebook for 4-layer CSI reporting using antenna ports [3000 to 2999 + $P_{CSI-RS}$]

| Config1, $(N_g, N_1, N_2) \in \{(2, 1, 1), (4, 1, 1)\}$ | | |
|---|---|---|
| $i_{1,4,q}$, $q = 1, \ldots, N_g - 1$ | $i_2$ | |
| 0, 1, 2, 3 | 0, 1 | $W_{i_{1,4},i_2}^{(4)}$ |
| where $W_{p,n}^{(4)} = \frac{1}{\sqrt{4}} [W_{p,n}^{1,N_g,1} \quad W_{p,n}^{2,N_g,1} \quad W_{p,n}^{3,N_g,1} \quad W_{p,n}^{4,N_g,1}]$. | | |

| Config2, $(N_g, N_1, N_2) = (2, 1, 1)$ | | |
|---|---|---|
| $i_{1,4,q}$, $q = 1, 2$ | $i_{2,q}$, $q = 0, 1, 2$ | |
| 0, 1, 2, 3 | 0, 1 | $W_{i_{1,4},i_2}^{(4)}$ |
| where $W_{p,n}^{(4)} = \frac{1}{\sqrt{4}} [W_{p,n}^{1,N_g,2} \quad W_{p,n}^{2,N_g,2} \quad W_{p,n}^{3,N_g,2} \quad W_{p,n}^{4,N_g,2}]$. | | |

In one embodiment A4A, the 1-4 layer codebooks for Config2 given respectively in TABLES 58-61 are also supported for $N_g=4$, where $i_{1,4}$ and $i_2$ are replaced with the following:

$i_{1,4} = \begin{cases} [i_{1,4,1} \quad i_{1,4,2}] & N_g = 2 \\ [i_{1,4,1} \quad i_{1,4,2} \quad i_{1,4,3} \quad i_{1,4,4} \quad i_{1,4,5} \quad i_{1,4,6}] & N_g = 4 \end{cases}$ $i_{1,4,q} \in \{0, 1, 2, 3\}, q = 1, \ldots, 2(N_g - 1)$ $i_2 = \begin{cases} [i_{2,0} \quad i_{2,1} \quad i_{2,2}] & N_g = 2 \\ [i_{2,0} \quad i_{2,1} \quad i_{2,2} \quad i_{2,3} \quad i_{2,4} \quad i_{2,5} \quad i_{2,6}] & N_g = 4 \end{cases}$ ;

$i_{2,q} \in \{0, 1\}, q = 1, \ldots, 2(N_g - 1)$ $i_{2,0} \in \{0, 1, 2, 3\}$ $v = 1$ $i_{2,0} \in \{0, 1\}$ $v = 2, 3, 4$ and the quantities $W_{p,n}^{1,N_g,2}$, $W_{p,n}^{2,N_g,2}$, $W_{p,n}^{3,N_g,2}$ and $W_{p,n}^{4,N_g,2}$ for $N_g=4$ are given by:

$$W_{p,n}^{1,4,2} = \frac{1}{\sqrt{P_{CSI-RS}}} \begin{bmatrix} 1 \\ \varphi_{n_0} \\ a_{p_1}b_{n_1} \\ a_{p_2}b_{n_2} \\ a_{p_3}b_{n_3} \\ a_{p_4}b_{n_4} \\ a_{p_5}b_{n_5} \\ a_{p_6}b_{n_6} \end{bmatrix} \quad W_{p,n}^{2,4,2} = \frac{1}{\sqrt{P_{CSI-RS}}} \begin{bmatrix} 1 \\ -\varphi_{n_0} \\ a_{p_1}b_{n_1} \\ -a_{p_2}b_{n_2} \\ a_{p_3}b_{n_3} \\ -a_{p_4}b_{n_4} \\ a_{p_5}b_{n_5} \\ -a_{p_6}b_{n_6} \end{bmatrix}$$

$$W_{p,n}^{3,4,2} = \frac{1}{\sqrt{P_{CSI-RS}}} \begin{bmatrix} 1 \\ \varphi_{n_0} \\ -a_{p_1}b_{n_1} \\ -a_{p_2}b_{n_2} \\ a_{p_3}b_{n_3} \\ a_{p_4}b_{n_4} \\ -a_{p_5}b_{n_5} \\ -a_{p_6}b_{n_6} \end{bmatrix} \quad W_{p,n}^{4,4,2} = \frac{1}{\sqrt{P_{CSI-RS}}} \begin{bmatrix} 1 \\ -\varphi_{n_0} \\ -a_{p_1}b_{n_1} \\ a_{p_2}b_{n_2} \\ a_{p_3}b_{n_3} \\ -a_{p_4}b_{n_4} \\ -a_{p_5}b_{n_5} \\ a_{p_6}b_{n_6} \end{bmatrix}$$

where $p = [\, p_1 \ p_2 \ p_3 \ p_4 \ p_5 \ p_6\,]$ $n = [\, n_0 \ n_1 \ n_2 \ n_3 \ n_4 \ n_5 \ n_6\,]$.

In one embodiment A4B, the pre-coding matrix expression in the 3 layer codebook 60 is replaced with one of following:

$$W_{p,n}^{(3)} = \frac{1}{\sqrt{3}} [\, W_{p,n}^{1,N_g,1} \ W_{p,n}^{2,N_g,1} \ W_{p,n}^{4,N_g,1}\,]$$

for Config1 and $$W_{p,n}^{(3)} = \frac{1}{\sqrt{3}} [\, W_{p,n}^{1,N_g,2} \ W_{p,n}^{2,N_g,2} \ W_{p,n}^{4,N_g,2}\,]$$

for Config2;

$$W_{p,n}^{(3)} = \frac{1}{\sqrt{3}} [\, W_{p,n}^{1,N_g,1} \ W_{p,n}^{3,N_g,1} \ W_{p,n}^{4,N_g,1}\,]$$

for Config1 and $$W_{p,n}^{(3)} = \frac{1}{\sqrt{3}} [\, W_{p,n}^{1,N_g,2} \ W_{p,n}^{3,N_g,2} \ W_{p,n}^{4,N_g,2}\,]$$

for Config2; and $$W_{p,n}^{(3)} = \frac{1}{\sqrt{3}} [\, W_{p,n}^{2,N_g,1} \ W_{p,n}^{3,N_g,1} \ W_{p,n}^{4,N_g,1}\,]$$

for Config1 and $$W_{p,n}^{(3)} = \frac{1}{\sqrt{3}} [\, W_{p,n}^{2,N_g,2} \ W_{p,n}^{3,N_g,2} \ W_{p,n}^{4,N_g,2}\,]$$

for Config2

In one embodiment A4C, the quantities $W_{p,n}^{1,N_g,1}$, $W_{p,n}^{2,N_g,1}$, $W_{p,n}^{3,N_g,1}$ and $W_{p,n}^{4,N_g,1}$ for $N_g=4$ in TABLE 58-61 are given by:

$$W_{p,n}^{1,4,1} = \frac{1}{\sqrt{P_{CSI-RS}}} \begin{bmatrix} 1 \\ \varphi_n \\ \varphi_{p_1} \\ \varphi_n\varphi_{p_1} \\ \varphi_{p_2} \\ \varphi_n\varphi_{p_2} \\ \varphi_{p_3} \\ \varphi_n\varphi_{p_3} \end{bmatrix} \quad W_{p,n}^{2,4,1} = \frac{1}{\sqrt{P_{CSI-RS}}} \begin{bmatrix} 1 \\ \varphi_n \\ -\varphi_{p_1} \\ -\varphi_n\varphi_{p_1} \\ \varphi_{p_2} \\ \varphi_n\varphi_{p_2} \\ -\varphi_{p_3} \\ -\varphi_n\varphi_{p_3} \end{bmatrix}$$

$$W_{p,n}^{3,4,1} = \frac{1}{\sqrt{P_{CSI-RS}}} \begin{bmatrix} 1 \\ \varphi_n \\ \varphi_{p_1} \\ \varphi_n\varphi_{p_1} \\ -\varphi_{p_2} \\ -\varphi_n\varphi_{p_2} \\ -\varphi_{p_3} \\ -\varphi_n\varphi_{p_3} \end{bmatrix} \quad W_{p,n}^{4,4,1} = \frac{1}{\sqrt{P_{CSI-RS}}} \begin{bmatrix} 1 \\ \varphi_n \\ -\varphi_{p_1} \\ -\varphi_n\varphi_{p_1} \\ -\varphi_{p_2} \\ -\varphi_n\varphi_{p_2} \\ \varphi_{p_3} \\ \varphi_n\varphi_{p_3} \end{bmatrix}$$

and the quantities $W_{p,n}^{1,N_g,2}$, $W_{p,n}^{2,N_g,2}$, $W_{p,n}^{3,N_g,2}$ and $W_{p,n}^{4,N_g,2}$ for $N_g=4$ are given by:

$$W_{p,n}^{1,4,2} = \frac{1}{\sqrt{P_{CSI-RS}}} \begin{bmatrix} 1 \\ \varphi_{n_0} \\ a_{p_1}b_{n_1} \\ a_{p_2}b_{n_2} \\ a_{p_3}b_{n_3} \\ a_{p_4}b_{n_4} \\ a_{p_5}b_{n_5} \\ a_{p_6}b_{n_6} \end{bmatrix} \quad W_{p,n}^{2,4,2} = \frac{1}{\sqrt{P_{CSI-RS}}} \begin{bmatrix} 1 \\ \varphi_{n_0} \\ -a_{p_1}b_{n_1} \\ -a_{p_2}b_{n_2} \\ a_{p_3}b_{n_3} \\ a_{p_4}b_{n_4} \\ -a_{p_5}b_{n_5} \\ -a_{p_6}b_{n_6} \end{bmatrix}$$

$$W_{p,n}^{3,4,2} = \frac{1}{\sqrt{P_{CSI-RS}}} \begin{bmatrix} 1 \\ \varphi_{n_0} \\ a_{p_1}b_{n_1} \\ a_{p_2}b_{n_2} \\ -a_{p_3}b_{n_3} \\ -a_{p_4}b_{n_4} \\ -a_{p_5}b_{n_5} \\ -a_{p_6}b_{n_6} \end{bmatrix} \quad W_{p,n}^{4,4,2} = \frac{1}{\sqrt{P_{CSI-RS}}} \begin{bmatrix} 1 \\ \varphi_{n_0} \\ -a_{p_1}b_{n_1} \\ -a_{p_2}b_{n_2} \\ -a_{p_3}b_{n_3} \\ -a_{p_4}b_{n_4} \\ a_{p_5}b_{n_5} \\ a_{p_6}b_{n_6} \end{bmatrix}.$$

In one embodiment A4D, the quantities $W_{p,n}^{1,N_g,1}$, $W_{p,n}^{2,N_g,1}$, $W_{p,n}^{3,N_g,1}$ and $W_{p,n}^{4,N_g,1}$ for $N_g=4$ in TABLES 58-61 are given by:

$$W_{p,n}^{1,4,1} = \frac{1}{\sqrt{P_{CSI-RS}}} \begin{bmatrix} 1 \\ -\varphi_n \\ \varphi_{p_1} \\ -\varphi_n\varphi_{p_1} \\ \varphi_{p_2} \\ -\varphi_n\varphi_{p_2} \\ \varphi_{p_3} \\ -\varphi_n\varphi_{p_3} \end{bmatrix} \quad W_{p,n}^{2,4,1} = \frac{1}{\sqrt{P_{CSI-RS}}} \begin{bmatrix} 1 \\ -\varphi_n \\ -\varphi_{p_1} \\ \varphi_n\varphi_{p_1} \\ \varphi_{p_2} \\ -\varphi_n\varphi_{p_2} \\ -\varphi_{p_3} \\ \varphi_n\varphi_{p_3} \end{bmatrix}$$

$$W_{p,n}^{3,4,1} = \frac{1}{\sqrt{P_{CSI-RS}}} \begin{bmatrix} 1 \\ -\varphi_n \\ \varphi_{p_1} \\ -\varphi_n\varphi_{p_1} \\ -\varphi_{p_2} \\ \varphi_n\varphi_{p_2} \\ -\varphi_{p_3} \\ \varphi_n\varphi_{p_3} \end{bmatrix} \quad W_{p,n}^{4,4,1} = \frac{1}{\sqrt{P_{CSI-RS}}} \begin{bmatrix} 1 \\ -\varphi_n \\ -\varphi_{p_1} \\ \varphi_n\varphi_{p_1} \\ -\varphi_{p_2} \\ \varphi_n\varphi_{p_2} \\ \varphi_{p_3} \\ -\varphi_n\varphi_{p_3} \end{bmatrix}$$

and the quantities $W_{p,n}^{1,N_g,2}$, $W_{p,n}^{2,N_g,2}$, $W_{p,n}^{3,N_g,2}$ and $W_{p,n}^{4,N_g,2}$ for $N_g=4$ are given by:

$$W_{p,n}^{1,4,2} = \frac{1}{\sqrt{P_{CSI-RS}}} \begin{bmatrix} 1 \\ -\varphi_{n_0} \\ a_{p_1}b_{n_1} \\ -a_{p_2}b_{n_2} \\ a_{p_3}b_{n_3} \\ -a_{p_4}b_{n_4} \\ a_{p_5}b_{n_5} \\ -a_{p_6}b_{n_6} \end{bmatrix} \quad W_{p,n}^{2,4,2} = \frac{1}{\sqrt{P_{CSI-RS}}} \begin{bmatrix} 1 \\ -\varphi_{n_0} \\ -a_{p_1}b_{n_1} \\ a_{p_2}b_{n_2} \\ a_{p_3}b_{n_3} \\ -a_{p_4}b_{n_4} \\ -a_{p_5}b_{n_5} \\ a_{p_6}b_{n_6} \end{bmatrix}$$

$$W_{p,n}^{3,4,2} = \frac{1}{\sqrt{P_{CSI-RS}}} \begin{bmatrix} 1 \\ -\varphi_{n_0} \\ a_{p_1}b_{n_1} \\ -a_{p_2}b_{n_2} \\ -a_{p_3}b_{n_3} \\ a_{p_4}b_{n_4} \\ -a_{p_5}b_{n_5} \\ a_{p_6}b_{n_6} \end{bmatrix} \quad W_{p,n}^{4,4,2} = \frac{1}{\sqrt{P_{CSI-RS}}} \begin{bmatrix} 1 \\ -\varphi_{n_0} \\ -a_{p_1}b_{n_1} \\ a_{p_2}b_{n_2} \\ -a_{p_3}b_{n_3} \\ a_{p_4}b_{n_4} \\ a_{p_5}b_{n_5} \\ -a_{p_6}b_{n_6} \end{bmatrix}.$$

In one embodiment A5, the PMI codebook for rank 5, rank 6, rank 7, and rank 8 CSI reporting for $(N_g,N_1,N_2)=(4,1,1)$ are as shown in TABLES 62-65, respectively where the quantities $W_{p,n}^{1,N_g,1}$, $W_{p,n}^{2,N_g,1}$, $W_{p,n}^{3,N_g,1}$, and $W_{p,n}^{4,N_g,1}$ are given by:

$$W_{p,n}^{1,4,1} = \frac{1}{\sqrt{P_{CSI-RS}}} \begin{bmatrix} 1 \\ \varphi_n \\ \varphi_{p_1} \\ \varphi_n\varphi_{p_1} \\ \varphi_{p_2} \\ \varphi_n\varphi_{p_2} \\ \varphi_{p_3} \\ \varphi_n\varphi_{p_3} \end{bmatrix} \quad W_{p,n}^{2,4,1} = \frac{1}{\sqrt{P_{CSI-RS}}} \begin{bmatrix} 1 \\ -\varphi_n \\ \varphi_{p_1} \\ -\varphi_n\varphi_{p_1} \\ \varphi_{p_2} \\ -\varphi_n\varphi_{p_2} \\ \varphi_{p_3} \\ -\varphi_n\varphi_{p_3} \end{bmatrix}$$

$$W_{p,n}^{5,4,1} = \frac{1}{\sqrt{P_{CSI-RS}}} \begin{bmatrix} 1 \\ \varphi_n \\ \varphi_{p_1} \\ \varphi_n\varphi_{p_1} \\ -\varphi_{p_2} \\ -\varphi_n\varphi_{p_2} \\ -\varphi_{p_3} \\ -\varphi_n\varphi_{p_3} \end{bmatrix} \quad W_{p,n}^{6,4,1} = \frac{1}{\sqrt{P_{CSI-RS}}} \begin{bmatrix} 1 \\ -\varphi_n \\ \varphi_{p_1} \\ -\varphi_n\varphi_{p_1} \\ -\varphi_{p_2} \\ \varphi_n\varphi_{p_2} \\ -\varphi_{p_3} \\ \varphi_n\varphi_{p_3} \end{bmatrix}$$

$$W_{p,n}^{3,4,1} = \frac{1}{\sqrt{P_{CSI-RS}}} \begin{bmatrix} 1 \\ \varphi_n \\ -\varphi_{p_1} \\ -\varphi_n\varphi_{p_1} \\ \varphi_{p_2} \\ \varphi_n\varphi_{p_2} \\ -\varphi_{p_3} \\ -\varphi_n\varphi_{p_3} \end{bmatrix} \quad W_{p,n}^{4,4,1} = \frac{1}{\sqrt{P_{CSI-RS}}} \begin{bmatrix} 1 \\ -\varphi_n \\ \varphi_{p_1} \\ \varphi_n\varphi_{p_1} \\ \varphi_{p_2} \\ -\varphi_n\varphi_{p_2} \\ -\varphi_{p_3} \\ \varphi_n\varphi_{p_3} \end{bmatrix}$$

$$W_{p,n}^{7,4,1} = \frac{1}{\sqrt{P_{CSI-RS}}} \begin{bmatrix} 1 \\ \varphi_n \\ -\varphi_{p_1} \\ -\varphi_n\varphi_{p_1} \\ -\varphi_{p_2} \\ -\varphi_n\varphi_{p_2} \\ \varphi_{p_3} \\ \varphi_n\varphi_{p_3} \end{bmatrix} \quad W_{p,n}^{8,4,1} = \frac{1}{\sqrt{P_{CSI-RS}}} \begin{bmatrix} 1 \\ -\varphi_n \\ \varphi_{p_1} \\ \varphi_n\varphi_{p_1} \\ -\varphi_{p_2} \\ \varphi_n\varphi_{p_2} \\ \varphi_{p_3} \\ -\varphi_n\varphi_{p_3} \end{bmatrix}$$

the quantities $W_{p,n}^{1,N_g,2}$, $W_{p,n}^{2,N_g,2}$, $W_{p,n}^{3,N_g,2}$, and $W_{p,n}^{4,N_g,2}$ are giving by:

$$W_{p,n}^{1,4,2} = \frac{1}{\sqrt{P_{CSI-RS}}} \begin{bmatrix} 1 \\ \varphi_{n_0} \\ a_{p_1}b_{n_1} \\ a_{p_2}b_{n_2} \\ a_{p_3}b_{n_3} \\ a_{p_4}b_{n_4} \\ a_{p_5}b_{n_5} \\ a_{p_6}b_{n_6} \end{bmatrix} \quad W_{p,n}^{2,4,2} = \frac{1}{\sqrt{P_{CSI-RS}}} \begin{bmatrix} 1 \\ -\varphi_{n_0} \\ a_{p_1}b_{n_1} \\ -a_{p_2}b_{n_2} \\ a_{p_3}b_{n_3} \\ -a_{p_4}b_{n_4} \\ a_{p_5}b_{n_5} \\ -a_{p_6}b_{n_6} \end{bmatrix}$$

$$W_{p,n}^{3,4,2} = \frac{1}{\sqrt{P_{CSI-RS}}} \begin{bmatrix} 1 \\ \varphi_{n_0} \\ -a_{p_1}b_{n_1} \\ -a_{p_2}b_{n_2} \\ a_{p_3}b_{n_3} \\ a_{p_4}b_{n_4} \\ -a_{p_5}b_{n_5} \\ -a_{p_6}b_{n_6} \end{bmatrix} \quad W_{p,n}^{4,4,2} = \frac{1}{\sqrt{P_{CSI-RS}}} \begin{bmatrix} 1 \\ -\varphi_{n_0} \\ -a_{p_1}b_{n_1} \\ a_{p_2}b_{n_2} \\ a_{p_3}b_{n_3} \\ -a_{p_4}b_{n_4} \\ -a_{p_5}b_{n_5} \\ a_{p_6}b_{n_6} \end{bmatrix}$$

$$W_{p,n}^{5,4,2} = \frac{1}{\sqrt{P_{CSI-RS}}} \begin{bmatrix} 1 \\ \varphi_{n_0} \\ a_{p_1}b_{n_1} \\ a_{p_2}b_{n_2} \\ -a_{p_3}b_{n_3} \\ -a_{p_4}b_{n_4} \\ -a_{p_5}b_{n_5} \\ -a_{p_6}b_{n_6} \end{bmatrix} \quad W_{p,n}^{6,4,2} = \frac{1}{\sqrt{P_{CSI-RS}}} \begin{bmatrix} 1 \\ -\varphi_{n_0} \\ a_{p_1}b_{n_1} \\ -a_{p_2}b_{n_2} \\ -a_{p_3}b_{n_3} \\ a_{p_4}b_{n_4} \\ -a_{p_5}b_{n_5} \\ a_{p_6}b_{n_6} \end{bmatrix}$$

$$W_{p,n}^{7,4,2} = \frac{1}{\sqrt{P_{CSI-RS}}} \begin{bmatrix} 1 \\ \varphi_{n_0} \\ -a_{p_1}b_{n_1} \\ -a_{p_2}b_{n_2} \\ -a_{p_3}b_{n_3} \\ -a_{p_4}b_{n_4} \\ a_{p_5}b_{n_5} \\ a_{p_6}b_{n_6} \end{bmatrix} \quad W_{p,n}^{8,4,2} = \frac{1}{\sqrt{P_{CSI-RS}}} \begin{bmatrix} 1 \\ -\varphi_{n_0} \\ -a_{p_1}b_{n_1} \\ a_{p_2}b_{n_2} \\ -a_{p_3}b_{n_3} \\ a_{p_4}b_{n_4} \\ a_{p_5}b_{n_5} \\ -a_{p_6}b_{n_6} \end{bmatrix}.$$

TABLE 62

Codebook for 5-layer CSI reporting using antenna ports [3000 to 2999 + $P_{CSI-RS}$]

| Config1, $(N_g, N_1, N_2) = (4, 1, 1)$ | | |
|---|---|---|
| $i_{1,4,q}$, q = 1, 2, 3 | $i_2$ | |
| 0, 1, 2, 3 | 0, 1 | $W_{i_{1,4},i_2}^{(5)}$ | where $W_{p,n}^{(5)} = \frac{1}{\sqrt{5}} \begin{bmatrix} W_{p,n}^{1,N_g,1} & W_{p,n}^{2,N_g,1} & W_{p,n}^{3,N_g,1} & W_{p,n}^{4,N_g,1} & W_{p,n}^{5,N_g,1} \end{bmatrix}$.

TABLE 62-continued

Codebook for 5-layer CSI reporting using antenna ports [3000 to 2999 + $P_{CSI-RS}$]

| Config2, $(N_g, N_1, N_2) = (4, 1, 1)$ | | |
|---|---|---|
| $i_{1,4,q}$, q = 1, ..., 6 | $i_{2,q}$, q = 0, 1, ..., 6 | |
| 0, 1, 2, 3 | 0, 1 | $W_{i_{1,4},i_2}^{(5)}$ | where $W_{p,n}^{(5)} = \frac{1}{\sqrt{5}} \begin{bmatrix} W_{p,n}^{1,N_g,2} & W_{p,n}^{2,N_g,2} & W_{p,n}^{3,N_g,2} & W_{p,n}^{4,N_g,2} & W_{p,n}^{5,N_g,2} \end{bmatrix}$.

TABLE 63

Codebook for 6-layer CSI reporting using antenna ports [3000 to 2999 + $P_{CSI-RS}$]

| Config1, $(N_g, N_1, N_2) = (4, 1, 1)$ | | |
|---|---|---|
| $i_{1,4,q}$, q = 1, 2, 3 | $i_2$ | |
| 0, 1, 2, 3 | 0, 1 | $W_{i_{1,4},i_2}^{(6)}$ | where $W_{p,n}^{(6)} = \frac{1}{\sqrt{6}}$ $\begin{bmatrix} W_{p,n}^{1,N_g,1} & W_{p,n}^{2,N_g,1} & W_{p,n}^{3,N_g,1} & W_{p,n}^{4,N_g,1} & W_{p,n}^{5,N_g,1} & W_{p,n}^{6,N_g,1} \end{bmatrix}$.

| Config2, $(N_g, N_1, N_2) = (4, 1, 1)$ | | |
|---|---|---|
| $i_{1,4,q}$, q = 1, ..., 6 | $i_{2,q}$, q = 0, 1, ..., 6 | |
| 0, 1, 2, 3 | 0, 1 | $W_{i_{1,4},i_2}^{(6)}$ | where $W_{p,n}^{(6)} = \frac{1}{\sqrt{6}}$ $\begin{bmatrix} W_{p,n}^{1,N_g,2} & W_{p,n}^{2,N_g,2} & W_{p,n}^{3,N_g,2} & W_{p,n}^{4,N_g,2} & W_{p,n}^{5,N_g,2} & W_{p,n}^{6,N_g,2} \end{bmatrix}$.

TABLE 64

Codebook for 7-layer CSI reporting using antenna ports [3000 to 2999 + $P_{CSI-RS}$]

| Config1, $(N_g, N_1, N_2) = (4, 1, 1)$ | | |
|---|---|---|
| $i_{1,4,q}$, q = 1, 2, 3 | $i_2$ | |
| 0, 1, 2, 3 | 0, 1 | $W_{i_{1,4},i_2}^{(7)}$ | where $W_{p,n}^{(7)} = \frac{1}{\sqrt{7}}$ $\begin{bmatrix} W_{p,n}^{1,N_g,1} & W_{p,n}^{2,N_g,1} & W_{p,n}^{3,N_g,1} & W_{p,n}^{4,N_g,1} & W_{p,n}^{5,N_g,1} & W_{p,n}^{6,N_g,1} & W_{p,n}^{7,N_g,1} \end{bmatrix}$.

| Config2, $(N_g, N_1, N_2) = (4, 1, 1)$ | | |
|---|---|---|
| $i_{1,4,q}$, q = 1, ..., 6 | $i_{2,q}$, q = 0, 1, ..., 6 | |
| 0, 1, 2, 3 | 0, 1 | $W_{i_{1,4},i_2}^{(7)}$ | where $W_{p,n}^{(7)} = \frac{1}{\sqrt{7}}$ $\begin{bmatrix} W_{p,n}^{1,N_g,2} & W_{p,n}^{2,N_g,2} & W_{p,n}^{3,N_g,2} & W_{p,n}^{4,N_g,2} & W_{p,n}^{5,N_g,2} & W_{p,n}^{6,N_g,2} & W_{p,n}^{7,N_g,2} \end{bmatrix}$.

TABLE 65

Codebook for 8-layer CSI reporting using antenna ports [3000 to 2999 + $P_{CSI-RS}$]

| Config1, $(N_g, N_1, N_2) = (4, 1, 1)$ | | |
|---|---|---|
| $i_{1,4,q}$, q = 1, 2, 3 | $i_2$ | |
| 0, 1, 2, 3 | 0, 1 | $W_{i_{1,4},i_2}^{(8)}$ |

$$W_{p,n}^{(8)} = \frac{1}{\sqrt{8}}[W_{p,n}^{1,N_g,1} \quad W_{p,n}^{2,N_g,1} \quad W_{p,n}^{3,N_g,1} \quad W_{p,n}^{4,N_g,1} \quad W_{p,n}^{5,N_g,1} \quad W_{p,n}^{6,N_g,1} \quad W_{p,n}^{7,N_g,1} \quad W_{p,n}^{8,N_g,1}].$$

| Config2, $(N_g, N_1, N_2) = (4, 1, 1)$ | | |
|---|---|---|
| $i_{1,4,q}$, q = 1, ..., 6 | $i_{2,q}$, q = 0, 1, ..., 6 | |
| 0, 1, 2, 3 | 0, 1 | $W_{i_{1,4},i_2}^{(8)}$ |

$$W_{p,n}^{(8)} = \frac{1}{\sqrt{8}}[W_{p,n}^{1,N_g,2} \quad W_{p,n}^{2,N_g,2} \quad W_{p,n}^{3,N_g,2} \quad W_{p,n}^{4,N_g,2} \quad W_{p,n}^{5,N_g,2} \quad W_{p,n}^{6,N_g,2} \quad W_{p,n}^{7,N_g,2} \quad W_{p,n}^{8,N_g,2}].$$

In one embodiment A5A, the pre-coding matrix expression in the 5 layer codebook TABLE 62 is replaced with one of following:

Config 1

$$W_{p,n}^{(5)} = \frac{1}{\sqrt{5}}[W_{p,n}^{c_1,N_g,1} \quad W_{p,n}^{c_2,N_g,1} \quad W_{p,n}^{c_3,N_g,1} \quad W_{p,n}^{c_4,N_g,1} \quad W_{p,n}^{c_5,N_g,1}];$$

and

Config 2

$$W_{p,n}^{(5)} = \frac{1}{\sqrt{5}}[W_{p,n}^{c_1,N_g,2} \quad W_{p,n}^{c_2,N_g,2} \quad W_{p,n}^{c_3,N_g,2} \quad W_{p,n}^{c_4,N_g,2} \quad W_{p,n}^{c_5,N_g,2}]$$

where $(c_1, c_2, \ldots, c_5)$ corresponds to one of $$\binom{8}{5} = 56$$

combinations of 5 numbers out of $\{1, 2, \ldots, 8\}$.

The pre-coding matrix expression in the 6 layer codebook TABLE 63 is replaced with one of following:

Config1

$$W_{p,n}^{(6)} = \frac{1}{\sqrt{6}}$$
$$[W_{p,n}^{c_1,N_g,1} \quad W_{p,n}^{c_2,N_g,1} \quad W_{p,n}^{c_3,N_g,1} \quad W_{p,n}^{c_4,N_g,1} \quad W_{p,n}^{c_5,N_g,1} \quad W_{p,n}^{c_6,N_g,1}];$$
and Config2

$$W_{p,n}^{(6)} = \frac{1}{\sqrt{6}}$$
$$[W_{p,n}^{c_1,N_g,2} \quad W_{p,n}^{c_2,N_g,2} \quad W_{p,n}^{c_3,N_g,2} \quad W_{p,n}^{c_4,N_g,2} \quad W_{p,n}^{c_5,N_g,2} \quad W_{p,n}^{c_6,N_g,2}]$$

where $(c_1, c_2, \ldots, c_6)$ corresponds to one of $$\binom{8}{6} = 28$$

combinations of 6 numbers out of $\{1, 2, \ldots, 8\}$.

The pre-coding matrix expression in the 7 layer codebook TABLE 64 are replaced with one of following:

Config1

$$W_{p,n}^{(7)} = \frac{1}{\sqrt{7}}[W_{p,n}^{c_1,N_g,1} W_{p,n}^{c_2,N_g,1} W_{p,n}^{c_3,N_g,1} W_{p,n}^{c_4,N_g,1} W_{p,n}^{c_5,N_g,1} W_{p,n}^{c_6,N_g,1} W_{p,n}^{c_7,N_g,1}];$$

and

Config2

$$W_{p,n}^{(7)} = \frac{1}{\sqrt{7}}[W_{p,n}^{c_1,N_g,2} W_{p,n}^{c_2,N_g,2} W_{p,n}^{c_3,N_g,2} W_{p,n}^{c_4,N_g,2} W_{p,n}^{c_5,N_g,2} W_{p,n}^{c_6,N_g,2} W_{p,n}^{c_7,N_g,2}]$$

where $(c_1, c_2, \ldots, c_7)$ corresponds to one of $$\binom{8}{7} = 8$$

combinations of 7 numbers out of $\{1, 2, \ldots, 8\}$.

In one embodiment A6, the codebook table for $(N_g, N_1, N_2)=(1,1,1)$, i.e., single panel with 2 ports, is defined by PMI indices $i_{1,4}$ and $i_2$, and quantities $\varphi_n$, $a_p$, and $b_n$ as defined in embodiment A3/A4/A5. The pre-coding vector/matrix for 1-2 layer CSI reporting is according to one of the following alternatives. One of these alternatives is either fixed in the standard specification or is configured via higher layer signaling.

In one example of Alt A6-0, if the UE is configured with CodebookMode=Config1, then the quantities $W_{p,n}^{1,N_g,1}$ and $W_{p,n}^{2,N_g,1}$ ($N_g$=1) are given by:

$$W_n^{1,1,1} = \frac{1}{\sqrt{P_{CSI-RS}}}\begin{bmatrix}1\\\varphi_n\end{bmatrix} \quad W_n^{2,1,1} = \frac{1}{\sqrt{P_{CSI-RS}}}\begin{bmatrix}1\\-\varphi_n\end{bmatrix}.$$

In such example, the pre-coding vector for 1-layer CSI reporting is given by $W_{i_{1,4},i_2}^{(1)}=W_{i_2}^{1,1,1}$, where $i_{1,4}=0$ and $i_2=0,1,2,3$. In such example, the pre-coding matrix for 2-layer CSI reporting is given by $$W_{i_{1,4},i_2}^{(2)} = \frac{1}{\sqrt{2}}[\ W_{i_2}^{1,1,1}\ \ W_{i_2}^{2,1,1}\ ],$$

where $i_{1,4}=0$ and $i_2=0,1$.

In one example of Alt A6-1, if the UE is configured with CodebookMode=Config2, then the quantities $W_{p,n}^{1,N_g,2}$ and $W_{p,n}^{2,N_g,2}$ ($N_g=1$) are given by:

$$W_{p,n}^{1,1,2} = \frac{1}{\sqrt{P_{CSI-RS}}}\begin{bmatrix}1\\a_p b_n\end{bmatrix}\ W_{p,n}^{2,1,2} = \frac{1}{\sqrt{P_{CSI-RS}}}\begin{bmatrix}1\\-a_p b_n\end{bmatrix}.$$

In such example, the pre-coding vector for 1-layer CSI reporting is given by $W_{i_{1,4},i_2}^{(1)}=W_{i_{1,4},i_2}^{1,1,2}$, where $i_{1,4}=0,1,2,3$ and $i_2=0,1$. In such example, the pre-coding matrix for 2-layer CSI reporting is given by $$W_{i_{1,4},i_2}^{(2)} = \frac{1}{\sqrt{2}}[\ W_{i_{1,4},i_2}^{1,1,2}\ \ W_{i_{1,4},i_2}^{2,1,2}\ ],$$

where $i_{1,4}=0,1,2,3$ and $i_2=0,1$.

In one example of Alt A6-2, if the UE is configured with CodebookMode=Config3, then the quantities $W_{p,n}^{1,N_g,3}$ and $W_{p,n}^{2,N_g,3}$ ($N_g=1$) are given by:

$$W_0^{1,1,3} = \frac{1}{\sqrt{P_{CSI-RS}}}\begin{bmatrix}1\\0\end{bmatrix}\ W_1^{1,1,3} = \frac{1}{\sqrt{P_{CSI-RS}}}\begin{bmatrix}0\\1\end{bmatrix}.$$

In such example, the pre-coding vector for 1-layer CSI reporting is given by $W_{i_{1,4},i_2}^{(1)}=W_{i_2}^{1,1,3}$, where $i_{1,4}=0$ and $i_2=0,1$. In such example, the pre-coding matrix for 2-layer CSI reporting is given by $$W_{i_{1,4},i_2}^{(2)} = \frac{1}{\sqrt{2}}[\ W_{i_2}^{1,1,3}\ \ W_{i_2+1}^{1,1,3}\ ],$$

where $i_{1,4}=0$ and $i_2=0$.

In one example of Alt A6-4, if the UE is configured with CodebookMode=Config4, then the pre-coder vector/matrix can be either according to Alt A6-0 or Alt A6-2 for all 1-2 layers. In such example, the pre-coding vector for 1-layer CSI reporting is given by $W_{i_{1,4},i_2}^{(1)}=W_{i_2}^{1,1,1}$, where $i_{1,4}=0$ and $i_2=0,1,2,3$. In such example, the pre-coding vector for 1-layer CSI reporting is given by $W_{i_{1,4},i_2}^{(1)}=W_{i_2-4}^{1,1,3}$, where $i_{1,4}=0$ and $i_2=4,5$. In such example, the pre-coding matrix for 2-layer CSI reporting is given by $$W_{i_{1,4},i_2}^{(2)} = \frac{1}{\sqrt{2}}[\ W_{i_2}^{1,1,1}\ \ W_{i_2}^{2,1,1}\ ],$$

where $j_{1,4}=0$ and $i_2=0,1$. In such example, the pre-coding matrix for 2-layer CSI reporting is given by $$W_{i_{1,4},i_2}^{(2)} = \frac{1}{\sqrt{2}}[\ W_{i_2-2}^{1,1,3}\ \ W_{i_2-1}^{1,1,3}\ ],$$

where $i_{1,4}=0$ and $i_2=2$.

In one example of Alt A6-5, if the UE is configured with CodebookMode=Config5, then the pre-coder vector/matrix can be either according to Alt A6-1 or Alt A6-2 for all 1-2 layers. In such example, the pre-coding vector for 1-layer CSI reporting is given by $W_{i_{1,4},i_2}^{(1)}=W_{i_{1,4},i_2}^{1,1,2}$, where $i_{1,4}=0,1,2,3$ and $i_2=0,1$. In such example, the pre-coding vector for 1-layer CSI reporting is given by $W_{i_{1,4},i_2}^{(1)}=W_{i_2-2}^{1,1,3}$, where $i_{1,4}=0$ and $i_2=2,3$. In such example, the pre-coding matrix for 2-layer CSI reporting is given by $$W_{i_{1,4},i_2}^{(2)} = \frac{1}{\sqrt{2}}[\ W_{i_{1,4},i_2}^{1,1,2}\ \ W_{i_{1,4},i_2}^{2,1,2}\ ],$$

where $i_{1,4}=0,1,2,3$ and $i_2=0,1$. In such example, the pre-coding matrix for 2-layer CSI reporting is given by $$W_{i_{1,4},i_2}^{(2)} = \frac{1}{\sqrt{2}}[\ W_{i_2-2}^{1,1,3}\ \ W_{i_2-1}^{1,1,3}\ ],$$

where $i_{1,4}=0$ and $i_2=2$.

In one example of Alt A6-6, if the UE is configured with CodebookMode=Config6, then the pre-coder vector/matrix is according to Alt A6-x for 1-layer CSI reporting and according to Alt A6-y for 2-layer CSI reporting where x≠y. A few examples of x and y are as follows:(x, y)=(0, 2); (x, y)=(1, 2); (x, y)=(3, 2); and (x, y)=(4, 2)

In one embodiment A6A, at least one of the proposed 2 port codebook in embodiment A6 is also used for TPMI indication (in UL-related DCI signaling) for codebook-based UL transmission. Two alternatives in this case are as follows. In one example of Alt A6A-1, the codebook is used regardless of 2 ports being either on a single panel with 2 dual-polarized antenna ports at the UE or two panels each with a single antenna port at the UE. In one example of Alt A6A-2, the codebook is only used for the case of two panels each with a single antenna port at the UE.

In one embodiment A7, the codebook table for $(N_g,N_1,N_2)=(2,1,1)$, i.e., two panels each with 2 ports, is defined by PMI indices $i_{1,4}$ and $i_2$, and quantities $\varphi_n$, $a_p$, and $b_n$ as defined in embodiment A3A/4/A5. The pre-coding vector/matrix for 1-4 layer CSI reporting is according to one of the following alternatives. One of these alternatives is either fixed in the specification or is configured via higher layer signaling.

In one example of Alt A7-0, if the UE is configured with CodebookMode=Config1, then the following quantities are defined as given by:

$$W_{p,n}^{1,2,1} = \frac{1}{\sqrt{P_{CSI-RS}}}\begin{bmatrix}1\\\varphi_n\\\varphi_{P_1}\\\varphi_n\varphi_{P_1}\end{bmatrix}\ W_{p,n}^{2,2,1} = \frac{1}{\sqrt{P_{CSI-RS}}}\begin{bmatrix}1\\-\varphi_n\\\varphi_{P_1}\\-\varphi_n\varphi_{P_1}\end{bmatrix}$$

$$W_{p,n}^{3,2,1} = \frac{1}{\sqrt{P_{CSI-RS}}} \begin{bmatrix} 1 \\ \varphi_n \\ -\varphi_{p_1} \\ -\varphi_n \varphi_{p_1} \end{bmatrix} \quad W_{p,n}^{4,2,1} = \frac{1}{\sqrt{P_{CSI-RS}}} \begin{bmatrix} 1 \\ -\varphi_n \\ -\varphi_{p_1} \\ \varphi_n \varphi_{p_1} \end{bmatrix}$$

where $p = p_1$.

In such example, the pre-coding vector for 1-layer CSI reporting is given by $W_{i_{1,4},i_2}^{(1)} = W_{i_{1,4},i_2}^{1,2,1}$, where the range of values for $i_{1,4}$ and $i_2$ (or/and their components) are defined as in embodiment A4 (or A4A or A4B or A4C or A4D or their combination) for 1-layer CSI reporting.

In such example, the pre-coding matrix for 2-layer CSI reporting is given by $$W_{i_{1,4},i_2}^{(2)} = \frac{1}{\sqrt{2}} [\ W_{i_{1,4},i_2}^{1,2,1} \quad W_{i_{1,4},i_2}^{2,2,1}\ ],$$

where the range of values for $i_{1,4}$ and $i_2$ (or/and their components) are defined as in embodiment A4 (or A4A or A4B or A4C or A4D or their combination) for 2-layer CSI reporting.

In such example, the pre-coding matrix for 3-layer CSI reporting is given by $$W_{i_{1,4},i_2}^{(3)} = \frac{1}{\sqrt{3}} [\ W_{i_{1,4},i_2}^{1,2,1} \quad W_{i_{1,4},i_2}^{2,2,1} \quad W_{i_{1,4},i_2}^{3,2,1}\ ],$$

where the range of values for $i_{1,4}$ and $i_2$ (or/and their components) are defined as in embodiment A4 (or A4A or A4B or A4C or A4D or their combination) for 3-layer CSI reporting.

In such example, the pre-coding matrix for 4-layer CSI reporting is given by $$W_{i_{1,4},i_2}^{(4)} = \frac{1}{\sqrt{4}} [\ W_{i_{1,4},i_2}^{1,2,1} \quad W_{i_{1,4},i_2}^{2,2,1} \quad W_{i_{1,4},i_2}^{3,2,1} \quad W_{i_{1,4},i_2}^{4,2,1}\ ],$$

where the range of values for $i_{1,4}$ and $i_2$ (or/and their components) are defined as in embodiment A4 (or A4A or A4B or A4C or A4D or their combination) for 4-layer CSI reporting.

In one example of Alt A7-1, if the UE is configured with CodebookMode=Config2, then the following quantities are defined as given by:

$$W_{p,n}^{1,2,2} = \frac{1}{\sqrt{P_{CSI-RS}}} \begin{bmatrix} 1 \\ \varphi_{n_0} \\ a_{p_1} b_{n_1} \\ a_{p_2} b_{p_2} \end{bmatrix} \quad W_{p,n}^{2,2,2} = \frac{1}{\sqrt{P_{CSI-RS}}} \begin{bmatrix} 1 \\ -\varphi_{n_0} \\ a_{p_1} b_{n_1} \\ -a_{p_2} b_{p_2} \end{bmatrix}$$

$$W_{p,n}^{3,2,2} = \frac{1}{\sqrt{P_{CSI-RS}}} \begin{bmatrix} 1 \\ \varphi_{n_0} \\ -a_{p_1} b_{n_1} \\ -a_{p_2} b_{p_2} \end{bmatrix} \quad W_{p,n}^{4,2,2} = \frac{1}{\sqrt{P_{CSI-RS}}} \begin{bmatrix} 1 \\ -\varphi_{n_0} \\ -a_{p_1} b_{n_1} \\ a_{p_2} b_{p_2} \end{bmatrix}$$

where $p = [\ p_1 \quad p_2\ ]$ $n = [\ n_0 \quad n_1 \quad n_2\ ]$.

In such example, the pre-coding vector for 1-layer CSI reporting is given by $W_{i_{1,4},i_2}^{(1)} = W_{i_{1,4},i_2}^{1,2,2}$, where the range of values $i_{1,4}$ and $i_2$ (or/and their components) are defined as in embodiment A4 (or A4A or A4B or A4C or A4D or their combination) for 1-layer CSI reporting.

In such example, the pre-coding matrix for 2-layer CSI reporting is given by $$W_{i_{1,4},i_2}^{(2)} = \frac{1}{\sqrt{2}} [\ W_{i_{1,4},i_2}^{1,2,2} \quad W_{i_{1,4},i_2}^{2,2,2}\ ],$$

where the range of values for $i_{1,4}$ and $i_2$ (or/and their components) are defined as in embodiment A4 (or A4A or A4B or A4C or A4D or their combination) for 2-layer CSI reporting.

In such example, the pre-coding matrix for 3-layer CSI reporting is given by $$W_{i_{1,4},i_2}^{(3)} = \frac{1}{\sqrt{3}} [\ W_{i_{1,4},i_2}^{1,2,2} \quad W_{i_{1,4},i_2}^{2,2,2} \quad W_{i_{1,4},i_2}^{3,2,2}\ ],$$

where the range of values for $i_{1,4}$ and $i_2$ (or/and their components) are defined as in embodiment A4 (or A4A or A4B or A4C or A4D or their combination) for 3-layer CSI reporting.

In such example, the pre-coding matrix for 4-layer CSI reporting is given by $$W_{i_{1,4},i_2}^{(4)} = \frac{1}{\sqrt{4}} [\ W_{i_{1,4},i_2}^{1,2,2} \quad W_{i_{1,4},i_2}^{2,2,2} \quad W_{i_{1,4},i_2}^{3,2,2} \quad W_{i_{1,4},i_2}^{4,2,2}\ ],$$

where the range of values for $i_{1,4}$ and $i_2$ (or/and their components) are defined as in embodiment A4 (or A4A or A4B or A4C or A4D or their combination) for 4-layer CSI reporting.

In one example of Alt A7-2, if the UE is configured with CodebookMode=Config3, then the following quantities are defined as given by:

$$W_n^{1,2,3} = \frac{1}{\sqrt{P_{CSI-RS}}} \begin{bmatrix} 1 \\ \varphi_n \\ 0 \\ 0 \end{bmatrix} \quad W_n^{2,2,3} = \frac{1}{\sqrt{P_{CSI-RS}}} \begin{bmatrix} 1 \\ -\varphi_n \\ 0 \\ 0 \end{bmatrix}$$

$$W_n^{3,2,3} = \frac{1}{\sqrt{P_{CSI-RS}}} \begin{bmatrix} 0 \\ 0 \\ 1 \\ \varphi_n \end{bmatrix} \quad W_n^{4,2,3} = \frac{1}{\sqrt{P_{CSI-RS}}} \begin{bmatrix} 0 \\ 0 \\ 1 \\ -\varphi_n \end{bmatrix}.$$

In such example, the pre-coding vector for 1-layer CSI reporting is given by $W_{i_{1,4},i_2}^{(1)} = W_{i_2}^{1,2,3}$, where $i_{1,4}=0$ and $i_1=0,1,2,3$.

In such example, the pre-coding matrix for 2-layer CSI reporting is given by $$W^{(2)}_{i_{1,4},i_2} = \frac{1}{\sqrt{2}}\left[\ W^{1,2,3}_{i_2}\quad W^{2,2,3}_{i_2}\ \right],$$

where $i_{1,4}=0$ and $i_2=0,1$.

In such example, the pre-coding matrix for 3-layer CSI reporting is given by $$W^{(3)}_{i_{1,4},i_2} = \frac{1}{\sqrt{3}}\left[\ W^{1,2,3}_{i_{2,0}}\quad W^{2,2,3}_{i_{2,0}}\quad W^{3,2,3}_{i_{2,1}}\ \right],$$

where $i_{1,4}=0$ and $i_2=[i_{2,0}\ i_{2,1}]$, where $i_{2,q}=0,1$, is reported according to at least one of the following options: Option 0: $i_{2,0}=i_{2,1}$ is reported common for both panels; and Option $i_{2,0}$ and $i_{2,1}$ are reported independently for both panels.

In such example, the pre-coding matrix for 4-layer CSI reporting is given by $$W^{(4)}_{i_{1,4},i_2} = \frac{1}{\sqrt{4}}\left[\ W^{1,2,3}_{i_{2,0}}\quad W^{2,2,3}_{i_{2,0}}\quad W^{3,2,3}_{i_{2,1}}\quad W^{4,2,3}_{i_{2,1}}\ \right],$$

where, $i_{1,4}=0$ and $i_2=[i_{2,0}\ i_{2,1}]$, where $i_{2,q}=0,1$, is reported according to at least one of the following options: Option 0: $i_{2,0}=i_{2,1}$ is reported common for both panels; and Option 1: $i_{2,0}$ and $i_{2,1}$ are reported independently for both panels.

In one example of Alt A7-2A, if the UE is configured with CodebookMode=Config3A, then the following quantities are defined as given by:

$$W^{1,2,3}_{p,n} = \frac{1}{\sqrt{P_{CSI-RS}}}\begin{bmatrix}1\\a_p b_n\\0\\0\end{bmatrix}\quad W^{2,2,3}_{p,n} = \frac{1}{\sqrt{P_{CSI-RS}}}\begin{bmatrix}1\\-a_p b_n\\0\\0\end{bmatrix}$$

$$W^{3,2,3}_{p,n} = \frac{1}{\sqrt{P_{CSI-RS}}}\begin{bmatrix}0\\0\\1\\a_p b_n\end{bmatrix}\quad W^{4,2,3}_{p,n} = \frac{1}{\sqrt{P_{CSI-RS}}}\begin{bmatrix}0\\0\\1\\-a_p b_n\end{bmatrix}.$$

In such example, the pre-coding vector for 1-layer CSI reporting is given by $W^{(1)}_{i_{1,4},i_2}=W^{1,2,3}_{i_{1,4},i_2}$, where $i_{1,3}=0,1,2,3$ and $i_1=0,1,2,3$.

In such example, the pre-coding matrix for 2-layer CSI reporting is given by $$W^{(2)}_{i_{1,4},i_2} = \frac{1}{\sqrt{2}}\left[\ W^{1,2,3}_{i_{1,4},i_2}\quad W^{2,2,3}_{i_{1,4},i_2}\ \right],$$

where $i_{1,4}=0,1,2,3$ and $i_2=0,1$.

In such example, the pre-coding matrix for 3-layer CSI reporting is given by $$W^{(3)}_{i_{1,4},i_2} = \frac{1}{\sqrt{3}}\left[\ W^{1,2,3}_{i_{1,4,0},i_{2,0}}\quad W^{2,2,3}_{i_{1,4,0},i_{2,0}}\quad W^{3,2,3}_{i_{1,4,1},i_{2,1}}\ \right],$$

where $i_{1,4}=[i_{1,4,0}\ i_{1,4,1}]$ and $i_2=[i_{2,0}\ i^{2,1}]$, where $i_{1,4,q}=0,1,2,3$ and $i_{2,q}=0,1$, are reported according to at least one of the following options: Option 0: $i_{1,4,0}=i_{1,4,1}$ or/and $i_{2,0}=i_{2,1}$ is/are reported common for both panels; and Option 1: $i_{1,4,0},i_{1,4,1}$, $i_{2,0}$, and $i_{2,1}$ are reported independently for both panels.

In such example, the pre-coding matrix for 4-layer CSI reporting is given by $$W^{(4)}_{i_{1,4},i_2} = \frac{1}{\sqrt{4}}\left[\ W^{1,2,3}_{i_{1,4,0},i_{2,0}}\quad W^{2,2,3}_{i_{1,4,0},i_{2,0}}\quad W^{3,2,3}_{i_{1,4,1},i_{2,1}}\quad W^{4,2,3}_{i_{1,4,1},i_{2,1}}\ \right],$$

where $i_{1,4}=[i_{1,4,0}\ i_{1,4,1}]$ and $i_2=[i_{2,0}\ i_{2,1}]$, $i_{1,4,q}=0,1,2,3$ and $i_{2,q}=0,1$, are reported according to at least one of the following options: Option 0: $i_{1,4,0}=i_{1,4,1}$ or/and $i_{2,0}=i_{2,1}$ is/are reported common for both panels; and Option 1: $i_{1,4,0}, i_{1,4,1}$, $i_{2,0}$, and $i_{2,1}$ are reported independently for both panels.

In one example of Alt A7-4, if the UE is configured with CodebookMode=Config4, then the pre-coder vector/matrix can be either according to Alt A7-0 or Alt A7-2/A7-2A for all 1-4 layers.

In such example, the codebook for 1-layer CSI reporting is a union of the 1-layer codebook according to Alt A7-0 and the 1-layer codebook according to Alt A7-2/A7-2A.

In such example, the codebook for 2-layer CSI reporting is a union of the 2-layer codebook according to Alt A7-0 and the 2-layer codebook according to Alt A7-2/A7-2A.

In such example, the codebook for 3-layer CSI reporting is a union of the 3-layer codebook according to Alt A7-0 and the 3-layer codebook according to Alt A7-2/A7-2A.

In such example, the codebook for 4-layer CSI reporting is a union of the 4-layer codebook according to Alt A7-0 and the 4-layer codebook according to Alt A7-2/A7-2A.

In one example of Alt A7-5, if the UE is configured with CodebookMode=Config5, then the pre-coder vector/matrix can be either according to Alt A7-1 or Alt A7-2/A7-2A for all 1-4 layers.

In such example, the codebook for 1-layer CSI reporting is a union of the 1-layer codebook according to Alt A7-1 and the 1-layer codebook according to Alt A7-2/A7-2A.

In such example, the codebook for 2-layer CSI reporting is a union of the 2-layer codebook according to Alt A7-1 and the 2-layer codebook according to Alt A7-2/A7-2A.

In such example, the codebook for 3-layer CSI reporting is a union of the 3-layer codebook according to Alt A7-1 and the 3-layer codebook according to Alt A7-2/A7-2A.

In such example, the codebook for 4-layer CSI reporting is a union of the 4-layer codebook according to Alt A7-1 and the 4-layer codebook according to Alt A7-2/A7-2A.

In one example of Alt A7-6, if the UE is configured with CodebookMode=Config6, then the pre-coder vector/matrix is according to Alt A7-x for 1 to r layer CSI reporting and according to Alt A7-y for r+1 to 4 layer CSI reporting where x≠y, and r=1 or 2. A few examples of x and y are as follows: (x, y)=(0, 2) or (0, 2A); (x, y)=(1, 2) or (1, 2A); (x, y)=(3, 2) or (3, 2A); and (x, y)=(4, 2) or (4, 2A).

In one embodiment A7A, at least one of the proposed 4 port codebook in embodiment A7 is also used for TPMI indication (in UL-related DCI signaling) for codebook-based UL transmission. Two alternatives in this case are as follows. In one example of Alt A7A-1, the codebook is used regardless of 4 ports being either on a single panel ($N_g=1$) with 4 single-polarized or dual-polarized antenna ports at the UE or on two panels ($N_g=2$) each with 2 antenna ports at the UE. In one example of Alt A7A-2, the codebook is only used for the case of two panels ($N_g=2$) each with 2 antenna ports at the UE.

In one embodiment A8, the codebook table for $(N_g,N_1,N_2)=(4,1,1)$, i.e., two panels each with 2 ports, is defined by PMI indices $i_{1,4}$ and $i_2$, and quantities $\varphi_n$, $a_p$, and $b_n$ as defined in embodiment A3/A4/A5. The pre-coding vector/matrix for 1-4 layer CSI reporting is according to one of the following alternatives. One of these alternatives is either fixed in the specification or is configured via higher layer signaling.

In one example of Alt A8-0, if the UE is configured with CodebookMode=Config1, then the following quantities are defined as given by:

$$W_{p,n}^{1,4,1} = \frac{1}{\sqrt{P_{CSI-RS}}} \begin{bmatrix} 1 \\ \varphi_n \\ \varphi_{p_1} \\ \varphi_n \varphi_{p_1} \\ \varphi_{p_2} \\ \varphi_n \varphi_{p_2} \\ \varphi_{p_3} \\ \varphi_n \varphi_{p_3} \end{bmatrix} \quad W_{p,n}^{2,4,1} = \frac{1}{\sqrt{P_{CSI-RS}}} \begin{bmatrix} 1 \\ -\varphi_n \\ \varphi_{p_1} \\ -\varphi_n \varphi_{p_1} \\ \varphi_{p_2} \\ -\varphi_n \varphi_{p_2} \\ \varphi_{p_3} \\ -\varphi_n \varphi_{p_3} \end{bmatrix}$$

$$W_{p,n}^{3,4,1} = \frac{1}{\sqrt{P_{CSI-RS}}} \begin{bmatrix} 1 \\ \varphi_n \\ -\varphi_{p_1} \\ -\varphi_n \varphi_{p_1} \\ \varphi_{p_2} \\ \varphi_n \varphi_{p_2} \\ -\varphi_{p_3} \\ -\varphi_n \varphi_{p_3} \end{bmatrix} \quad W_{p,n}^{4,4,1} = \frac{1}{\sqrt{P_{CSI-RS}}} \begin{bmatrix} 1 \\ -\varphi_n \\ -\varphi_{p_1} \\ \varphi_n \varphi_{p_1} \\ \varphi_{p_2} \\ -\varphi_n \varphi_{p_2} \\ -\varphi_{p_3} \\ \varphi_n \varphi_{p_3} \end{bmatrix}$$

where $p = [\, p_1 \; p_2 \; p_3 \,]$.

In such example, the pre-coding vector for 1-layer CSI reporting is given by $W_{i_{1,4},i_2}^{(1)} = W_{i_{1,4},i_2}^{1,4,1}$, where the range of values for $i_{1,4}$ and $i_2$ (or/and their components) are defined as in embodiment A4 (or A4A or A4B or A4C or A4D or their combination) for 1-layer CSI reporting.

In such example, the pre-coding matrix for 2-layer CSI reporting is given by $$W_{i_{1,4},i_2}^{(2)} = \frac{1}{\sqrt{2}} [\, W_{i_{1,4},i_2}^{1,4,1} \; W_{i_{1,4},i_2}^{2,4,1} \,],$$

where the range of values for $i_{1,4}$ and $i_2$ (or/and their components) are defined as in embodiment A4 (or A4A or A4B or A4C or A4D or their combination) for 2-layer CSI reporting.

In such example, the pre-coding matrix for 3-layer CSI reporting is given by $$W_{i_{1,4},i_2}^{(3)} = \frac{1}{\sqrt{3}} [\, W_{i_{1,4},i_2}^{1,4,1} \; W_{i_{1,4},i_2}^{2,4,1} \; W_{i_{1,4},i_2}^{3,4,1} \,],$$

where the range of values for $i_{1,4}$ and $i_2$ (or/and their components) are defined as in embodiment A4 (or A4A or A4B or A4C or A4D or their combination) for 3-layer CSI reporting.

In such example, the pre-coding matrix for 4-layer CSI reporting is given by $$W_{i_{1,4},i_2}^{(4)} = \frac{1}{\sqrt{4}} [\, W_{i_{1,4},i_2}^{1,4,1} \; W_{i_{1,4},i_2}^{2,4,1} \; W_{i_{1,4},i_2}^{3,4,1} \; W_{i_{1,4},i_2}^{4,4,1} \,],$$

where the range of values for $i_{1,4}$ and $i_2$ (or/and their components) are defined as in embodiment A4 (or A4A or A4B or A4C or A4D or their combination) for 4-layer CSI reporting.

In one example of Alt A8-1, if the UE is configured with CodebookMode=Config2, then the following quantities are defined as given by:

$$W_{p,n}^{1,4,2} = \frac{1}{\sqrt{P_{CSI-RS}}} \begin{bmatrix} 1 \\ \varphi_{n_0} \\ a_{p_1} b_{n_1} \\ a_{p_2} b_{n_2} \\ a_{p_3} b_{n_3} \\ a_{p_4} b_{n_4} \\ a_{p_5} b_{n_5} \\ a_{p_6} b_{n_6} \end{bmatrix} \quad W_{p,n}^{2,4,2} = \frac{1}{\sqrt{P_{CSI-RS}}} \begin{bmatrix} 1 \\ -\varphi_{n_0} \\ a_{p_1} b_{n_1} \\ -a_{p_2} b_{n_2} \\ a_{p_3} b_{n_3} \\ -a_{p_4} b_{n_4} \\ a_{p_5} b_{n_5} \\ -a_{p_6} b_{n_6} \end{bmatrix}$$

$$W_{p,n}^{3,4,2} = \frac{1}{\sqrt{P_{CSI-RS}}} \begin{bmatrix} 1 \\ \varphi_{n_0} \\ -a_{p_1} b_{n_1} \\ -a_{p_2} b_{n_2} \\ a_{p_3} b_{n_3} \\ a_{p_4} b_{n_4} \\ -a_{p_5} b_{n_5} \\ -a_{p_6} b_{n_6} \end{bmatrix} \quad W_{p,n}^{4,4,2} = \frac{1}{\sqrt{P_{CSI-RS}}} \begin{bmatrix} 1 \\ -\varphi_{n_0} \\ -a_{p_1} b_{n_1} \\ a_{p_2} b_{n_2} \\ a_{p_3} b_{n_3} \\ -a_{p_4} b_{n_4} \\ -a_{p_5} b_{n_5} \\ a_{p_6} b_{n_6} \end{bmatrix}$$

where $p = [\, p_1 \; p_2 \; p_3 \; p_4 \; p_5 \; p_6 \,]$ $n = [\, n_0 \; n_1 \; n_2 \; n_3 \; n_4 \; n_5 \; n_6 \,]$.

In such example, the pre-coding vector for 1-layer CSI reporting is given by $W_{i_{1,4},i_2}^{(1)} = W_{i_{1,4},i_2}^{1,4,2}$, where the range of values for $i_{1,4}$ and $i_2$ (or/and their components) are defined as in embodiment A4 (or A4A or A4B or A4C or A4D or their combination) for 1-layer CSI reporting.

In such example, the pre-coding matrix for 2-layer CSI reporting is given by $$W_{i_{1,4},i_2}^{(2)} = \frac{1}{\sqrt{2}} [\, W_{i_{1,4},i_2}^{1,4,2} \; W_{i_{1,4},i_2}^{2,4,2} \,],$$

where the range of values for $i_{1,4}$ and $i_2$ (or/and their components) are defined as in embodiment A4 (or A4A or A4B or A4C or A4D or their combination) for 2-layer CSI reporting.

In such example, the pre-coding matrix for 3-layer CSI reporting is given by $$W_{i_{1,4},i_2}^{(3)} = \frac{1}{\sqrt{3}} [ W_{i_{1,4},i_2}^{1,4,2} \quad W_{i_{1,4},i_2}^{2,4,2} \quad W_{i_{1,4},i_2}^{3,4,2} ],$$

where the range of values for $i_{1,4}$ and $i_2$ (or/and their components) are defined as in embodiment A4 (or A4A or A4B or A4C or A4D or their combination) for 3-layer CSI reporting.

In such example, the pre-coding matrix for 4-layer CSI reporting is given by $$W_{i_{1,4},i_2}^{(4)} = \frac{1}{\sqrt{4}} [ W_{i_{1,4},i_2}^{1,4,2} \quad W_{i_{1,4},i_2}^{2,4,2} \quad W_{i_{1,4},i_2}^{3,4,2} \quad W_{i_{1,4},i_2}^{4,4,2} ],$$

where the range of values for $i_{1,4}$ and $i_2$ (or/and their components) are defined as in embodiment A4 (or A4A or A4B or A4C or A4D or their combination) for 4-layer CSI reporting.

In one example of Alt A8-2, if the UE is configured with CodebookMode=Config3, then the following quantities are defined as given by:

$$W_{p,n}^{1,4,3} = \frac{1}{\sqrt{P_{CSI-RS}}} \begin{bmatrix} 1 \\ \varphi_n \\ \varphi_p \\ \varphi_n \varphi_p \\ 0 \\ 0 \\ 0 \\ 0 \end{bmatrix} \quad W_{p,n}^{2,4,3} = \frac{1}{\sqrt{P_{CSI-RS}}} \begin{bmatrix} 1 \\ -\varphi_n \\ \varphi_p \\ -\varphi_n \varphi_p \\ 0 \\ 0 \\ 0 \\ 0 \end{bmatrix}$$

$$W_{p,n}^{3,4,3} = \frac{1}{\sqrt{P_{CSI-RS}}} \begin{bmatrix} 0 \\ 0 \\ 0 \\ 0 \\ 1 \\ \varphi_n \\ \varphi_p \\ \varphi_n \varphi_p \end{bmatrix} \quad W_{p,n}^{4,4,3} = \frac{1}{\sqrt{P_{CSI-RS}}} \begin{bmatrix} 0 \\ 0 \\ 0 \\ 0 \\ 1 \\ -\varphi_n \\ \varphi_p \\ -\varphi_n \varphi_p \end{bmatrix}.$$

In such example, the pre-coding vector for 1-layer CSI reporting is given by $W_{i_{1,4},i_2}^{(1)} = W_{i_{1,4},i_2}^{1,4,3}$, where $i_{1,4}=0,1,2,3$ and $i_2=0,1,2,3$.

In such example, the pre-coding matrix for 2-layer CSI reporting is given by $$W_{i_{1,4},i_2}^{(2)} = \frac{1}{\sqrt{2}} [ W_{i_{1,4},i_2}^{1,4,3} \quad W_{i_{1,4},i_2}^{2,4,3} ],$$

where $i_{1,4}=0,1,2,3$ and $i_2=0,1$.

In such example, the pre-coding matrix for 3-layer CSI reporting is given by $$W_{i_{1,4},i_2}^{(3)} = \frac{1}{\sqrt{3}} [ W_{i_{1,4,0},i_{2,0}}^{1,4,3} \quad W_{i_{1,4,0},i_{2,0}}^{2,4,3} \quad W_{i_{1,4,1},i_{2,1}}^{3,4,3} ],$$

where $i_{1,4}=[i_{1,4,0} \; i_{1,4,1}]$ and $i_2=[i_{2,0} \; i_{2,1}]$, where $i_{1,4,q}=0,1,2,3$ and $i_{2,q}=0,1$, are reported according to at least one of the following options: Option 0: $i_{1,4,0}=i_{1,4,1}$ or/and $i_{2,0}=i_{2,1}$ is/are reported common for the pair of 2 panels; and Option 1: $i_{1,4,0}, i_{1,4,1}, i_{2,0}$, and $i_{2,1}$ are reported independently for the pair of 2 panels.

In such example, the pre-coding matrix for 4-layer CSI reporting is given by $$W_{i_{1,4},i_2}^{(4)} = \frac{1}{\sqrt{4}} [ W_{i_{1,4,0},i_{2,0}}^{1,4,3} \quad W_{i_{1,4,0},i_{2,0}}^{2,4,3} \quad W_{i_{1,4,1},i_{2,1}}^{3,4,3} \quad W_{i_{1,4,1},i_{2,1}}^{4,4,3} ],$$

where $i_{1,4}=[i_{1,4,0} \; i_{1,4,1}]$ and $i_2=[i_{2,0} \; i_{2,1}]$, where $i_{1,4,q}=0,1,2,3$ and $i_{2,q}=0,1$, are reported according to at least one of the following options: Option 0: $i_{1,4,0}=i_{1,4,1}$ or/and $i_{2,0}=i_{2,1}$ is/are reported common for the pair of 2 panels; and Option 1: $i_{1,4,0}, i_{1,4,1}, i_{2,0}$, and $i_{2,1}$ are reported independently for the pair of 2 panels.

In one example of Alt A8-2A, if the UE is configured with CodebookMode=Config3A, then the following quantities are defined as given by:

$$W_{p,n}^{1,4,3} = \frac{1}{\sqrt{P_{CSI-RS}}} \begin{bmatrix} 1 \\ \varphi_{n_0} \\ a_{p_1} b_{n_1} \\ a_{p_2} b_{n_2} \\ 0 \\ 0 \\ 0 \\ 0 \end{bmatrix} \quad W_{p,n}^{2,4,3} = \frac{1}{\sqrt{P_{CSI-RS}}} \begin{bmatrix} 1 \\ -\varphi_{n_0} \\ a_{p_1} b_{n_1} \\ -a_{p_2} b_{n_2} \\ 0 \\ 0 \\ 0 \\ 0 \end{bmatrix}$$

$$W_{p,n}^{3,4,3} = \frac{1}{\sqrt{P_{CSI-RS}}} \begin{bmatrix} 0 \\ 0 \\ 0 \\ 0 \\ 1 \\ \varphi_{n_0} \\ a_{p_1} b_{n_1} \\ a_{p_2} b_{n_2} \end{bmatrix} \quad W_{p,n}^{4,4,3} = \frac{1}{\sqrt{P_{CSI-RS}}} \begin{bmatrix} 0 \\ 0 \\ 0 \\ 0 \\ 1 \\ -\varphi_{n_0} \\ a_{p_1} b_{n_1} \\ -a_{p_2} b_{n_2} \end{bmatrix}$$

where $p = [\; p_1 \quad p_2 \;]$ $n = [\; n_0 \quad n_1 \quad n_2 \;]$.

In one example, the pre-coding vector for 1-layer CSI reporting is given by $W_{i_{1,4},i_2}^{(1)} = W_{i_{1,4},i_2}^{1,4,3}$, where $i_{1,4}=[i_{1,4,0} \; i_{1,4,1}]$ and $i_2=[i_{2,0} \; i_{2,1} \; i_{2,2}]$, where $i_{1,4,q}=0,1,2,3$ and $i_{2,q}=0,1$.

In one example, the pre-coding matrix for 2-layer CSI reporting is given by $$W_{i_{1,4},i_2}^{(2)} = \frac{1}{\sqrt{2}} [ W_{i_{1,4},i_2}^{1,4,3} \quad W_{i_{1,4},i_2}^{2,4,3} ],$$

where $i_{1,4}=[i_{1,4,0} \; i_{1,4,1}]$ and $i_2=[i_{2,0} \; i_{2,1} \; i_{2,2}]$, where $i_{1,4,q}=0,1,2,3$ and $i_{2,q}=0,1$.

In one example, the pre-coding matrix for 3-layer CSI reporting is given by $$W^{(3)}_{i_1,4,i_2} = \frac{1}{\sqrt{3}} [ W^{1,4,3}_{i_{1,4,0},i_{2,0}} \quad W^{2,4,3}_{i_{1,4,0},i_{2,0}} \quad W^{3,4,3}_{i_{1,4,1},i_{2,1}} ],$$

where $i_{1,4,q}=[i_{1,4,q,0} \; i_{1,4,q,1}]$ and $i_{2,q}=[i_{2,q,0} \; i_{2,q,1} \; i_{2,q,2}]$, where $i_{1,4,q,1}=0,1,2,3$ and $i_{2,q,1}=0,1$, are reported according to at least one of the following options: Option 0: $i_{1,4,q,0}=i_{1,4,q,1}$ or/and $i_{2,q,0}=i_{2,q,1}$ is/are reported common for both panels; and Option 1: $i_{1,4,q,0}$, $i_{1,4,q,1}$, $i_{2,q,0}$, and $i_{2,q,1}$ are reported independently for both panels.

In one example, the pre-coding matrix for 4-layer CSI reporting is given by $$W^{(4)}_{i_1,4,i_2} = \frac{1}{\sqrt{4}} [ W^{1,4,3}_{i_{1,4,0},i_{2,0}} \quad W^{2,4,3}_{i_{1,4,0},i_{2,0}} \quad W^{3,4,3}_{i_{1,4,1},i_{2,1}} \quad W^{4,4,3}_{i_{1,4,1},i_{2,1}} ],$$

where $i_{1,4,q}=[i_{1,4,q,0} \; i_{1,4,q,1}]$ and $i_{2,q}=[i_{2,q,0} \; i_{2,q,1} \; i_{2,q,2}]$, where $i_{1,4,q,r}=0,1,2,3$ and $i_{2,q,r}=0,1$, are reported according to at least one of the following options: Option 0: $i_{1,4,q,0}=i_{1,4,q,1}$ or/and $i_{2,q,0}=i_{2,q,1}$ is/are reported common for both panels; and Option 1: $i_{1,4,q,0}$, $i_{1,4,q,1}$, $i_{2,q,0}$, and $i_{2,q,1}$ are reported independently for both panels.

In one example of Alt A8-4, if the UE is configured with CodebookMode=Config4, then the pre-coder vector/matrix can be either according to Alt A8-0 or Alt A8-2/A8-2A for all 1-4 layers.

In such example, the codebook for 1-layer CSI reporting is a union of the 1-layer codebook according to Alt A8-0 and the 1-layer codebook according to Alt A8-2/A8-2A.

In such example, the codebook for 2-layer CSI reporting is a union of the 2-layer codebook according to Alt A8-0 and the 2-layer codebook according to Alt A8-2/A8-2A.

In such example, the codebook for 3-layer CSI reporting is a union of the 3-layer codebook according to Alt A8-0 and the 3-layer codebook according to Alt A8-2/A8-2A.

In such example, the codebook for 4-layer CSI reporting is a union of the 4-layer codebook according to Alt A8-0 and the 4-layer codebook according to Alt A8-2/A8-2A.

In one example of Alt A8-5, if the UE is configured with CodebookMode=Config5, then the pre-coder vector/matrix can be either according to Alt A8-1 or Alt A8-2/A8-2A for all 1-4 layers.

In such example, the codebook for 1-layer CSI reporting is a union of the 1-layer codebook according to Alt A8-1 and the 1-layer codebook according to Alt A8-2/A8-2A.

In such example, the codebook for 2-layer CSI reporting is a union of the 2-layer codebook according to Alt A8-1 and the 2-layer codebook according to Alt A8-2/A8-2A.

In such example, the codebook for 3-layer CSI reporting is a union of the 3-layer codebook according to Alt A8-1 and the 3-layer codebook according to Alt A8-2/A8-2A.

In such example, the codebook for 4-layer CSI reporting is a union of the 4-layer codebook according to Alt A8-1 and the 4-layer codebook according to Alt A8-2/A8-2A.

In one example of Alt A8-6, if the UE is configured with CodebookMode=Config6, then the pre-coder vector/matrix is according to Alt A8-x for 1 to r layer CSI reporting and according to Alt A8-y for r+1 to 4 layer CSI reporting where $x \neq y$, and r=1 or 2 or 4. A few examples of x and y is as follows: (x, y)=(0, 2) or (0, 2A); (x, y)=(1, 2) or (1, 2A); (x, y)=(3, 2) or (3, 2A); and (x, y)=(4, 2) or (4, 2A).

In one embodiment A8A, at least one of the proposed 4 port codebook in embodiment A8 is also used for TPMI indication (in UL-related DCI signaling) for codebook-based UL transmission. Two alternatives in this case are as follows. In one example of Alt A8A-1, the codebook is used regardless of 8 ports being either on a single panel ($N_g=1$) with 8 single-polarized or dual-polarized antenna ports at the UE or 2 panels each with 4 antenna ports at the UE or on two panels ($N_g=4$) each with 2 antenna ports at the UE.

In one example of Alt A8A-2, the codebook is only used for the case of four panels ($N_g=4$) each with 2 antenna ports at the UE.

Figure 14:
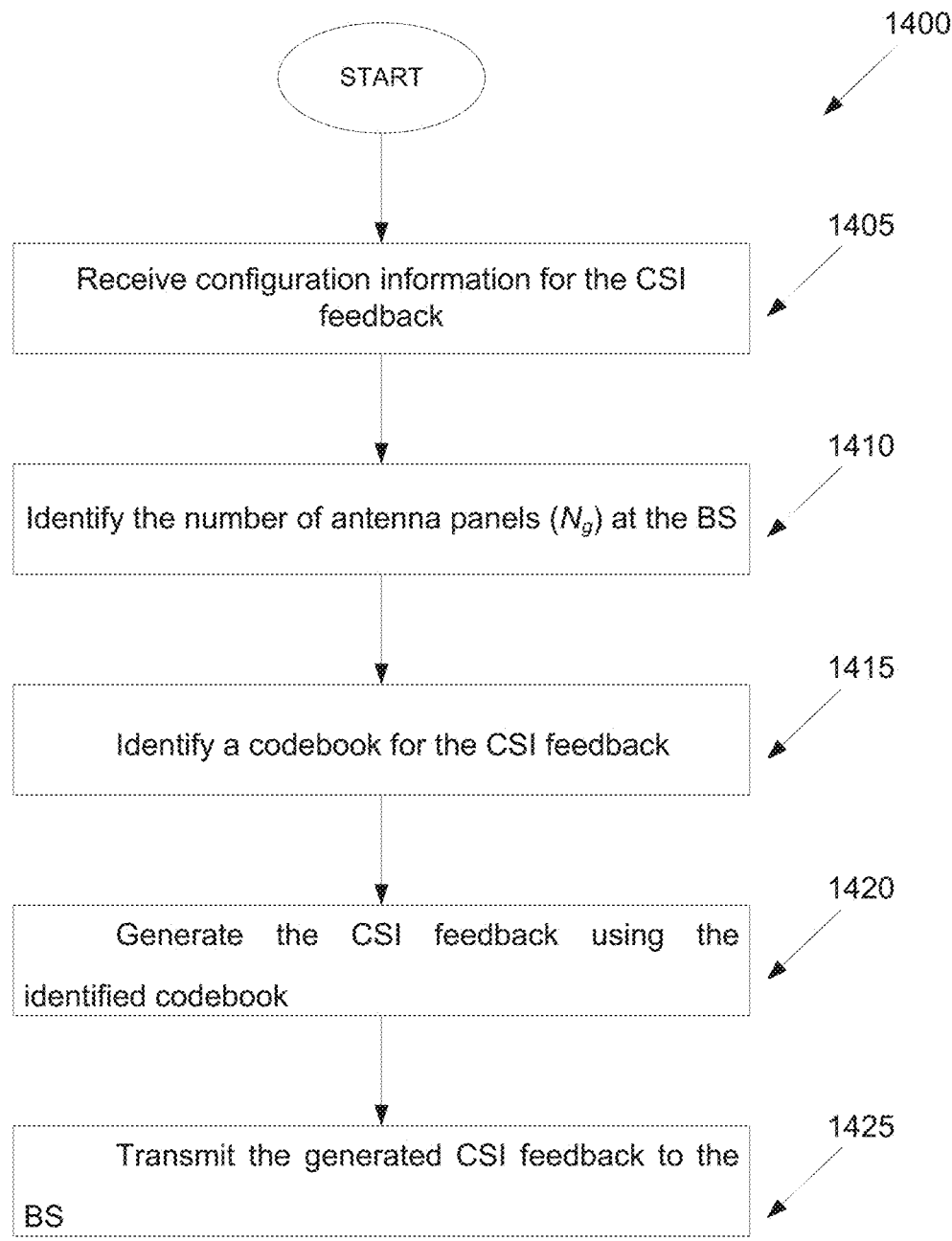
FIG. 14 illustrates a flowchart of a method for CSI feedback according to embodiments of the present disclosure.

FIG. 14 illustrates a flow chart of a method 1400 for CSI feedback according to embodiments of the present disclosure, as may be performed by a user equipment (UE). The embodiment of the method 1400 illustrated in FIG. 14 is for illustration only. FIG. 14 does not limit the scope of this disclosure to any particular implementation.

As illustrated in FIG. 14, the method 1400 begins at step 1405. At step 1405, the UE receives, from a base station (BS), configuration information for the CSI feedback. At step 1405, the configuration information indicates a number of antenna panels ($N_g$) at the BS and a codebook mode, wherein $N_g>1$ and each of the antenna panels comprises antenna ports with a first polarization ($P_1$) and antenna ports with a second polarization ($P_2$).

At step 1410, the UE identifies the number of antenna panels ($N_g$) at the BS. At step 1415, the UE identifies a codebook for the CSI feedback based on the codebook mode configured between a first codebook mode and a second codebook mode.

In one embodiment, the number of antenna panels ($N_g$) is two or four. In one example, if the number of antenna panels is two ($N_g=2$), one of the first codebook mode or the second codebook mode is configured. In one example, if the number of antenna panels is four ($N_g=4$), only the first codebook mode is configured.

In one embodiment, the number of antenna panels is two ($N_g=2$), the second codebook mode is configured, the wideband inter-panel co-phase for each polarization ($P_i$) of a second of the two antenna panels is given by $a_p=e^{j\pi/4}e^{j\pi p/2}$, and the subband inter-panel co-phase for each polarization ($P_i$) of the second antenna panel is given by $b_n=e^{-j\pi/4}e^{j\pi n/2}$, where p=0,1, 2, 3 and n=0,1.

In one embodiment, a combination of ($N_g,N_1,N_2$), configured via the configuration information for the CSI feedback, for a given number of antenna ports and corresponding values of ($O_1, O_2$) are determined according to:

| Number of antenna ports | ($N_g$, $N_1$, $N_2$) | ($O_1$, $O_2$) |
|---|---|---|
| 8 | (2, 2, 1) | (4, 1) |
| 16 | (2, 4, 1) | (4, 1) |
|  | (4, 2, 1) | (4, 1) |
|  | (2, 2, 2) | (4, 4) |
| 32 | (2, 8, 1) | (4, 1) |
|  | (4, 4, 1) | (4, 1) |
|  | (2, 4, 2) | (4, 4) |
|  | (4, 2, 2) | (4, 4) | where $N_1$ and $N_2$ respectively are a number of antenna ports with a polarization ($P_1$ or $P_2$) in first and second dimensions of each of the antenna panels, and $O_1$ and $O_2$ are oversampling factors in the first and second dimensions, respectively, and $N_1$, $N_2$, $O_1$ and $O_2$ are used to obtain a set of two-dimensional discrete Fourier transform (DFT) beams, $v_{l,m}$, where $l=0,1,\ldots,O_1N_1N_1$, $m = 0, 1, \ldots, O_2N_2$, and $$u_m = \begin{cases} \begin{bmatrix} 1 & e^{j\frac{2\pi m}{O_2N_2}} & \ldots & e^{j\frac{2\pi m(N_2-1)}{O_2N_2}} \end{bmatrix} & N_2 > 1 \\ 1 & N_2 = 1 \end{cases}$$

$$v_{l,m} = \begin{bmatrix} u_m & e^{j\frac{2\pi l}{O_1N_1}}u_m & \ldots & e^{j\frac{2\pi l(N_1-1)}{O_1N_1}}u_m \end{bmatrix}^T$$

In various embodiments, for the first codebook mode, the codebook for generating the CSI feedback for $N_g=2,4$ is constructed using vectors:

$$W_{l,m,p,n}^{1,2,1} = \frac{1}{\sqrt{P_{CSI-RS}}} \begin{bmatrix} v_{l,m} \\ \varphi_n v_{l,m} \\ \varphi_{p_1} v_{l,m} \\ \varphi_n \varphi_{p_1} v_{l,m} \end{bmatrix},$$

$$W_{l,m,p,n}^{2,2,1} = \frac{1}{\sqrt{P_{CSI-RS}}} \begin{bmatrix} v_{l,m} \\ -\varphi_n v_{l,m} \\ \varphi_{p_1} v_{l,m} \\ -\varphi_n \varphi_{p_1} v_{l,m} \end{bmatrix},$$

$$W_{l,m,p,n}^{1,4,1} = \frac{1}{\sqrt{P_{CSI-RS}}} \begin{bmatrix} v_{l,m} \\ \varphi_n v_{l,m} \\ \varphi_{p_1} v_{l,m} \\ \varphi_n \varphi_{p_1} v_{l,m} \\ \varphi_{p_2} v_{l,m} \\ \varphi_n \varphi_{p_2} v_{l,m} \\ \varphi_{p_3} v_{l,m} \\ \varphi_n \varphi_{p_3} v_{l,m} \end{bmatrix},$$

$$W_{l,m,p,n}^{2,4,1} = \frac{1}{\sqrt{P_{CSI-RS}}} \begin{bmatrix} v_{l,m} \\ -\varphi_n v_{l,m} \\ \varphi_{p_1} v_{l,m} \\ -\varphi_n \varphi_{p_1} v_{l,m} \\ \varphi_{p_2} v_{l,m} \\ -\varphi_n \varphi_{p_2} v_{l,m} \\ \varphi_{p_3} v_{l,m} \\ -\varphi_n \varphi_{p_3} v_{l,m} \end{bmatrix};$$

where $p = \begin{cases} p_1 & N_g = 2 \\ [p_1 \ p_2 \ p_3] & N_g = 4 \end{cases}$, and for the second codebook mode, the codebook for generating the CSI feedback for $N_g=2$ is constructed using vectors:

$$W_{l,m,p,n}^{1,2,2} = \frac{1}{\sqrt{P_{CSI-RS}}} \begin{bmatrix} v_{l,m} \\ \varphi_{n_0} v_{l,m} \\ a_{p_1} b_{n_1} v_{l,m} \\ a_{p_2} b_{n_2} v_{l,m} \end{bmatrix},$$

$$W_{l,m,p,n}^{2,2,2} = \frac{1}{\sqrt{P_{CSI-RS}}} \begin{bmatrix} v_{l,m} \\ -\varphi_{n_0} v_{l,m} \\ a_{p_1} b_{n_1} v_{l,m} \\ -a_{p_2} b_{n_2} v_{l,m} \end{bmatrix},$$

where: $p = [p_1 \ p_2]$, $n = [n_0 \ n_1 \ n_2]$, $n, n_0 = 0,1,2,3$; $p_1, p_2, p_3 = 0,1,2,3$; $n_1, n_2 = 0,1$; and $P_{CSI-RS}$ is the number of antenna ports, and $\varphi_n = e^{j\pi n/2}$
$a_p = e^{j\pi/4} e^{j\pi p/2}$
$b_n = e^{-j\pi/4} e^{j\pi n/2}$ At step 1420, the UE generates the CSI feedback using the identified codebook. In one embodiment, the CSI feedback includes a pre-coding matrix indicator (PMI) that includes PMI indices $i_{1,1}$, $i_{1,2}$, $i_{1,3}$, $i_{1,4}$, and $i_2$.

In one example for 1-layer CSI feedback: for the first codebook mode, the codebook comprises pre-coding matrices: $W_{l,m,p,n}^{(1)} = W_{l,m,p,n}^{1,N_g,1}$, and for the second codebook mode, the codebook comprises pre-coding matrices: $W_{l,m,p,n}^{(1)} = W_{l,m,p,n}^{1,N_g,2}$.

In one example for 2-layer CSI feedback: for the first codebook mode, the codebook comprises pre-coding matrices:

$$W_{l,l',m,m',p,n}^{(2)} = \frac{1}{\sqrt{2}} \begin{bmatrix} W_{l,m,p,n}^{1,N_g,1} & W_{l',m',p,n}^{2,N_g,1} \end{bmatrix},$$

and for the second codebook mode, the codebook comprises pre-coding matrices:

$$W_{l,l',m,m',p,n}^{(2)} = \frac{1}{\sqrt{2}} \begin{bmatrix} W_{l,m,p,n}^{1,N_g,2} & W_{l',m',p,n}^{2,N_g,2} \end{bmatrix}.$$

In one example for 3-layer CSI feedback: for the first codebook mode, the codebook comprises pre-coding matrices:

$$W_{l,l',m,m',p,n}^{(3)} = \frac{1}{\sqrt{3}} \begin{bmatrix} W_{l,m,p,n}^{1,N_g,1} & W_{l',m',p,n}^{1,N_g,1} & W_{l,m,p,n}^{2,N_g,1} \end{bmatrix},$$

and for the second codebook mode, the codebook comprises pre-coding matrices:

$$W_{l,l',m,m',p,n}^{(3)} = \frac{1}{\sqrt{3}} \begin{bmatrix} W_{l,m,p,n}^{1,N_g,2} & W_{l',m',p,n}^{1,N_g,2} & W_{l,m,p,n}^{2,N_g,2} \end{bmatrix}.$$

In one example for 4-layer CSI feedback: for the first codebook mode, the codebook comprises pre-coding matrices:

$$W_{l,l',m,m',p,n}^{(4)} = \frac{1}{\sqrt{4}} \begin{bmatrix} W_{l,m,p,n}^{1,N_g,1} & W_{l',m',p,n}^{1,N_g,1} & W_{l,m,p,n}^{2,N_g,1} & W_{l',m',p,n}^{2,N_g,1} \end{bmatrix},$$

and for the second codebook mode, the codebook comprises pre-coding matrices:

$$W^{(4)}_{l,l',m,m',p,n} = \frac{1}{\sqrt{4}} [\; W^{1,N_g,2}_{l,m,p,n} \quad W^{1,N_g,2}_{l',m',p,n} \quad W^{2,N_g,2}_{l,m,p,n} \quad W^{2,N_g,2}_{l',m',p,n} \;]$$

where: $l=i_{1,1}$, $m=i_{1,2}$, $l'=i_{1,1}+k_1$, $m'=i_{1,2}+k_2$, for the first codebook mode, $$p = \begin{cases} p_1 = i_{1,4,1} = i_{1,4}, & N_g = 2 \\ [p_1 \; p_2 \; p_3] = [i_{1,4,1} \; i_{1,4,2} \; i_{1,4,3}] = i_{1,4}, & N_g = 4 \end{cases},$$

and $n=i_2$, for the second codebook mode, $N_g=2$, $p=[p_1 \; p_2]=[i_{1,4,1} \; i_{1,4,2}]=i_{1,4}$, and $n=[n_0 \; n_1 \; n_2]=[i_{2,0} \; i_{2,1} \; i_{2,2}]=i_2$, $i_{1,1}$ and $i_{1,2}$ are PMI indices that indicate a first beam $v_{i_{1,1},i_{1,2}}$, $i_{1,3}$ is a PMI index that indicates a distance $(k_1, k_2)$ of a second beam $v_{i_{1,1}+k_1,i_{1,2}+k_2}$ with respect to the first beam $v_{i_{1,1},i_{1,2}}$, $i_{1,4}$ is a PMI index that indicates the wideband inter-panel co-phase, and $i_2$ is a PMI index that indicates: for the first codebook mode, a subband co-phase between two polarizations is common for all of the antenna panels, and for the second codebook mode, the subband co-phase between two polarizations of a first of the antenna panels (via $i_{2,0}$), and the subband inter-panel co-phase for each polarization a second of the antenna panels (via $i_{2,1}$, $i_{2,2}$).

At step 1425, the UE transmits the generated CSI feedback to the BS. In one embodiment, at step 1425, the codebook corresponding to the first codebook mode is used to generate the CSI feedback based on a wideband inter-panel co-phase that is common for a plurality of subbands configured for the CSI feedback. In one embodiment, at step 1425, the codebook corresponding to the second codebook mode is used to generate the CSI feedback based on at least one of (i) a wideband inter-panel co-phase that is common for the plurality of subbands, and (ii) a subband inter-panel co-phase for each of the plurality of subbands.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:
1. A user equipment (UE) for channel state information (CSI) feedback, the UE comprising
 a transceiver configured to receive, from a base station (BS), configuration information for the CSI feedback, the configuration information indicating a number of antenna panels ($N_g$) at the BS and a codebook mode, wherein $N_g>1$ and each of the antenna panels comprises antenna ports with a first polarization ($P_1$) and antenna ports with a second polarization ($P_2$); and
 a processor operably connected to the transceiver, the processor configured to:
  identify the number of antenna panels at the BS,
  identify a codebook for the CSI feedback based on the codebook mode configured between a first codebook mode and a second codebook mode, and
  generate the CSI feedback using the identified codebook,
 wherein the transceiver is further configured to transmit the generated CSI feedback to the BS,
 wherein the codebook corresponding to the first codebook mode is used to generate the CSI feedback based on a wideband inter-panel co-phase that is common for a plurality of subbands configured for the CSI feedback,
 wherein the codebook corresponding to the second codebook mode is used to generate the CSI feedback based on at least one of (i) a wideband inter-panel co-phase that is common for the plurality of subbands, and (ii) a subband inter-panel co-phase for each of the plurality of subbands,
 wherein the number of antenna panels is two or four, wherein if the number of antenna panels is two ($N_g=2$), one of the first codebook mode or the second codebook mode is configured, and wherein if the number of antenna panels is four ($N_g=4$), only the first codebook mode is configured.

2. The UE of claim 1, wherein:
 the number of antenna panels is two ($N_g=2$),
 the second codebook mode is configured,
 the wideband inter-panel co-phase for each polarization ($P_i$) of a second of the two antenna panels is given by $a_p = e^{j\pi i}4e^{j\pi p}/2$, and
 the subband inter-panel co-phase for each polarization ($P_i$) of the second antenna panel is given by $b_n = e^{-j\pi i}/4e^{j\pi n}/2$,
 where $p=0,1,2,3$ and $n=0,1$.

3. The UE of claim 1, wherein:
 a combination of ($N_g$, $N_1$, $N_2$), configured via the configuration information for the CSI feedback, for a given number of antenna ports and corresponding values of ($O_1$, $O_2$) are determined according to:

| Number of antenna ports | ($N_g$, $N_1$, $N_2$) | ($O_1$, $O_2$) |
| --- | --- | --- |
| 8 | (2, 2, 1) | (4, 1) |
| 16 | (2, 4, 1) | (4, 1) |
|  | (4, 2, 1) | (4, 1) |
|  | (2, 2, 2) | (4, 4) |
| 32 | (2, 8, 1) | (4, 1) |
|  | (4, 4, 1) | (4, 1) |
|  | (2, 4, 2) | (4, 4) |
|  | (4, 2, 2) | (4, 4), |

$N_1$ and $N_2$ respectively are a number of antenna ports with a polarization ($P_1$ or $P_2$) in first and second dimensions of each of the antenna panels, and
$O_1$ and $O_2$ are oversampling factors in the first and second dimensions, respectively, and
$N_1$, $N_2$, $O_1$ and $O_2$ are used to obtain a set of two-dimensional discrete Fourier transform (DFT) beams, $v_{l,m}$,
where $l=0, 1, \ldots, O_1 N_1$, $m=0, 1, \ldots, O_2 N_2$, and $$u_m = \begin{cases} \left[ 1 \quad e^{j\frac{2\pi m}{O_2 N_2}} \quad \ldots \quad e^{j\frac{2\pi m(N_2-1)}{O_2 N_2}} \right] & N_2 > 1 \\ 1 & N_2 = 1 \end{cases},$$

-continued $$v_{l,m} = \begin{bmatrix} u_m & e^{j\frac{2\pi l}{O_1 N_1}} u_m & \cdots & e^{j\frac{2\pi l(N_1-1)}{O_1 N_1}} u_m \end{bmatrix}^T.$$

4. The UE of claim 3, wherein:
for the first codebook mode, the codebook for generating the CSI feedback for $N_g=2,4$ is constructed using vectors:

$$W_{l,m,p,n}^{1,2,1} = \frac{1}{\sqrt{P_{CSI-RS}}} \begin{bmatrix} v_{l,m} \\ \varphi_n v_{l,m} \\ \varphi_{p_1} v_{l,m} \\ \varphi_n \varphi_{p_1} v_{l,m} \end{bmatrix},$$

$$W_{l,m,p,n}^{2,2,1} = \frac{1}{\sqrt{P_{CSI-RS}}} \begin{bmatrix} v_{l,m} \\ -\varphi_n v_{l,m} \\ \varphi_{p_1} v_{l,m} \\ -\varphi_n \varphi_{p_1} v_{l,m} \end{bmatrix},$$

$$W_{l,m,p,n}^{1,4,1} = \frac{1}{\sqrt{P_{CSI-RS}}} \begin{bmatrix} v_{l,m} \\ \varphi_n v_{l,m} \\ \varphi_{p_1} v_{l,m} \\ \varphi_n \varphi_{p_1} v_{l,m} \\ \varphi_{p_2} v_{l,m} \\ \varphi_n \varphi_{p_2} v_{l,m} \\ \varphi_{p_3} v_{l,m} \\ \varphi_n \varphi_{p_3} v_{l,m} \end{bmatrix},$$

$$W_{l,m,p,n}^{2,4,1} = \frac{1}{\sqrt{P_{CSI-RS}}} \begin{bmatrix} v_{l,m} \\ -\varphi_n v_{l,m} \\ \varphi_{p_1} v_{l,m} \\ -\varphi_n \varphi_{p_1} v_{l,m} \\ \varphi_{p_2} v_{l,m} \\ -\varphi_n \varphi_{p_2} v_{l,m} \\ \varphi_{p_3} v_{l,m} \\ -\varphi_n \varphi_{p_3} v_{l,m} \end{bmatrix},$$

where $p = \begin{cases} p_1 & N_g = 2 \\ [p_1 \ p_2 \ p_3] & N_g = 4 \end{cases}$, and
for the second codebook mode, the codebook for generating the CSI feedback for $N_g=2$ is constructed using vectors:

$$W_{l,m,p,n}^{1,2,2} = \frac{1}{\sqrt{P_{CSI-RS}}} \begin{bmatrix} v_{l,m} \\ \varphi_{n_0} v_{l,m} \\ a_{p_1} b_{n_1} v_{l,m} \\ a_{p_2} b_{n_2} v_{l,m} \end{bmatrix},$$

$$W_{l,m,p,n}^{2,2,2} = \frac{1}{\sqrt{P_{CSI-RS}}} \begin{bmatrix} v_{l,m} \\ -\varphi_{n_0} v_{l,m} \\ a_{p_1} b_{n_1} v_{l,m} \\ -a_{p_2} b_{n_2} v_{l,m} \end{bmatrix},$$

where:
$p=[p_1 \ p_2]$, $n=[n_0 \ n_1 \ n_2]$, $n$, $n_0=0,1,2,3$, $p_1$, $p_2$, $p_3=0,1,2,3$, $n_1$, $n_2=0,1$, and $P_{CSI-RS}$ is the number of antenna ports,
$\varphi_n = e^{j\pi n/2}$,
$a_p = e^{j\pi/4} e^{j\pi p/2}$, and
$b_n = e^{-j\pi/4} e^{j\pi n/2}$.

5. The UE of claim 4, wherein:
the CSI feedback includes a pre-coding matrix indicator (PMI) that includes PMI indices $i_{1,1}$, $i_{1,2}$, $i_{1,3}$, $i_{1,4}$, and $i_2$,
for 1-layer CSI feedback:
for the first codebook mode, the codebook comprises pre-coding matrices:

$$W_{l,m,p,n}^{(1)} = W_{l,m,p,n}^{1,N_g,1}, \text{ and}$$

for the second codebook mode, the codebook comprises pre-coding matrices:

$$W_{l,m,p,n}^{(1)} = W_{l,m,p,n}^{1,N_g,2},$$

for 2-layer CSI feedback:
for the first codebook mode, the codebook comprises pre-coding matrices:

$$W_{l,l',m,m',p,n}^{(2)} = \frac{1}{\sqrt{2}} \begin{bmatrix} W_{l,m,p,n}^{1,N_g,1} & W_{l',m',p,n}^{2,N_g,1} \end{bmatrix},$$

and
for the second codebook mode, the codebook comprises pre-coding matrices:

$$W_{l,l',m,m',p,n}^{(2)} = \frac{1}{\sqrt{2}} \begin{bmatrix} W_{l,m,p,n}^{1,N_g,2} & W_{l',m',p,n}^{2,N_g,2} \end{bmatrix},$$

for 3-layer CSI feedback:
for the first codebook mode, the codebook comprises pre-coding matrices:

$$W_{l,l',m,m',p,n}^{(3)} = \frac{1}{\sqrt{3}} \begin{bmatrix} W_{l,m,p,n}^{1,N_g,1} & W_{l',m',p,n}^{1,N_g,1} & W_{l,m,p,n}^{2,N_g,1} \end{bmatrix},$$

and
for the second codebook mode, the codebook comprises pre-coding matrices:

$$W_{l,l',m,m',p,n}^{(3)} = \frac{1}{\sqrt{3}} \begin{bmatrix} W_{l,m,p,n}^{1,N_g,2} & W_{l',m',p,n}^{1,N_g,2} & W_{l,m,p,n}^{2,N_g,2} \end{bmatrix},$$

and
for 4-layer CSI feedback:
for the first codebook mode, the codebook comprises pre-coding matrices:

$$W_{l,l',m,m',p,n}^{(4)} = \frac{1}{\sqrt{4}} \begin{bmatrix} W_{l,m,p,n}^{1,N_g,1} & W_{l',m',p,n}^{1,N_g,1} & W_{l,m,p,n}^{2,N_g,1} & W_{l',m',p,n}^{2,N_g,1} \end{bmatrix},$$

and
for the second codebook mode, the codebook comprises pre-coding matrices:

$$W^{(4)}_{l,l',m,m',p,n} = \frac{1}{\sqrt{4}} [ W^{1,N_g,2}_{l,m,p,n} \quad W^{1,N_g,2}_{l',m',p,n} \quad W^{2,N_g,2}_{l,m,p,n} \quad W^{2,N_g,2}_{l',m',p,n} ],$$

where:
$l = i_{1,1}$, $m = i_{1,2}$, $l' = i_{1,1} + k_1$, $m' = i_{1,2} + k_2$,
for the first codebook mode, $$p = \begin{cases} p_1 = i_{1,4,1} = i_{1,4}, & N_g = 2 \\ [p_1 \quad p_2 \quad p_3] = [i_{1,4,1} \quad i_{1,4,2} \quad i_{1,4,3}] = i_{1,4}, & N_g = 4 \end{cases},$$

and $n = i_2$,
for the second codebook mode, $N_g = 2$, $p_1 = [i_{1,4,1} \quad i_{1,4,2}] = i_{1,4}$, $n = [n_0 \quad n_1 \quad n_2] = [i_{2,0} \quad i_{2,1} \quad i_{2,2}] = i_2$,
$i_{1,1}$ and $i_{1,2}$ are PMI indices that indicate a first beam $v_{i_{1,1},i_{1,2}}$,
$i_{1,3}$ is a PMI index that indicates a distance $(k_1, k_2)$ of a second beam $v_{i_{1,1}+k_1, i_{1,2}+k_2}$ with respect to the first beam $v_{i_{1,1},i_{1,2}}$,
$i_{1,4}$ is a PMI index that indicates the wideband inter-panel co-phase, and
$i_2$ is a PMI index that indicates:
  for the first codebook mode, a subband co-phase between two polarizations is common for all of the antenna panels, and
  for the second codebook mode, the subband co-phase between two polarizations of a first of the antenna panels (via $i_{2,0}$), and the subband inter-panel co-phase for each polarization of a second of the antenna panels (via $i_{2,1}$, $i_{2,2}$).

6. The UE of claim 5, wherein:
$k_1 = 0$, $k_2 = 0$, and $i_{1,3}$ is not included for the 1-layer CSI feedback,
mapping of $i_{1,3}$ to $k_1$ and $k_2$ for the 2-layer CSI feedback for $N_g = 2$ or 4 is determined according to:

| | $N_1 > N_2 > 1$ | | $N_1 = N_2$ | | $N_1 = 2, N_2 = 1$ | | $N_1 > 2, N_2 = 1$ | |
|---|---|---|---|---|---|---|---|---|
| $i_{1,3}$ | $k_1$ | $k_2$ | $k_1$ | $k_2$ | $k_1$ | $k_2$ | $k_1$ | $k_2$ |
| 0 | 0 | 0 | 0 | 0 | 0 | 0 | 0 | 0 |
| 1 | $O_1$ | 0 | $O_1$ | 0 | $O_1$ | 0 | $O_1$ | 0 |
| 2 | 0 | $O_2$ | 0 | $O_2$ | | | $2O_1$ | 0 |
| 3 | $2O_1$ | 0 | $O_1$ | $O_2$ | | | $3O_1$ | 0, | and
mapping of $i_{1,3}$ to $k_1$ and $k_2$ for the 3-layer or 4-layer CSI feedback for $N_g = 2$ or 4 is determined according to:

| | $N_1 = 2, N_2 = 1$ | | $N_1 = 4, N_2 = 1$ | | $N_1 = 2, N_2 = 2$ | | $N_1 = 2, N_2 = 2$ | | $N_1 = 4, N_2 = 2$ | |
|---|---|---|---|---|---|---|---|---|---|---|
| $i_{1,3}$ | $k_1$ | $k_2$ | $k_1$ | $k_2$ | $k_1$ | $k_2$ | $k_1$ | $k_2$ | $k_1$ | $k_2$ |
| 0 | $O_1$ | 0 | $O_1$ | 0 | $O_1$ | 0 | $O_1$ | 0 | $O_1$ | 0 |
| 1 | | | $2O_1$ | 0 | $2O_1$ | 0 | 0 | $O_2$ | 0 | $O_2$ |
| 2 | | | $3O_1$ | 0 | $3O_1$ | 0 | $O_1$ | $O_2$ | $O_1$ | $O_2$ |
| 3 | | | | | $4O_1$ | 0 | | | $2O_1$ | 0. |

7. A base station (BS), the BS comprising
a processor configured to generate configuration information for channel state information (CSI) feedback, the configuration information indicating a number of antenna panels ($N_g$) at the BS and a codebook mode, the codebook mode indicating a codebook for the CSI feedback and configured between a first codebook mode and a second codebook mode, wherein $N_g > 1$ and each of the antenna panels comprises antenna ports with a first polarization ($P_1$) and antenna ports with a second polarization ($P_2$); and
a transceiver operably connected to the processor, the transceiver configured to:
  transmit, to a user equipment (UE), the configuration information, and
  receive the CSI feedback from the UE generated in accordance with the indicated codebook,
wherein the codebook corresponding to the first codebook mode is used to generate the CSI feedback based on a wideband inter-panel co-phase that is common for a plurality of subbands configured for the CSI feedback, and
wherein the codebook corresponding to the second codebook mode is used to generate the CSI feedback based on at least one of (i) a wideband inter-panel co-phase that is common for the plurality of subbands, and (ii) a subband inter-panel co-phase for each of the plurality of subbands,
wherein the number of antenna panels is two or four, wherein if the number of antenna panels is two ($N_g = 2$), one of the first codebook mode or the second codebook mode is configured, and wherein if the number of antenna panels is four ($N_g = 4$), only the first codebook mode is configured.

8. The BS of claim 7, wherein:
the number of antenna panels is two ($N_g = 2$),
the second codebook mode is configured,
the wideband inter-panel co-phase for each polarization ($P_i$) of a second of the two antenna panels is given by $a_p = e^{j\pi/4} e^{j\pi p/2}$, and
the subband inter-panel co-phase for each polarization ($P_i$) of the second antenna panel is given by $b_n = e^{-j\pi/4} e^{j\pi n/2}$,
where $p = 0, 1, 2, 3$ and $n = 0, 1$.

9. The BS of claim 7, wherein:
a combination of ($N_g$, $N_1$, $N_2$), configured via the configuration information for the CSI feedback, for a given number of antenna ports and corresponding values of ($O_1$, $O_2$) are determined according to:

| Number of antenna ports | $(N_g, N_1, N_2)$ | $(O_1, O_2)$ |
|---|---|---|
| 8 | (2, 2, 1) | (4, 1) |
| 16 | (2, 4, 1) | (4, 1) |
|  | (4, 2, 1) | (4, 1) |
|  | (2, 2, 2) | (4, 4) |
| 32 | (2, 8, 1) | (4, 1) |
|  | (4, 4, 1) | (4, 1) |
|  | (2, 4, 2) | (4, 4) |
|  | (4, 2, 2) | (4, 4), |

$N_1$ and $N_2$ respectively are a number of antenna ports with a polarization ($P_1$ or $P_2$) in first and second dimensions of each of the antenna panels, $O_1$ and $O_2$ are oversampling factors in the first and second dimensions, respectively, and $N_1$, $N_2$, $O_1$ and $O_2$ are used to obtain a set of two-dimensional discrete Fourier transform (DFT) beams, $v_{l,m}$, where $l=0,1,\ldots,O_1N_1$, $m=0,1,\ldots,O_2N_2$, and $$u_m = \begin{cases} \begin{bmatrix} 1 & e^{j\frac{2\pi m}{O_2 N_2}} & \ldots & e^{j\frac{2\pi m(N_2-1)}{O_2 N_2}} \end{bmatrix} & N_2 > 1 \\ 1 & N_2 = 1 \end{cases}$$

$$v_{l,m} = \begin{bmatrix} u_m & e^{j\frac{2\pi l}{O_1 N_1}} u_m & \ldots & e^{j\frac{2\pi l(N_1-1)}{O_1 N_1}} u_m \end{bmatrix}^T.$$

10. The BS of claim 9, wherein:

for the first codebook mode, the codebook for generating the CSI feedback for $N_g=2,4$ is constructed using vectors:

$$W^{1,2,1}_{l,m,p,n} = \frac{1}{\sqrt{P_{CSI-RS}}} \begin{bmatrix} v_{l,m} \\ \varphi_n v_{l,m} \\ \varphi_{p_1} v_{l,m} \\ \varphi_n \varphi_{p_1} v_{l,m} \end{bmatrix},$$

$$W^{2,2,1}_{l,m,p,n} = \frac{1}{\sqrt{P_{CSI-RS}}} \begin{bmatrix} v_{l,m} \\ -\varphi_n v_{l,m} \\ \varphi_{p_1} v_{l,m} \\ -\varphi_n \varphi_{p_1} v_{l,m} \end{bmatrix},$$

$$W^{1,4,1}_{l,m,p,n} = \frac{1}{\sqrt{P_{CSI-RS}}} \begin{bmatrix} v_{l,m} \\ \varphi_n v_{l,m} \\ \varphi_{p_1} v_{l,m} \\ \varphi_n \varphi_{p_1} v_{l,m} \\ \varphi_{p_2} v_{l,m} \\ \varphi_n \varphi_{p_2} v_{l,m} \\ \varphi_{p_3} v_{l,m} \\ \varphi_n \varphi_{p_3} v_{l,m} \end{bmatrix},$$

$$W^{2,4,1}_{l,m,p,n} = \frac{1}{\sqrt{P_{CSI-RS}}} \begin{bmatrix} v_{l,m} \\ -\varphi_n v_{l,m} \\ \varphi_{p_1} v_{l,m} \\ -\varphi_n \varphi_{p_1} v_{l,m} \\ \varphi_{p_2} v_{l,m} \\ -\varphi_n \varphi_{p_2} v_{l,m} \\ \varphi_{p_3} v_{l,m} \\ -\varphi_n \varphi_{p_3} v_{l,m} \end{bmatrix},$$

where $p = \begin{cases} P_1 & N_g = 2 \\ [P_1 \ P_2 \ P_3] & N_g = 4 \end{cases}$, and for the second codebook mode, the codebook for generating the CSI feedback for $N_g=2$ is constructed using vectors:

$$W^{1,2,2}_{l,m,p,n} = \frac{1}{\sqrt{P_{CSI-RS}}} \begin{bmatrix} v_{l,m} \\ \varphi_{n_0} v_{l,m} \\ a_{p_1} b_{n_1} v_{l,m} \\ a_{p_2} b_{n_2} v_{l,m} \end{bmatrix},$$

$$W^{2,2,2}_{l,m,p,n} = \frac{1}{\sqrt{P_{CSI-RS}}} \begin{bmatrix} v_{l,m} \\ -\varphi_{n_0} v_{l,m} \\ a_{p_1} b_{n_1} v_{l,m} \\ -a_{p_2} b_{n_2} v_{l,m} \end{bmatrix},$$

where:

$p=[P_1 \ P_2]$, $n=[n_0 \ n_1 \ n_2]$, $n$, $n_0=0,1,2,3$, $p_1$, $p_2$, $p_3=n_1$, $n_2=0,1$, and $P_{CSI-RS}$ is the number of antenna ports, $\varphi_n = e^{j\pi n/2}$, $a_p = e^{j\pi/4} e^{j\pi p/2}$, and $b_n = e^{-j\pi/4} e^{j\pi n/2}$.

11. The BS of claim 10, wherein:

the CSI feedback includes a pre-coding matrix indicator (PMI) that includes PMI indices $i_{1,1}$, $i_{1,2}$, $i_{1,3}$, $i_{1,4}$, and $i_2$, for 1-layer CSI feedback:

for the first codebook mode, the codebook comprises pre-coding matrices:

$W_{l,m,p,n}^{(1)} = W_{l,m,p,n}^{1,N_g,1}$, and for the second codebook mode, the codebook comprises pre-coding matrices:

$W_{l,m,p,n}^{(1)} = W_{l,m,p,n}^{1,N_g,2}$, for 2-layer CSI feedback:

for the first codebook mode, the codebook comprises pre-coding matrices:

$$W^{(2)}_{l,l',m,m',p,n} = \frac{1}{\sqrt{2}} \begin{bmatrix} W^{1,N_g,1}_{l,m,p,n} & W^{2,N_g,1}_{l',m',p,n} \end{bmatrix},$$

and for the second codebook mode, the codebook comprises pre-coding matrices:

$$W^{(2)}_{l,l',m,m',p,n} = \frac{1}{\sqrt{2}} [\, W^{1,N_g,2}_{l,m,p,n} \quad W^{2,N_g,2}_{l',m',p,n} \,],$$

for 3-layer CSI feedback:
  for the first codebook mode, the codebook comprises pre-coding matrices:

$$W^{(3)}_{l,l',m,m',p,n} = \frac{1}{\sqrt{3}} [\, W^{1,N_g,1}_{l,m,p,n} \quad W^{1,N_g,1}_{l',m',p,n} \quad W^{2,N_g,1}_{l,m,p,n} \,],$$

and
  for the second codebook mode, the codebook comprises pre-coding matrices:

$$W^{(3)}_{l,l',m,m',p,n} = \frac{1}{\sqrt{3}} [\, W^{1,N_g,2}_{l,m,p,n} \quad W^{1,N_g,2}_{l',m',p,n} \quad W^{2,N_g,2}_{l,m,p,n} \,],$$

and
for 4-layer CSI feedback:
  for the first codebook mode, the codebook comprises pre-coding matrices:

$$W^{(4)}_{l,l',m,m',p,n} = \frac{1}{\sqrt{4}} [\, W^{1,N_g,1}_{l,m,p,n} \quad W^{1,N_g,1}_{l',m',p,n} \quad W^{2,N_g,1}_{l,m,p,n} \quad W^{2,N_g,1}_{l',m',p,n} \,],$$

and
  for the second codebook mode, the codebook comprises pre-coding matrices:

$$W^{(4)}_{l,l',m,m',p,n} = \frac{1}{\sqrt{4}} [\, W^{1,N_g,2}_{l,m,p,n} \quad W^{1,N_g,2}_{l',m',p,n} \quad W^{2,N_g,2}_{l,m,p,n} \quad W^{2,N_g,2}_{l',m',p,n} \,],$$

where:
$l = i_{1,1}$, $m = i_{1,2}$, $l' = i_{1,1} + k_1$, $m' = i_{1,2} + k_2$,
for the first codebook mode, $$p = \begin{cases} p_1 = i_{1,4,1} = i_{1,4}, & N_g = 2 \\ [p_1 \; p_2 \; p_3] = [i_{1,4,1} \; i_{1,4,2} \; i_{1,4,3}] = i_{1,4}, & N_g = 4 \end{cases},$$

and $n = i_2$,
for the second codebook mode, $N_g = 2$, $p_1 = [i_{1,4,1} \; i_{1,4,2}] = i_{1,4}$, $n = [n_0 \; n_1 \; n_2] = [i_{2,0} \; i_{2,1} \; i_{2,2}] = i_2$,
$i_{1,1}$ and $i_{1,2}$ are PMI indices that indicate a first beam $v_{i_{1,1}, i_{1,2}}$, $i_{1,3}$ is a PMI index that indicates a distance $(k_1, k_2)$ of a second beam $v_{i_{1,1}+k_1, i_{1,2}+k_2}$ with respect to the first beam $v_{i_{1,1}, i_{1,2}}$,
$i_{1,4}$ is a PMI index that indicates the wideband inter-panel co-phase, and
$i_2$ is a PMI index that indicates:
  for the first codebook mode, a subband co-phase between two polarizations is common for all of the antenna panels, and
  for the second codebook mode, the subband co-phase between two polarizations of a first of the antenna panels (via $i_{2,0}$), and the subband inter-panel co-phase for each polarization of a second of the antenna panels (via $i_{2,1}$, $i_{2,2}$).

12. The BS of claim 11, wherein:
$k_1 = 0$, $k_2 = 0$, and $i_{1,3}$ is not included for the 1-layer CSI feedback,
mapping of $i_{1,3}$ to $k_1$ and $k_2$ for the 2-layer CSI feedback for $N_g = 2$ or 4 is determined according to:

|  | $N_1 > N_2 > 1$ | | $N_1 = N_2$ | | $N_1 = 2, N_2 = 1$ | | $N_1 > 2, N_2 = 1$ | |
| --- | --- | --- | --- | --- | --- | --- | --- | --- |
| $i_{1,3}$ | $k_1$ | $k_2$ | $k_1$ | $k_2$ | $k_1$ | $k_2$ | $k_1$ | $k_2$ |
| 0 | 0 | 0 | 0 | 0 | 0 | 0 | 0 | 0 |
| 1 | $O_1$ | 0 | $O_1$ | 0 | $O_1$ | 0 | $O_1$ | 0 |
| 2 | 0 | $O_2$ | 0 | $O_2$ |  |  | $2O_1$ | 0 |
| 3 | $2O_1$ | 0 | $O_1$ | $O_2$ |  |  | $3O_1$ | 0, | and
mapping of $i_{1,3}$ to $k_1$ and $k_2$ for the 3-layer or 4-layer CSI feedback for $N_g = 2$ or 4 is determined according to:

|  | $N_1 = 2, N_2 = 1$ | | $N_1 = 4, N_2 = 1$ | | $N_1 = 2, N_2 = 2$ | | $N_1 = 2, N_2 = 2$ | | $N_1 = 4, N_2 = 2$ | |
| --- | --- | --- | --- | --- | --- | --- | --- | --- | --- | --- |
| $i_{1,3}$ | $k_1$ | $k_2$ | $k_1$ | $k_2$ | $k_1$ | $k_2$ | $k_1$ | $k_2$ | $k_1$ | $k_2$ |
| 0 | $O_1$ | 0 | $O_1$ | 0 | $O_1$ | 0 | $O_1$ | 0 | $O_1$ | 0 |
| 1 |  |  | $2O_1$ | 0 | $2O_1$ | 0 | 0 | $O_2$ | 0 | $O_2$ |
| 2 |  |  | $3O_1$ | 0 | $3O_1$ | 0 | $O_1$ | $O_2$ | $O_1$ | $O_2$ |
| 3 |  |  | $4O_1$ | 0 |  |  |  |  | $2O_1$ | 0. |

13. A method for channel state information (CSI) feedback by a user equipment (UE), the method comprising
receiving, from a base station (BS), configuration information for the CSI feedback, the configuration information indicating a number of antenna panels ($N_g$) at the BS and a codebook mode, wherein $N_g > 1$ and each of the antenna panels comprises antenna ports with a first polarization ($P_1$) and antenna ports with a second polarization ($P_2$);
identifying the number of antenna panels at the BS;
identifying a codebook for the CSI feedback based on the codebook mode configured between a first codebook mode and a second codebook mode;
generating the CSI feedback using the identified codebook; and
transmitting the generated CSI feedback to the BS,
wherein the codebook corresponding to the first codebook mode is used to generate the CSI feedback based on a wideband inter-panel co-phase that is common for a plurality of subbands configured for the CSI feedback,
wherein the codebook corresponding to the second codebook mode is used to generate the CSI feedback based on at least one of (i) a wideband inter-panel co-phase that is common for the plurality of subbands, and (ii) a subband inter-panel co-phase for each of the plurality of subbands, wherein the number of antenna panels is two or four,
wherein if the number of antenna panels is two ($N_g=2$), one of the first codebook mode or the second codebook mode is configured, and wherein if the number of antenna panels is four ($N_g=4$), only the first codebook mode is configured.

14. The method of claim 13, wherein:
the number of antenna panels is two ($N_g=2$),
the second codebook mode is configured,
the wideband inter-panel co-phase for each polarization ($P_i$) of a second of the two antenna panels is given by $a_p = e^{j\pi/4} e^{j\pi p/2}$, and
the subband inter-panel co-phase for each polarization ($P_i$) of the second antenna panel is given by $b_n = e^{-j\pi/4} e^{j\pi n/2}$,
where p=0,1,2,3 and n=0,1.

15. The method of claim 13, wherein:
a combination of ($N_g$, $N_1$, $N_2$), configured via the configuration information for the CSI feedback, for a given number of antenna ports and corresponding values of ($O_1$, $O_2$) are determined according to:

| Number of antenna ports | ($N_g$, $N_1$, $N_2$) | ($O_1$, $O_2$) |
|---|---|---|
| 8 | (2, 2, 1) | (4, 1) |
| 16 | (2, 4, 1) | (4, 1) |
|  | (4, 2, 1) | (4, 1) |
|  | (2, 2, 2) | (4, 4) |
| 32 | (2, 8, 1) | (4, 1) |
|  | (4, 4, 1) | (4, 1) |
|  | (2, 4, 2) | (4, 4) |
|  | (4, 2, 2) | (4, 4), |

$N_1$ and $N_2$ respectively are a number of antenna ports with a polarization ($P_1$ or $P_2$) in first and second dimensions of each of the antenna panels,
$O_1$ and $O_2$ are oversampling factors in the first and second dimensions, respectively, and
$N_1$, $N_2$, $O_1$ and $O_2$ are used to obtain a set of two-dimensional discrete Fourier transform (DFT) beams, $v_{l,m}$,
where l=0,1, . . . , $O_1 N_1$, m=0,1, . . . , $O_2 N_2$, and $$u_m = \begin{cases} \begin{bmatrix} 1 & e^{j\frac{2\pi m}{O_2 N_2}} & \cdots & e^{j\frac{2\pi m(N_2-1)}{O_2 N_2}} \end{bmatrix} & N_2 > 1 \\ 1 & N_2 = 1 \end{cases},$$

$$v_{l,m} = \begin{bmatrix} u_m & e^{j\frac{2\pi l}{O_1 N_1}} u_m & \cdots & e^{j\frac{2\pi l(N_1-1)}{O_1 N_1}} u_m \end{bmatrix}^T.$$

16. The method of claim 15, wherein:
for the first codebook mode, the codebook for generating the CSI feedback for $N_g=2,4$ is constructed using vectors:

$$W_{l,m,p,n}^{1,2,1} = \frac{1}{\sqrt{P_{CSI-RS}}} \begin{bmatrix} v_{l,m} \\ \varphi_n v_{l,m} \\ \varphi_{P_1} v_{l,m} \\ \varphi_n \varphi_{P_1} v_{l,m} \end{bmatrix},$$

$$W_{l,m,p,n}^{2,2,1} = \frac{1}{\sqrt{P_{CSI-RS}}} \begin{bmatrix} v_{l,m} \\ -\varphi_n v_{l,m} \\ \varphi_{P_1} v_{l,m} \\ -\varphi_n \varphi_{P_1} v_{l,m} \end{bmatrix},$$

$$W_{l,m,p,n}^{1,4,1} = \frac{1}{\sqrt{P_{CSI-RS}}} \begin{bmatrix} v_{l,m} \\ \varphi_n v_{l,m} \\ \varphi_{P_1} v_{l,m} \\ \varphi_n \varphi_{P_1} v_{l,m} \\ \varphi_{P_2} v_{l,m} \\ \varphi_n \varphi_{P_2} v_{l,m} \\ \varphi_{P_3} v_{l,m} \\ \varphi_n \varphi_{P_3} v_{l,m} \end{bmatrix},$$

$$W_{l,m,p,n}^{2,4,1} = \frac{1}{\sqrt{P_{CSI-RS}}} \begin{bmatrix} v_{l,m} \\ -\varphi_n v_{l,m} \\ \varphi_{P_1} v_{l,m} \\ -\varphi_n \varphi_{P_1} v_{l,m} \\ \varphi_{P_2} v_{l,m} \\ -\varphi_n \varphi_{P_2} v_{l,m} \\ \varphi_{P_3} v_{l,m} \\ -\varphi_n \varphi_{P_3} v_{l,m} \end{bmatrix},$$

where $p = \begin{cases} P_1 & N_g = 2 \\ [P_1 \ P_2 \ P_3] & N_g = 4 \end{cases}$, and
for the second codebook mode, the codebook for generating the CSI feedback for $N_g=2$ is constructed using vectors:

$$W_{l,m,p,n}^{1,2,2} = \frac{1}{\sqrt{P_{CSI-RS}}} \begin{bmatrix} v_{l,m} \\ \varphi_{n_0} v_{l,m} \\ a_{p_1} b_{n_1} v_{l,m} \\ a_{p_2} b_{n_2} v_{l,m} \end{bmatrix},$$

$$W_{l,m,p,n}^{2,2,2} = \frac{1}{\sqrt{P_{CSI-RS}}} \begin{bmatrix} v_{l,m} \\ -\varphi_{n_0} v_{l,m} \\ a_{p_1} b_{n_1} v_{l,m} \\ -a_{p_2} b_{n_2} v_{l,m} \end{bmatrix},$$

where:
p=[$P_1$ $P_2$], n=[$n_0$ $n_1$ $n_2$], n, $n_0$=0,1,2,3, $p_1$, $p_2$, $p_3$=0,1,2,3, $n_1$, $n_2$=0,1, and $P_{CSI-RS}$ is the number of antenna ports, and
$\varphi_n = e^{j\pi n/2}$,
$a_p = e^{j\pi/4} e^{j\pi p/2}$, and
$b_n = e^{-j\pi/4} e^{j\pi n/2}$.

17. The method of claim 16, wherein:
the CSI feedback includes a pre-coding matrix indicator (PMI) that includes PMI indices $i_{1,1}$, $i_{1,2}$, $i_{1,3}$, $i_{1,4}$, and $i_2$,
for 1-layer CSI feedback:
for the first codebook mode, the codebook comprises pre-coding matrices:

$$W_{l,m,p,n}^{(1)} = W_{l,m,p,n}^{1,N_g,1}, \text{ and}$$

for the second codebook mode, the codebook comprises pre-coding matrices:

$$W_{l,m,p,n}^{(1)} = W_{l,m,p,n}^{1,N_g,2},$$

for 2-layer CSI feedback:
for the first codebook mode, the codebook comprises pre-coding matrices:

$$W^{(2)}_{l,l',m,m',p,n} = \frac{1}{\sqrt{2}}[\ W^{1,N_g,1}_{l,m,p,n}\ \ W^{2,N_g,1}_{l',m',p,n}\ ],$$

and for the second codebook mode, the codebook comprises pre-coding matrices:

$$W^{(2)}_{l,l',m,m',p,n} = \frac{1}{\sqrt{2}}[\ W^{1,N_g,2}_{l,m,p,n}\ \ W^{2,N_g,2}_{l',m',p,n}\ ],$$

for 3-layer CSI feedback:
for the first codebook mode, the codebook comprises pre-coding matrices:

$$W^{(3)}_{l,l',m,m',p,n} = \frac{1}{\sqrt{3}}[\ W^{1,N_g,1}_{l,m,p,n}\ \ W^{1,N_g,1}_{l',m',p,n}\ \ W^{2,N_g,1}_{l,m,p,n}\ ],$$

and for the second codebook mode, the codebook comprises pre-coding matrices:

$$W^{(3)}_{l,l',m,m',p,n} = \frac{1}{\sqrt{3}}[\ W^{1,N_g,2}_{l,m,p,n}\ \ W^{1,N_g,2}_{l',m',p,n}\ \ W^{2,N_g,2}_{l,m,p,n}\ ],$$

and for 4-layer CSI feedback:
for the first codebook mode, the codebook comprises pre-coding matrices:

$$W^{(4)}_{l,l',m,m',p,n} = \frac{1}{\sqrt{4}}[\ W^{1,N_g,1}_{l,m,p,n}\ \ W^{1,N_g,1}_{l',m',p,n}\ \ W^{2,N_g,1}_{l,m,p,n}\ \ W^{2,N_g,1}_{l',m',p,n}\ ],$$

and for the second codebook mode, the codebook comprises pre-coding matrices:

$$W^{(4)}_{l,l',m,m',p,n} = \frac{1}{\sqrt{4}}[\ W^{1,N_g,2}_{l,m,p,n}\ \ W^{1,N_g,2}_{l',m',p,n}\ \ W^{2,N_g,2}_{l,m,p,n}\ \ W^{2,N_g,2}_{l',m',p,n}\ ],$$

where:
$l=i_{1,1}$, $m=i_{1,2}$, $l'=i_{1,1}+k_1$, $m'=i_{1,2}+k_2$,
for the first codebook mode, $$p = \begin{cases} p_1 = i_{1,4,1} = i_{1,4}, & N_g = 2 \\ [\ p_1\ \ p_2\ \ p_3\ ] = [\ i_{1,4,1}\ \ i_{1,4,2}\ \ i_{1,4,3}\ ] = i_{1,4}, & N_g = 4 \end{cases},$$

and $n=i_2$,
for the second codebook mode, $N_g=2$, $p_1=[i_{1,4,1}\ i_{1,4,2}]=i_{1,4}$, $n=[n_0\ n_1\ n_2]=[i_{2,0}\ i_{2,1}\ i_{2,2}]=i_2$,
$i_{1,1}$ and $i_{1,2}$ are PMI indices that indicate a first beam $v_{i_{1,1},i_{1,2}}$,
$i_{1,3}$ is a PMI index that indicates a distance ($k_1$, $k_2$) of a second beam $v_{i_{1,1}+k_1,i_{1,2}+k_2}$ with respect to the first beam $v_{i_{1,1},v_{1,2}}$,
$i_{1,4}$ is a PMI index that indicates the wideband inter-panel co-phase, and
$i_2$ is a PMI index that indicates:
for the first codebook mode, a subband co-phase between two polarizations is common for all of the antenna panels, and
for the second codebook mode, the subband co-phase between two polarizations of a first of the antenna panels (via $i_{2,0}$), and the subband inter-panel co-phase for each polarization of a second of the antenna panels (via $i_{2,1}$, $i_{2,2}$).

* * * * *